(12) United States Patent
Abercrombie et al.

(10) Patent No.: US 6,275,920 B1
(45) Date of Patent: Aug. 14, 2001

(54) MESH CONNECTED COMPUTED

(75) Inventors: Andrew P. Abercrombie, Winter Park; David A. Duncan, Orlando; Woodrow Meeker, Orlando; Ronald W. Schoomaker, Orlando; Michele D. Van Dyke-Lewis, Orlando, all of FL (US)

(73) Assignee: TeraNex, Inc., Orlando, FL (US)

( * ) Notice: Subject to any disclaimer, the term of this patent is extended or adjusted under 35 U.S.C. 154(b) by 0 days.

(21) Appl. No.: 09/552,319

(22) Filed: Apr. 24, 2000

Related U.S. Application Data

(62) Division of application No. 09/057,481, filed on Apr. 9, 1998.

(51) Int. Cl.$^7$ .................................................. G06F 12/00
(52) U.S. Cl. ............................................. 712/14; 711/202
(58) Field of Search .......................... 712/1, 14; 711/202, 711/200

(56) References Cited

U.S. PATENT DOCUMENTS

| | | | |
|---|---|---|---|
| 3,287,703 | 11/1966 | Slotnick | 712/13 |
| 3,643,236 | 2/1972 | Kolankowsky et al. | 365/49 |
| 3,815,095 | 6/1974 | Wester | 712/11 |

(List continued on next page.)

FOREIGN PATENT DOCUMENTS

| | | |
|---|---|---|
| 0223690 | 5/1987 | (EP) . |
| 0237218 | 9/1987 | (EP) . |
| 0539595A1 | 5/1993 | (EP) . |
| WO86/03038 | 5/1986 | (WO) . |
| WO90/04235 | 4/1990 | (WO) . |

OTHER PUBLICATIONS

John T. Burkley, MPP VLSI Multiprocessor Integrated Circuit Design, published in *The Massively Parallel Processor*, pp. 206–216, ed. J.L. Potter, (MIT Press, 1985).

W.F. Wong & K.T. Lua, "A preliminary evaluation of a massively parallel processor: GAPP," *Microprocessing and Microprogramming*, pp. 53–62, vol. 29, No. 1, Jul. 1990, Amsterdam, NL.

Alcolea et al., "FAMA Architecture: Implementation details," *Proceedings of IECON '87: 1987 International Conference on Industrial Electronics, Control, and Instrumentation*, pp. 737–744, vol. 2, Nov. 3–6, 1987, Cambridge, Massachusetts.

A. Boubekeur et al., "A Real Experience on Configuring a Wafer Scale 2–D Array of Monobit Processors," *IEEE Transactions on Components, Hybrids, and Manufacturing Technology*, pp. 637–644, vol. 16, No. 7, Nov. 1993, New York, U.S..

(List continued on next page.)

*Primary Examiner*—Eric Coleman
(74) *Attorney, Agent, or Firm*—Burns, Doane, Swecker & Mathis, LLP

(57) ABSTRACT

An apparatus for processing data has a Single-Instruction-Multiple-Data (SIMD) architecture, and a number of features that improve performance and programmability. The apparatus includes a rectangular array of processing elements and a controller. In one aspect, each of the processing elements includes one or more addressable storage means and other elements arranged in a pipelined architecture. The controller includes means for receiving a high level instruction, and converting each instruction into a sequence of one or more processing element microinstructions for simultaneously controlling each stage of the processing element pipeline. In doing so, the controller detects and resolves a number of resource conflicts, and automatically generates instructions for registering image operands that are skewed with respect to one another in the processing element array. In another aspect, a programmer references images via pointers to image descriptors that include the actual addresses of various bits of multi-bit data. Other features facilitate and speed up the movement of data into and out of the apparatus. "Hit" detection and histogram logic are also included.

48 Claims, 59 Drawing Sheets

U.S. PATENT DOCUMENTS

| | | | |
|---|---|---|---|
| 4,167,780 | 9/1979 | Hayashi | 714/30 |
| 4,187,551 | 2/1980 | Nutter et al. | 711/100 |
| 4,215,401 | 7/1980 | Holsztynski et al. | 382/304 |
| 4,309,755 | 1/1982 | Lanty | 710/21 |
| 4,314,349 | 2/1982 | Batcher | 708/230 |
| 4,384,273 | 5/1983 | Ackland et al. | 382/215 |
| 4,489,381 | 12/1984 | Lavallee et al. | 711/117 |
| 4,507,726 | 3/1985 | Grinberg et al. | 712/11 |
| 4,511,967 | 4/1985 | Witalka et al. | 710/1 |
| 4,517,659 | 5/1985 | Chamberlain | 712/11 |
| 4,524,455 | 6/1985 | Holsztynski et al. | 382/303 |
| 4,533,993 | 8/1985 | McCanny et al. | 712/16 |
| 4,541,115 | 9/1985 | Werth | 382/159 |
| 4,546,428 | 10/1985 | Morton | 712/18 |
| 4,573,116 | 2/1986 | Ong et al. | 711/211 |
| 4,574,394 | 3/1986 | Holsztynski et al. | 382/303 |
| 4,628,481 | 12/1986 | Reddaway | 712/11 |
| 4,635,292 | 1/1987 | Mori et al. | 382/304 |
| 4,660,155 | 4/1987 | Thaden et al. | 345/10 |
| 4,667,308 | 5/1987 | Hayes et al. | 365/230.02 |
| 4,720,780 | 1/1988 | Dolecek | 712/18 |
| 4,739,474 | 4/1988 | Holsztynski | 712/14 |
| 4,739,476 | 4/1988 | Fiduccia | 712/22 |
| 4,752,893 | 6/1988 | Guttag et al. | 345/133 |
| 4,769,779 | 9/1988 | Chang et al. | 708/622 |
| 4,884,190 | 11/1989 | Ngai et al. | 712/4 |
| 4,933,846 | 6/1990 | Humphrey et al. | 710/107 |
| 5,038,282 | 8/1991 | Gilbert et al. | 712/14 |
| 5,095,527 | 3/1992 | Uramoto et al. | 712/14 |
| 5,129,060 * | 7/1992 | Pfeiffer | 345/563 |
| 5,179,714 | 1/1993 | Graybill | 712/19 |
| 5,276,819 | 1/1994 | Rau et al. | 711/214 |
| 5,421,019 | 5/1995 | Holsztynski et al. | 712/14 |
| 5,606,707 | 2/1997 | Tomassi et al. | 345/418 |
| 5,710,881 * | 1/1998 | Gupta | 709/200 |
| 5,832,291 * | 11/1998 | Rosen | 712/11 |
| 5,835,971 * | 11/1998 | Ikeda | 711/220 |
| 5,987,468 * | 11/1999 | Singh | 707/100 |

OTHER PUBLICATIONS

The publication "Processing Element and Custom Chip Architecture for the BLITZEN Massively Parallel Processor", Donald W. Blevins, et al., Technical Report TR87–22, pp. 1–27, published Oct. 22, 1987, by The Microelectronics Center of North Carolina.

The publication "Parallel Supercomputing in SIMD Architectures", R. Michael Hord, pp. 85–90; 143–149; 205–217; 312–324; and 356–359, published 1990 by CRC Press.

The publication "The Image Understanding Architecture", Charles C. Weems et al., pp. 21–27, COINS Technical Report 87–76.

The publication "Architecture Descriptions for the Massively Parallel Processor (MPP) and the Airborne Associative Processor (ASPRO)", by John Smit, published Aug. 8, 1980 by Goodyear Aerospace Corporation GER–16785.

The publication "An Evaluation of Some Chips for Image Processing", by T. J. Fountain for University College London, Department of Physics and Astronomy.

The publication for NCR, "Geometric Arithmetic Parallel Processor", Model No. NCR45CG72.

The article "Calculateur Cellulaire Universel Destine a L'Etude Des Structures Cellulaires Specialisees", by J. R. Rochez, appearing in *Digital Processes*, vol. 3, No. 2, pp. 121–138 (1977).

The article "Interconnect Strategies for Fault Tolerant 2D VLSI Arrays", by P. Franzon appearing in *IEEE International Conference on Computer Design: VLSI in Computers* pp. 230–233, Oct. 1986.

* cited by examiner

| MOD | 0000 | 0001 | 0010 | 0011 | 0100 |
|---|---|---|---|---|---|
| CAPS CODE | 7117 | 2112 | 2002 | 2000 | 0002 |
| NEIGHBORHOOD |  |  |  |  |  |

| MOD | 0101 | 0110 | 0111 | 1000 | 1001 |
|---|---|---|---|---|---|
| CAPS CODE | 0110 | 0100 | 0010 | 0001 | 0004 |
| NEIGHBORHOOD |  |  |  |  |  |

| MOD | 1010 | 1011 | 1100 | 1101 | 1110 |
|---|---|---|---|---|---|
| CAPS CODE | 1000 | 4000 | 1001 | 4004 | 5005 |
| NEIGHBORHOOD |  |  |  |  |  |

| 8..0 | 9 | 15..10 | 21..16 | 27..22 | 29..28 | 35..30 | 37..36 | 41..38 | 44..42 | 49..45 | 50 |
|---|---|---|---|---|---|---|---|---|---|---|---|
| mc_adr | A_d_u | A_end | A_bos | R_bos | R_skew | L_bos | L_skew | sig_in | sig_out | discrete | alt_sel |
| 2201 | 2203 | 2205 | 2207 | 2209 | 2211 | 2213 | 2215 | 2217 | 2219 | 2221 | 2223 |

| 34 | 33.32 | 31.30 | 29 | 28 | 27 | 26.24 | 23.22 | 21.20 | 19.17 | 16.15 | 14..12 | 11.10 | 9.8 | 7.4 | 3.0 |
|---|---|---|---|---|---|---|---|---|---|---|---|---|---|---|---|
| ROLL Cmd | MODE Cmd | CM Sel | A Cmd | B Cmd | OP Cmd | RAM Sel | XF Sel | YF Sel | Z Sel | D Sel | C Sel | BL Sel | AL Sel | EW Sel | NS Sel |
| STAGE 3 | | | | | | STAGE 1 | | | | | | STAGE 2 | | | STAGE 3 |

FIG. 25

| | I/O RAM (2K × 64) — 107 | | | | | | | |
|---|---|---|---|---|---|---|---|---|
| | UPPER BLOCK | | | | LOWER BLOCK | | | |
| addr=0 x 000 | 0,0 | 0,1 | 0,2 | 0,3 | 0,4 | 0,5 | 0,6 | 0,7 |
| addr=0 x 001 | 0,8 | 0,9 | 0,10 | 0,11 | 0,12 | 0,13 | 0,14 | 0,15 |
| addr=0 x 002 | 0,16 | 0,17 | 0,18 | 0,19 | 0,20 | 0,21 | 0,22 | 0,23 |
| addr=0 x 003 | 0,24 | 0,25 | 0,26 | 0,27 | 0,28 | 0,29 | 0,30 | 0,31 |
| addr=0 x 004 | 1,0 | 1,1 | 1,2 | 1,3 | 1,4 | 1,5 | 1,6 | 1,7 |
| addr=0 x 005 | 1,8 | 1,9 | 1,10 | 1,11 | 1,12 | 1,13 | 1,14 | 1,15 |
| addr=0 x 006 | 1,16 | 1,17 | 1,18 | 1,19 | 1,20 | 1,21 | 1,22 | 1,23 |
| addr=0 x 007 | 1,24 | 1,25 | 1,26 | 1,27 | 1,28 | 1,29 | 1,30 | 1,31 |
| addr=0 x 008 | 2,0 | 2,1 | 2,2 | 2,3 | 2,4 | 2,5 | 2,6 | 2,7 |
| ⋮ | | | | | | | | |
| addr=0 x 07d | 31,8 | 31,9 | 31,10 | 31,11 | 31,12 | 31,13 | 31,14 | 31,15 |
| addr=0 x 07e | 31,16 | 31,17 | 31,18 | 31,19 | 31,20 | 31,21 | 31,22 | 31,23 |
| addr=0 x 07f | 31,24 | 31,25 | 31,26 | 31,27 | 31,28 | 31,29 | 31,30 | 31,31 |
| addr=0 x 080 | | | | | | | | |
| addr=0 x 081 | | | | | | | | |
| addr=0 x 082 | | | | | | | | |
| addr=0 x 083 | | | | | | | | |
| addr=0 x 084 | | | | | | | | |
| addr=0 x 085 | | | | | | | | |
| addr=0 x 086 | | | | | | | | |
| addr=0 x 087 | | | | | | | | |
| addr=0 x 088 | | | | | | | | |
| addr=0 x 089 | | | | | | | | |
| addr=0 x 08a | | | | | | | | |
| addr=0 x 08b | | | | | | | | |
| addr=0 x 08c | | | | | | | | |
| ⋮ | | | | | | | | |
| addr=0 x 3f4 | | | | | | | | |
| addr=0 x 3f5 | | | | | | | | |
| addr=0 x 3f6 | | | | | | | | |
| addr=0 x 3f7 | | | | | | | | |
| addr=0 x 3f8 | | | | | | | | |
| addr=0 x 3f9 | | | | | | | | |
| addr=0 x 3fa | | | | | | | | |
| addr=0 x 3fb | | | | | | | | |
| addr=0 x 3fc | | | | | | | | |
| addr=0 x 3fd | | | | | | | | |
| addr=0 x 3fe | | | | | | | | |
| addr=0 x 3ff | | | | | | | | |
| | 8 BIT | 8 BIT | 8 BIT | 8 BIT | 8 BIT | 8 BIT | 8 BIT | 8 BIT |

| | \multicolumn{8}{c}{PE ARRAY COLUMN} |
|---|---|---|---|---|---|---|---|---|
| | 0 | 1 | 2 | 3 | 4 | 5 | 6 | 7 |
| bp=0 | 0,7 | 0,6 | 0,5 | 0,4 | 0,3 | 0,2 | 0,1 | 0,0 |
| bp=1 | 1,7 | 1,6 | 1,5 | 1,4 | 1,3 | 1,2 | 1,1 | 1,0 |
| bp=2 | 2,7 | 2,6 | 2,5 | 2,4 | 2,3 | 2,2 | 2,1 | 2,0 |
| bp=3 | 3,7 | 3,6 | 3,5 | 3,4 | 3,3 | 3,2 | 3,1 | 3,0 |
| bp=4 | 4,7 | 4,6 | 4,5 | 4,4 | 4,3 | 4,2 | 4,1 | 4,0 |
| bp=5 | 5,7 | 5,6 | 5,5 | 5,4 | 5,3 | 5,2 | 5,1 | 5,0 |
| bp=6 | 6,7 | 6,6 | 6,5 | 6,4 | 6,3 | 6,2 | 6,1 | 6,0 |
| bp=7 | 7,7 | 7,6 | 7,5 | 7,4 | 7,3 | 7,2 | 7,1 | 7,0 |

FIG. 29F

| | PE ARRAY COLUMN | | | | | | | |
|---|---|---|---|---|---|---|---|---|
| | 0 | 1 | 2 | 3 | 4 | 5 | 6 | 7 |
| bp=0 | 0,7 | 0,6 | 0,5 | 0,4 | 4,7 | 4,6 | 4,5 | 4,4 |
| bp=1 | 1,7 | 1,6 | 1,5 | 1,4 | 5,7 | 5,6 | 5,5 | 5,4 |
| bp=2 | 2,7 | 2,6 | 2,5 | 2,4 | 6,7 | 6,6 | 6,5 | 6,4 |
| bp=3 | 3,7 | 3,6 | 3,5 | 3,4 | 7,7 | 7,6 | 7,5 | 7,4 |
| bp=4 | 0,3 | 0,2 | 0,1 | 0,0 | 4,3 | 4,2 | 4,1 | 4,0 |
| bp=5 | 1,3 | 1,2 | 1,1 | 1,0 | 5,3 | 5,2 | 5,1 | 5,0 |
| bp=6 | 2,3 | 2,2 | 2,1 | 2,0 | 6,3 | 6,2 | 6,1 | 6,0 |
| bp=7 | 3,3 | 3,2 | 3,1 | 3,0 | 7,3 | 7,2 | 7,1 | 7,0 |

FIG. 29G

| | PE ARRAY COLUMN | | | | | | | |
|---|---|---|---|---|---|---|---|---|
| | 0 | 1 | 2 | 3 | 4 | 5 | 6 | 7 |
| bp=0 | 0,7 | 0,6 | 2,7 | 2,6 | 4,7 | 4,6 | 6,7 | 6,6 |
| bp=1 | 1,7 | 1,6 | 3,7 | 3,6 | 5,7 | 5,6 | 7,7 | 7,6 |
| bp=2 | 0,5 | 0,4 | 2,5 | 2,4 | 4,5 | 4,4 | 6,5 | 6,4 |
| bp=3 | 1,5 | 1,4 | 3,5 | 3,4 | 5,5 | 5,4 | 7,5 | 7,4 |
| bp=4 | 0,3 | 0,2 | 2,3 | 2,2 | 4,3 | 4,2 | 6,3 | 6,2 |
| bp=5 | 1,3 | 1,2 | 3,3 | 3,2 | 5,3 | 5,2 | 7,3 | 7,2 |
| bp=6 | 0,1 | 0,0 | 2,1 | 2,0 | 4,1 | 4,0 | 6,1 | 6,0 |
| bp=7 | 1,1 | 1,0 | 3,1 | 3,0 | 5,1 | 5,0 | 7,1 | 7,0 |

FIG. 29H

| | PE ARRAY COLUMN | | | | | | | |
|---|---|---|---|---|---|---|---|---|
| | 0 | 1 | 2 | 3 | 4 | 5 | 6 | 7 |
| bp=0 | 0,7 | 1,7 | 2,7 | 3,7 | 4,7 | 5,7 | 6,7 | 7,7 |
| bp=1 | 0,6 | 1,6 | 2,6 | 3,6 | 4,6 | 5,6 | 6,6 | 7,6 |
| bp=2 | 0,5 | 1,5 | 2,5 | 3,5 | 4,5 | 5,5 | 6,5 | 7,5 |
| bp=3 | 0,4 | 1,4 | 2,4 | 3,4 | 4,4 | 5,4 | 6,4 | 7,4 |
| bp=4 | 0,3 | 1,3 | 2,3 | 3,3 | 4,3 | 5,3 | 6,3 | 7,3 |
| bp=5 | 0,2 | 1,2 | 2,2 | 3,2 | 4,2 | 5,2 | 6,2 | 7,2 |
| bp=6 | 0,1 | 1,1 | 2,1 | 3,1 | 4,1 | 5,1 | 6,1 | 7,1 |
| bp=7 | 0,0 | 1,0 | 2,0 | 3,0 | 4,0 | 5,0 | 6,0 | 7,0 |

| | PE ARRAY COLUMN | | | | | | | |
|---|---|---|---|---|---|---|---|---|
| | 0 | 1 | 2 | 3 | 4 | 5 | 6 | 7 |
| bp=0 | 0,0 | 1,0 | 2,0 | 3,0 | 4,0 | 5,0 | 6,0 | 7,0 |
| bp=1 | 0,1 | 1,1 | 2,1 | 3,1 | 4,1 | 5,1 | 6,1 | 7,1 |
| bp=2 | 0,2 | 1,2 | 2,2 | 3,2 | 4,2 | 5,2 | 6,2 | 7,2 |
| bp=3 | 0,3 | 1,3 | 2,3 | 3,3 | 4,3 | 5,3 | 6,3 | 7,3 |
| bp=4 | 0,4 | 1,4 | 2,4 | 3,4 | 4,4 | 5,4 | 6,4 | 7,4 |
| bp=5 | 0,5 | 1,5 | 2,5 | 3,5 | 4,5 | 5,5 | 6,5 | 7,5 |
| bp=6 | 0,6 | 1,6 | 2,6 | 3,6 | 4,6 | 5,6 | 6,6 | 7,6 |
| bp=7 | 0,7 | 1,7 | 2,7 | 3,7 | 4,7 | 5,7 | 6,7 | 7,7 |

FIG. 29I

MESH CONNECTED COMPUTED

This application is a divisional, of application Ser. No. 09/057,481 filed Apr. 9. 1998.

Some aspects of this invention were made with Government support under Contract No. F08630-95-2-0001 awarded by Air Force Wright Laboratory Armament Directorate. The Government may have certain rights in this invention.

CROSS-REFERENCE TO RELATED APPLICATIONS

The present application is related to commonly assigned U.S. application Ser. No. 09/057,482, now U.S. Pat. No. 6,173,388, entitled "Mesh Connected Computer," filed on an even date herewith, which is incorporated herein by reference in its entirety.

BACKGROUND

The present invention relates to parallel computing, and more particularly to mesh connected computing.

In a number of technological fields, such as digital signal processing of video image data, it is necessary to perform substantially identical logical or arithmetic operations on large amounts of data in a short period of time. Parallel processing has proven to be an advantageous way of quickly performing the necessary computations. In parallel processing, an array of processor elements, or cells, is configured so that each cell performs logical or arithmetic operations on its own data at the same time that all other cells are processing their own data. Machines in which the logical or arithmetic operation being performed at any instant in time is identical for all cells in the array are referred to by several names, including Single Instruction-Multiple Data (SIMD) machines.

A common arrangement for such a machine is as a rectangular array of cells, with each interior cell being connected to its four nearest neighboring cells (designated north, south, east and west) and each edge cell being connected to a data input/output device. In this way, a mesh of processing elements is formed. Accordingly, the term "Mesh Connected Computer" (MCC) is often applied to this architecture.

In a MCC, each cell is connected as well to a master controller which coordinates operations on data throughout the array by providing appropriate instructions to the processing elements. Such an array proves useful, for example, in high resolution image processing. The image pixels comprise a data matrix which can be loaded into the array for quick and efficient processing.

Although SIMD machines may all be based upon the same generic concept of an array of cells all performing the same function in unison, parallel processors vary in details of cell design. For example, U.S. Pat. No. 4,215,401 to Holsztynski et al. discloses a cell which includes a random access memory (RAM), a single bit accumulator, and a simple logical gate. The disclosed cell is extremely simple and, hence, inexpensive and easily fabricated. A negative consequence of this simplicity, however, is that some computational algorithms are quite cumbersome so that it may require many instructions to perform a simple and often repeated task.

U.S. Pat. No. 4,739,474 to Holsztynski et al., represents a higher level of complexity, in which the logic gate is replaced by a full adder capable of performing both arithmetic and logical functions. This increase in the complexity of the cell's computational logic allows fewer cells to provide higher performance.

U.S. patent application Ser. No. 08/112,540, now U.S. Pat. No. 6,073,185 which was filed on August 27, 1993 in the name of Meeker, describes still further improvements in SIMD architecture computers.

It is important to note that the various improvements in this technological field, such as the substitution of a full adder for a logic gate, while superficially simple, are in reality changes of major consequence. The cell structure cannot be allowed to become too complex. This is because in a typical array, the cell will be repeated many times. The cost of each additional element in terms of money and space on a VLSI chip is therefore multiplied many times. It is therefore no simple matter to identify those functions that are sufficiently useful to justify their incorporation into the cell. It is similarly no simple matter to implement those functions so that their incorporation is not realized at too high a cost.

Parallel processors may also vary in the manner of cell interconnection. As mentioned above, cells are typically connected to their nearest physical neighbors. All cells except those at the edge of the entire array are typically connected to four neighbors. However, the provision of alternate paths of interconnection may produce additional benefits in the form of programmable, flexible interconnection between cells.

As mentioned above, MCCs prove especially useful in applications such as high resolution image processing. Various types of sensors are capable of producing large quantities of data signals (henceforth referred to simply as "data") that, when taken together, constitute an "image" of the sensed object or terrain. The term "image" is used broadly throughout this specification to refer not only to pictures produced by visible light, but also to any collection of data, from any type of sensor, that can be considered together to convey information about an object that has been sensed. In many applications, the object or terrain is sensed repeatedly, often at high speed, thereby creating many images constituting a voluminous amount of data. Very often, the image data needs to be processed in some way, in order to be useful for a particular application. While it is possible to perform this processing "off-line" (i.e., at a time after all of the data has been collected), the application that mandates the collection of image data may further require that the images be processed in "real-time", that is, that the processing of the image data keep up with the rate at which it is collected from the sensor. Further complicating the image processing task is the fact that some applications require the sensing and real-time processing of images that are simultaneously collected from two or more sensors.

Examples of the need for high-speed image processing capability can be found in both military and civil applications. For example, future military weapon platforms will use diverse suites of high-data-rate infrared, imaging laser, television, and imaging radar sensors that require real-time automatic target detection, recognition, tracking, and automatic target handoff-to-weapons capabilities. Civil applications for form processing and optical character recognition, automatic fingerprint recognition, and geographic information systems are also being pursued by the government.

Perhaps the greatest future use of real-time image processing will be in commercial applications like medical image enhancement and analysis, automated industrial inspection and assembly, video data compression, expansion, editing and processing, optical character reading, automated document processing, and many others.

Consequently, the need for real-time image processing is becoming a commonplace requirement in commercial and civil government markets as well in the traditional high-performance military applications. The challenge is to develop an affordable processor that can handle the tera-operations-per-second processing requirement needed for complex image processing algorithms and the very high data rates typical of video imagery.

One solution that has been applied to image processing applications with some success has been the use of high-performance digital signal processors (DSP), such as the Intel i860 or the Texas Instruments (TI) TMS320C40, which have architectures inspired by high-performance military vector processing algorithms, such as linear filters and the fast Fourier transform. However, traditional DSP architectural characteristics, such as floating point precision and concurrent multiply-accumulate (vector) hardware components, are less appropriate for image processing applications since they process with full precision whether it is needed or not.

New hardware architectures created specifically for image processing applications are beginning to emerge from the military aerospace community to satisfy the demanding requirements of civil and commercial image processing applications. Beyond the high input data rates and complex algorithms, the most unique characteristics of image processing applications are the two-dimensional image structures and the relatively low precision required to represent and process video data. Sensor input data precision is usually only 8 to 12 bits per pixel. Shape analysis edge operations can be accomplished with a single bit of computational precision. While it is possible that some other operations may require more than 12 bits, the average precision required is often 8 bits or less. These characteristics can be exploited to create hardware architectures that are very efficient for image processing.

Both hard-wired (i.e., algorithm designed-in hardware) and programmable image processing architectures have been tried. Because of the immaturity of image processing-algorithms, programmable image processing architectures (which, by definition, are more flexible than hard-wired approaches) are the most practical. These architectures include Single Instruction Single Data (SISD) uniprocessors, Multiple Data Multiple Instruction (MIMD) vector processors, and Single Instruction Multiple Data (SIMD) two-dimensional array processors.

Massively parallel SIMD operating architectures, having two-dimensional arrays of processing elements (PE), each operating on a small number of pixels, have rapidly matured over the last 10 years to become the most efficient architecture for high-performance image processing applications. These architectures exploit image processing's unique algorithm and data structure characteristics, and are therefore capable of providing the necessary tera-operation-per-second support to image processing algorithms at the lowest possible hardware cost.

The bit-serial design of most SIMD image processing architectures represents the logical and complete extension of the Reduced Instruction Set Computer (RISC) design concept. Where required by the algorithm suite, the SIMD bit serial PE is flexible enough to perform 1 bit or full precision floating point operations. In all cases, the highest possible implementation efficiencies are achieved because excess hardware in the SIMD architecture is never idle, in contrast to those solutions which employ DSP hardware for image processing. Two-dimensional SIMD image processing architectures also mirror the two-dimensional image data structures to achieve maximum interprocessor communication efficiency. These processors typically use direct nearest neighbor (i.e, north, south, east, and west) PE connections to form fine-grained, pixel-to-processor mapping between the computer architecture and the image data structure. The two-dimensional grid of interconnections provides two-dimensional SIMD architectures with inherent scalability. As the processing array is increased in size, the data bandwidth of the inter-PE bus (i.e, two-dimensional processor interconnect) increases naturally and linearly.

While a SIMD architecture makes available the raw processing power necessary to process image data in real-time, this capability is of little use if the processor is left idle whenever the surrounding hardware is either supplying image data to, or retrieving processed data from, the processor. Thus, it is necessary for the overall architecture of a real-time image processor to efficiently collect data from the sensors, supply it to the processing engine, and just as quickly move processed data out of the processing engine.

A number of these problems are addressed in a real-time image processor as described in U.S. Pat. No. 5,606,707, to Tomassi et al. In the Tomassi et al. processor, a mesh-connected array of processing elements is coupled to other components that perform such tasks as instruction generation, and image management, including the moving of images into and out of the array of processing elements. It is now recognized by the inventors of the present invention that one drawback with the system as described in the Tomassi et al. patent derives from its hardware organization. In particular, the Tomassi et al. system is implemented as five separate Application Specific Integrated Circuits (ASICs) that, together, operate as a complete system. The result is high cost, high complexity and high risk in the design of complete systems. The functional partitioning of the Tomassi et al. system also tends to limit the input/output (I/O) bandwidth, affecting the overall throughput.

SUMMARY

It is therefore an object of the invention to improve computation speed in a SIMD processor.

It is a further object of the invention to improve the mechanism by which data is moved into, out of, and within an array of processing elements in a mesh connected computer.

It is yet another object of the invention to improve the ease with which a SIMD processor is controlled.

In accordance with one aspect of the present invention, the foregoing and other objects are achieved in an apparatus for processing data that has a Single-Instruction-Multiple-Data (SIMD) architecture, and a number of features that improve performance and programmability. The apparatus may include a rectangular array of processing elements and a controller. In one aspect, each of the processing elements includes one or more addressable storage means and other elements arranged in a pipelined architecture. The controller includes means for receiving a high level instruction, and converting each instruction into a sequence of one or more processing element microinstructions for simultaneously controlling each stage of the processing element pipeline. In doing so, the controller detects and resolves a number of resource conflicts, and automatically generates instructions for registering image operands that are skewed with respect to one another in the processing element array.

In another aspect, a programmer references images via pointers to image descriptors that include the actual addresses of various bits of multi-bit data.

In still other aspects of the invention, image descriptors may include any of a number of attribute fields that define various characteristics of the operand represented thereby.

In yet other aspects, image descriptors may include any of a number of attribute fields that define alternative ways of interpreting other fields in the image descriptors.

Other features facilitate and speed up the movement of data into and out of the apparatus. These features include splitting the processing element array into two halves for the purpose of data input and output, whereby, in one embodiment, data may be simultaneously moved from in input/output (I/O) memory into both halves of the processing element array. With the array split in two in this manner, the number of shifts required to move data from an I/O port at one edge of the half array to an opposite edge of the half array is only half that which would be required to shift data through an entire array. The same technique may be employed to move data from each half array to the I/O memory.

Other aspects of the invention include the provision of "hit" detection and histogram logic.

BRIEF DESCRIPTION OF THE DRAWINGS

The objects and advantages of the invention will be understood by reading the following detailed description in conjunction with the drawings in which:

FIG. 23 illustrates an exemplary format of a PSEQ instruction word that is received from the instruction sequencer 1205;

FIG. 25 illustrates how the PE Command Word is broken up by pipeline delay correction;

FIGS. 28A, 28B and 28C respectively depict how a sample image made up of 8-bit pixels will be stored in the I/O RAM 107, the resultant distribution of pixels in the north and south PE arrays, and how, for pixel sizes greater than 1, the bits that make up any one pixel are distributed among a number of PEs after having been moved from the I/O RAM;

FIGS. 29A–29I illustrate the steps for repositioning data bits within the PE array so that each PE 701 has stored therein all of the bits that make up an individual pixel;

DETAILED DESCRIPTION

Figure 1:
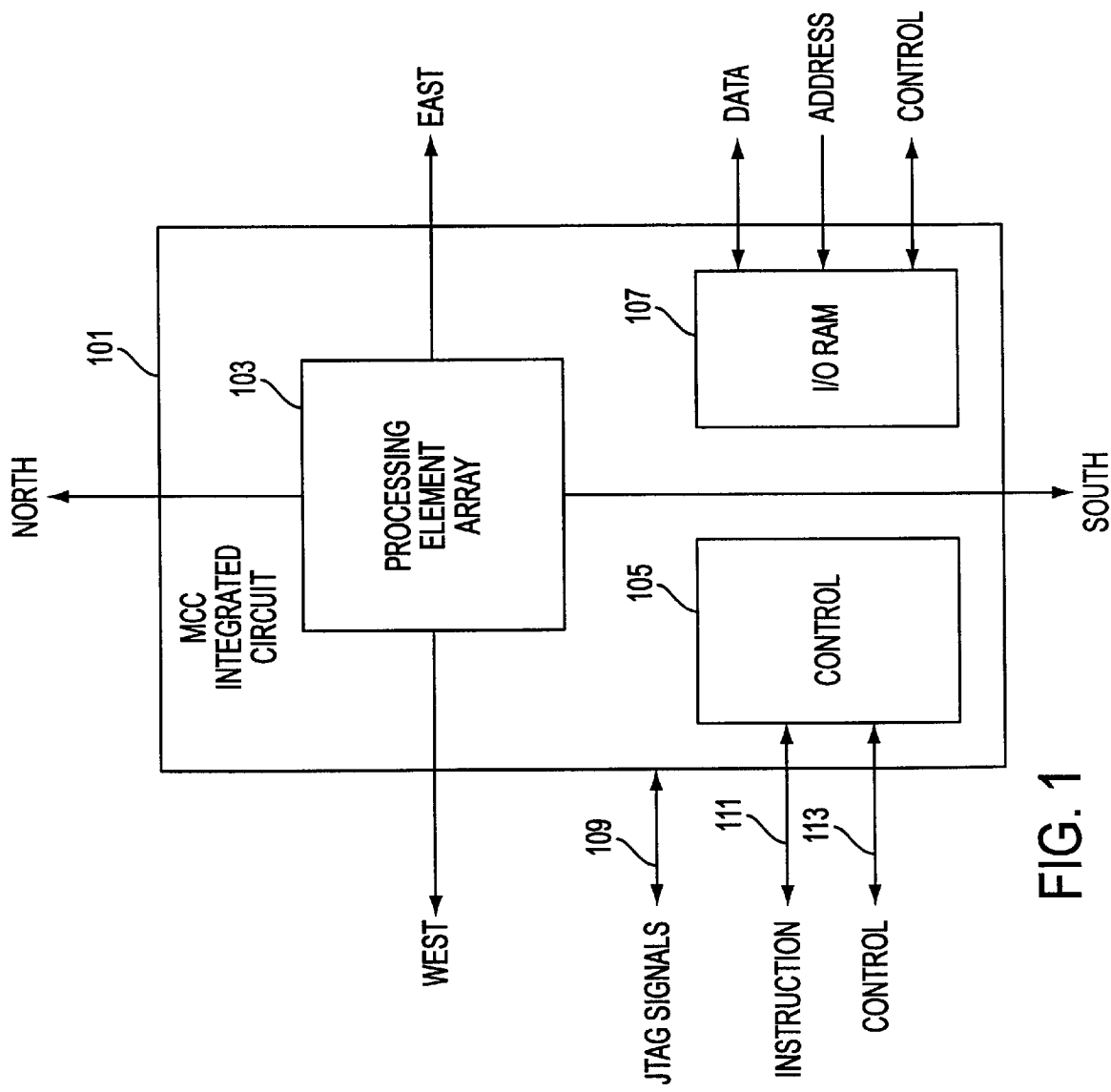
FIG. 1 is a very high level block diagram of the Mesh Connected Computer integrated circuit (MCC IC) in accordance with one aspect of the invention.

The various features of the invention will now be described with respect to the figures, in which like parts are identified with the same reference characters. The signal level convention utilized in this document is that all signals are active when the input voltage is a logic "high" unless the signal has a "–" (minus sign) suffix indicating that it is "active low". The definition of what type of logic levels constitute "active low" and "active high" signals is, of course arbitrary. For the purpose of the exemplary embodiments described herein, signals that are "active low", are defined as active when the signal is at a logic "low".

Signals that have a "–" (minus sign) embedded in the middle are bilateral signals (i.e. a signal that has one meaning when it is a logic "high" and another when it is a logic "low"). The label prior to the negation symbol ("–") is the meaning when it is "high" and the portion of the label following the negation symbol is the meaning when the signal is "low". For example, R-W indicates that when the signal is high, the operation being selected is a READ, and when the signal is low, the operation selected is a WRITE.

In one embodiment, the inventive mesh connected computer (MCC) is implemented as a single integrated circuit. FIG. 1 is a very high level block diagram of the MCC integrated circuit (MCC IC) 101. As will be described in greater detail below, the MCC architecture includes an array of identical Processing Elements (PE) 103, such as those described in U.S. patent application Ser. No. 08/112,540, which was filed on Aug. 27, 1993 in the name of Meeker, and which is hereby incorporated herein by reference. In alternative embodiments, the architecture of the individual PEs that make up the PE array 103 include additional improvements that are discussed below in more detail. In each of the various embodiments, however, interior PEs in the array 103 are each connected to a north, south, east and west neighboring PE. Those PEs that make up the perimeter of the array lack one or more neighbors, and therefore provide interface signals to the array. These interface signals are made available at the interface of the MCC IC 101.

The MCC architecture further includes a controller 105 for coordinating the operation of the various resources of the MCC IC 101 so that the various actions specified by instructions and other control signals supplied to the MCC IC 101 will be carried out. The MCC architecture still further includes an input/output random access memory (I/O RAM) 107, whose purpose is to hold data (e.g., image data) that is to be moved into or out of the MCC IC 101. Associated with the I/O RAM 107 are various data, address and control signals that enable the MCC integrated circuit 101 to be viewed as an addressable resource by hardware that is external to the MCC IC 101.

The MCC ICC 101 may also contain a Phase-Locked Loop (PLL) clock circuit for the processor clock (PCLK).

Although it is not essential to the normal operation of the MCC IC 101, preferred embodiments still further include hardware that permits the architecture to be controlled and its resources viewed under test conditions. This hardware may be provided in accordance with standard specifications such as the JTAG signals 109 defined by IEEE 1149.1.

1. Signal Interface of the MCC IC 101

The various types of possible interface signals to the MCC integrated circuit 101 may broadly be grouped into the following categories:

Control Interface Signals;

Memory Interface Signals (signals associated with the I/O RAM 107 and with other storage elements within the MCC IC 101);

Processing Element Array Interface Signals;

PLL Interface Signals;

Miscellaneous Signals (status and control signals for an array of MCC ICs 101); and JTAG Signals.

Figure 2:
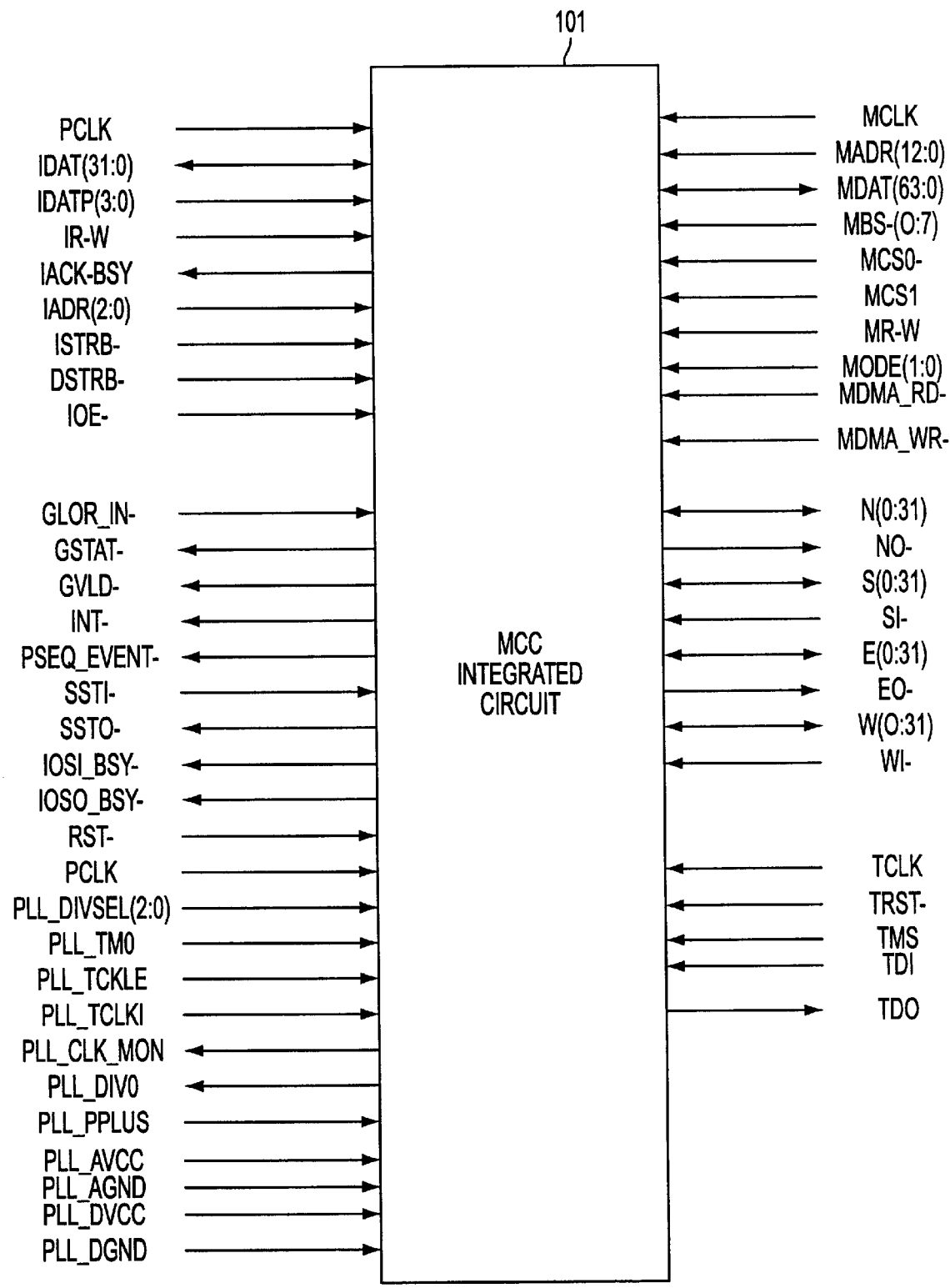
FIG. 2 is a block diagram illustrating, in more detail, an exemplary signal interface of the exemplary MCC IC.

FIG. 2 is a block diagram illustrating, in more detail, an exemplary signal interface of the MCC IC 101. These signals will now be described in greater detail.

1.1 Control Interface

The control interface consists of an Instruction Bus 111 and additional miscellaneous control signals 113. The Instruction Bus 111 provides control signals for specifying MCC IC instructions, for providing read-write access to "image descriptors" (described in greater detail below) and other MCC IC 101 resources, and for status and interrupt control. The ISTRB- and DSTRB-signals provide two distinct modes of access using the Control Interface: Instruction Mode and Direct Mode. The Instruction Mode is the "normal" MCC instruction word dispatch and operand access mode, in which bus traffic is piped through a fetch unit (described in greater detail below), and bus handshake signals enforce access execution order dependencies. More specifically, the 32 bit IDAT signals are handshake managed for instruction launches and data reads via the IR-W, ISTRB-, IACK-BSY, and IOE-signals.

By contrast, the Direct Mode provides a direct access path for reading and writing resources of the MCC IC 101 and is used primarily for initialization, execution debugging, and interrupt handling.

The exemplary Control Interface, then, consists of the signals listed in Table 1.

TABLE 1

| Name | In/Out | Function |
| --- | --- | --- |
| PCLK | I | Processor Clock (see PLL Interface for more details) |
| IDAT (31:0) | I/O | Instruction Data |
| IDATP (3:0) | I | Instruction Data Parity Byte-Parity (Input only) signals for Instruction Mode write access only. When enabled, a parity error will be signaled as an interrupt condition and the MCC IC instruction fetch pipe will enter a trap (halt) state. |
| IR-W | I | Instruction Data Read/Write Specifies a read or write access for either Instruction Mode or Direct Access Mode. Read = 1. Write = 0 |
| IACK-BSY | O | Instruction Acknowledge/Busy Used for Instruction Mode only. It |

TABLE 1-continued

| Name | In/Out | Function |
|---|---|---|
| | | provides a busy signal for instruction writes, and an acknowledge signal for reads. Note the timing diagram in FIG. 3. An IACK-BSY- acknowledge state indicates that upon the next clock cycle the interface will accept an instruction write applied to IDAT. For a data read, an acknowledge indicates valid data returned upon IDAT. Acknowledge = 1. Busy = 0. |
| IADR (2:0) | I | Direct Mode Address Used only in Direct Access Mode. Provides address signals to access Direct Access resources. |
| INSTR_ENABLE- | I | Instruction Enable This signal allows the instruction interface to run at a rate less than that of the internal array clock. For an instruction bus interface that runs at one half of the internal rate, the PLL may be programmed to perform a clock-doubling function and the INSTR_ENABLE- signal may be tied to the same signal as the PCLK input. |
| ISTRB- | I | Instruction mode strobe Indicates an Instruction Mode read access or write access. Access = 0. |
| DSTRB- | I | Direct Access mode strobe Indicates a Direct Access Mode read access or write access. Access = 0. |
| IOE- | I | Instruction Output Enable Enables the output enable circuitry for the IDAT signals. Where an array of MCC chips share a common Control Interface, only one MCC chip may have an active IOE- signal. Active = 0. |

Figure 3:
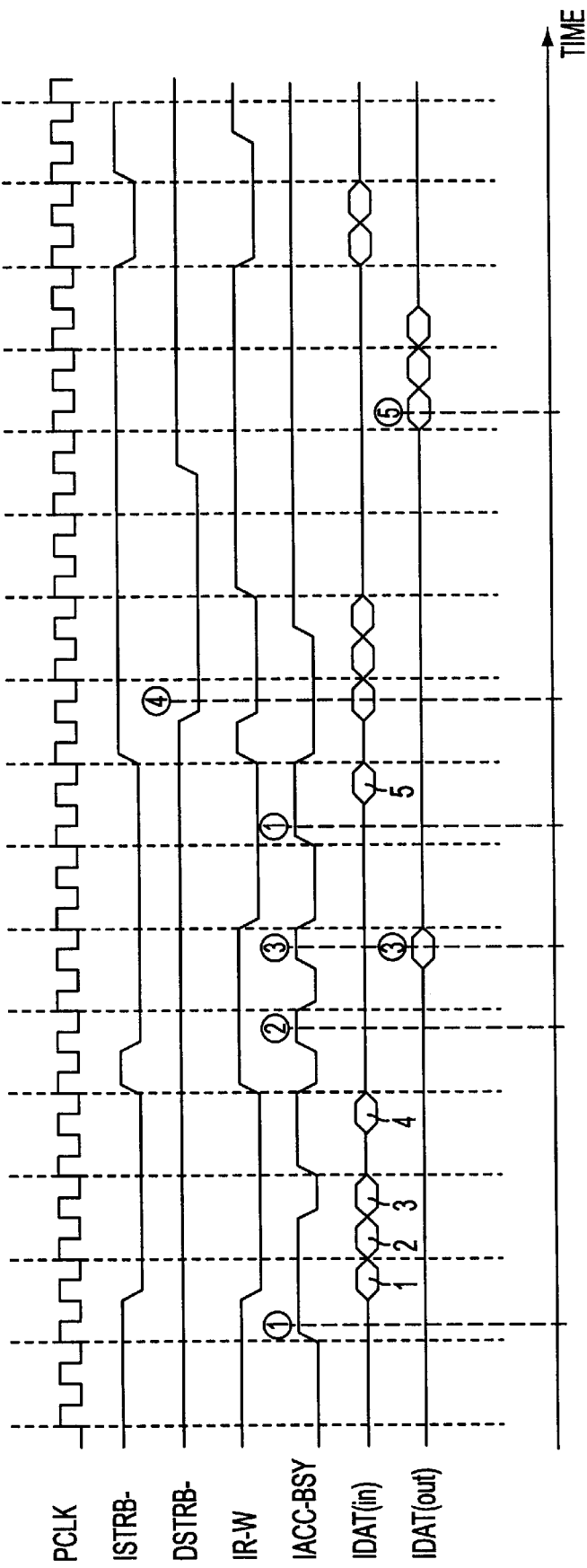
FIG. 3 is a timing diagram of the instruction accesses of the MCC IC in accordance with one aspect of the invention.

All instruction interface accesses are synchronous to the MCC execution clock (PCLK), as shown in the timing diagram of FIG. 3. At the points labeled time 1, an active (=1) IACC-BSY signal indicates that the MCC IC 101 will accept an instruction during the following clock cycle, provided that ISTRB- and IR-W (wr) are asserted. At the point labeled time 2, in response to an ISTRB- initiated read (IR-W=1), the IACC-BSY signal will transition to busy (=0) on the next clock cycle. This cycle should be ignored by the controlling device. At time 3, the IACC-BSY signal will acknowledge the presence of valid data upon IDAT with a high signal. It will transition to a low in the following clock cycle. At time 4, DSTRB-initiated access does not use IACC-BSY to determine cycle validity or read data available. At time 5, one can observe the clock delay for data in response to DSTRB-read access. Because of this, IR-W must be left in the READ state until the read operation is completed.

1.2 Memory Interface Signals

The category designated "memory interface signals" includes signals associated with controlling not only the I/O RAM 107, but also a mailbox memory 1821, a chip identification (ID) register 1833, and a DMA address base register 1841. The purpose of the I/O RAM 107 was briefly discussed above. In an exemplary embodiment, the mailbox memory 1821 serves as a buffer for exchanging data between a memory bus and an instruction bus within the MCC IC 101. (Such a buffer may be necessary because these buses may be controlled by different processors and/or by different clocks.) The DMA address base register 1841 provides I/O RAM addresses for all DMA accesses on the memory bus. This register auto-increments on each access. The chip ID register 1833 provides a unique ED for each chip in an array of MCC ICs 101. The chip ID value is compared to a chip select value (which is sent to all chips) in order to determine chip select status. Whether the memory interface signals are associated with the I/O RAM 107, the mailbox memory 1821, the chip ID register 1833 or the DMA address base register 1841 is determined by a memory mapping strategy such as the exemplary mapping of the memory interface of the MCC IC 101 depicted in Table 3. In an exemplary embodiment, the memory interface includes the signals listed in Table 2 below.

TABLE 2

| Name | In/Out | Function |
|---|---|---|
| MCLK | I | Clock for Memory Interface |
| MADR (12:0) | I | Address Bus |
| MDAT (63:0) | I/O | Data Bus |
| MBS- (0:7) | I | Byte Selects (0 = MS Byte) |
| MCS0- | I | Chip Select (Active Low) |
| MCS1 | I | Chip Select (Active High) |
| MR-W | I | Read (Logic 1)/Write (Logic 0) |
| MODE (1:0) | I | Bus Interface Mode |
| MDMA_RD- | I | Direct Memory Access Read |
| MDMA_WR- | I | Direct Memory Access Write |

Figure 4:
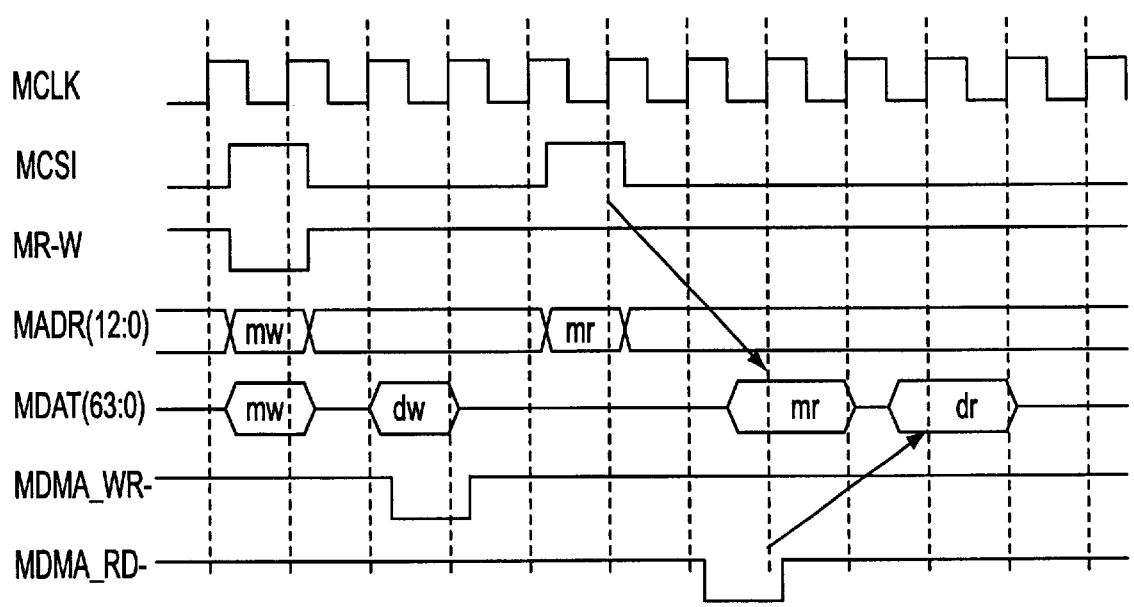
FIG. 4 is a functional timing diagram of the memory interface signals of the MCC IC.

The memory interface is a synchronous bus whose operations are timed by the MCLK signal. The primary usage of this path is to move image data and processing parameters into the MCC IC 101 and to retrieve results from the MCC IC 101. The MCC IC 101 may be accessed as a generic memory device and/or as a DMA controlled device. When accessed as a memory device, a read or write operation is qualified with chip select (MCS0- and MCS1) and byte select signals (MBS-(0:7)). For a DMA style access, the interface to the I/O RAM 107 responds to the DMA read and write enables (MDMA_RD- and MDMA_WR-). All DMA accesses utilize an internal DMA address base register 1841 which should be initialized via the memory interface port. FIG. 4 is a functional timing diagram of the memory interface signals. Memory read operations are designated by "mr"; memory write operations are designated by "mw"; DMA read operations are designated by "dr"; and DMA write operations are designated by "dw". Note that for read operations, the memory interface enables the data drivers on the negative edge of the clock and disables the drivers on the rising edge of the clock. External devices should be careful to disable on the rising edge of the clock, leaving a half-clock time period of "dead-time" to avoid bus contention. A detailed description of the modes for this interface are presented below.

From the timing diagram depicted in FIG. 4, it can be seen that after a read operation, a write operation should not be scheduled until the fifth clock cycle following the read. The data will be driven out of the device beginning on the second clock edge following the clock edge where the read access was recognized and the data lines should not be driven by outside devices during this clock nor during the subsequent cycle (to avoid bus contention). The MCC IC 101 should asynchronously disable its bus drivers if it detects a combination of control signals which would indicate that an outside source is attempting to drive the data bus. A series of read cycles may occur on adjacent clock cycles, and a series of write cycles may occur on adjacent clock cycles. A change of operation from writing to reading can occur on adjacent clock cycles since there will be an inherent delay (due to the pipelined access to the memory) before the MCC IC 101 will turn on its output buffers and therefore there will be no bus contention.

As mentioned above, memory mapping is employed to designate whether the various memory interface signals are directed at the I/O RAM 107, the mailbox memory 1821, the chip ID register 1833 or the DMA address base register 1841. An exemplary mapping of the memory interface of the MCC IC 101 is shown in Table 3.

TABLE 3

| Address | Access | Description |
| --- | --- | --- |
| 0x0000 - 0x07ff | R/W | I/O Ram |
| 0x0800 - 0x083f | R/W | Mailbox Memory |
| 0x1000 - 0x1000 | R/W | Chip ID Register |
| 0x1800 - 0x1800 | R/W | DMA Address Base Register |

1.3 Processing Element Array Interface

Each outside boundary of the Processing Element (PE) array 103 is capable of bidirectional communication with an adjacent MCC IC 101. The PE interface signals are synchronous to PCLK. An exemplary set of PE interface signals is described in Table 4.

TABLE 4

| Signal | I/O | Description |
| --- | --- | --- |
| N (0:31) | I/O | North PE boundary bi-directional interface. |
| NO- | O | North Out indicator. A logic low indicates the next clock cycle will be an output from the N (0:31) signals. |
| S (0:31) | I/O | South PE boundary bi-directional interface. |
| SI- | I | South In indicator. A logic low indicates the next clock cycle will be an output from the adjacent MCC IC's N (0:31) |
| E (0:31) | I/O | East PE boundary bi-directional interface. |
| EO- | O | East Out indicator. A logic low indicates the next clock cycle will be an output from the E (0:31) signals. |
| W (0:31) | I/O | West PE boundary bi-directional interface. |
| WI- | I | West In indicator. A logic low indicates the next clock cycle will be an output from the adjacent MCC IC's E (0:31) |

These various signals (and their corresponding operations) should be constrained in accordance with a number of principles. Opposite boundary interface busses should have mutually exclusive input/output operations. For example, if N(0:31) is in the output mode, S(0:31) will be in the input mode. At least one tri-state (i.e. non-active drive) clock cycle should separate input and output operations. While in tri-state mode, bus holders should maintain the last driven logic state. To avoid input/output mode conflicts between adjacent MCC ICs 101, each MCC IC 101 should generate and supply signals indicating that the next clock cycle will be an output. Likewise, each MCC IC 101 should monitor these signals from adjacent MCC ICs 101. When the direction signals indicate a conflict, the MCC integrated circuit 101 should force a tri-state condition and flag an error (Note: this is a device protection mechanism and should never be encountered in normal operation).

Figure 5:
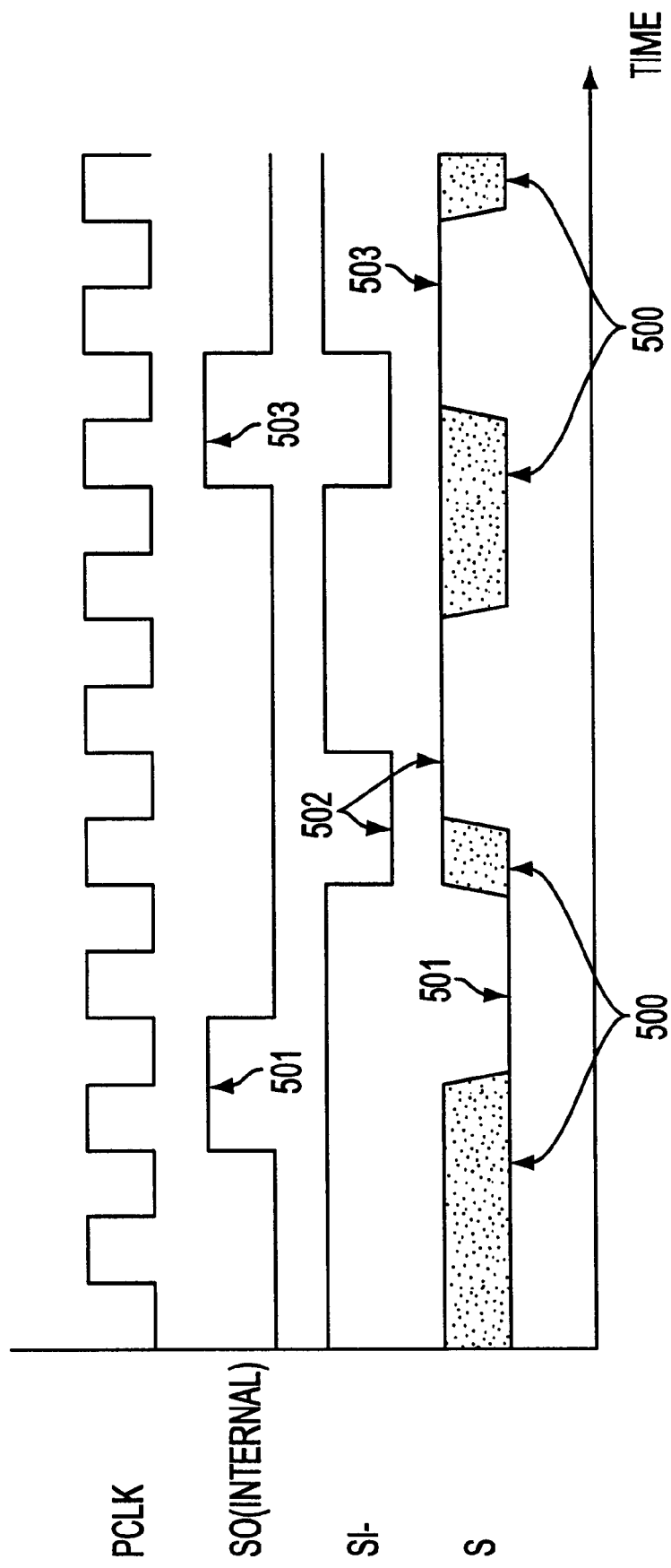
FIG. 5 is a timing diagram of some of the processing element (PE) array interface signals associated with input and output at the north and south ends of the PE array.

These principles are illustrated in FIG. 5, which is a timing diagram of some of the PE array 103 interface signals associated with input and output at the north and south ends of the PE array 103. The shaded areas 500 indicate that the interconnect is not being actively driven. However, the logic state is being held by a bus holder circuit. The signal events designated 501 are associated with the PE array 103 performing a shift to the south. In the figure, SO is the internal equivalent of SI-, indicating that the chip will attempt to enable its south drivers to drive the S interconnect signals on the next clock.

The signal events designated 502 are associated with the array performing a shift to the north. A neighboring chip drives the SI-signal to indicate that it is going to drive the signals for the south edge on the next clock. The interconnect actually begins to be driven beginning on the negative edge of the clock (i.e., a half clock early).

The signal events designated 503 show a collision, in which the internal SO signal is activated (indicating an intention to enable its south drivers for a shift to the south on the next clock) at the same time that a neighboring MCC IC 101 drives the SI-signal to indicate that it is going to drive the signals for the south edge on the next clock. In this case, the MCC IC 101 should protect its I/O drivers by detecting the coming collision and preventing its I/O drivers from being enabled.

1.4 PLL Interface Signals

As mentioned above, the MCC IC 101 may include a Phase-Locked Loop (PLL) clock circuit for the processor clock (PCLK). This circuit is advantageously controlled by providing the MCC IC 101 with the interface signals described in Table 5 as well as other signals that are specific to different PLL vendors, and are therefore not described here.

TABLE 5

| Name | In/Out | Function |
| --- | --- | --- |
| PCLK | I | Reference Clock Input |
| PLL_DIVSEL [2:0] | I | Divider Select. Sets divide vaiue of the feedback clock going into the phase detector, which in turn multiplies the output frequency of the output clock in relation to the PCLK input. |
| PLL_CLK_MON | O | PLL Test Clock Monitor |

1.4.1 PLL Divider Selection and Frequency Range

Table 6 shows the PLL divider selection. A minimum and maximum frequency for each divider value may be specified for the PLL circuit provided by its vendor.

TABLE 6

| DIVSEL [2:0] | Divider Value |
| --- | --- |
| 000 | Divide by 1 |
| 001 | Divide by 2 |
| 010 | Divide by 3 |
| 011 | Divide by 4 |
| 100 | Divide by 5 |
| 101 | Divide by 6 |
| 110 | Divide by 7 |
| 111 | Divide by 8 |

1.5 Miscellaneous Signals

Another group of signals, categorized here as miscellaneous signals, are described in Table 7. They are presented here in order to provide a complete description of the exemplary interface. However, a full understanding of the meaning and use of these signals will be derived from the more detailed discussion of the exemplary hardware elements, which appears later in this description.

TABLE 7

| Name | In/Out | Function |
| --- | --- | --- |
| GLOR_IN- | I | Global-OR input |
| GSTAT- | O | GLOR/Status flag |
| GVLD- | O | GSTAT valid |

TABLE 7-continued

| Name | In/Out | Function |
| --- | --- | --- |
| INT- | O | Interrupt |
| PSEQ_EVENT- | O | P-sequencer event |
| SSTI- | I | Sync Status input |
| SSTO- | O | Sync Status output |
| IOSI_BSY- | O | IO Sequencer In Busy |
| IOSO_BSY- | O | IO Sequencer Out Busy |
| RST- | I | Reset |

Typically, the GSTAT-signal is an output from each MCC IC 101 that represents the chip global-OR ("GLOR"). By means of the MCC instruction control, the GSTAT-signal may also reflect the chip OVER signal or the chip INT signal. The GVLD-signal indicates when the GSTAT-signal is valid so that external sampling may be easily accomplished without resorting to elaborate means of synchronization.

The GLOR_IN-signal is an array-wide global OR which is computed by combining all of the GSTAT-signals for an array of MCC ICs 101. This input is used by the sequencer logic as a condition code and by the overlay logic as a global bit plane operand. In the exemplary embodiment, a latency of 7 PCLK clock cycles (or more, depending upon the delays external to the device for a particular system) may be required to logically OR GSTAT signals. To accommodate the variable delay, the MCC IC 101 supports a GLOR_IN delay specification register as shown in Table 55 below.

The INT-output signals an interrupt or trap for the MCC IC 101.

The SSTI- and SSTO-signals are sync status input and output signals that are used to check synchronization between MCC ICs based upon I-Seq instruction accept. To check synchronization, the SSTO-signal for one MCC IC 101 is connected to another MCC IC's SSTI-signal. Should the SSTI-signal for any MCC IC 101 differ from its internally generated SSTO-signal, a "loss of synchronization" event is detected and signaled via interrupt/status. The pattern of connecting SSTI- and SSTO-signals is system specific, but a daisy-chain interconnect would suffice.

The RST-input provides a hardware reset for the MCC IC 101. This event clears most sequencer states and disables the Step Enable signal. RST- may be applied asynchronously to the MCC IC 101. In the exemplary embodiment, the MCC IC 101 will synchronously (with respect to the processor clock, PCLK) remove an internal RESET signal nine clock cycles following the deassertion of RST-.

1.6 JTAG Interface

In order to assist with debugging of the MCC integrated circuit 101, it is preferably provided with hardware supporting the JTAG signals shown in Table 8.

TABLE 8

| Name | In/Out | Function |
| --- | --- | --- |
| TCLK | I | Test Clock |
| TRST- | I | Test Reset |
| TMS | I | Test Mode Select |
| TDI | I | Test Data In |
| TDO | O | Test Data Out |

The MCC integrated circuit 101 should provide a JTAG compatible boundary scan for all signals. Inputs may be limited to a "capture-only" capability. Outputs and bidirectional signals (except for NSEW interconnect) should have a boundary-scan cell which will allow the JTAG circuitry to drive a stimulus onto the output. As a compromise taken to avoid placing an additional multiplexor in a critical timing path, the NSEW interconnect signals preferably have a capture-only capability. In order to provide for full interconnect testing at the board level, a combination of JTAG and normal chip operation can be utilized to test the NSEW interconnect. The MCC IC 101 is preferably programmed to output patterns on the NSEW interconnect that can be observed using JTAG on the adjacent chips.

Figure 6:
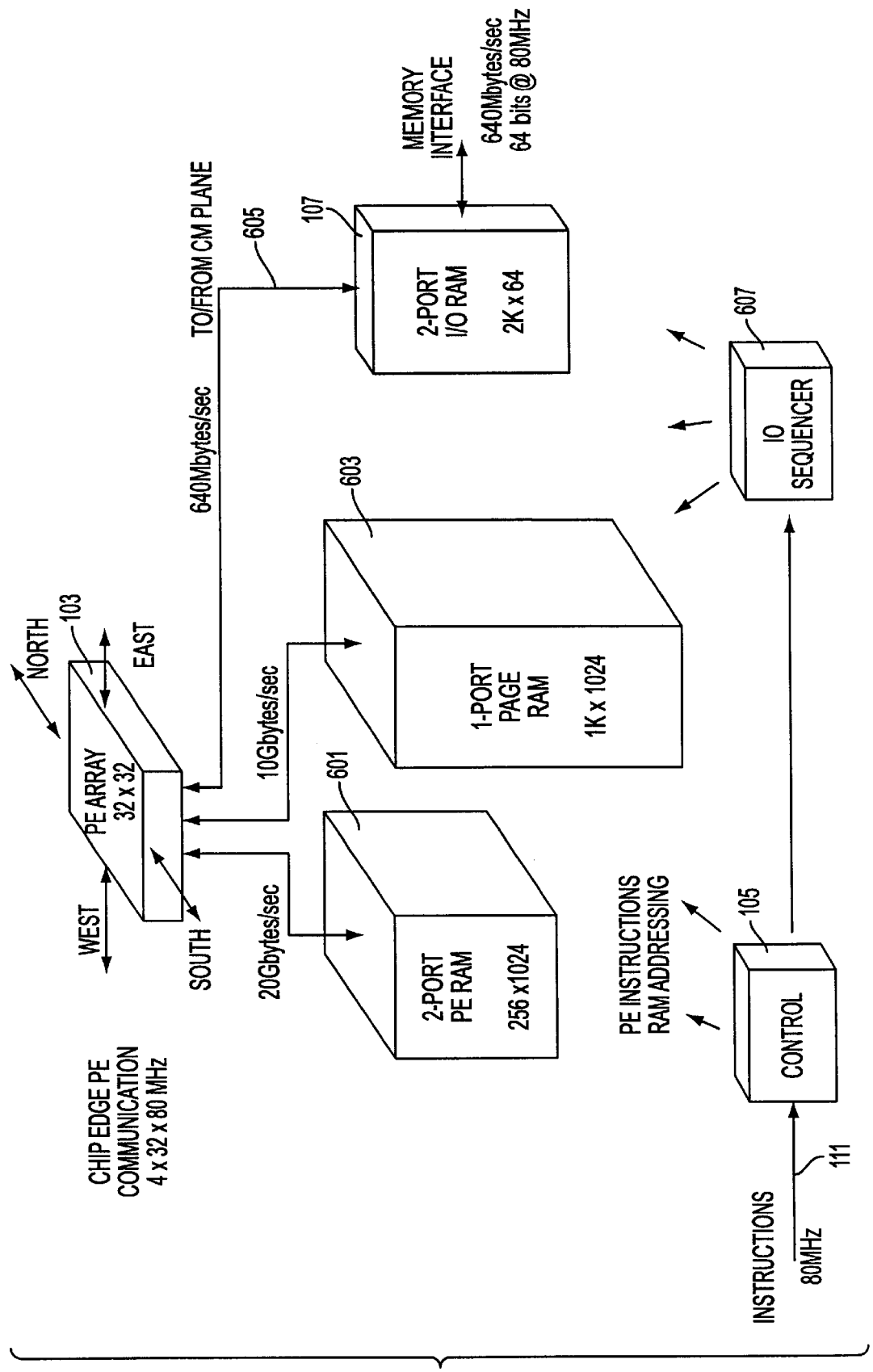
FIG. 6 is a block diagram illustrating one embodiment of the architecture of the MCC IC in accordance with one aspect of the invention.

Referring now to FIG. 6, the architecture of the MCC IC 101 will now be described in greater detail. The PE array 103, the controller 105 and the I/O RAM 107 are again shown. In one embodiment, the PE array 103 is a 32×32 array of PEs, each capable of processing 1-bit operands per clock. Thus, multi-bit operands are processed one bit at a time over a sequence of clock cycles. Each PE in the PE array 103 includes two addressable memories: a 2-port PE RAM 601 and a 1-port page RAM 603. In the exemplary embodiment, each PE's 2-port PE RAM has 256 addressable storage locations, each 1 bit wide. Each PE's 1 port page RAM 603 has 1024 addressable storage locations, each 1 bit wide. Because the exemplary PE array 103 has 1024 PEs (i.e., 32×32), the total size of the MCC IC's 2-port PE RAM 601 is 256×1024, and the total size of the MCC IC's 1 port page RAM 603 is 1024×1024.

As mentioned earlier, the purpose of the I/O RAM 107 is to hold data (e.g., image data) that is to be moved into or out of the MCC IC 101. In particular, the I/O RAM 107 supplies operands to, and receives results from, the PE array 103. To facilitate access not only by the PE array 103 but also the external memory interface of the MCC IC 101, the I/O RAM 107 is preferably a 2-port memory. In the exemplary embodiment, the I/O RAM 107 has 2K of addressable storage locations (where 1K=1024), each location being 64 bits wide. The I/O RAM 107 is coupled to the PE array 103 through a special path called the communications (CM) plane 605. The CM plane 605 is not directly accessible from the external interface to the MCC IC 101.

The controller 105 generates signals that act as PE instructions and as addresses for the various memory elements. The MCC IC 101 further includes an I/O sequencer 607, that generates control signals for moving data into and out of the MCC IC 101. In one aspect of the invention, the controller 105 and the I/O sequencer 607 operate concurrently, that is the PE array 103 is capable of processing data (under the control of PE instructions generated by the controller 105) while, at the same time, data is being moved into or out of the PE array 103 (from or to the I/O RAM 107), and into or out of the I/O RAM 107 from the external memory interface.

2. PE Array 103

Figure 7:
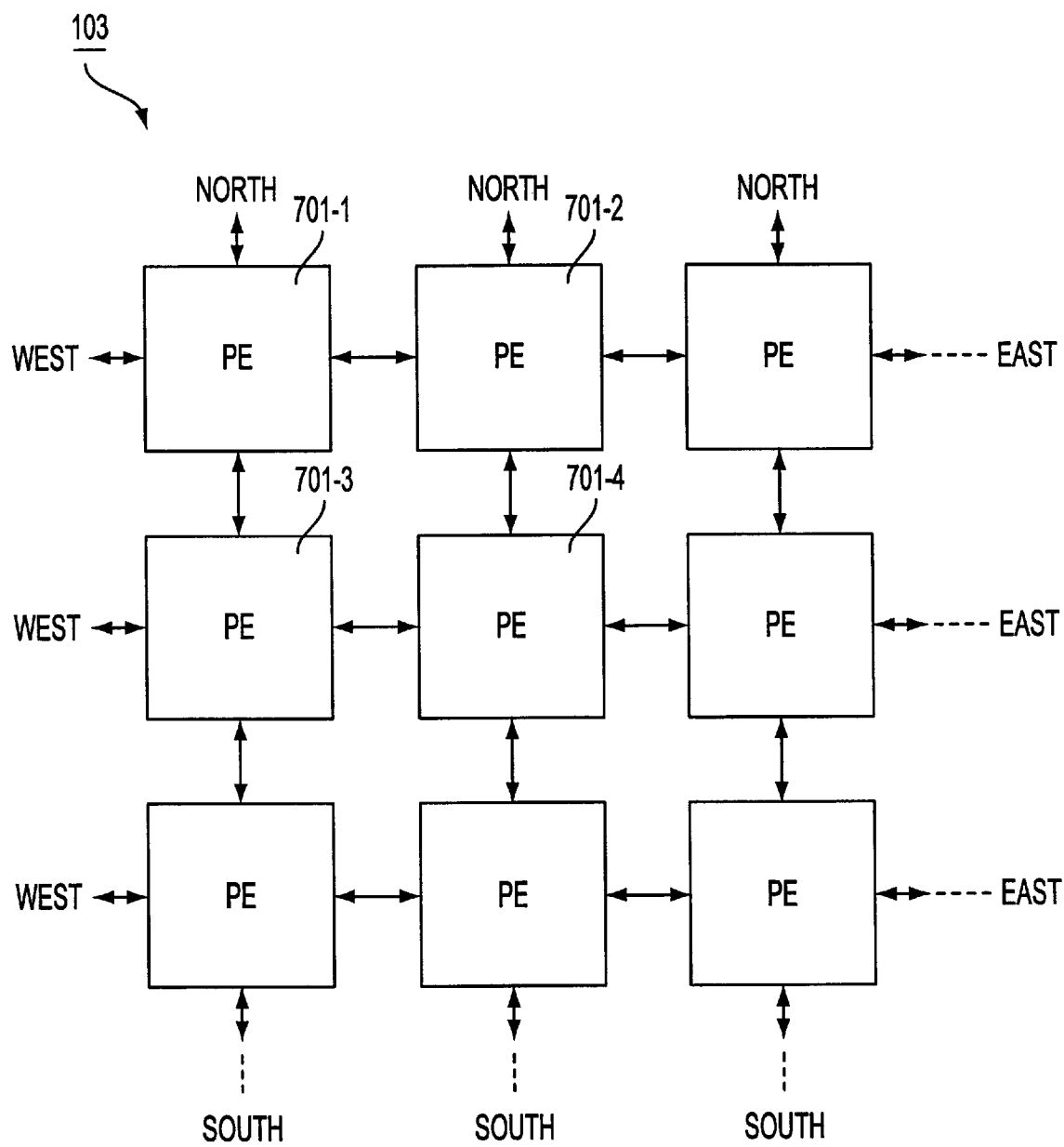
FIG. 7 shows a 3×3 portion of the total PE array 103.

The heart of processing within the MCC IC 101 is the PE array 103, which will now be described in greater detail. FIG. 7 shows a 3×3 portion of the total PE array 103. Each of the PE's is architecturally identical to the other PE's, and receives the same PE instructions from the controller 105 as are received by all of the other PE's in the PE array 103. Consequently, each PE in the PE array 103 operates in lock-step with every other PE in the PE array 103, each performing the same instruction but with (potentially) different valued operands. As mentioned in the BACKGROUND section, this type of arrangement is known in the art as a Single Instruction/Multiple Data (SIMD) architecture.

A PE's connections, however, will vary as a function of its location within the array. For example, a PE 701-1 occupies a corner position within the PE array 103, and is therefore connected to a neighboring PE 701-2 to its east, and to a neighboring PE 701-3 to its south. The north and west interface signals of the corner PE 701-1 are supplied as part of the respective north and west PE interface signals of the MCC IC 101. A perimeter PE. such as the PE 701-2, is connected to three nearest neighbors, and supplies its remaining interface signal as part of the PE interface signals of the MCC IC 101. An interior PE, such as the PE 7014, is connected to its four nearest neighbors, and therefore does not supply signals directly to the PE interface signals of the MCC IC 101.

The location of a PE 701 within the PE array 103 gives rise to some characteristics that might permit one PE 701 to be considered different from another. These characteristics include the grouping of PEs into PE groups (PEGs), the location of PEs 107 on the periphery of the MCC IC 101, and the position of a PE 107 with respect to pattern generation and GLOR logic. For the remainder of this discussion, however, these characteristics are all assumed to be external to the PE 107.

In order to avoid obfuscating the interface between PEs 701 in the PE array 103, a full depiction of input and output signals of each PE 701 is not presented in FIG. 7. These signals are, however, fully set forth in Table 9.

TABLE 9

| Name | Bits | In/Out | Description |
| --- | --- | --- | --- |
| NI | 1 | in | signal from north neighbor |
| SI | 1 | in | signal from south neighbor |
| EI | 1 | in | signal from east neighbor |
| WI | 1 | in | signal from west neighbor |
| NO | 1 | out | signal to north neighbor |
| SO | 1 | out | signal to south neighbor |
| EO | 1 | out | signal to east neighbor |
| WO | 1 | out | signal to west neighbor |
| CMSI | 1 | in | CM plane south input |
| CMNI | 1 | in | CM plane north input |
| CMSO | 1 | out | CM plane South output |
| CMNO | 1 | out | CM plane North output |
| CW | 35 | in | control word |
| OVER | 1 | out | pe overflow output |
| PEGLOR | 1 | out | pe glor output |
| ROWGLOR | 1 | out | pe glor output |
| COLGLOR | 1 | out | pe glor output |
| YPAT | 1 | in | Y pattern register input |
| XPAT | 1 | in | X pattern register input |
| ARAM | 1 | in | memory port A read data |
| BRAM | 1 | in | memory port B read data |
| WRAM | 1 | out | memory port W write data |

Figure 8:
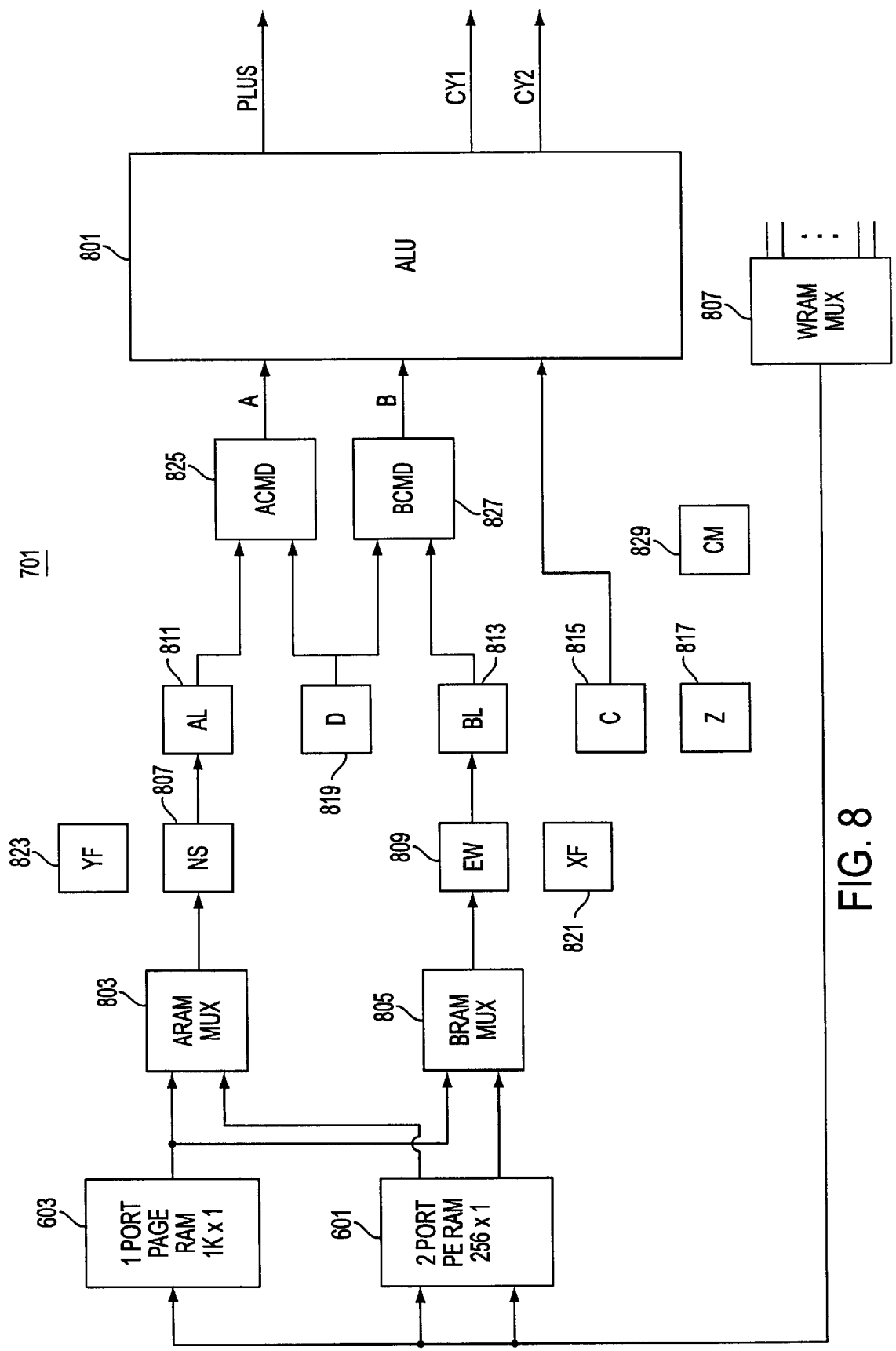
FIG. 8 is a block diagram of the internal resources of an exemplary PE in accordance with one aspect of the invention.
Figure 9A:
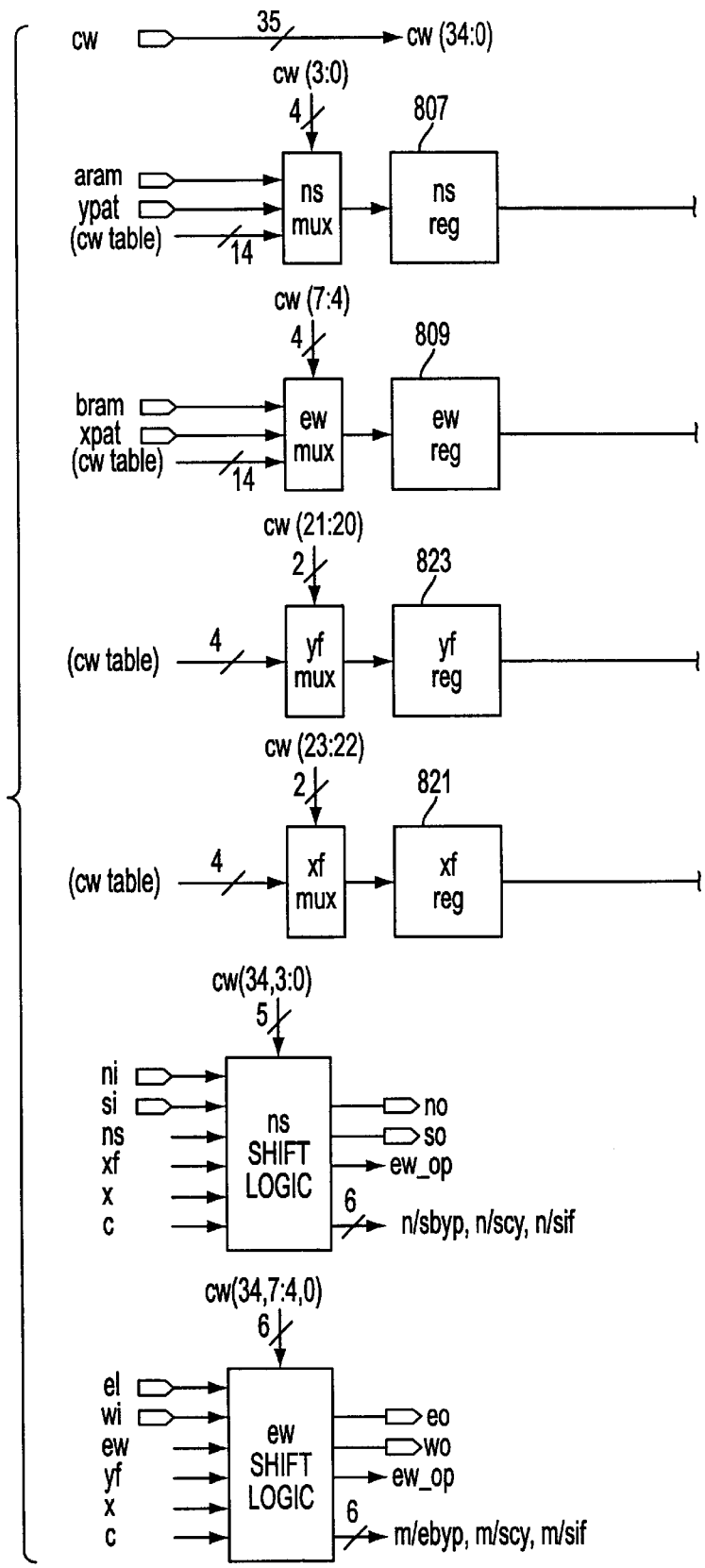
FIGS. 9A, 9B and 9C together are a block diagram depicting an exemplary PE at a higher level of detail.
Figure 9B:
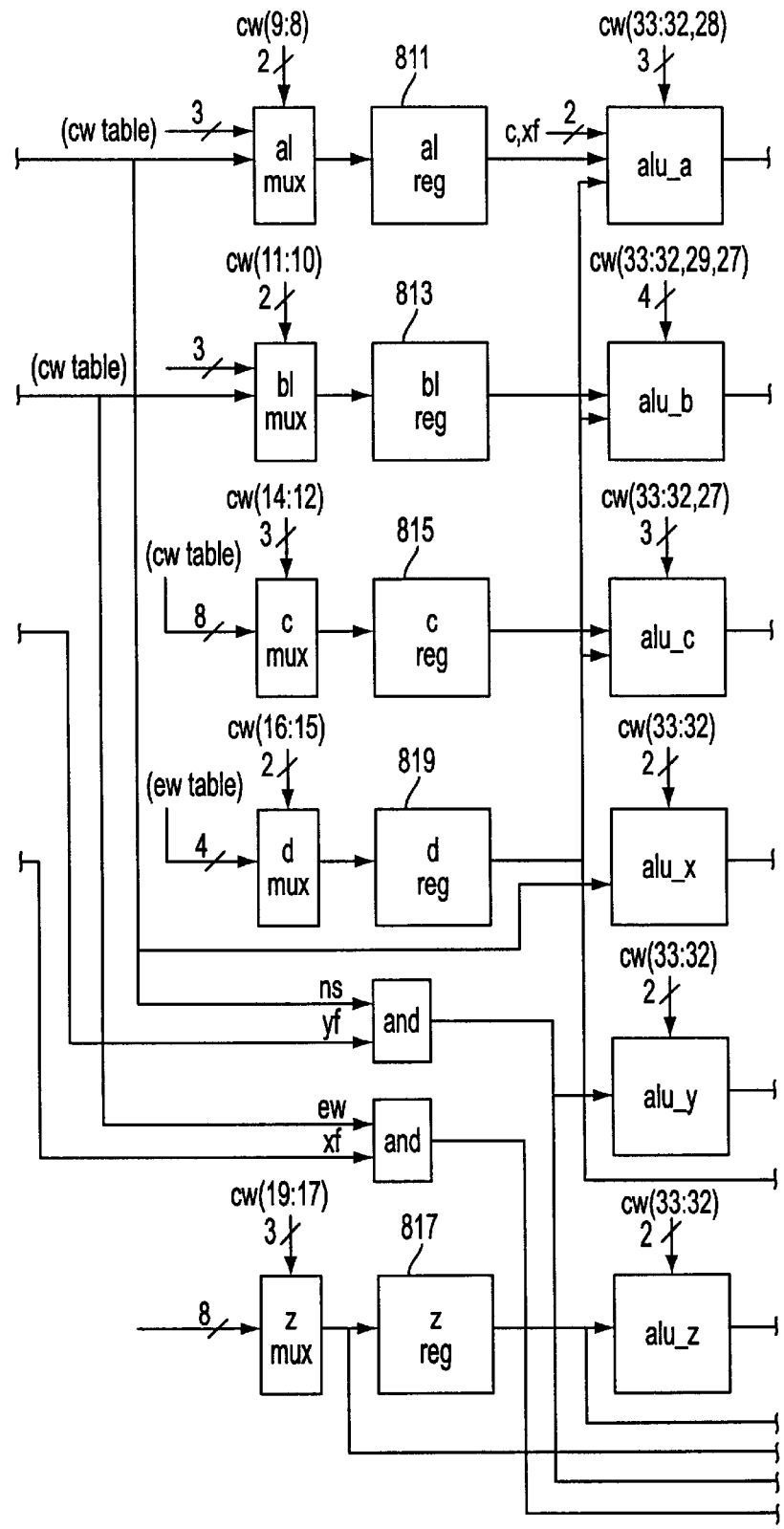
Figure 9C:
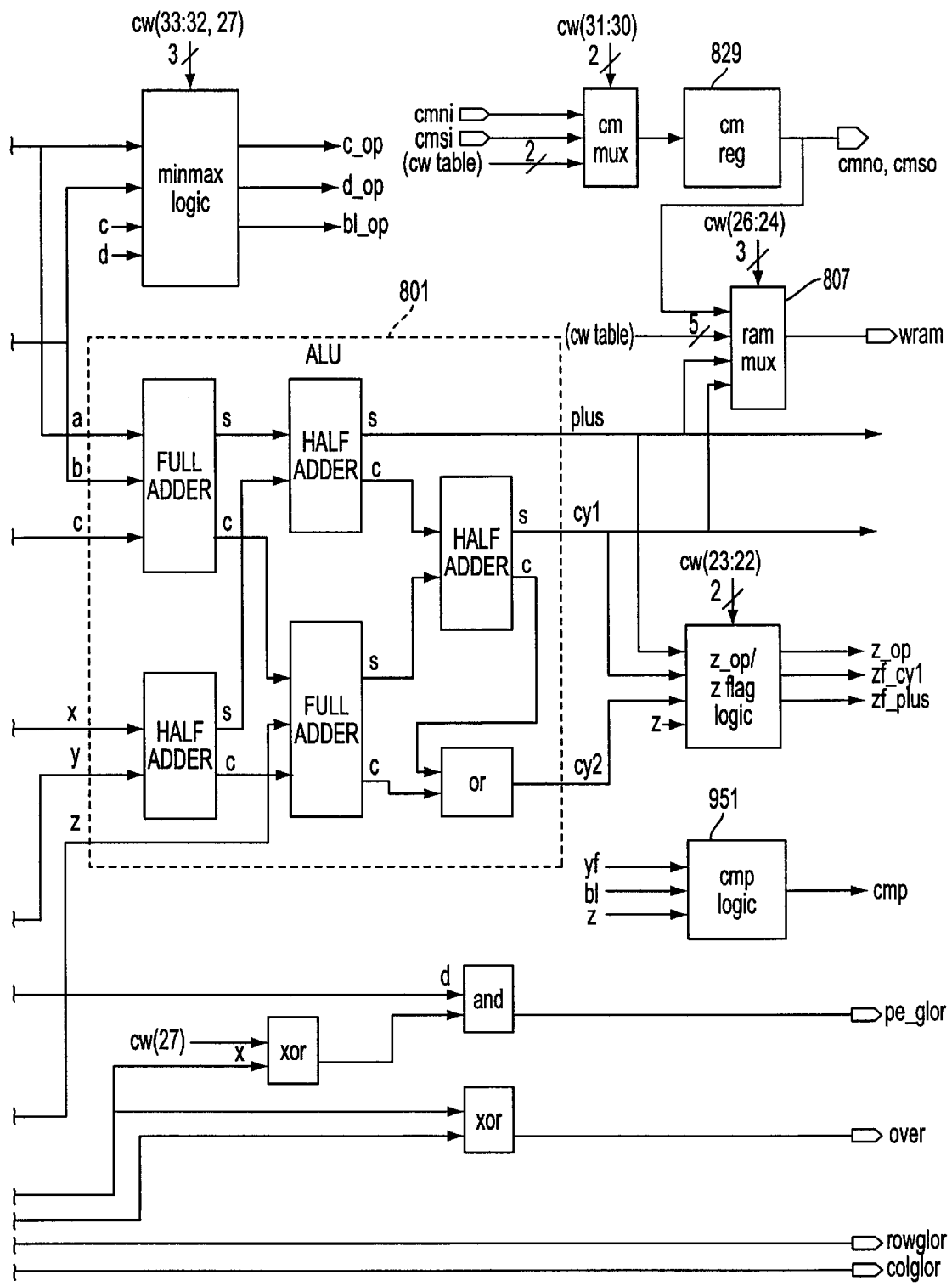

The internal resources of an exemplary PE 701 are shown in FIG. 8. Because of the complexity of interconnection, FIG. 8 primarily illustrates the types of resources and fundamental interconnections in a PE 701. FIGS. 9A, 9B and 9C together are a block diagram depicting a PE 701 at a higher level of detail. One having ordinary skill in the art will readily ascertain that a complete description of interconnections within the PE 701 is to be found by referring to FIGS. 9A, 9B and 9C in conjunction with the various Tables set forth below, which describe all of the operations that may be performed by a PE 701.

The PE 701 comprises ten registers, which are described in Table 10.

TABLE 10

| Reg | Description |
| --- | --- |
| NS | north south register |
| EW | east west register |
| AL | 'A' latch register |
| BL | 'B' latch register |
| C | carry propagate register |
| D | mask register |
| Z | zero propagate register |
| CM | bit plane I/O register |
| XF | EW shift activity register |
| YF | NS shift activity register |

Each PE 701 further includes multiplexors associated with these registers, and an arithmetic logic unit (ALU) 801. The PE 701 performs operations in response to a command word which, in the exemplary embodiment, is thirty-five bits wide.

A PE 701 communicates with each of its four nearest neighbors via the N, S, E and W input and output signals (NI, NO, SI, SO, EI, EO, WI, WO). These signals provide 'shift plane' functions, allowing computations to use data from neighboring PEs 701 as well as providing data manipulation within the shift plane. A special purpose shift plane, the CM plane 605, provides for input and output of image data. Since the CM plane 605 is largely independent of other PE functions, image input and output may be performed concurrently with other computational tasks.

Depending on the location of the PE 701, a CM register 829 in the PE 701 receives data either from the I/O RAM 107 or from the output of a CM register 829 located in a neighboring PE 701. Thus, moving an entire bit plane into and out of the PE array 103 may involve multiple shift operations, in order to propagate the data from the PE 701 that is directly connected to the I/O RAM 107 to a PE 701 that is the farthest from the I/O RAM 107 (i.e., the PE 701 that has the greatest number of PEs 701 in the CM data path between itself and the I/O RAM 107.

Figure 10:
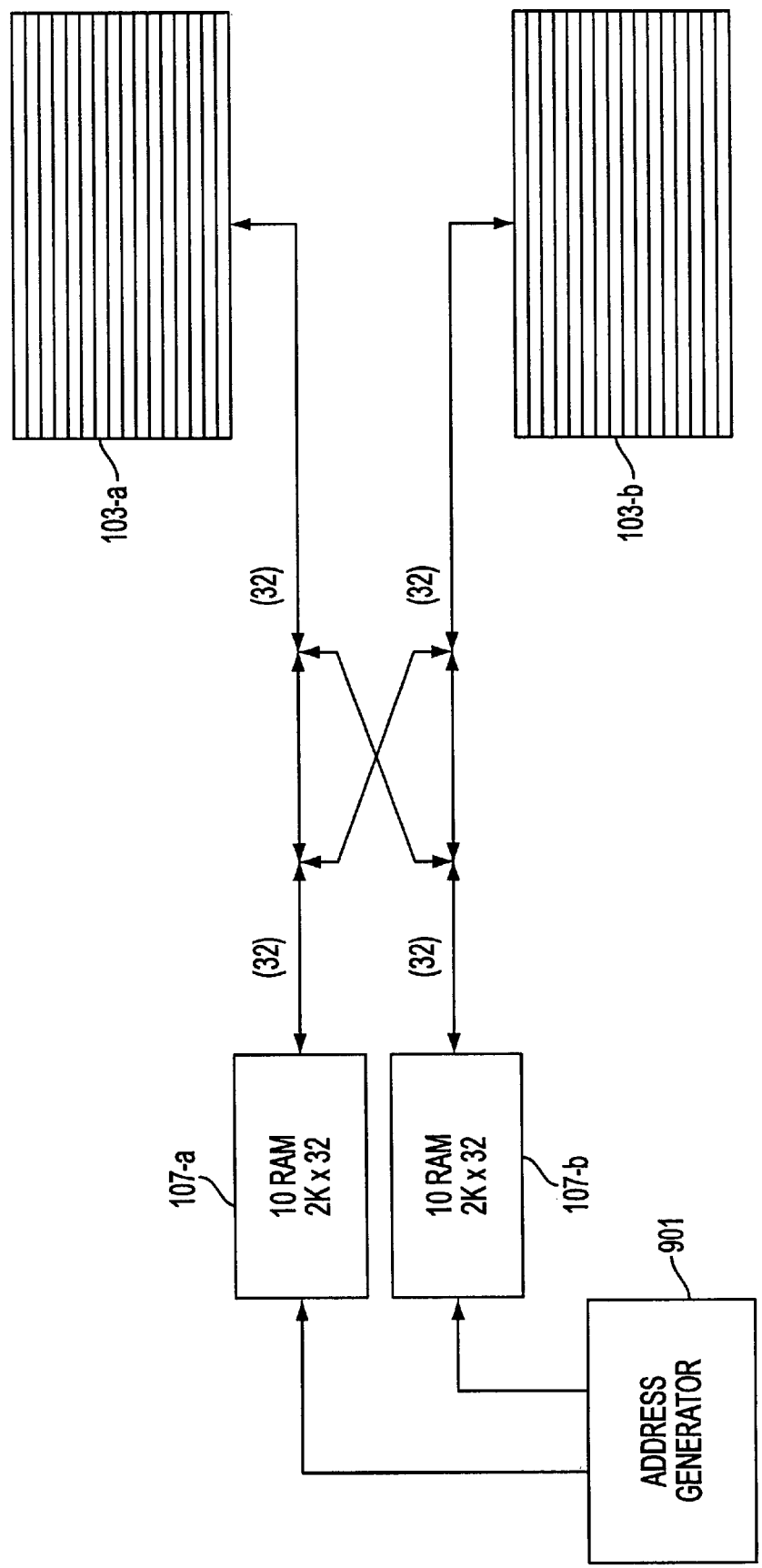
FIG. 10 illustrates an arrangement of the CM plane that facilitates the movement of data into and out of the PE array, in accordance with one aspect of the invention.

In accordance with one aspect of the invention, data may be moved into and out of the PE array 103 by arranging the CM plane 605 as shown in FIG. 10. Here the exemplary 2K×64 I/O RAM 107 is configured as two I/O RAM memories 107-a and 107-b, each sized at 2K×32. Addresses for each of the I/O RAMs 107-a, 107-b are supplied by an address generator 901. For the purpose of designating which CM registers 829 lie on the periphery of the PE array 103, the PE array 103 is also divided into a north PE array 103-a and a south PE array 103-b, each sized at, for example, 32 PEs wide, but only 16 PEs deep. This permits sixty-four rather than only thirty-two CM registers 829 to be directly coupled to the I/O RAM 107, as illustrated in FIG. 10. Because data enters the PE array 103 from a center point in the array and is to be propagated to the actual edges of the array (i.e, data entering the north PE array 103-a propagates northward, while data entering the south PE array 103-b propagates southward), this arrangement permits an entire bit plane of data to be moved into the PE array 103 in only sixteen shift operations, rather than the thirty-two that would otherwise be required to shift data from, say, the southern-most periphery PEs 701 to the northern-most periphery PEs 701. The movement of data in the other direction (i.e., from the PE array 103 to the I/O RAM 107) is essentially just the reverse of the above-described processes. More information about the movement of data between the I/O RAM 107 and the PE array 103 is presented in FIGS. 27 and 28 and the supporting text.

The PE 701 has access to the several memories via three ports: an ARAM multiplexor 803, a BRAM multiplexor 805 and a WRAM multiplexor 807. The ARAM and BRAM multiplexors 803, 805 provide only read access, whereas the WRAM multiplexor 807 provides write only access. During a given cycle, any or all of these ports may be active.

Each PE 701 contributes to a number of global output signals including GLOR, ROWGLOR and COLGLOR and an overflow signal (OVER). Row and column oriented input signals (YPAT and XPAT) provide pattern generation and PE addressing capabilities.

The data object which is processed in the MCC IC 101 is referred to as an "image", although applications are not restricted to the image processing domain. An image may be conceptualized as an array of pixel values equal in dimension to the PE array 103 within the MCC IC 101. In practice, an image is stored in the array as a collection of bit planes, where each bit plane is an array of bit values, one from each image pixel, all of equal significance. An 'n' bit image is implemented as 'n' bit planes. Each PE 701 contains all of the bit values for a single pixel of the image. During processing of a bit plane operation, input (or 'read') operand data are normally loaded into the NS register 807 and the EW register 809. These registers can provide shift plane translation if necessary to align neighboring operands for computation. By "shift plane translation" is meant the movement of data from one PE 701 to another. Because of the SIMD architecture, it is generally the case that if one PE 701 is shifting data to another PE 701, then all PEs 701 are performing the same type of shift in the same direction; thus, a "plane" of data is being shifted. The NS plane stores the 'Left' operand (i.e., the operand that is designated to the left of an operator, e.g., left-right) to a register and shifts in the north-south direction. Similarly, the EW plane stores the 'Right' operand (i.e., the operand that is designated to the right of an operator) to a register and shifts in the east-west direction. The AL and BL registers, 811 and 813 respectively, then accept the operand bit planes while the NS and EW load the next operand planes. The AL and BL registers 811 and 813, as well as the C register 815, supply operand inputs to the ALU for computation. The results of the computation may be written to either the PE RAM 601 or the page RAM 603, and/or propagated to the C register 815 and Z register 817 for use in the next bit operation. The D register 819, XF register 821, and YF register 823 provide bit plane masks which contribute to the functioning of the ALU 801. The ACMD logic block 825 permits various operations to be performed between the contents of the AL register 811 and the D register 819, the results of which are supplied as the "A" input to the ALU 801. Similarly, the BCMD logic block 827 permits various operations to be performed between the contents of the BL register 813 and the D register 819, the results of which are supplied as the "B" input to the ALU 801.

Figure 11:
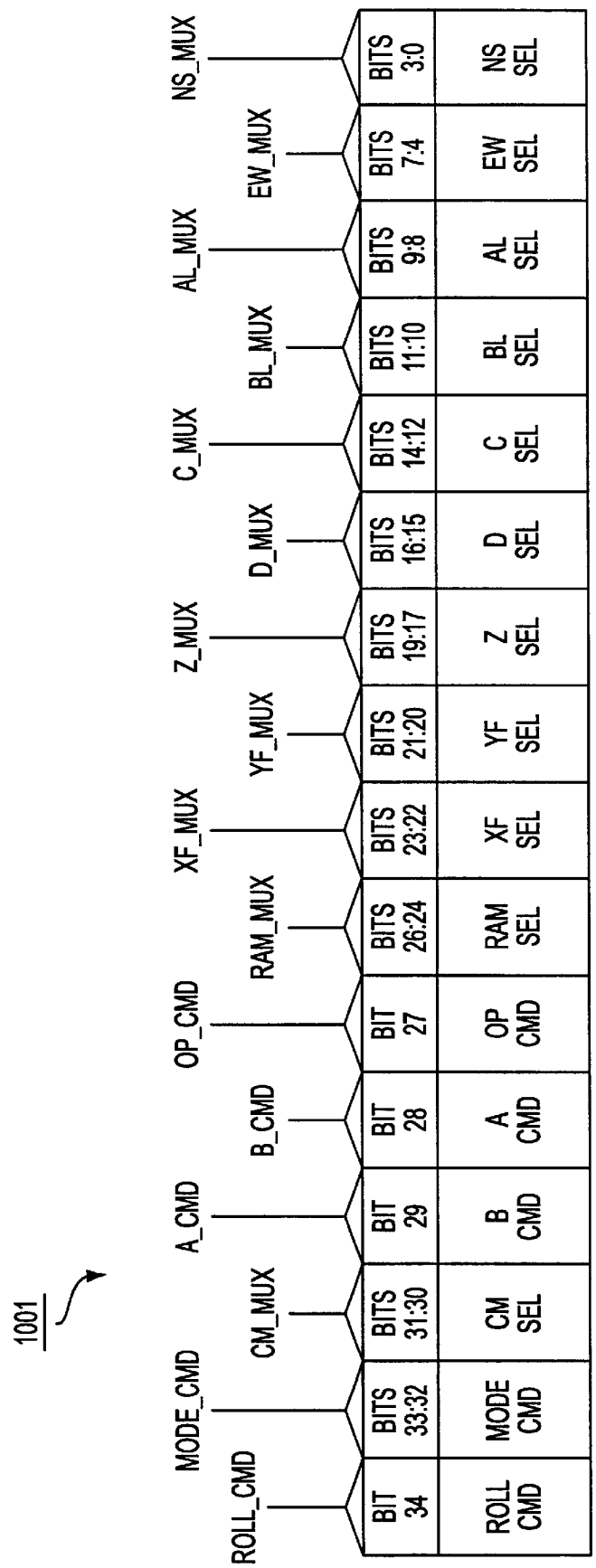
FIG. 11 illustrates an exemplary format of a PE Control Word (CW)

The exemplary PE 701 is controlled by a thirty-five bit Control Word (CW) 1001 which is divided into sixteen command fields as shown in FIG. 11. Of the sixteen command fields, eleven (with the '_SEL' suffix) are devoted to controlling the signal selection for the ten register inputs and the memory write data. Thus, these fields are used to control multiplexors (MUXs) whose inputs receive signals from all of the possible signal sources for that register or memory, and whose output supplies the selected signal to the input of the corresponding register or memory. The remaining fields (with the "CMD" suffix) control various PE operations. In particular, the Roll_Cmd field provides control of the shift plane operation. The remaining four command fields (MODE_CMD, A_CMD, B_CMD and OP_CMD) control computation in the ALU. Each of these operations is described fully below.

Figure 12:
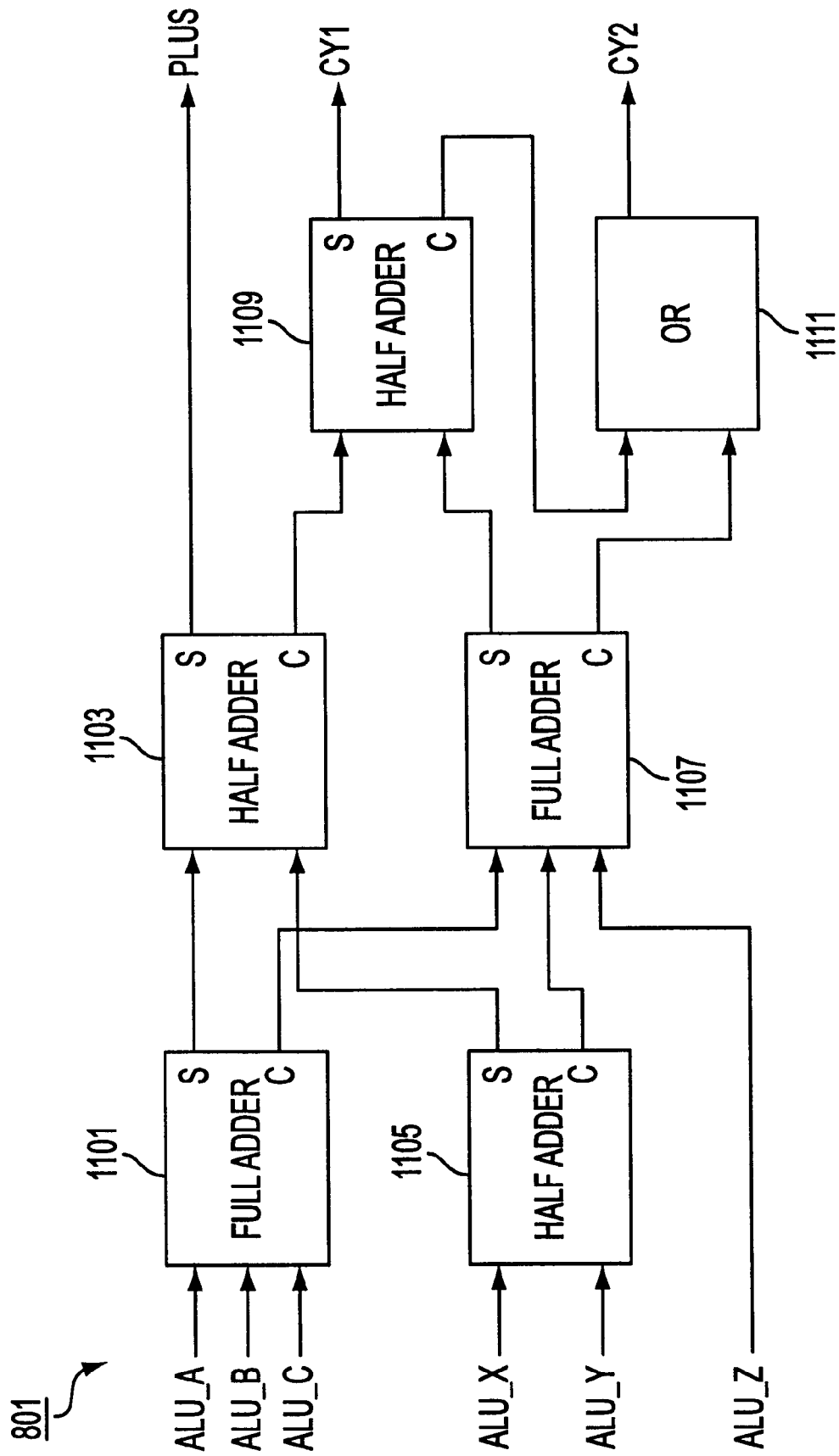
FIG. 12 is a block diagram illustrating the ALU logic in greater detail.

The functionality of the PE 701 is completely defined by Tables 11–31 (because the ARAM and BRAM multiplexors 803, 805 are closely associated with the memory controls, they are described elsewhere in this disclosure). In particular, in addition to defining certain PE operations that may be specified by the CW 1001, Tables 11–26 define, for each destination within the PE 701, its possible source signals and an exemplary encoding of these operations within the CW 1001. Each of the possible source signals is listed in Table 27, and is either defined there or is provided with a reference to another Table (one of Tables 20, 28 and 31) or to FIG. 12. Table 28 defines the NS and EW Shift Plane signals, and is more fully described below. Table 31 defines the ALU inputs and mode dependent signals, and FIG. 12 is a block diagram of the ALU logic. The ALU 801 is more fully described below as well.

TABLE 11

| NS_MUX | CW (3:0) |
|---|---|
| NS: = NS_OP | 0000 |
| NS: = ARAM | 0001 |
| NS: = NI | 0010 |
| NS: = SI | 0011 |
| NS: = BL | 0100 |
| NS: = RMUX | 0101 |
| NS: = 0 | 0110 |
| NS: = 1 | 0111 |
| NS: = NBYP | 1000 |
| NS: = SBYP | 1001 |
| NS: = Z | 1010 |
| NS: = YPAT | 1011 |
| NS: = NCY | 1100 |
| NS: = SCY | 1101 |
| NS: = NIF | 1110 |
| NS: = SIF | 1111 |

TABLE 12

| EW_MUX | CW (7:4) |
|---|---|
| EW: = EW_OP | 0000 |
| EW: = BRAM | 0001 |
| EW: = EI | 0010 |
| EW: = WI | 0011 |
| EW: = AL | 0100 |
| EW: = RMUX | 0101 |
| EW: = 0 | 0110 |
| EW: = 1 | 0111 |
| EW: = EBYP | 1000 |
| EW: = WBYP | 1001 |
| EW: = Z | 1010 |
| EW: = XPAT | 1011 |
| EW: = ECY | 1100 |
| EW: = WCY | 1101 |
| EW: = EIF | 1110 |
| EW: = WIF | 1111 |

TABLE 13

| AL_MUX | CW (9:8) |
|---|---|
| AL: = AL | 00 |
| AL: = NS_OP | 01 |
| AL: = NI | 10 |
| AL: = SI | 11 |

TABLE 14

| BL_MUX | CW (11:10) |
|---|---|
| BL: = BL | 00 |
| BL: = BL_OP | 01 |
| BL: = EI | 10 |
| BL: = WI | 11 |

TABLE 15

| C_MUX | CW (14:12) |
|---|---|
| C: = C | 000 |
| C: = ARAM | 001 |
| C: = CY1 | 010 |
| C: = PLUS | 011 |
| C: = C_OP | 100 |
| C: = Z | 101 |
| C: = 0 | 110 |
| C: = 1 | 111 |

TABLE 16

| D_MUX | CW (16:15) |
|---|---|
| D: = D | 00 |
| D: = D_OP | 01 |
| D: = CMUX | 10 |
| D: = CMP | 11 |

TABLE 17

| Z_MUX | CW (19:17) |
|---|---|
| Z: = Z | 000 |
| Z: = CMP | 001 |
| Z: = Z_OP | 010 |
| Z: = PLUS | 011 |
| Z: = ZF_CY1 | 100 |
| Z: = ZF_PLUS | 101 |
| Z: = 0 | 110 |
| Z: = 1 | 111 |

TABLE 18

| YF_MUX | CW (21:20) |
|---|---|
| NOP | 00 |
| YF: = ARAM | 01 |
| YF: = CMUX | 10 |
| YF: = PLUS | 11 |

TABLE 19

| XF_MUX | CW (23:22) |
|---|---|
| NOP | 00 |
| XF: = BRAM | 01 |
| XF: = CMUX | 10 |
| XF: = CY1 | 11 |

TABLE 20

| RAM_MUX | CW (26:24) |
|---|---|
| WRAM = NOP | 000 |
| WRAM = Z | 001 |
| WRAM = CY1 | 010 |
| WRAM = PLUS | 011 |
| WRAM = D | 100 |
| WRAM = CM | 101 |
| WRAM = XF | 110 |
| WRAM = YF | 111 |

TABLE 21

| OP_CMD | CW (27) |
|---|---|
| OP0 | 0 |
| OP1 | 1 |

TABLE 22

| B_CMD | CW (28) |
|---|---|
| B_BL | 0 |
| B_MSK | 1 |

TABLE 23

| A_CMD | CW (29) |
|---|---|
| A_AL | 0 |
| A_MSK | 1 |

TABLE 24

| CM_MUX | CW (31:30) |
|---|---|
| CM: = CM | 00 |
| CM: = ARAM | 01 |
| CM: = CMN | 10 |
| CM: = CMS | 11 |

TABLE 25

| MODE_CMD | CW (33:32) |
|---|---|
| NORM | 00 |
| MULT | 01 |
| MINMAX | 10 |
| unused | 11 |

TABLE 26

| ROLL_CMD | CW (34) |
|---|---|
| NORM | 0 |
| ROLL | 1 |

Table 27, which follows, lists each of the possible source signals within a PE 701. As mentioned earlier, Table 27 either defines the signal, or provides a reference to another Table (one of Tables 20, 28 and 31) or to FIG. 12. The symbols used in the tables have the following meaning:

| | |
|---|---|
| logical OR | \| |
| logical AND | & |
| logical XOR | ^ |
| logical NOT | ! |
| equal | = |
| not equal | != |

TABLE 27

| Signal | Definition |
|---|---|
| NO | see Table 28 |
| SO | see Table 28 |
| EO | see Table 28 |
| WO | see Table 28 |
| NS_OP | see Table 28 |
| EW_OP | see Table 28 |
| NBYP | NI |
| SBYP | SI |
| EBYP | EI |
| WBYP | WI |
| YROLL | (Roll_Cmd = 1) & (NS_Cmd(0) = 1) |
| XROLL | (Roll_Cmd = 1) & (NS_Cmd(0) = 0) |
| NCY | NI&YF |
| SCY | SI&YF |
| ECY | EI&XF |
| WCY | WI&XF |
| NIF | NI&YF |
| SIF | SI&YF |
| EIF | EI&XF |
| WIF | WI&XF |
| BL_OP | see Table 31 |
| C_OP | see Table 31 |
| D_OP | see Table 31 |
| Z_OP | see Table 31 |
| ALU_A | see Table 31 |
| ALU_B | see Table 31 |
| ALU_C | see Table 31 |
| ALU_X | see Table 31 |
| ALU_Y | see Table 31 |
| ALU_Z | see Table 31 |
| PLUS | see Figure 12 |
| CY1 | see Figure 12 |
| CY2 | see Figure 12 |
| ZF_CY1 | Z & !CY1 |
| ZF_PLUS | Z & !PLUS |
| CMP | (YF&!BL) \| (Z&!BL) \| (YF&Z) |
| ROWGLOR | NS & YF |
| COLGLOR | EW & XF |
| PEGLOR | (Z ^ OP_CMD) & D |
| OVER | Z_MUX  Z |
| WRAM | see Table 20 |

2.1 I/O Functions via CM Register 829

Image data is input to and output from array memory (PE RAM 601 and Page RAM 603) via the CM register plane. As shown in Table 24, the CM register 829 may be loaded from PE-accessible memory (e.g., PE RAM 601 or Page RAM 603), shifted north (CM:=CMS) or shifted south (CM:=CMN). The CM plane is stored to memory by executing the WRAM:=CM command. The CM plane may shift data at any time without disturbing PE operation. Computation must be interrupted, however, for memory accesses. This is accomplished by MCC IC 101 logic (called "Overlay Logic", described in greater detail below) that is external to the PE array 103 and which steals one clock cycle and inserts the memory load or store command.

During image input operations, the CM plane 605 receives image data from the I/O Sequencer 607 as the bit plane is shifted north/south. During image output, the I/O Sequencer 607 receives image data from the CM plane 605 as it is shifted.

2.2 Shift Plane Functions

As previously explained, each PE 701 in the PE array 103 is connected to anywhere from two to four PEs 701, so that data may be obtained not only from a PE's own memory resources, but also from a neighboring PE 701. A so-called "normal" shift of data from one PE 701 to another PE 701 is provided by any of the commands NS:=NI/SI, EW:=EI/WI, AL:=NI/SI, and BL:=EIWI. A shift to the north in the NS plane is expressed as NS:=SI, that is, as a shift from the south. Repetitive shifts in the NS and EW planes allow the translation of data by any distance desired within the array. The AL and BL planes, on the other hand, may receive shifted data, but cannot propagate further shifts because the NS and EW planes are the sources for all bit plane shifts.

A typical application may include multiple MCC ICs 101, each connected to its four neighbors, to effectively form a rectangular PE array of whatever size is desired. Device boundaries are invisible to the programmer for normal shift operations. For example, a shift to the east propagates thirty-two EO signals from the PEs 701 in the east-most column of one MCC IC 101 to the thirty-two EI signals of the PEs 701 in the west-most column of the neighboring MCC IC 101 to the east. These chip outputs are bidirectional,. with a single signal pin being dedicated to each boundary PE 701, and as such impose some limitations which do not apply to the interior PEs 701 within the PE array 103. One limitation is that the boundary PEs 701 may communicate in one direction only during a given clock. This affects the ROLL function (described below), making operation of the ROLL position dependent. A second limitation is that shifts in opposite directions may not occur on consecutive clocks because the drivers need time to switch. This limitation affects all shift functions (except for ROLL) and is enforced on the instruction stream (i.e. for all PEs 701) in the Overlay Logic, thereby removing any position dependencies that would otherwise arise.

In addition to the normal shift operation there are several other shift plane operations which are supported. These are listed in Tables 11, 12 and 28. The first, conditional shifting (NS:=NIF/SIF, EW:=EIF/WIF), provides a shift to or from a PE 701 only where the contents of the PE 701 shift mask (XF register 821 for east/west, YF register 823 for north/south) is active (e.g., equal to "1"). Where the shift mask is active for a particular shift direction (n/s, e/w), shifts are performed normally in that direction. Where the shift mask is inactive, the PE 701 propagates an input of 0, and propagates an output of 0. With this capability, shifts within a PE array 103 may be confined to only a subset of the entire array, with regions being designated as either "active" or "inactive." Prior to any shifting, active regions are initialized with active shift masks, and inactive regions are initialized with inactive shift masks, In this manner, when a shift operation is specified in a CW 1001 that is supplied to the PE array 103 as a whole, data that is shifted out of an active region (under a region mask) is inhibited from propagating into an inactive region. Furthermore, data within the inactive region propagates into the active region only as a "0" value. As a result, data is prevented from "bleeding" out of or into a region.

Another type of shift operation is the shift bypass function. The shift bypass function (NS:=NBYP/SBYP, EW:=EBYP/WBYP) provides a means for data to shift by more than one PE 701 during any given clock. This is accomplished by allowing the input data of a PE 701 to be routed to that PE's output during the shift, thereby preempting the, PE's own data output. (In other words, the data received by the PE 701 is supplied directly as an output signal of the PE 701 during a single clock cycle.) A datum can therefore be shifted through a number of PEs 701 during a given clock. This does not mean that the entire bit plane is shifting by multiple PEs 701 during the clock; the overall shift bandwidth has not increased. Only selected data bits are shifted in this way. A PE 701 is bypassed if the contents of its shift mask (XF register 821 for east/west; YF register 823 for north/south) are "1". Because this approach provides a ripple effect (i.e., there is no 'bypass look-ahead'), the bypass distance is necessarily limited by the propagation delays of the logic. Consequently, the maximum shift distance both within the interior of the PE array 103 as well as where a chip boundary is crossed is application specific.

In another aspect of the invention, carry propagation logic (NCY, SCY, ECY, WCY) provides a means for using multiple PEs 701 in combination to perform a multibit sum. This feature is restricted to propagations in a single direction at a time (N, S, E or W) and is limited as to propagation distance within a single clock because a ripple approach is employed.

An example of an operation in which carry propagate might be used is a 16-bit add where four PEs 701 operate upon four bits of each operand at a time. For the purpose of illustration, let the operands be called L, R and A where L and R are summed to produce A. The sum image might be represented as shown below:

|         | PE0         | PE1          | PE2           | PE3            |
|---------|-------------|--------------|---------------|----------------|
| adr = 0 | L0 + R0 + 0 | L4 + R4 + ci | L8 + R8 + ci  | L12 + R12 + ci |
| adr = 1 | L1 + R1 + c | L5 + R5 + c  | L9 + R9 + c   | L13 + R13 + c  |
| adr = 2 | L2 + R2 + c | L6 + R6 + c  | L10 + R10 + c | L14 + R14 + c  |
| adr = 3 | L3 + R3 + c | L7 + R7 + c  | L11 + R11 + c | L15 + R15 + c  |

It may be seen from the example that four bit planes are required to store each of the 16-bit images (only A is shown above). The first bit of image A is located in PE0 at adr=1 and is generated by summing L0 and R0. Since this is the least significant bit, no carry is propagated to this sum. For the remaining bits in PE0 (A1–A3), a carry is propagated from the previous bit sum (c for A1 is the carry out of L0+R0, etc.). The carry input to the sum L4+R4, located in PE1, is the same as the carry out from the L3+R3+c sum in PE0. This pattern repeats for each of the remaining PEs 701.

Clearly, there is a difficulty in performing the adr=1 bitplane operation when, for PE1, PE2 and PE3, the result of the adr=3 bitplane operation is required. This is resolved by performing the operation in three steps.

1. Perform a 4-bit add to generate the carry out for each PE 701.
2. Perform a propagation of the carry out to the neighboring PE 701.
3. Repeat the 4-bit add, using the carry in from the preceding PE 701.

This series of steps would need to be carried out once for each of the four PEs 701 if there were not a means for propagating the carry across all of the PEs 701 in a single step. This is accomplished by computing, in step 1 above, two carry outputs for each PE 701. The first carry out is the carry assuming a carry-in had been 0 (c0). The second carry out is the carry assuming the carry-in had been 1 (c1). The "real" carry out, then, is 1 if c0=1 or if c1=1 and the carry-in actually is 1. This is expressed:

$$cy = c0 | (c1 \ \& \ ci);$$

Since the cy for one PE 701 is the ci for the next PE in the series, we can compute the cy for the second PE 701 by substituting as follows:

$$cy(PE1) = c0(PE1) | (c1(PE1) \ \& \ (c0(PE0) | (c1(PE0) \ \& \ c1(PE0))));$$

This carry propagation may be rippled across the PEs 701, with each PE 701 adding two gates of delay to the total.

The computation of c0 and c1 is done with a single pass by performing the add with a carry-in of 1, propagating the carry to the C register 815 and a zero flag to the Z register 817. The Z register 817 will be 1 if the sum is 0 or the sum is 16 (for the example above). A sum of 16 means the sum with carry in of 0 would have been 15. Since the c0 condition is true for all cases of c1=1 except where (in the example) the sum "would have been" 15 with carry-in of 0, (i.e., the sum "is" 16 with carry-in of 1), the value of c0 may be derived from the C and Z registers 815, 817 as:

$$c0 = C \ \& \ !Z;$$

This in turn gives:

$$cy = (c \ \& \ !Z) | (c \ \& \ ci);$$

$$cy = C \& (!Z \ ci);$$

This expression for the carry-out (cy) is implemented as shown in Table 28 to generate the (NO, SO, EO or WO) outputs in response to the (NS=SCY, NS=NCY, EW=WCY or EW=ECY) commands respectively. The (SCY, NCY, WCY, ECY) signals in the expression represent the carry-in for each PE 701. As shown in Table 27, these signals are generated by gating (ANDing) the PE input signals (NI, SI, EI, WI) with the XF/YF registers 821, 823. This gating allows the establishment of carry propagate boundaries so that PE0, in the example above, will not propagate a carry-in from a neighboring PE 701. The partitioning of the array into multibit PE groups, therefore, is accomplished through a simple mask loaded to the XF or YF registers 821, 823.

In yet another aspect of the invention, the injection of patterns into the PE array 103 is supported through the propagation of bit data values across rows (NS:=YPAT) or columns (EW:=XPAT). This capability is useful for controlling individual PEs 701 based upon location within the PE array 103 by, for example, supporting PE coordinate generation. The data patterns originate in a thirty-two bit X Pattern register and a thirty-two bit Y Pattern register (two registers that are external to the PE array 103 but within the MCC IC 101 architecture). Each bit of the X Pattern register propagates data to a single (entire) column of PEs 701, and each bit of the Y Pattern register propagates data to a single (entire) row of PEs 701 via the XPAT and YPAT input signals. By propagating patterns into the NS and EW registers 807, 809 it is a simple matter to generate a mask which selects a single PE 701, or a row/column or sub-region within the PE array 103. PE numbering is a straightforward matter, and having obtained that the possibilities are endless.

The NS and EW shift plane signals are set forth in Table 28:

TABLE 28

| Signal | XROLL | YROLL | Conditions                          | Definition |
|--------|-------|-------|-------------------------------------|------------|
| NO     | 0     | 1     |                                     | NS         |
|        | 0     | 0     | ns_sel = 3(SI) or al_sel = 3(SI)    | NS         |

TABLE 28-continued

| Signal | XROLL | YROLL | Conditions | Definition |
|---|---|---|---|---|
| | 0 | 0 | ns_sel = 9(SBYP) | (NS&YF) \| (SI&!YF) |
| | 0 | 0 | ns_sel = 13(SCY) | C & (!Z\|SCY) |
| | 0 | 0 | ns_sel = 15(SIF) | NS & YF |
| SO | 0 | 1 | | EW |
| | 0 | 0 | ns_sel = 2(NI) or al_sel = 2(NI) | NS |
| | 0 | 0 | ns_sel = 8(NBYP) | (NS&YF) \| (NI&!YF) |
| | 0 | 0 | ns_sel = 12(NCY) | C & (!Z\|NCY) |
| | 0 | 0 | ns_sel = 14(NIF) | NS & YF |
| EO | 1 | 0 | | EW |
| | 0 | 0 | ew_sel = 3(WI) or bl_sel = 3(WI) | EW |
| | 0 | 0 | ew_sel = 9(WBYP) | (EW&XF) \| (WI&XF) |
| | 0 | 0 | ew_sel = 13(WCY) | C & (!Z\|WCY) |
| | 0 | 0 | ew_sel = 15(WIF) | EW & XF |
| WO | 1 | 0 | | NS |
| | 0 | 0 | ew_sel = 2(EI) or bl_sel = 2(EI) | EW |
| | 0 | 0 | ew_sel = 8(EBYP) | (EW&XF) \| (EI&!XF) |
| | 0 | 0 | ew_sel = 12(ECY) | C & (!Z\|ECY) |
| | 0 | 0 | ew_sel = 14(EIF) | EW & XF |
| NS_OP | 0 | 1 | | (SI&!YF) \| (EW&YF) |
| | 1 | 0 | | (EI&!YF) \| (EW&YF) |
| | 0 | 0 | | NS |
| EW_OP | 1 | 0 | | (WI&!XF) \| (NS&XF) |
| | 0 | 1 | | (NI&!XF) \| (NS&XF) |
| | 0 | 0 | | EW |

In another aspect of the invention, a type of shift, called "ROLL", is provided. The pattern of data movement during a roll operation is a loop whose end points are determined by the mask values in the XF and YF registers 821, 823. In the exemplary embodiment, XF=1 indicates that PE 701 in which the content of the NS register 807 "rolls over" to the EW register 809 within the same PE 701; and YF=1 indicates that PE 701 in which the content of the EW register 809 "rolls over" to the NS register 807 within the same PE 701. This pattern is analogous to a tank tread which moves in one direction on top, the opposite direction on bottom, and rolls over from top to bottom (and bottom to top) at the end points. The shifting pattern of a ROLL operation is ideal for shuffling operations (such as transforms), in which the swapping of pattern blocks is pervasive. The ROLL function also provides a reversal capability that may be useful for pattern reflections.

The ROLL function is unique in that it allows simultaneous propagation of data in opposite directions within the interior PEs 701 of a PE array 103. This is not, however, possible across boundaries between one MCC IC 101 and another, so, in the exemplary embodiment, bit plane shift outputs are not driven during a ROLL command. The ROLL function accomplishes its bidirectional shifting by combining the NS and EW bit plane functions during a given clock. For example during a roll in the north/south direction, the NS plane shifts north while the EW plane shifts south. There are two combinations of the ROLL command only: the north/south roll and the east/west roll. When Roll_Cmd is active (see Table 26), the roll direction is selected by the least significant bit of the NS_Sel field of the CW 1001 (where NS_Sel(0)=0=>e/w, and NS_Sel(0)=1 =>n/s). When Roll_Cmd is active, the NS_Sel and EW_Sel multiplexors select NS_OP and EW_OP respectively, regardless of the value of the NS_Sel and EW_Sel fields in the CW 1001.

2.3 ALU Functions

The ALU 801 and associated masking logic (i.e., ACMD logic block 825 and BCMD logic block 827) provides the computational capability of the PE 701. The operation of the ALU 801 is controlled by the Mode_Cmd field in the CW 1001 (see Table 25). The ALU inputs are masked under the control of the A_Cmd, B_Cmd and Op_Cmd fields of the CW 1001 (see Tables 21, 22 and 23), thereby effectively providing a wide range of ALU functions.

FIG. 12 is a block diagram showing the ALU 801 in greater detail. The ALU 801 has six inputs and three outputs, providing a simple full adder function in Normal Mode and a six-input adder in a Multiply ("Mult") Mode, which is described later. The ALU 801 is implemented with three half adders 1103, 1105 and 1109, and two full adders 1101 and 1107, interconnected as shown in FIG. 12. The half adders 1103, 1105 and 1109 are components that provide the two-bit sum of two single-bit inputs. The truth table for this function is shown in Table 29:

TABLE 29

| Input a | Input b | Output: sum ("S") | Output: carry ("C") |
|---|---|---|---|
| 0 | 0 | 0 | 0 |
| 0 | 1 | 1 | 0 |
| 1 | 0 | 1 | 0 |
| 1 | 1 | 0 | 1 |

In Table 29, the two outputs are designated as the single-bit values "Sum" and "Carry". However, these outputs may alternatively be viewed in combination as a 2-bit sum.

The truth table for the full adders 1101 and 1107 is shown in Table 30:

TABLE 30

| Input: a | Input: b | Input: c | Output: sum ("S") | Output: carry ("C") |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The full adders 1101, 1107 provide sum and carry outputs for the three single-bit input signals a, b and c. The sum and carry outputs of the full adders 1101, 1107 could alternatively be viewed as a two-bit sum derived from the three single-bit inputs.

The arrangement of the ALU 801, then, is the following: A first full adder 1101 receives three input signals, designated ALU_A, ALU_B and ALU_C. The Sum output generated from these signals is supplied to a first half adder 1103, while the Carry output of the first full adder 1101 is supplied to a first input of a second full adder 1107. A second half adder 1105 receives two other input signals, designated ALU_X and ALU_Y. The Sum output from the second half adder 1105 is supplied to a second input of the first half adder 1103, while the Carry output from the second half adder 1105 is supplied to a second input of the second full adder 1107. A third input signal to the ALU 801, designated ALU_Z, is supplied directly to a third input of the second full adder 1107.

The Sum output of the first half adder 1103 is supplied as a SUM output from the ALU 801, while the Carry output from the first half adder 1103 is supplied to a first input of a third half adder 1109. The Sum output from the second full adder 1107 is supplied to a second input of the third half adder 1109. From these two inputs, the third half adder 1109 generates a Sum output that is supplied as a first carry signal ("CY1") at an output of the ALU 801.

The carry output from the third half adder 1109 is supplied to a first input of a logical-OR gate 1111. A second input of the logical-OR gate 1111 receives the carry signal generated by the second full adder 1107. The output of the logical-OR gate 1111 is then supplied as a second carry signal ("CY2") at an output of the ALU 801.

The ALU 801 is thus capable of performing a variety of functions, depending on what signals are supplied to its six inputs. The possible ALU input signals and other mode-dependent signals incorporated into the exemplary embodiment are shown in Table 31:

TABLE 31

| Signal | Conditions | Norm Mode | Mult Mode | MinMax Mode |
|---|---|---|---|---|
| C_OP | op_cmd = 0 | c \| plus | 0 | !d \| (c & (!alu_a \| alu_b)) |
|  | op_cmd = 1 | c \| plus | 0 | !d \| (c & (alu_a \| !alu_b)) |
| D_OP | op_cmd = 0 | aram | aram | !c \| (d & (alu_a \| !alu_b)) |
|  | op_cmd = 1 | aram | aram | !c \| (d & (!alu_a \| alu_b)) |
| BL_OP |  |  | ew_op | al | ew_op |
| Z_OP |  |  | cy1 | cy2 | cy1 |
| ALU_A | a_cmd = 0 | al | al | al |
|  | a_cmd = 1 | al \| d | al & xf | al \| !c |
| ALU_B | b_cmd = 0, op_cmd = 0 | bl | bl | bl |
|  | b_cmd = 0, op_cmd = 1 | !bl | !bl | !bl |
|  | b_cmd = 1, op_cmd = 0 | bl & d | bl & d | bl & d |
|  | b_cmd = 1, op_cmd = 1 | !bl \| !d | !bl \| !d | bl & d |
| ALU_C | op_cmd = 0 | c | c | !d |
|  | op_cmd = 1 | c | c | c |
| ALU_X |  | 0 | ew | 0 |
| ALU_Y |  | 0 | yf & ns | 0 |
| ALU_Z |  | 0 | z | 0 |

To interpret Table 31, one first finds the row associated with the signal of interest (e.g., the ALU-A signal). The second column, labeled "Conditions" indicates whether the meaning of the signal is a function of one or more other conditions. This, in conjunction with the mode of operation of the ALU, as specified by the MODE_CMD field of the CW 1001, determines the meaning of the signal. For example, the meaning of the ALU A signal is a function of the value of the A_CMD field in the CW 1001. In particular, when the A CMD field=0, the ALU A signal in Norm Mode is equal to the al signal (i.e., output of the AL register 811), whereas when the A_CMD field=1, the ALU_A signal in Norm Mode is equal to al|d (i.e., the contents of the AL register 811 logically OR'ed with the contents of the D register 819). One may similarly, determine the value of the ALU_A signal when Mult Mode and MinMax Mode are specified by the MODE_CMD field of the CW 1001.

It can be seen, then, that when Norm Mode is selected, three of the ALU inputs (namely ALU_X, ALU_Y and ALU_Z) are zeroed, leaving the ALU 801 to function as a simple full adder. In this mode, the PLUS output supplies the sum for each bit operation and the CY1 output provides the carry out which may be propagated to the next bit operations (via the C register 815). To perform a subtraction, the Op_Cmd is set to 1, complementing the ALU B input. (For two's complement subtraction, the ALU C input should be set to "1" when subtracting the least significant bits.) To perform a conditional add, the B_CMD field of the CW 1001 is set to 1, thereby masking (ANDing) the ALU_B input with the D register.

It is possible to provide a sequence of PE instructions to implement multiply operations using the ALU 801 in normal mode. Such techniques are utilized, for example in the SIMD processor that is described in U.S. patent application Ser. No. 08/112,540, which was filed on Aug. 27, 1993 in the name of Meeker. However, in another aspect of the invention, another mode of operation (herein referred to as Mult Mode) permits multi-bit multiply operations to be performed in significantly fewer clock cycles. This technique is fully described in a later section of this disclosure. When Mult Mode is selected by the MODE_CMD field of the CW 1001 (see Table 25), all of the inputs of the ALU 801 are enabled, so that the ALU 801 functions as a six-input adder, returning a PLUS and two carry outputs (CY1 and CY2). When performing multiply operations in this mode, the CY1 output is propagated to the C register 815 and the CY2 output is propagated to the Z register 817. Since the CY2 is a higher-significance bit than CY1, an asserted ("1") bit value applied to the ALU Z input (from the Z register 817) counts as a decimal value of "2", making this six-input adder capable of generating sums between 0 and 7 (where PLUS, CY2 and CY2 represent the three-bit sum). This arrangement provides a fast multiply capability by allowing the conditional addition of three bits at a time to an accumulator bit. (The six inputs comprise these four signals plus the two carry signals.) The masking required to accomplish this is defined in Table 31.

When MinMax Mode is selected by the MODE-CMD field of the CW 1001, it is possible to perform a minimum ("Min") function (Op_Cmd=0) or a maximum ("Max") function (Op_Cmd=1) within a single pass. The Min and Max functions are performed by initially setting the contents of the C and D registers 815, 819 to "0, indicating that both operands are still min/max candidates. Processing single-bit operands with each clock, sequencing proceeds from the most significant to least significant bits of the multi-bit operands. During sequencing, the C and D registers 815, 819 are updated on each clock to indicate the determination of the min or max operand. Once a difference between operands is detected, the C/D registers 815, 819 are set to indicate which operand is min/max, and the remainder of the operation proceeds without changing the contents of the C and D registers 815, 819. The appropriate min/max output is provided through masking of inputs with the values of the C and D registers 815, 819.

2.4 Global Outputs

Each PE 701 generates signals that are combined to create chip global outputs. These PE signals include PE global OR (PEGLOR), overflow (OVER), column GLOR (colGLOR) and row GLOR (rowGLOR). The PEGLOR signals from each of the PEs 701 in the PE array 103 are combined to generate a single chip GLOR signal that can be output via GSTAT. Similarly, the OVER signals from each of the PEs 701 in the PE array 103 are combined to generate a single chip OVER signal that can be output via GSTAT. Each of the quadrant GLOR signals is generated by combining the PEGLOR signals from each PE 701 in a respective one of four quadrants of the PE array 103.

The PEGLOR signal is generated by AND-ing the contents of the Z register 817 with the contents of the D 819 (where Op-Cmd=0). This provides a maskable contribution to GLOR from each PE 701. Through the use of masks, the programmer can extract a data value from a single PE 701, or alternatively search all PEs 701 for the occurrence of a "1" value. When Op_Cmd=1, the value of the Z register 817 is inverted before masking and contributing to GLOR. This allows a global NAND in addition to global OR, thereby providing occurrence-of-0 detection.

The OVER signal value is used in the detection of overflow conditions and operates simply by comparing the output of the Z register 817 to its input (output of a Z_Mux, not shown in a figure) on a given clock. Any change in the Z register value may be indicative of an overflow. In the exemplary embodiment, the OVER signal is not maskable.

The RowGLOR and ColGLOR signals may be described as opposite in direction to the XPAT and YPAT functions. The RowGLOR signal is generated by OR-ing all contributions from the PEs 701 in a row of the PE array 103 to generate a single-bit row signal, doing this for each row of the PE array 103, and propagating the row signals to respective bits of the X_pattern register. Likewise the ColGLOR signal is generated by OR-ing all contributions from the PEs 701 in a single column of the PE array 103 to generate a single-bit column signal, doing this for each column in the PE array 103, and propagating column signals into respective bits of the Y Pattern register. The mapping of row/col GLOR signals to the pattern registers is the same as for the XPAT/YPAT functions of the shift planes. The contribution of each PE 701 to the row/col GLOR is computed by AND-ing the NS/EW value with the YF/XF value (e.g., RowGLOR:=NS&YF).

3. Programming Perspective of MCC Integrated Circuit

This description will now focus on the MCC IC 101 from the programmer's point of view. The MCC IC 101 is preferably designed to function as a SIMD co-processor to a conventional processor or program sequencer. As such, it does not need to include program sequencing logic or serial processor arithmetic capabilities which would be required for stand alone operation. Instead, the primary components of the controller 105 for controlling the operation of the MCC IC 101 are shown in the block diagram of FIG. 13.

As will be described below in greater detail, the MCC IC 101 includes a fetch unit 1201 that accepts instructions which (primarily) specify image operands, an operation code ("opcode"), and some optional modifiers. From these instructions, appropriate PE commands are generated (in the form of the CW 1001) that cause the MCC IC 101 to perform the operation on the operands and then to proceed to the next received instruction. (Instructions are "received" via the Instruction Bus (IBus) 1807 and the fetch logic stages in the fetch unit 1201, described below.) Interaction with the control processor is minimal and instructions may typically be supplied to and processed by the MCC IC 101 largely uninterrupted.

The data object which is processed in the MCC IC 101 is referred to as an "image", although applications are not restricted to the image processing domain. An image may be conceptualized as an array of pixel (or other type of) values equal in dimension to the PE array 103 within the MCC IC 101. In practice, an image is stored in the array as a collection of bit planes, where each bit plane is an array of bit values, one from each image pixel, all of equal significance. An 'n' bit image (i.e., an image comprised of a number of pixels, each of which is 'n' bits wide) is implemented as 'n' bit planes. Each PE 703 contains all of the bit values for a single pixel of the image.

Image operations may be performed between image operands, between scalar operands, or between image and scalar operands. In general, an operation between two images involves the pair-wise performance of the operation between pixels of the operand images within each PE 701 of the PE array 103. From the point of view of one of the PEs 703, an image ADD, therefore, involves the addition of the local pixel from one image to the local pixel from a second image. More specifically, because the arithmetic logic of the PE 701 is bit serial (i.e., multiple bit operations are performed one bit at a time, one per PE instruction clock), an image operation (which specifies an operation to be performed on a potentially multi-bit image operand) is performed by running a microprogram (i.e., a sequence of PE commands) that sequentially performs a series of "bit operations" that combine to implement the image operation. The process of executing instructions within the MCC IC 101 is therefore analogous to that which is performed by conventional processors that implement macro instructions (written at an assembly or machine level) by translating them, one by one, into a sequence of one or more microinstructions, the execution of which produces the desired result specified by the macro instruction.

Image operands are maintained by the MCC IC 101 through the use of "image descriptors". An image descriptor is a structure that completely describes an image, including attribute and bit plane storage information. The image descriptor is used by the MCC IC 101 to provide control during the execution of operations. An image's descriptor is maintained by the MCC IC 101 in an Image Descriptor Table (IDT) 1203, and is represented to the control processor (i.e., the processor that provides the instructions to the MCC IC 101) as a simple index, or Image ID, that addresses the desired Image Descriptor within the IDT 1203. In the exemplary embodiment, each Image ID is seven bits long.

An instruction for the MCC IC 101, then, consists of an opcode and opcode modifier and three operands (src1, src2, dest), each of the operands being represented by 7-bit Image IDs. The opcode specifies the operation to be performed on the three operands specified. When the operation itself is ready to be performed, an instruction sequencer 1205 supplies a series of one or more dispatches using start addresses and operand descriptors to a primitive sequencer 1207 which, in conjunction with overlay logic 1209 and an I/O Sequencer 607, generates the sequence of PE commands (in the form of CWs 1001) based on the attribute and storage information supplied by the (operand) image descriptors. Because of the single-instruction multiple-data (SIMD) design of the PE array 103, the bit operations specified by each PE command occur simultaneously in all PEs of the array between corresponding bits of the image operands.

The life-cycle of an image begins with an allocation (ALLOC) operation and ends with a deallocation (DEALL) operation. In the exemplary embodiment of the MCC IC 101, storage locations within the PE RAM 601 and the Page RAM 603 are allocated to operands by PE memory allocation/deallocation logic 1211 within the controller 105. Addresses of available (i.e., non-allocated) storage locations within the PE memory resources are maintained in a pool memory 1213. In one aspect of the invention, storage for each multi-bit operand may be allocated in units that each represent multiples of bit planes that are fewer than the number necessary to store the entire multi-bit operand. As a result, it is possible for a single multi-bit operand to be stored at non-contiguous storage locations within the addressable PE memory resources. It is the responsibility of the programmer to ensure that all images are properly allocated and deallocated in order to maintain storage integrity within the MCC IC 101.

3.1 Operand Representation

In an exemplary embodiment of the inventive MCC architecture, an operand is represented by an 80-bit image descriptor which provides attribute and storage information sufficient to completely describe an image stored in the array (i.e., in either the PE RAM 601 or the Page RAM 603). Image descriptors are stored in the IDT 1203 and may alternatively represent image operands or scalar operands. Image descriptors may represent integer, floating point, or single bit mask images. In the exemplary embodiment, integer images may be any size up to 36 bits wide. Further, in the exemplary embodiment the image descriptor does not differentiate (or "tag") between integer and floating point operands.

One characteristic of an image-type operand is that the particular data value (e.g., pixel) operated on or generated in any one PE 701 may differ from the particular data values operated on or generated in any other PE 701. Thus, the image descriptor provides an advantageous way of referencing a data value in a way that is common to all PEs 701 (i.e., referencing it by referring to its storage address). However, in some cases it is desired to apply the same data value as an operand in all PEs 701 within the PE array 103. For this purpose, and in accordance with one aspect of the invention, a second operand type is defined: the scalar operand. In the exemplary embodiment, a scalar operand is represented internally as a fixed-size number, such as a 36 bit number. Because the scalar operand is the same for all PEs 701 in the PE array 103 (i.e., it is a global value with respect to the PEs 701 in the PE array 103), it is unnecessary to utilize storage space in each PE 701 to hold this value. Consequently, instead of allocating memory address space for the scalar operand, the value of the scalar is stored in the image descriptor itself, as will be seen in greater detail below. In all other respects, however, a scalar operand may be used interchangeably with image operands to perform image operations.

Figure 14A:
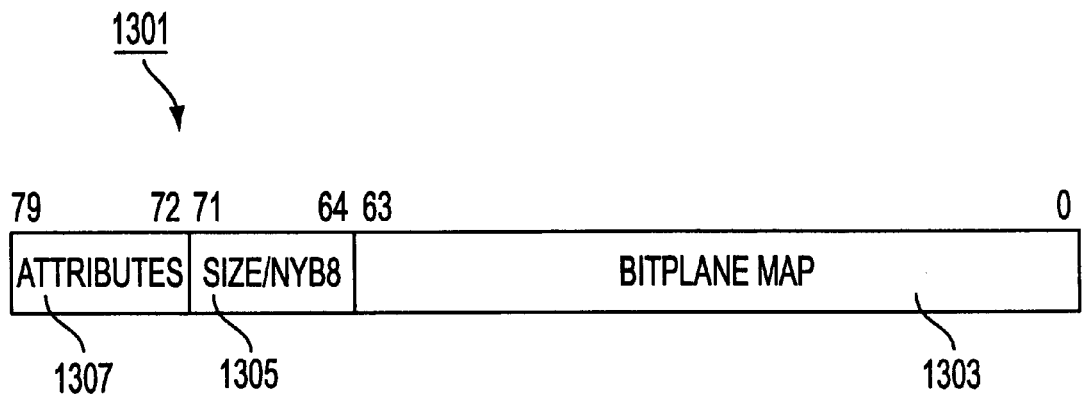
FIGS. 14A, 14B and 14C illustrate the format of an exemplary image descriptor in accordance with one aspect of the invention.
Figure 14B:
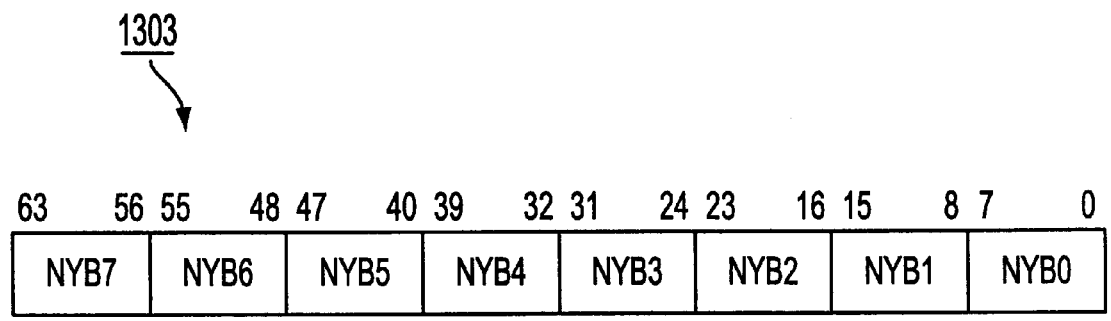

An exemplary image descriptor 1301, shown in FIG. 14A, uses the first 64 bits to provide a bit plane map 1303 of the image data in the array. FIG. 14B is a more detailed depiction of the bit plane map 1303. The bit plane map 1303 specifies the one or more addresses at which different groups of bits that together make up a potentially multi-bit operand are stored in either the PE RAM 601 or Page RAM 603.

Figure 14C:
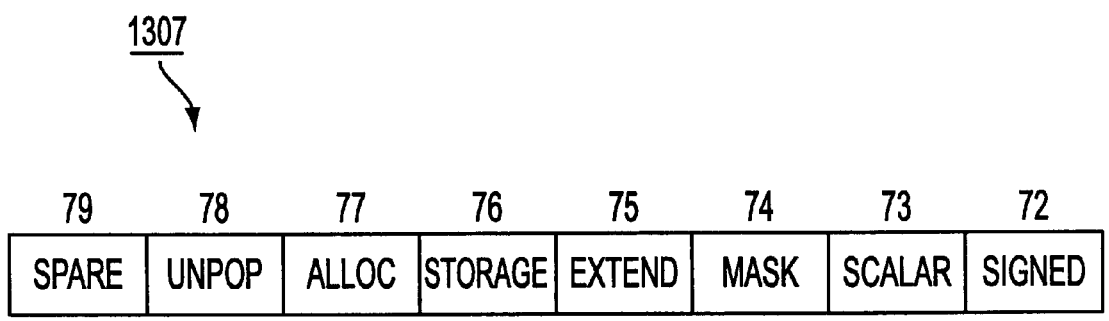

The next eight bits in the image descriptor 1301 make up a size/nyb8 field 1305 that provides an image size attribute for all images that are less than or equal to 32 bits in length (i.e., for images that require the allocation of any number from one to eight nybbles of storage). However, for "extended" images (where the extend attribute, described below, is active), the size of each pixel in the image is understood to be 36, and the eight-bit size/nyb8 field 1305 provides a ninth nybble address. (As used in this disclosure, the term "nybble" refers to a group of four data bits in the exemplary embodiment. However, nybbles may refer to different numbers of data bits in other embodiments.) The eight highest bits of-the image descriptor 1301 make up an attribute field 1307 that describes various properties of the image. The attribute field 1307 is depicted in greater detail in FIG. 14C.

Table 32 provides a detailed description of the various fields in the exemplary image descriptor 1301.

TABLE 32

| Field | Size | Description |
| --- | --- | --- |
| Bit plane Map | 64 | Bit plane map consisting of eight nybble-plane address fields. Each nybble-plane address is eight bits, spanning up to 256 nybble-planes (= 4 × 256 = 1024 bit planes). |

TABLE 32-continued

| Field | Size | Description |
| --- | --- | --- |
| Size/Nyb8 | 8 | Provides the size in bit planes for the image when the Extend attribute is not active. In this case, the image size may be any value between 0 and 32. Whenever the Extend attribute is active, the size is defined as 36 and this field provides a ninth nybble-plane address instead of a size count. Note that an image size of zero represents a "Global Zero" value. |
| Signed | 1 | Indicates whether the operand is to be interpreted as unsigned (Signed = 0) or signed (Signed = 1). The most significant bit of a signed operand is the sign bit. |
| Scalar | 1 | Indicates whether the operand is of type image (Scalar = 0) or scalar (Scalar = 1). |
| Mask | 1 | Indicates whether the image is a normal multi-bit image (Mask = 0) or a 1 bit mask image (Mask = 1). |
| Extend | 1 | Extend = 0 indicates that the image is normal (size = Size/Nyb8). Extend = 1 indicates that the image is extended (size = 36). |
| Storage | 1 | Indicates whether the image is stored in PE RAM (Storage = 0) or Page RAM (Storage = 1). |
| ALLOC | 1 | Indicates whether the image descriptor is allocated (Allocation is performed by the ALLOC primitive, described below). |
| Unpop | 1 | Indicates whether the image bit plane map is populated (allocated, i.e. assigned addresses). |
| Spare | 1 | Spare field |

Figure 15A:
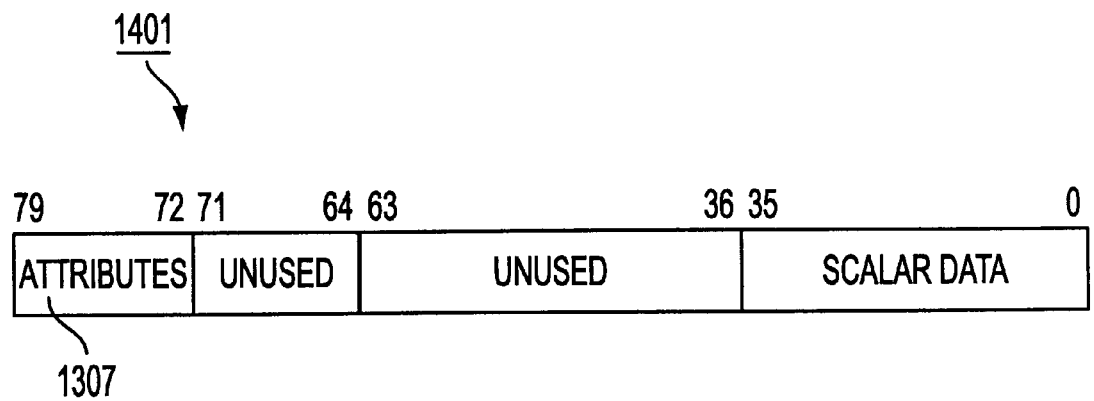
FIGS. 15A and 15B illustrate the format of an exemplary image descriptor for a scalar operand.
Figure 15B:
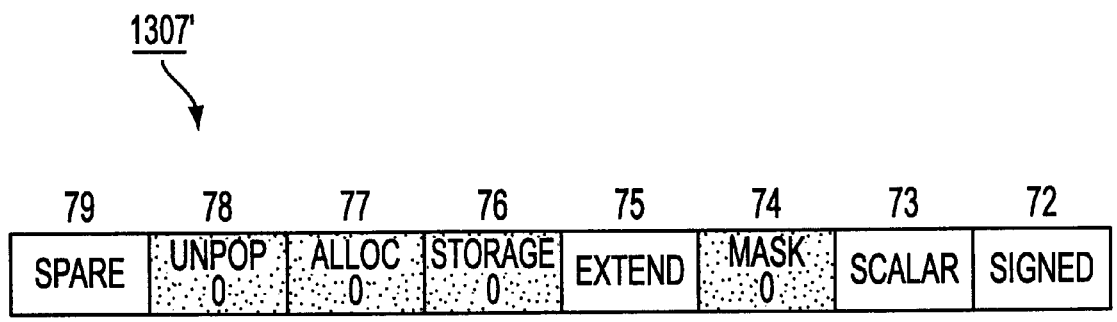

As mentioned above, the image descriptor itself does not allocate memory for scalar-type operands, but instead stores the scalar operand directly. This type of image descriptor 1401 is illustrated in FIGS. 15A and 15B. Here, the scalar type is represented by a scalar value which occupies the bit range 35.0 within the image descriptor itself. Scalars attributes are set by default to Extend=1, Signed=1, Scalar=1. There is no use for the Storage, Alloc, Unpop or Mask attributes for scalar operands, so these fields are set equal to zero, as illustrated in FIG. 15B. Scalar operands are assumed to span the entire 36 bits provided, so there is generally no need for alternate Extend or Signed attribute values. There may be cases where it would be useful to alter the Size and Extend attributes to provide specific control capabilities during internal sequencing, and it is feasible for the programmer to alter these attribute values directly if desired. However, the programmer should do nothing to invalidate the 36 scalar bits as stored in the descriptor.

It is noted that, in the exemplary embodiment, the 36 bit scalar representation is a convenient one for implementing scalar operations internally (i.e., within the MCC IC 101). It is recognized that scalar values originating outside the MCC IC 101 may be of various sizes, such as 8, 16 or 32 bits. Therefore, it is advantageous to provide means in the MCC IC 101 for automatically converting smaller scalar values to the 36 bit implementation during operand LD.

3.1.1 Reserved Image Descriptors

In accordance with one aspect of the invention, the first three locations in the IDT 1203 (i.e., locations 0, 1 and 2) are reserved for special image descriptors, which are listed in Table 33. These special image descriptors are treated differently from normal images in several ways. First, these three descriptors have read-only access; their descriptors may not be updated. The first two image descriptors, designated Global Zero and Global One, are global in the sense that they provide the same pixel value to every PE 701 in the PE array 103 when used as operands. All three images are global in the sense that they have global visibility to the programmer regardless of context. That is, each of these three images is visible at all points within a program. The "global images" may not be allocated or deallocated and are simply resources that are equally within the scope of all program segments.

TABLE 33

| Image Descr. | Description |
|---|---|
| 0 | Global Zero (always supplies a scalar 0 -- all bit positions) |
| 1 | Global One (always supplies a scalar 1 -- all bit positions) |
| 2 | Tmp Image (references the "Tmp" image which is defined in the MCC IC 101 to be nybbles 0–8 of each of the PE RAM 601 and Page RAM 603. In each of the PE RAM 601 and Page RAM 603, this corresponds to a 36-bit image (subject to the state of the Tmp descriptor) starting at address 0). |

The Tmp image is a dual image that occupies the first thirty-six bits of both the PE RAM 601 and the Page RAM 603. The Tmp image is intended mainly for internal use by MCC IC operations. See the section below entitled "Working Registers" for more information about the Tmp image. Since the Tmp image is always allocated and may be used from either PE RAM 601 or Page RAM 603, it can also provide a very convenient and powerful means for optimizing low level MCC IC code. The programmer must bear in mind that some MCC operations do use (corrupt) the Tmp image, and that any management of the Tmp descriptor is accomplished only through PE-level instructions. The programmer must not attempt to allocate or deallocate the Tmp image.

More information about each of the above predefined image descriptor IDs may be found below in the section that describes the hardware details of the IDT 1203.

3.1.2 Operand Types

The type of any operand is described by the Scalar, Extend, Mask and Signed bits in the attribute field 1307 of the operand's image descriptor 1301. The Size attribute is also an important descriptor of an image, but does not alter the interpretation of the image descriptor or image data and therefore is not an indicator of "type" as such. (The concept of type is a convenient way of describing the roles of the attributes and relating them to the programmer's experience. However, in the exemplary embodiment, the MCC Operation Set differentiates between two types only: integer and floating point.)

From the perspective of internal control, a scalar operand differs from an image primarily in terms of storage. A scalar operand requires no array storage because its value is represented entirely within the image descriptor. Scalar operands are seldom justified in departing from the profile Extend=1, Mask=0, Signed=1, and therefore do not present differing types (other than floating point, which is further discussed below).

A (non-extended) integer image may be any size in the range 0 to 32. The Size attribute identifies the number of bits comprising the integer image and the Signed attribute indicates whether the image is to be interpreted as signed or unsigned. A Signed image is interpreted such that the most significant bit is the sign bit. Where the operand is unsigned, the sign bit is implied to be 0.

A mask image (Mask=1) is an image that has a size of 1 and only one bit plane allocated. A mask image does not use the bit plane map 1303 in the same way that non-mask images do. Instead of interpreting each of the nyb7 . . . nyb0 fields as a nybble address, a mask image uses the 8-bit nybo field as the bit-level address with zero fill for the higher address bits. Mask images are treated the same as integer images for all image operations. A mask image may be signed, in which case it represents the range −1 . . . 0, or unsigned in which case the range is 0 . . . 1. (This is an important distinction where bitwise logical operations are to be performed. A bitwise logical operation is a logical operation where multi-bit (pairwise) operations are performed. The interpretation of higher bits matters. The programmer might find alternate (signed/unsigned) forms useful.) A mask image differs from a non-mask image of Size=1 only in that a single bit plane is allocated to the mask image whereas the non-mask image has a nybble-plane allocated to it and makes use of only the lowest bit plane.

An extended image (Extend=1) is a 36 bit image. Whenever the Extend bit is set, the Size attribute is ignored for the purpose of computing size and instead provides the ninth nybble-plane address in the bit plane map. The extended image is treated in the same way as normal integer images by image operations. Images in the size range 33 . . . 35 are not representable in normal image descriptors, but are provided for the Tmp image as described below in the section entitled "Tmp Image Control".

A floating point operand is not, strictly speaking, identified as such. Only single precision floating point operands are supported in the exemplary embodiment. In one aspect of the invention, a 36 bit form of binary floating point representation is used to handle the set of numbers defined by the ANSI/IEEE Std 754-1985 for binary floating-point arithmetic representation. This type of floating point representation, as well as techniques for converting to and from conventional floating point representations, are fully described below. Floating point operands are interpreted as floating point by virtue of the context in which they are used. In other words, floating point operations expect float operands and perform their computations based on that assumption.

Floating point scalar operands are supported and may be used in any floating point operation. A floating point scalar is represented in the same 36 bit form as floating point images. Floating point operands in the IEEE standard 32 bit single precision form may be loaded to the MCC IC 101 and converted internally to the 36 bit format for use in operations. The hardware for performing this conversion is described in Table 55 and supporting text, below.

Some attributes, such as Extend and Mask, are mutually exclusive. Scalar operands are expected to have Extend=1, Mask=0 and Signed=1, although variations in Size may be necessary. Floating point operands, as well, use Extend=1, Mask=0 and Signed=1, though the sign attribute should never be relevant because automatic sign extension is never exercised in floating point operations. Invalid combinations of attributes are not prevented absolutely, but should not occur normally because of the defaults provided by the internal MCC IC logic whenever operands are generated (e.g., during LD, especially during ALLOC).

3.2 Instruction Set

Instructions for the MCC IC 101 may be either of two types: an Array Processor Instruction (API) or an Array Processor Load Instruction (APLI). These are described in greater detail in the following sections.

3.2.1 Opcode Formats

Figure 16:
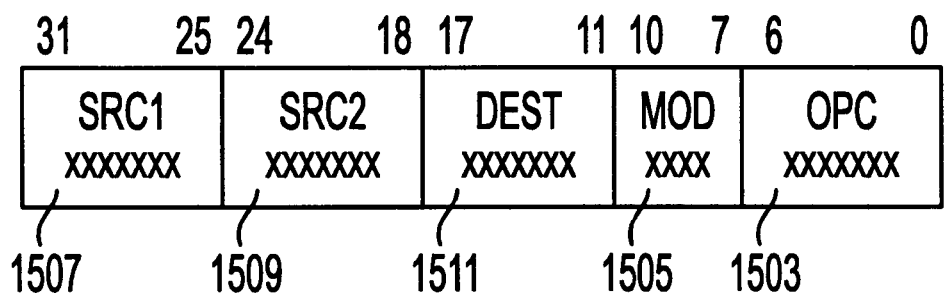
FIG. 16 illustrates an exemplary format of an Array Processor Instruction word 1501.

The format of an API instruction word 1501 is illustrated in FIG. 16. An API instruction word 1501 includes a seven-bit Opcode field 1503, a four-bit Mod field 1505, and three seven-bit operands (a first source operand (Src1) field 1507, a second source operand (Src2) field 1509 and a destination operand field 1511). The seven-bit Opcode field 1503, together with the four-bit Mod field 1505, determines the operation to be executed. Each of the seven-bit operand fields 1507, 1509, 1511 specifies a descriptor within the IDT 1203.

APLI instructions provide for the movement of operands to, from and within the MCC IC 101 for Instruction Mode access. (In the exemplary embodiment, Instruction Mode access occurs when ISTRB- is active, as described in further detail below.) These functions are provided by the load, store and move operations as shown in Table 34. A further instruction, RD, is activated by assertion of the ISTRB- and IR-W (read/write) signals. The RD operation does not have an opcode.

TABLE 34

| Opcode/Mnemonic | Description |
| --- | --- |
| 0x04 LDL | Load low 16 bits; note: high bits may be affected |
| 0x05 LDH | Load high 16 bits; low 16 bits are unchanged |
| 0x06 MOV | Move data from one address to another |
| 0x07 STR | Move operand to Store_Reg (and set Valid bit) |

Figure 17:
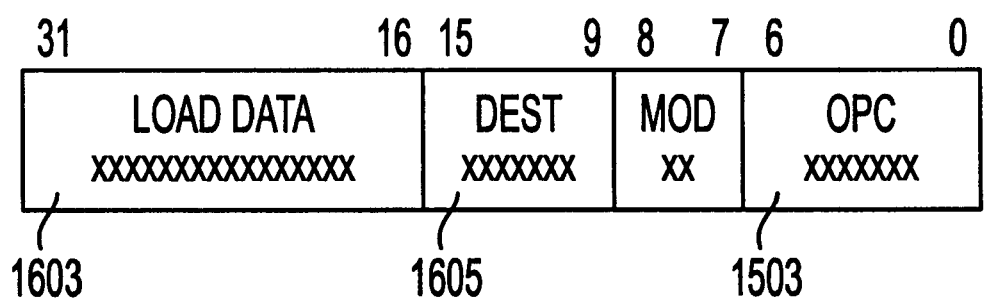
FIG. 17 illustrates an exemplary format of a load instruction.

The Array Processor Load Instructions utilize an internal 36-bit data bus, referred to herein as the Move Bus (see below for more information). The Move Bus controls respond to the LDL, LDH, MOV, and STR instructions. Resources upon the bus may occupy all or less than the full 36-bit width and are addressed with the Src1, Dest, and Mod fields 1507, 1509, 1511 of the APLI instruction. A Move Bus source (read) is specified with the Mod(3:2) and Src1 fields 1505, 1507. A Move Bus destination is specified with the Mod(1:0) and Dest fields 1505, 1511. The LDL and LDH instructions employ a variant instruction format 1601 as shown in FIG. 17. An address map of APLI bus resources may be found in a Table set forth below.

An LDL instruction loads bits from its 16-bit immediate data field 1603 into a destination's least significant sixteen bits. The remaining twenty bits of a 36-bit destination (or the remaining bits of a destination that is greater than 16-bits long) are formed by sign extending the 16-bits of data. The LDH instruction is similar in that the contents of the 16-bit immediate data field 1603 form the basis of the operand. In particular, the lower sixteen bits of the destination are left unchanged, the next sixteen bits come from the contents of the immediate data field 1603, and the remaining four bits are formed by sign extending the thirty-two bits of data (where the destination is 36-bits long). When the IDT 1203 is the destination of a LDL or LDH instruction, the MCC IC 101 additionally updates the image attribute field 1307 of the image descriptor 1301 to reflect active Scalar, Signed, and Extend attributes. If desired, these attributes may be overwritten with a subsequent LDL instruction to the IDT image attribute field 1307.

The MOV instruction copies the contents of a specified source location on the Move Bus to a specified destination on the Move Bus. Similar to the LDL and LDH instructions, when the source of the MOV instruction is the IEEE-to-MCC Float conversion registers ("FP Convert") 1835 and the destination is the IDT 1203, the IDT image descriptor attributes are updated to active Scalar, Signed, and Extend.

The STR instruction is like the MOV instruction, except that the Store_Reg 1917 is always the destination. When an instruction RD is performed (ISTRB-=active and IR-W=read) the contents of the Store Reg 1917 are returned in the IDAT signals. Thus an Instruction Mode read of a Move Bus address location is a two-step process: a write of a STR instruction to move the contents of the desired location to the Store Reg 1917, followed by a subsequent Instruction Mode read. Due to the piped execution of MCC IC instructions, several (potentially several hundred) clocks may be required to complete the STR|RD operation. For this reason, the RD operation will be completed upon the assertion of the IACK-BSY=acknowledge, signaling valid Store_Reg 1917 contents. In many cases, it may be more efficient to write several other MCC IC instructions between an STR/RD instruction operation pair, taking advantage of the STR data delay and "hiding" the wait for data. The Store_Reg 1917 will hold the STR data until a RD operation is performed.

3.2.2 Opcode Categories

In the exemplary embodiment of the MCC IC 101, operations are arranged by categories as shown in Table 35:

TABLE 35

| Opcodes | Category |
| --- | --- |
| 00..07 | Allocation, LD, Mov, STR Operations |
| 08..0f | Pattern, GLOR, and I/O Operations |
| 10..1f | Flag Operations |
| 20..27 | Logical Operations |
| 28..2f | Slice & Shift Operations |
| 30..3f | Fixed Point Operations |
| 40..4f | Floating Point Operations |
| 50..57 | Multiply and Divide Operations |
| 58..5f | Neighborhood Operations |
| 60..7f | Unused |

The operation set for the exemplary MCC IC 101 is given in Tables 39–47, below. The instruction set table supplies the opcode, mnemonic, operand usage, and description for each of the defined operations and the status flag effect. The usage is given as a triple, for example, (S1, S2, D) where the operand positions denote the Source 1, Source 2, and Destination operands for an operation such as Destination:= S1+S2. Where an 'X' appears, the operand is don't care. Other designations include D for Instruction Bus Load Data, P for the Preload Reg 1837, and G for a Chip_GLOR register. A number of the physical resources mentioned in the tables are more fully described in later sections of this document.

The total opcode space spans 128 possible Opcodes, 96 of which are reserved for predefined operations. This is a small number of predefined operations compared to instruction sets associated with some earlier SIMD architecture computers, but is sufficient because of several improvements in the implementation of the sequence control. First of all, many operations, such as MULT or FADD, are self contained where previously a number of "primitives" were required. A second improvement is the wide use of "overloading" in the instruction set, whereby a single primitive is used for operands which differ in scalar/image type as well as operands which differ in storage. A third improvement is the use of the Mod field 1505 of the instruction word 1501 to differentiate between variations of an operation. The ALLOC_PE operation is an example of the use of the Mod field 1505. There are two allocation instructions: ALLOC_PG, and ALLOC_PE. ALLOC_PG allocates an image in page memory, and ALLOC PE allocates an image in PE memory. The four Mod bits are used to determine the Signed, Size, Mask and Extend attributes, as shown in Table 36 below. Another example of the use of the Mod field 1505 to differentiate between variations of an operation is the PEEL operation, in which the Mod field 1505 determines the neighborhood for which the operation is performed.

One area of the exemplary MCC IC instruction set in which operations are not combined through overloading is that of floating point versus fixed point (integer) operations. The twenty floating point operations are counterparts to twenty fixed point operations. The floating point operations assume that operands are float image or float scalar, but do not enforce this. As mentioned before, the floating point operands are not tagged in any way, and it is the programmer's responsibility to avoid invalid operand/operation combinations.

The allocation operations, described in detail in the following section entitled "Allocation", include an ALLOC_PE for images stored in PE RAM 601, an ALLOC_PG for images stored in Page RAM 603, and a DEALL operation for deallocating images.

Figure 21:
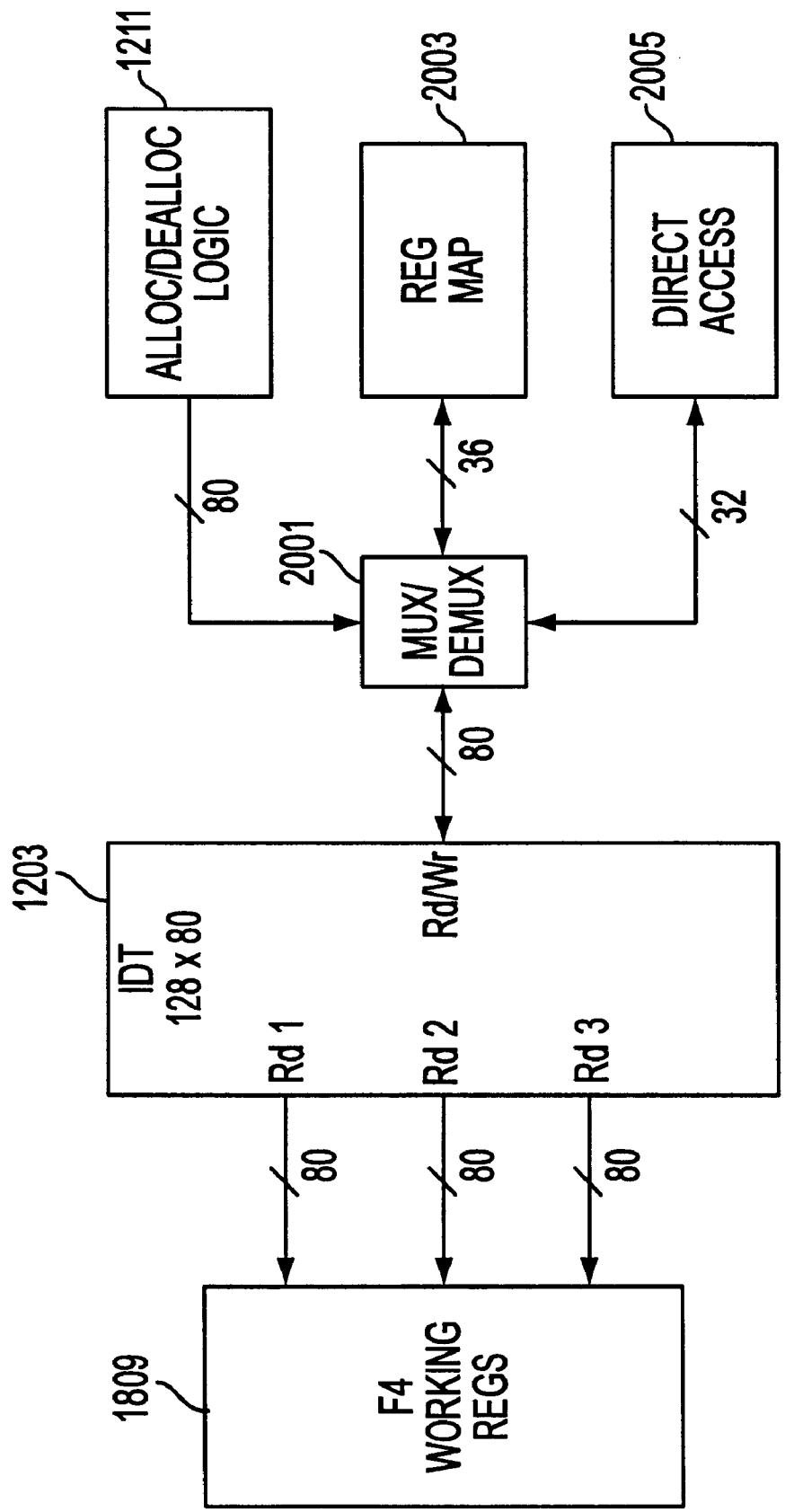
FIG. 21 illustrates the relationship between the Image Descriptor Table and some of the other hardware elements in accordance with an exemplary embodiment of the invention.

The LD, MOV, and STR operations described above provide access to resources in the Reg_Map 2003 (see FIG. 21). (The Reg_Map 2003, described in greater detail later in this disclosure, includes register and other resources, such as memories.) The LD and ST operations provide load and store capability via the instruction bus 111. The MOV operation provides for data movement between Reg_Map resources 2003. (More information about the Reg_Map resources 2003 is provided below.)

The Slice and Inject operations are not typical of conventional processors, but are considered useful for the MCC IC 101. These operations could be composed by combinations of shift and logical operations, but would then be much more time consuming. The LO and HI bit range parameters are derived from the Preload register 1837 (LO=Preload_Reg (5:0), HI=Preload_Reg(11:6)).

All of the Logical operations are implemented as bitwise logicals, which is to be expected in a conventional processor architecture. Where boolean operations are desired in high level tools, appropriate casts would need to be applied to the operation inputs prior to performing the logical operation. (The term "cast_refers to the conversion of data from one form to another, such as from integer to boolean.)

The fixed point operations provide an integer arithmetic image computation capability. These operations include single pass operations such as ADD, CMPLT, and the like, as well as two pass operations (MIN, MAX). The floating point operations are primarily counterparts to the fixed point operations.

The multiply and divide operations provide MULT, DIV, REM and SQRT for fixed and floating point operands.

Figure 18A:
FIGS. 18A, 18B and 18C illustrate how a Neighborhood is indicated by a Mod field in an instruction.
Figure 18A:
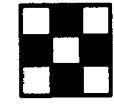
Figure 18A:
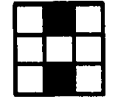
Figure 18A:
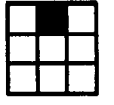
Figure 18A:
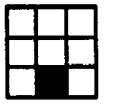
Figure 18B:
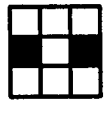
Figure 18B:
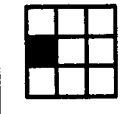
Figure 18B:
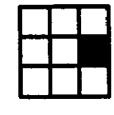
Figure 18B:
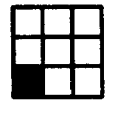
Figure 18B:
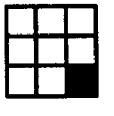
Figure 18C:
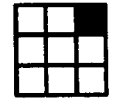
Figure 18C:
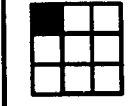
Figure 18C:
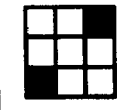
Figure 18C:
Figure 18C:
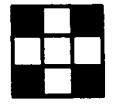

The Neighborhood operations provide several functions based upon the specification of a neighborhood. A neighborhood is selected by the Mod field 1505 as shown in FIGS. 18A, 18B and 18C, in which dark squares indicate neighbors with a value of 1, and white squares indicate neighbors with a value of 0.

The Pattern operations generate patterns from the X_Pattern register and the Y_Pattern register into the FLAG plane (which is implemented via Sig. See the section entitled "Signal Passing"). The COLGLOR and ROWGLOR operations, on the other hand, propagate the ColGLOR and RowGLOR signals from the FLAG plane to the X_Pattern and Y_Pattern registers 1827, 1829. The GLORVAL and GLORIMG operations extract image data via the GLOR signal into a chip_GLOR register or to an image respectively.

Image I/O is accomplished by the IMAGE IN and IMAGE OUT operations. These operations launch an I/O process. Any dependencies on operands which are currently being input or output are resolved by the fetch unit 1201 based on an input/output (I/O) process scoreboard. (See the section entitled "Dependency Enforcement" for more information about the scoreboard.)

Although image operands are inherently indirect (one references the image descriptor, which in turn references the one or more allocated nybble planes), this operation set is intended to provide the most conventional model feasible. There is no need to generate descriptor copies as in some earlier SIMD architecture computers. For example, to take a slice of an image (i.e., to obtain a contiguous subset of bitplanes that together constitute an image), one copies a slice from a source image into a different image (or by overwriting the same image). There is no descriptor copy describing the slice to be used. While it would be possible for more than one descriptor to denote a given image, it would have to be done intentionally by loading a descriptor to multiple registers at a time. The low level programmer must still remember to deallocate images in registers and not simply "abandon" them, but this is no different from the normal care and feeding of an explicitly allocated data object in a high level language.

3.2.2.1 Allocation

There are two allocation instructions: ALLOC_PG and ALLOC_PE. ALLOC_PG allocates an image in Page RAM 603, and ALLOC_PE allocates an image in PE RAM 601. The four bits of the Mod field 1505 are used to determine the Signed, Size, Mask and Extend attributes as shown in Table 36.

TABLE 36

| Mod | Attributes | Size/Sign |
| --- | --- | --- |
| 0000 | Mask | Unsigned |
| 0001 | Mask | Signed |
| 0010 | Int† | Unsigned 8 |
| 0011 | Int† | Signed 8 |
| 0100 | Int† | Unsigned 16 |
| 0101 | Int† | Signed 16 |
| 0110 | Int† | Unsigned 32 |
| 0111 | Int† | Signed 32 |
| 1000 | Extend | Signed |
| 1001 | Int† | Src1 Same Size & Same Sign |
| 1010 | Int† | Src1 Same Size & Unsigned |
| 1011 | Int† | Src1 Same Size & Signed |
| 1100 | Int† | Src1 Size + 1 & Same Sign |
| 1101 | Int† | Src1 Size − 1 & Same Sign |
| 1110 | Int† | Unsigned Preload Size |
| 1111 | Int† | Signed Preload Size |

†Int means mask = 0, Extend = 0

The number of nybble-planes allocated to an image should always be enough to satisfy the Size attribute, but never more than necessary. For example, a ten-bit image would have three nybble-planes allocated to it, as would a twelve-bit image. In the case of the ten-bit image, two bit planes are allocated but unused. The size attribute determines the number of "valid" bit planes, that is, the bit planes which are actually accessed during execution of a primitive operation.

For image operands, the storage does not affect the image data or its potential range of values, nor does it affect the use of an image as an operand to an image operation. The overlay logic 1209 resolves the storage of an image during execution of operations. This overloading by storage enables an operation set which is independent of storage.

3.2.3 Skew Parameters

Skew parameters modify the execution of operations by causing a translation of operands via the shift planes. In other words, operands are shifted from one PE 701 to another in either the north, south, east, or west direction in order to align with other operands during execution of the operation. This capability provides for neighborhood operations and any other operations where pixels from different image coordinates are required to combine.

The exemplary MCC IC 101 provides two means for supplying skew parameters to an operation. The first and simplest technique is to use the Mod field 1505 to specify immediate skew parameter values. The Mod field 1505 is convenient and high speed in that it allows the skew parameters to be "built in" to the instruction word. However, the Mod field approach is limited to skews of radius 1 (i.e., shifts of data from one PE 701 to a nearest neighbor PE 701).

The second technique for supplying skew parameters is to load 16-bit skew parameter values into the Preload skew registers 1851 prior to launching the instruction. With this approach, skews of any value in the +/−32 k range may be specified, and the skews are easily derived from run time data values within the control (i.e., external) processor. The second approach necessitates one extra operation for preloading each skew parameter, however, and therefore entails run time overhead.

The use of the Mod field 1505 to specify skew parameters depends upon the context in which it is used. Only operations for which operand skew is meaningful are modified with respect to skew parameters. For several operations discussed elsewhere, the Mod field 1505 has other uses.

Each operation has up to two input operands, a Src1 operand and a Src2 operand. The Src1 operand may have some north-south skew associated with it while the Src2 operand may have some east-west skew. Positive values denote north/east neighbors implying shift (i.e., skew, translation) to the south/west, while negative values denote south/west neighbors implying shift to the north/east.

The Mod field 1505 is interpreted as shown in Table 37. The Mod field 1505 selects, for each input operand, a skew of 0, +1, −1, or the value currently stored in the corresponding Preload register. The Mod field 1505 most significant bits (i.e., Instruction Word (10:9)) provide the Src1 operand skew modifiers while the least significant bits (i.e., Instruction Word (8:7)) provide the Src2 operand skew modifiers. The preloaded skew values are loaded to the skew Preload registers via normal load operations.

TABLE 37

| 10:9 | NS skew | 8:7 | EW skew |
|---|---|---|---|
| 00 | no skew | 00 | no skew |
| 01 | ns skew preload | 01 | ew skew preload |
| 10 | skew from North | 10 | skew from east |
| 11 | skew from South | 11 | skew from west |

3.2.4 Flag Operations

Conventional processors provide flag registers which record information about the results of an operation. The most common flags are a Carry flag, a Zero flag, and an Overflow flag. The PE array 103 within the MCC IC 101 can provide Carry and Zero indications for most operations, though these are not provided to the programmer directly. Instead, a signal known as the FLAG (also referred to throughout this document as "Sig") is provided which the programmer may use to propagate or store flag information.

Unlike conventional processor flags, the FLAG is not a discrete signal, but a bit plane value (i.e., a set of values, one for each PE 701). For a given PE 701, the results of an operation are retained by the C and Z registers 815, 817. These registers indicate directly the Carry/Borrow out and Zero state of an operation result. Like conventional flags, meaningful interpretations such as "less than" or "equal" may be inferred by combining the values stored in the C and Z registers 815, 817. This is illustrated by the definitions of the FLAG operations 0x10 . . . 0x17.

The programmer may access the FLAG via the Operation Set (as an implied operand for many operations). Whereas the conventional processor provides for branching on 'less than' or 'zero', the programmer can set the FLAG value to 'less than' or 'zero' (Opcodes 0x10 . . . 0x1f). The FLAG may be set to 0 or 1 (CLRF, SETF), loaded from an image bit (LDF) or stored to an image (STF). The flag may also be operated upon as shown in Opcodes 0x18 . . . 0x1f, or provided as an input to other operations (e.g., FORK).

The implementation of FLAG is the same as that of the Sig (described below), and FLAG in fact literally is the Sig represented at the operation (as opposed to primitive) level.

3.2.5 Overflow

As mentioned in the discussion of the FLAG signal, a conventional processor provides an Overflow flag which may be used to detect invalid operation results. The PE array 103 is capable of detecting overflow, but does not provide this information in a form which allows its inclusion in the FLAG signal. Rather, overflow is provided as a (global) status signal for which an interrupt may be enabled. Because of latency, it is not possible to raise the Overflow interrupt during execution of the operation which generates it. Detection of overflow occurs several clocks following the end of the operation, and can occur in a single MCC IC 101 or in multiple chips.

Overflow detection generally requires the execution of an extra clock for each primitive. For this reason, the use of overflow detection is optional. It is possible to generate the microcode for a 'safe' operation set in which overflow detection is employed, much as constraint checking is used in current high level languages. A 'fast' operation set may also be provided in which overflow detection is not employed. The user could opt for the 'fast' operation set much as one inhibits constraint checking during compilation with conventional languages.

Overflow occurs when a result is generated which does not fit its allotted storage. Overflow can be detected in most cases by executing as though the result size were 1 or 2 bits larger than it physically is. For example, when dealing with 8-bit operands, the PE array 103 should be operated to generate a 9- or 10-bit result. The extra bits are not actually stored, but are only generated and monitored. In the case of an unsigned result, overflow occurs if any extra bit is non-zero. For signed results, overflow occurs if any of the extra bits differ from the most significant (non-extra) bit.

The PE signal 'Over' (see Table 27) enables an overflow value to be generated for each PE 701. The PE Over signals are combined into a single chip overflow signal (part of GSTAT, as selected by GLOR select and Delay register {see Table 55, 0x000a}) which raises an interrupt when asserted.

3.2.6 Opcode Assignments

The operation set for the exemplary MCC IC 101 will now be presented. The nomenclature used in defining the operation set is set forth in Table 38.

TABLE 38

| Signal | Symbol | Definition |
|---|---|---|
| Flag | F | Flag out defined by the operation |
| Flag | f | Flag in is passed via previous operation's Flag out |
| Flag | S | Flag out is Sign flag |
| Flag | — | Flag out is undefined |
| Z | Z | Zero flag is passed via Z |
| Z | z | Z register in is passed via Z |
| Z | — | Zero flag output is undefined |
| XF | XF | Flag is passed in via XF |

The operation set for the exemplary MCC IC 101 is set forth below in Tables 39–47.

TABLE 39

| Opcode/ Mnemonic | Operands | Description | Flag | Z |
|---|---|---|---|---|
| 0x00 NOP | (X, X, X) | no operation | f | z |
| 0x01 DEALL | (X, X, A) | free A | f | z |
| 0x02 ALLOC_PE | (L, X, A) | A:= new image (PE RAM, size = g(mod)) | f | z |
| 0x03 ALLOC_PG | (L, X, A) | A:= new image (Page RAM, size = g(mod)) | f | z |
| 0x04 LDL | (D, X, A) | A(15:0):= LD_Data, A(31:16):= A(15) sign extended | f | z |
| 0x05 LDH | (D, X, A) | A(31:16):= LD_Data | f | z |
| 0x06 MOV | (L, X, A) | A:= L (register to register move) | f | z |
| 0x07 STR | (L, X, X) | Store_Reg:= L | f | z |

TABLE 40

Pattern, GLOR, and I/O Operations

| Opcode/Mnemonic | Operands | Description | Flag | Z |
|---|---|---|---|---|
| 0x08 IMAGE_IN | (X, X, A) | input_image(A) | f | z |
| 0x09 IMAGE_OUT | (L, X, X) | output_image(L) | f | z |
| 0x0A X_PATTERN | (X, X, X) | F:= X_Pattern(X_Reg) | F | Z |
| 0x0B YPATTERN | (X, X, X) | F:= Ypattern(Y_Reg) | F | Z |
| 0x0C COLGLOR | (X, X, X) | X_Reg:= Colglor(FLAG) | f | Z |
| 0x0D ROWGLOR | (X, X, X) | Y_Reg:= Rowglor(FLAG) | f | Z |
| 0x0E GLORVAL | (L, X, G) | Chip_GLOR:= glorval(L) | S | — |
| 0x0F GLORIMG | (L, X, A) | A:= glorval(L) | S | — |

TABLE 41

Flag Operations

| Opcode/Mnemonic | Operands | Description | Flag | Z |
|---|---|---|---|---|
| 0x10 CLRF | (X, X, X) | F:= 0 | F | z |
| 0x11 SETF | (X, X, X) | F:= 1 | F | z |
| 0x12 LDF | (L, X, X) | F:= L(0) | F | z |
| 0x13 STF | (X, X, A) | A(0):= f | F | z |
| 0x14 NOTF | (X, X, X) | F:= (! f) | f | z |
| 0x15 ANDF | (L, X, X) | F:= L(0) & f | F | z |
| 0x16 ORF | (L, X, X) | F:= L(0) \| f | F | z |
| 0x17 XORF | (L, X, X) | F:= L(0) ^ f | F | z |
| 0x18 LTF | (X, X, X) | F:= f & ! Z | F | z |
| 0x19 GTF | (X, X, X) | F:= !f & ! Z | F | z |
| 0x1A LEF | (X, X, X) | F:= f \| Z | F | z |
| 0x1B GEF | (X, X, X) | F:= !f \| Z | F | z |
| 0x1C EQF | (X, X, X) | F:= Z | F | z |
| 0x1D NEF | (X, X, X) | F:= ! Z | F | z |
| 0x1E XFF | (X, X, X) | XF:= f | f | z |
| 0x1F YFF | (X, X, X) | YF:= f | f | z |

TABLE 42

Image Logicals

| Opcode/Mnemonic | Operands | Description | Flag | Z |
|---|---|---|---|---|
| 0x20 AND | (L, R, A) | A:= L & R | S | Z |
| 0x21 NAND | (L, R, A) | A:= !(L & R) | S | Z |
| 0x22 OR | (L, R, A) | A:= L \| R | S | Z |
| 0x23 NOR | (L, R, A) | A:= !(L \| R) | S | Z |
| 0x24 XOR | (L, R, A) | A:= L ^ R | S | Z |
| 0x25 XNOR | (L, R, A) | A:= !(L ^ R) | S | Z |
| 0x26 ANDN | (L, R, A) | A:= L & ! R | S | Z |
| 0x27 ORN | (L, R, A) | A:= L \| ! R | S | Z |

TABLE 43

Slice and Shift Operations

| Opcode/ Mnemonic | Operands | Description | Flag | Z |
|---|---|---|---|---|
| 0x28 SLICEF | (L, X, X) | F:= L(PreL) | F | z |
| 0x29 SLICE | (L, X, A) | A:= L(PreH:PreL) | S | Z |
| 0x2A SSLICE | (L, X, A) | A:= sign extended L(PreH:PreL) | S | Z |
| 0x2B INJECTF | (X, X, A) | A(PreL):= f | f | z |
| 0x2C INJECT | (L, X, A) | A(PreH:PreL):= L | S | — |
| 0x2D SLL | (L, X, A) | A:= L << PreL | S | Z |
| 0x2E SRL | (L, X, A) | A:= L >> PreL (logical) | S | Z |
| 0x2F SRA | (L, X, A) | A:= L >> PreL (arithmetic) | S | Z |

TABLE 44

Fixed Point and Skew Operations

| Opcode/Mnemonic | Operands | Description | Flag | Z |
|---|---|---|---|---|
| 0x30 ADD | (L, R, A) | A:= L + R | S | Z |
| 0x31 SUB | (L, R, A) | A:= L − R | S | Z |
| 0x32 ADDIF | (L, R, A) | A:= L + (R&f) | S | Z |
| 0x33 SUBIF | (L, R, A) | A:= L − (R&f) | S | Z |
| 0x34 MIN | (L, R, A) | A:= min(L, R) | S | Z |
| 0x35 MAX | (L, R, A) | A:= max(L, R) | S | Z |
| 0x36 FORK | (L, R, A) | A:= (L&(!f)) + (R&f) | S | Z |
| 0x37 SKEW | (L, X, A) | A:= L (skew parms in mod or Preld) | S | Z |
| 0x38 CMPGT | (L, R, X) | F:= L > R | F | Z |
| 0x39 CMPLE | (L, R, X) | F:= L <= R | F | Z |
| 0x3A CMPEQ | (L, R, X) | F:= L == R | F | Z |
| 0x3B CMPNE | (L, R, X) | F:= L != R | F | Z |
| 0x3C ADDC | (L, R, A) | A:= L + R + C | S | Z |
| 0x3D SUBB | (L, R, A) | A:= L − R − C | S | Z |
| 0x3E SIGN | (L, X, X) | F:= sign of L | F | — |
| 0x3F ABS | (L, X, A) | A:= abs(L) | S | Z |

TABLE 45

Floating Point Operations

| Opcode/Mnemonic | Operands | Description | Flag | Z |
|---|---|---|---|---|
| 0x40 FADD | (L, R, A) | float A := L + R | S | Z |
| 0x41 FSUB | (L, R, A) | float A := L − R | S | Z |
| 0x42 FADDIF | (L, R, A) | float A := L + (R&f) | S | Z |
| 0x43 FSUBIF | (L, R, A) | float A := L − (R&f) | S | Z |
| 0x44 FMIN | (L, R, A) | float A := min(L, R) | S | Z |
| 0x45 FMAX | (L, R, A) | float A := max(L, R) | S | Z |
| 0x46 FROUND | (L, X, A) | float A := round(L) | S | Z |
| 0x47 INTFLT Mod = 0 | (L, X, A) | float A := (float) L | S | Z |
| Mod = 1 | (L, X, A) | A:= (int)L | S | Z |
| 0x48 FCMPGT | (L, R, X) | F := L < R | F | — |
| 0x49 FCMPLE | (L, R, X) | F := L <= R | F | — |
| 0x4A FCMPEQ | (L, R, X) | F := L == R | F | — |
| 0x4B FCMPNE | (L, R, X) | F := L != R | F | — |
| 0x4C FCMPO | (L, R, X) | F := ordered(L, R) | F | — |
| 0x4D FCMPU | (L, R, X) | F := unordered(L, R) | F | — |
| 0x4E FSIGN | (L, X, X) | F := sign of L | F | — |
| 0x4F FABS | (L, X, A) | float A := fabs(L) | S | Z |

TABLE 46

Multiply, Divide, Square Root, and Flt. Pt. Convert

| Opcode/Mnemonic | Operands | Description | Flag | Z |
|---|---|---|---|---|
| 0x50 MULT | (L, R, A) | A := L * R | S | — |
| 0x51 DIV | (L, R, A) | A := L/R | S | Z |
| 0x52 SQRT | (L, X, A) | A := SQRT(L) | S | Z |
| 0x53 NEGIF | (L, X, A) | A := (L & !f) − (L&f) | S | — |
| 0x54 FMULT | (L, R, A) | A := float L * R | S | Z |
| 0x55 FDIV | (L, R, A) | A := float L/R | S | Z |
| 0x56 FSQRT | (L, X, A) | A := float SQRT(L) | S | Z |
| 0x57 FPI3E | | | | |
| MOD = 0 | (L, X, A) | IEEE-to-MCC_IC floating pt convt | S | Z |
| MOD = 1 | (L, X, A) | MCC_IC-to-IEEE floating pt convt | S | Z |

TABLE 47

Neighborhood Operations

| Opcode/Mnemonic | Operands | Description | Flag | Z |
|---|---|---|---|---|
| 0x58 DIL | (X, X, X) | F := dil(f), n'hood := Mod | F | Z |
| 0x59 ERO | (X, X, X) | F := ero(f), n'hood := Mod | F | Z |
| 0x5A TRAN | (X, X, X) | F := tran(f), n'hood := Mod | F | Z |
| 0x5B TRANB | (X, X, X) | F := tranb(f), n'hood := Mod | F | Z |
| 0x5C PEEL | (X, X, X) | F := Peel(f), n'hood := Mod | F | Z |
| 0x5D SKEL | (X, X, X) | F := Skel(f), n'hood := Mod | F | Z |
| 0x5E FILL2X2 | (X, X, X) | F := fill_2x2(f) | F | Z |
| 0x5F REF | (L, X, A) | Reformat step operations, selected by Mod | S | Z |

3.3 Programming Operations
3.3.1 Initialization

The following list is a step-by-step sequence for starting instruction execution beginning with the removal of reset:

Remove reset (in the exemplary embodiment, the MCC integrated circuit 101 will remove the internal reset nine PCLK cycles later than the external removal of reset)

Unprotect the internal memories by writing to the configuration register 1817.

Write the microstore memories 1215, 1217 for the I-Sequencer 1205 and the P-Sequencer 1207.

Initialize the bit pools and the nybble pools in the pool memory 1213.

Protect the internal memories and turn on Step_Enable by writing to the configuration register 1817, an exemplary embodiment of which is described in Table 52).

Write the appropriate "Chip ID" to the ID reg 1833 in each chip in the array via the Memory Interface. (See Table 55.)

Write a value of all 1's to the "Chip Select" register 1849 so that all chips are enabled to accept the following write command. (See Table 55.) (Note that this can be done with a single LDL since the data will be sign-extended to the upper 16-bits).

Write to the Glor Select & Delay register (See Table 55) to select the source of GLOR and the external delay value for GLOR feedback to the MCC IC 101.

Begin launching instructions.

3.3.2 Programming Discrete GLOR Controls

There are four categories of GLOR signals: chip GLOR (CGLOR), overflow (OVER), quadrant GLOR (QGLOR), and pattern GLORs (ROW/COL GLOR). For each of the categories except for OVER, input (overlay or broadcast) and output (sample) operations are supported. Clear operations (and in the case of row/col GLOR, shift operations) are also supported. With the exception of pattern injection (row/col overlay), these operations are all controlled by discrete signals as shown in Table 7.

The synchronization of GLOR operations is, as suggested by the table, somewhat complex for the chip implementer. However, for the programmer, the conventions are quite straightforward. In short, sampling operations (i.e., operations that capture global signals) and overlay operations (i.e., operations that apply global values to PE command words 1001) are implemented so that they may be included with the instructions that use them, as shown in the examples below. Specifically, overlay operations are scheduled to occur one clock in advance of the instructions which use (sample) their results, and sampling operations are scheduled to occur one clock after the instructions which produce the result to be sampled. For example, where a shift right of the X_Pattern register is to be performed and the result loaded to the EW register 809, the instruction would be:

XPAT XPAT_SHIFT_RIGHT EX;

In this example, the XPAT command (ew:=X_Pattern) and XPAT_SHIFT_RIGHT command (shift X_Pattern register right) are specified in the same command (EX is an instruction terminator). The effect during execution, however, is that the shift right occurs before the injection of the pattern, allowing the EW register 809 to sample the result of the shift right.

Sampling operations, on the other hand, are synchronized so that the GLOR logic will sample the result of the instruction in which the GLOR (sampling) operation occurs. For example, a bit plane value could be extracted via the EW register 809 and column GLOR as shown in the following instruction:

EW:=BRAM(RWR, 0) XPAT_LOAD_COL_GLOR EX;

The programmer must be aware of the latency involved between sampling and overlay if the two types of operations are to be used together. In the case of the pattern and row/col GLOR, the latency is only 2 clocks, but this could still lead to unexpected results if the programmer were to try the following:

XPAT_LOAD_COL_GLOR EX;
XPAT EX;

This sequence would load the previous value of the X Pattern register into the EW register 809 because the XPAT_LOAD_COL_GLOR does not update the X_Pattern register until one clock after the EW command (XPAT) is executed.

For the CGLOR signal, the latency depends upon whether internal or external GLOR sampling is specified by the glor_sel_del register (0x000a). The external latency will likely exceed the internal latency by two or three clocks, and the programmer must take this into consideration when attempting to write portable code. Where an overlay operation follows a sampling operation, it is necessary to insert an appropriate delay. (This will likely be done at the end of the 'safe' version of the sampling operation,("glorval"—opcode 0x0e), i.e., one that requires no eternal sync because a delay is built in). The delay should be long enough to accommodate a reasonable maximum expected external latency. The delay need not match the latency exactly, it need only meet or exceed it. Thus common code may support both internal (chip) and external (array) GLOR operations across multiple systems.

Where sampling and overlay are to be combined into one operation (e.g., glorimg—opcode 0x0f), the latency must be built into the operation, thus leading to an operation in three stages. The first stage of the operation will involve 'n' iterations of sampling commands (e.g. CGLOR_SAMPLE) where 'n' equals the desired latency. The second stage will involve sample and overlay operations (e.g. CGLOR_SAMPLE_AND_OVERLAY_NS) and the final stage will provide 'n' iterations of overlay operations (e.g. CGLOR_OVERLAY_NS). The number of combined (sample and overlay) operations added to 'n' will equal the number of bit planes propagated by the operation.

Table 48 provides information about GLOR Control Synchronization.

TABLE 48

GLOR Control Synchronization

| Control Signal | Synchronization | Notes |
|---|---|---|
| OVER_SAMPLE_TEST | external delay | (1) |
| CGLOR_CLEAR | rd_pos: nsew_cmd | (4) |
| | wr_pos: internal delay | (2) |
| CGLOR_SAMPLE | config delay | (3) |
| CGLOR_OVERLAY_NS | nsew_cmd (overlay logic) | (4), (6) |
| CGLOR_OVERLAY_EW | nsew_cmd (overlay logic) | (4), (6) |
| CGLOR_SAMPLE_AND_OVERLAY_NS | sample: config delay | (3) |
| | overlay: nsew_cmd (overlay) | (4), (6) |
| CGLOR_SAMPLE_AND_OVERLAY_EW | sample: config delay | (3) |
| | overlay: | (4), |

TABLE 48-continued

GLOR Control Synchronization

| Control Signal | Synchronization | Notes |
|---|---|---|
| | nsew_cmd (overlay) | (6) |
| OVER_TEST | internal delay | (2) |
| QGLOR_CLEAR | rd_pos: nsew_cmd | (4) |
| | wr_pos: internal delay | (2) |
| QGLOR_SAMPLE | internal delay | (2) |
| QGLOR_OVERLAY_NS | nsew_cmd (overlay) | (4), (7) |
| QGLOR_OVERLAY_EW | nsew_cmd (overlay) | (4), (7) |
| QGLOR_SAMPLE_AND_OVERLAY_NS | sample: internal delay | (2) |
| | overlay: nsew_cmd (overlay) | (4), (6) |
| QGLOR_SAMPLE_AND_OVERLAY_EW | sample: internal delay | (2) |
| | overlay: nsew_cmd (overlay) | (4), (6) |
| XPAT_CLEAR | nsew_cmd (pe) | (4), (7) |
| XPAT_LOAD_COL_GLOR | nsew_cmd + 2 (pe) | (5), (7) |
| XPAT_SHIFT_RIGHT | nsew_cmd (pe) | (4), (7) |
| XPAT_SHIFT_LEFT | nsew_cmd (pe) | (4), (7) |
| YPAT_CLEAR | nsew_cmd (pe) | (4), (7) |
| YPAT_LOAD_ROW_GLOR | nsew_cmd + 2 (pe) | (5), (7) |
| YPAT_SHIFT_RIGHT | nsew_cmd (pe) | (4), (7) |
| YPAT_SHIFT_LEFT | nsew_cmd (pe) | (4), (7) |

(1) external delay as specified in glor_sel_register (0x000a)
(2) internal delay (hardwired)
(3) external or internal delay as selected by glor_sel_del (0x000a)
(4) synchronized to ns/ew command (ns/ew samples result)
(5) synchronized to ns/ew command + 2 (samples ns/ew result)
(6) injected at overlay
(7) injected at PE Getting GLOR Feedback Getting a multibit value out of either the PE array 103 or out of an array of MCC ICs 101 through GLOR feedback is a three-step process:

1. Process each bit of the image through the GSTAT (glor) and into the glor-reg,
2. Store the glor-reg value in the Store-Reg 1917, and
3. Read the Store_Reg 1917 value via the instruction bus interface.

Processing each bit of the image is accomplished by reading the bit into the Z register 817 to produce a GLOR output and issuing a discrete command to sample the GLOR feedback. The actual sampling of GLOR feedback is a hardware function that takes into account the source of GLOR specified in the GLOR configuration register 1817. (See Table 55.) The procedure outlined here requires that this register be set up to define the source of GLOR and the external delay (if external feedback is used) prior to step 1.

Storing the sampled GLOR value in the Store Reg 1917 allows it to be read out of the instruction bus and is accomplished using a STR opcode with the appropriate GLOR register specified as the source. Care must be taken here to make sure that the glor_reg is not read prior to the last GLOR sample being completed. This can be accomplished by instruction sequencer microcode (stored in the ISEQ memory) that waits for "glor_sample_pending" to go active and then waits for it to go inactive (indicating that the sample is complete).

The host interface instructions are summarized below:
//---[command the array to spread the image and sample it into the glor reg ]--- ibus_opcode('OPC_GLOR_FB, /*mod*/4'h0,/*src1*/ 'PID_SCALAR_GLOR, 7'h00, 7'h00);

//---[Read back the value sampled into the glor reg ]--- ibus_opcode('OPC_STR, /*mod*/4'h0, /*src1*/ 'MVADR_GLOR, 7'h00, 7'h00); read_store_reg (glor_value);

Exemplary I-Seq microcode that defines an instruction which can be used to accomplish GLOR feedback is shown below (verilog code from a test-bench) in four I-Seq microcode locations. (Note that this code assumes the sample pointer is at the reset position, and resets the pointer for the next operation at the end of the routine. Sample pointer management must be accomplished by the programiming environment.)

This description will now focus on the control elements and other resources that enable the PE array 103 to operate as described above. The block diagrams of FIGS. 1 and 6 depict a high level view of these control elements and other resources. In support of the more detailed description that follows, however, reference is now made to FIGS. 19A, 19B and 19C which, together, make up a more detailed block diagram of an exemplary MCC IC 101.

4. Clock Distribution

There are three clock sources in the exemplary MCC IC 101: PCLK, MCLK, and TCLK. The PCLK is the primary clock for all of the PEs 701 and for the instruction control components (e.g., instruction sequencer 1205 and primitive sequencer 1207). In an exemplary embodiment of the MCC IC 101, the PCLK is estimated to drive approximately 13,000 internal loads (i.e., loads not including those which are possible for chip input/output signals). As mentioned earlier, the PCLK signal is received from a source that is external to the MCC IC 101 (see, for example, FIG. 2). A positive edge locking phase-locked-loop (PLL—not shown in the figure) is preferably utilized to minimize the clock skew between the external PCLK signal and the clock distribution network that is internal to the MCC IC 101.

The PE array 103 and instruction control (i.e., all sequencing logic) may operate at one of several integer multiples of

```
iseq_ustr_dat    = 0;
iseq_ustr_dat[ 'SEQ_FIELD] = 'ISEQ_CJV; // Continue
iseq_ustr_dat[ 'COND_CODE_FIELD] = 'PICK1;
iseq_ustr_dat['PSEQ_JMPIN_FIELD] = 'PSADR_GT_GLOR_FB; // pipe image to GLOR
iseq_ustr_dat[ 'LIMG_SEL_FIELD] = 3'hl; // left is src1
iseq_ustr_dat[ 'LBOS_SEL_FIELD] = 6'd00; // start with lsb
iseq_ustr_dat[ 'ABOS_SEL_FIELD] = 6'd00; // start with lsb
iseq_ustr_dat[  'PICK1_FIELD] = 'DC_CGLOR_SAMPLE; // Sample GLOR
iseq_ustr_dat[  'AEND_FIELD] = 6'd36; // end with msb
iseq_ustr_dat[  'ADIR_FIELD] = 1'b0; // count up
iseq_ustr_dat[  'SKIN_FIELD] = 1'b1;
iseq_ustr_dat[  'SIGIN_FIELD] = 4'd14; // C<=1,D<=CMUX (Setup D for Glor Op)
iseq_ustr_mem[({4'h0,'OPC_GLOR_TEST_FB}<<2) + 0] = iseq_ustr_dat;
iseq_ustr_dat    = 0;
iseq_ustr_dat[ 'SEQ_FIELD] = 'ISEQ_CJP; // Wait for Sample Pending High
iseq_ustr_dat[ 'COND_CODE_FIELD] = 'ICC_GLOR_PENDING;
iseq_ustr_dat['SEQ_COND_NOT_FIELD]= 1'b1;
iseq_ustr_dat[  'IMM_FIELD] = ({4'h0,'OPC_GLOR_TEST_FB}<<2) + 1;
iseq_ustr_mem[({4'h0,'OPC_GLOR_TEST_FB}<<2) + 1] = iseq_ustr_dat;
iseq_ustr_dat    = 0;
iseq_ustr_dat[ 'SEQ_FIELD] = 'ISEQ_CJP; // Wait for Sample Pending Low
iseq_ustr_dat[ 'COND_CODE_FIELD] = 'ICC_GLOR_PENDING;
iseq_ustr_dat[  'IMM_FIELD] = ({4'h0,'OPC_GLOR_TEST_FB}<<2) + 2;
iseq_ustr_mem[({4'h0,'OPC_GLOR_TEST_FB}<<2) + 2] = iseq_ustr_dat;
iseq_ustr_dat    = 0;
iseq_ustr_dat[ 'SEQ_FIELD] = 'ISEQ_CJV; // End of Instruction
iseq_ustr_dat[ 'COND_CODE_FIELD] = 'ICC_ALWAYS;
iseq_ustr_dat[  'PICK1_FIELD] = 'DC_CGLOR_CLEAR; // Reset Sample Pointer
iseq_ustr_mem[({4'h0,'OPC_GLOR_TEST_FB}<<2) + 3] = iseq_ustr_dat;
```

Sample P-Seq microcode that is used by the I-Seq code above is accomplished in one primitive:

```
pseq_ustr_dat    = 0;
pseq_ustr_dat[ 'NS_SEL]   = 'NS_ARAM; // read image, and ...
pseq_ustr_dat[ 'EW_SEL]   = 'EW_0;
pseq_ustr_dat[ 'AL_SEL]   = 'AL_NS_OP;
pseq_ustr_dat[ 'BL_SEL]   = 'BL_BL_OP;
pseq_ustr_dat[ 'Z_SEL]    = 'Z_PLUS; // ... pipe image into GLOR
pseq_ustr_dat[ 'MODE_SEL] = 'MINMAX; // set alu_c from !D
(D == 1)
pseq_ustr_mem['PSADR_GT_GLOR_FB] = pseq_ustr_dat;
``` the clock rate of the external PCLK signal that is applied to the PCLK input port of the MCC IC 101. The PLL should operate in a mode that provides a 50% duty cycle clock. In order to obtain an operating frequency of 80 MHZ, the PCLK input should run at 40 MHZ. The goal for output clock skew is +/−0.25 nsec. For the purpose of testing the MCC IC 101, it is advantageous to provide a mechanism for bypassing the PLL by using the external PCLK signal directly as the internal PCLK signal.

The MCLK is the primary clock source for the Memory Interface logic (that directly controls the I/O RAM 107) and the memory interface side of the dual-port I/O memory 107. The dual-port I/O memory 107 provides the clock boundary between MCLK and PCLK, which are allowed to be asynchronous with respect to each other. In the exemplary embodiment, MCLK is estimated to drive approximately 554 loads. A preferred approach for MCLK distribution is ordinary fanout buffering with no PLL support. An exemplary frequency range for MCLK is 0 to 80 MHZ. The goal for output clock skew should be +/−0.25 nsec.

The TCLK is the test clock input for the JTAG boundary scan circuitry. A preferred approach for TCLK distribution is ordinary fanout buffering with no PLL support. An exemplary frequency range for TCLK is 0 to 25 MHZ. The goal for output clock skew should be 0.5 nsec.

5. Control Interface

5.1 Instruction Mode Access

Instruction Mode access provides for the issuance of instructions to the MCC IC 101 and instructions for internal resource access (reading, moving, loading) in a common instruction stream. The management of the instruction stream is accomplished by the Fetch Unit 1201.

5.1.1 Fetch Unit 1201

Figure 13:
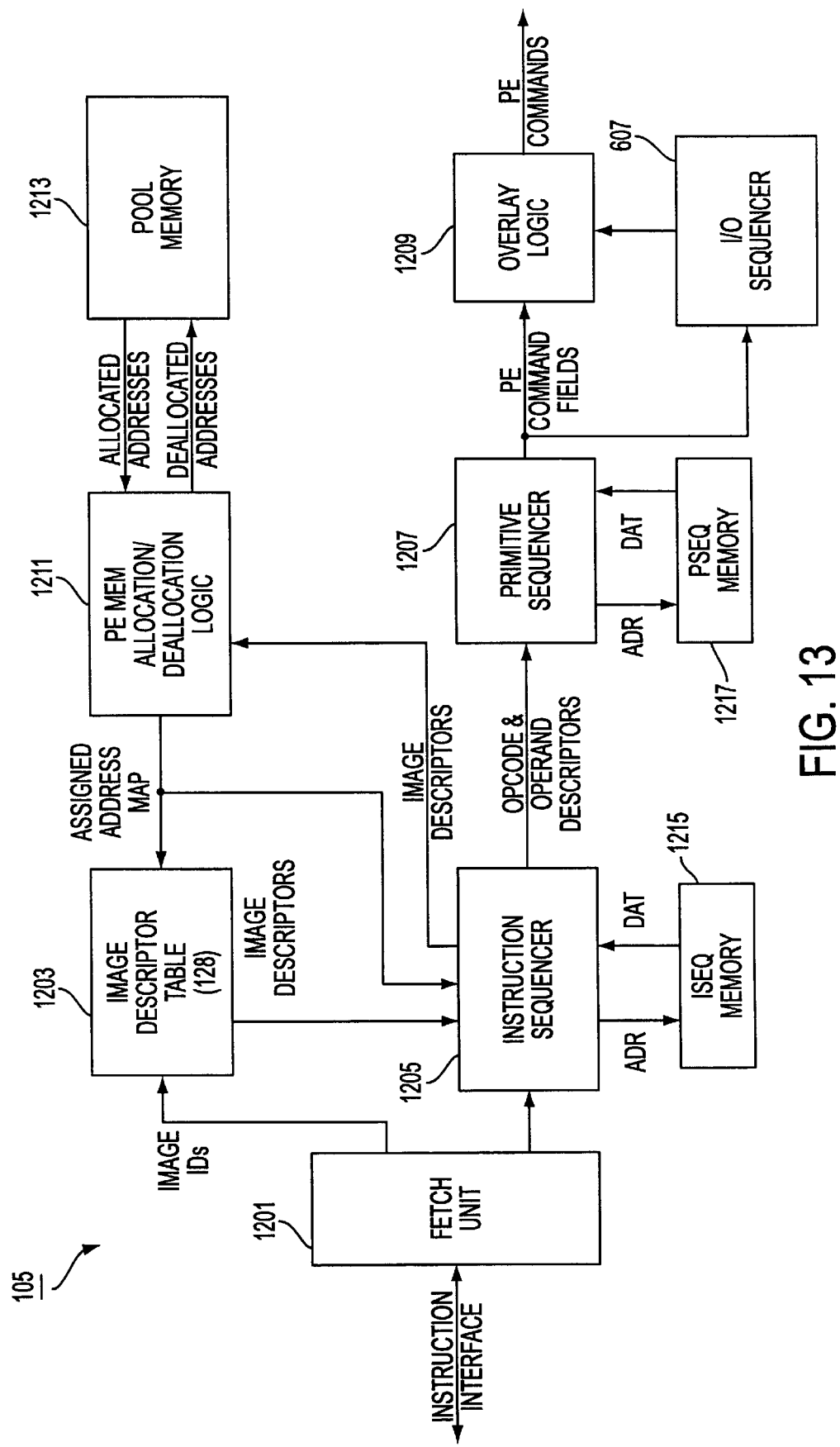
FIG. 13 is a block diagram of the primary components of an exemplary controller for controlling the operation of the MCC IC 101 in accordance with one aspect of the invention.
Figure 19A:
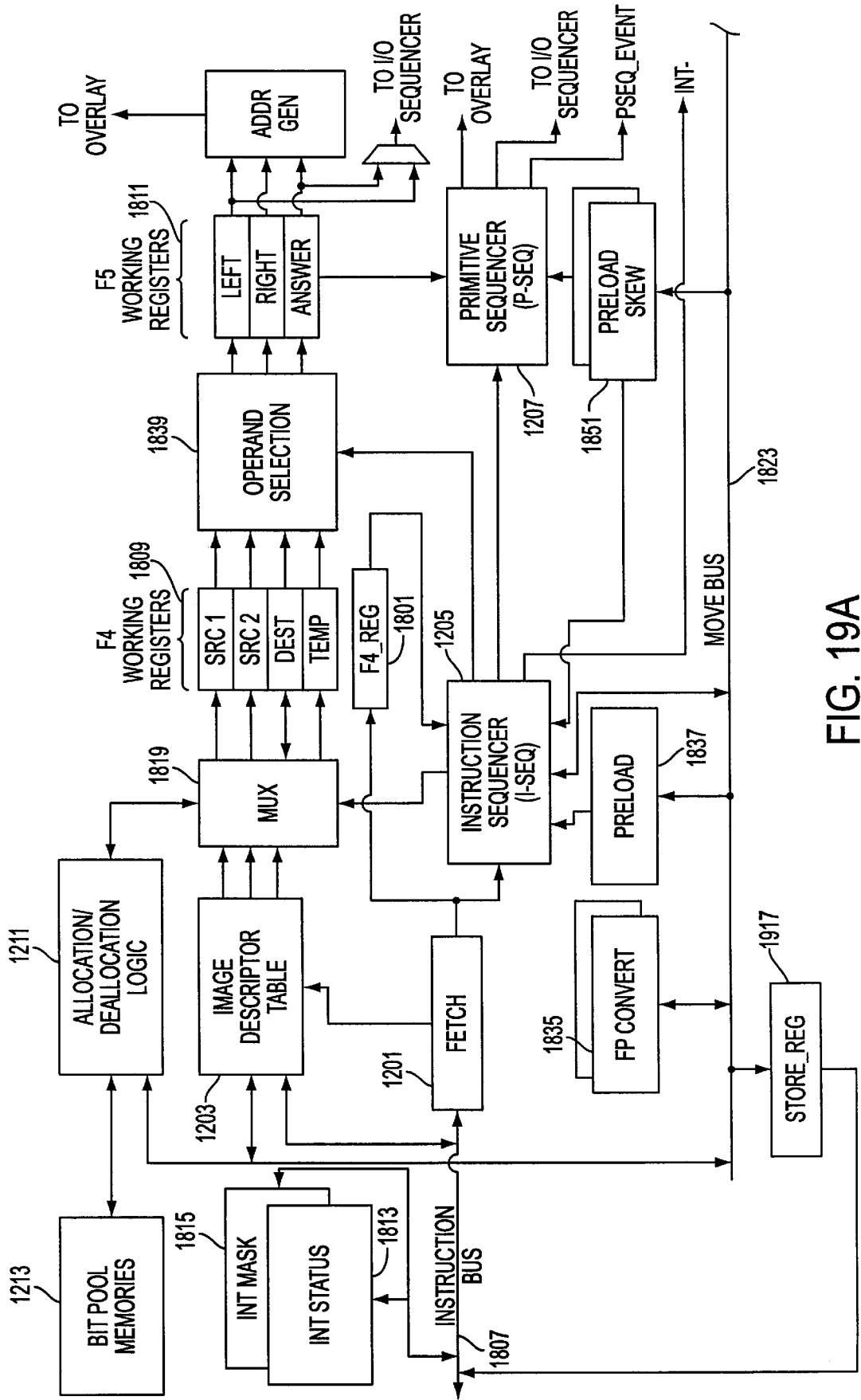
FIGS. 19A, 19B and 19C together make up a more detailed block diagram of an exemplary MCC IC.
Figure 19B:
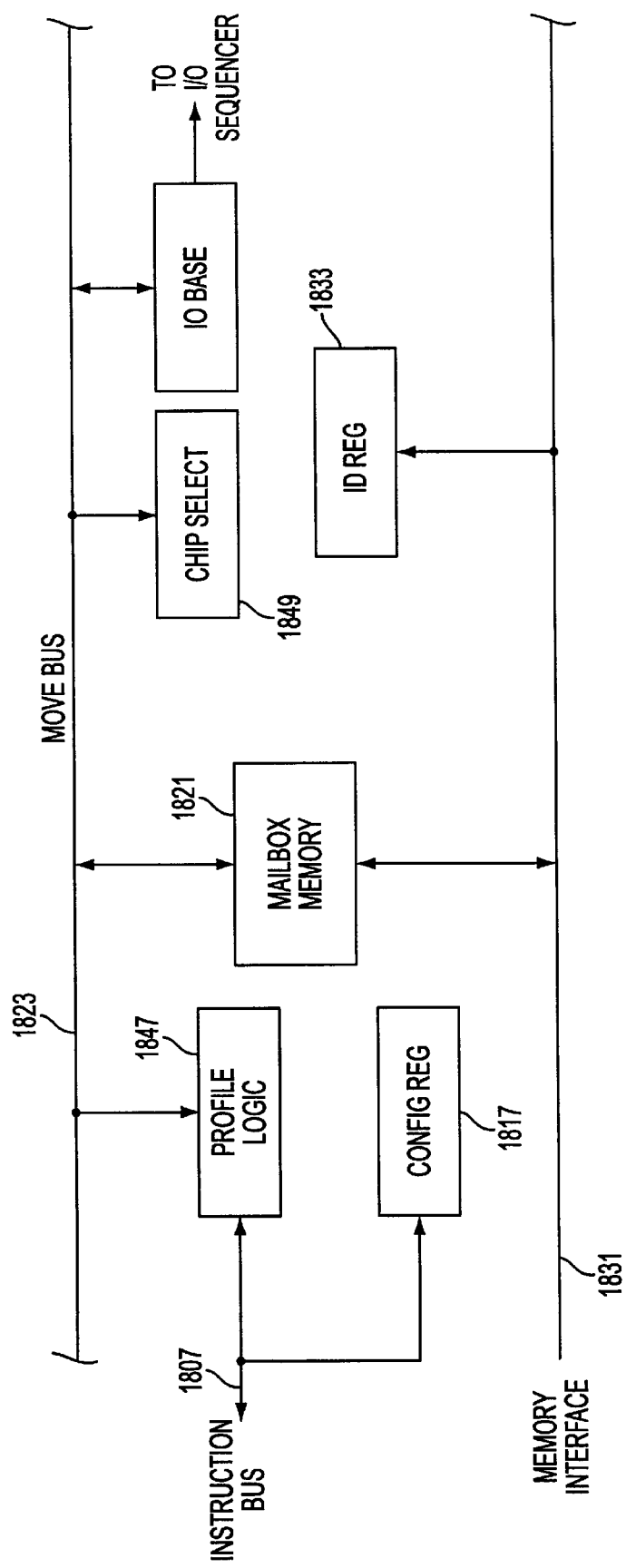
Figure 19C:
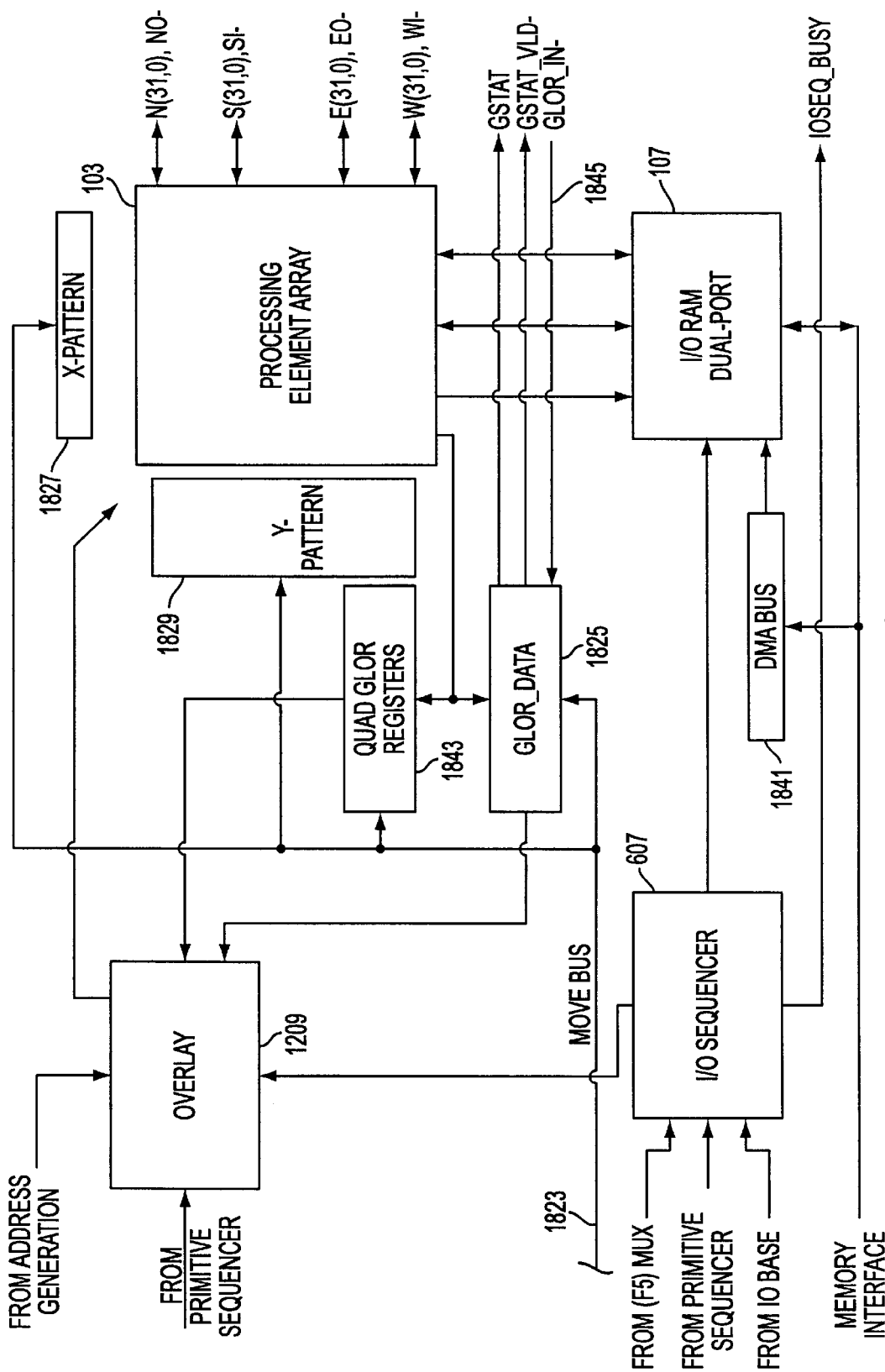
Figure 20:
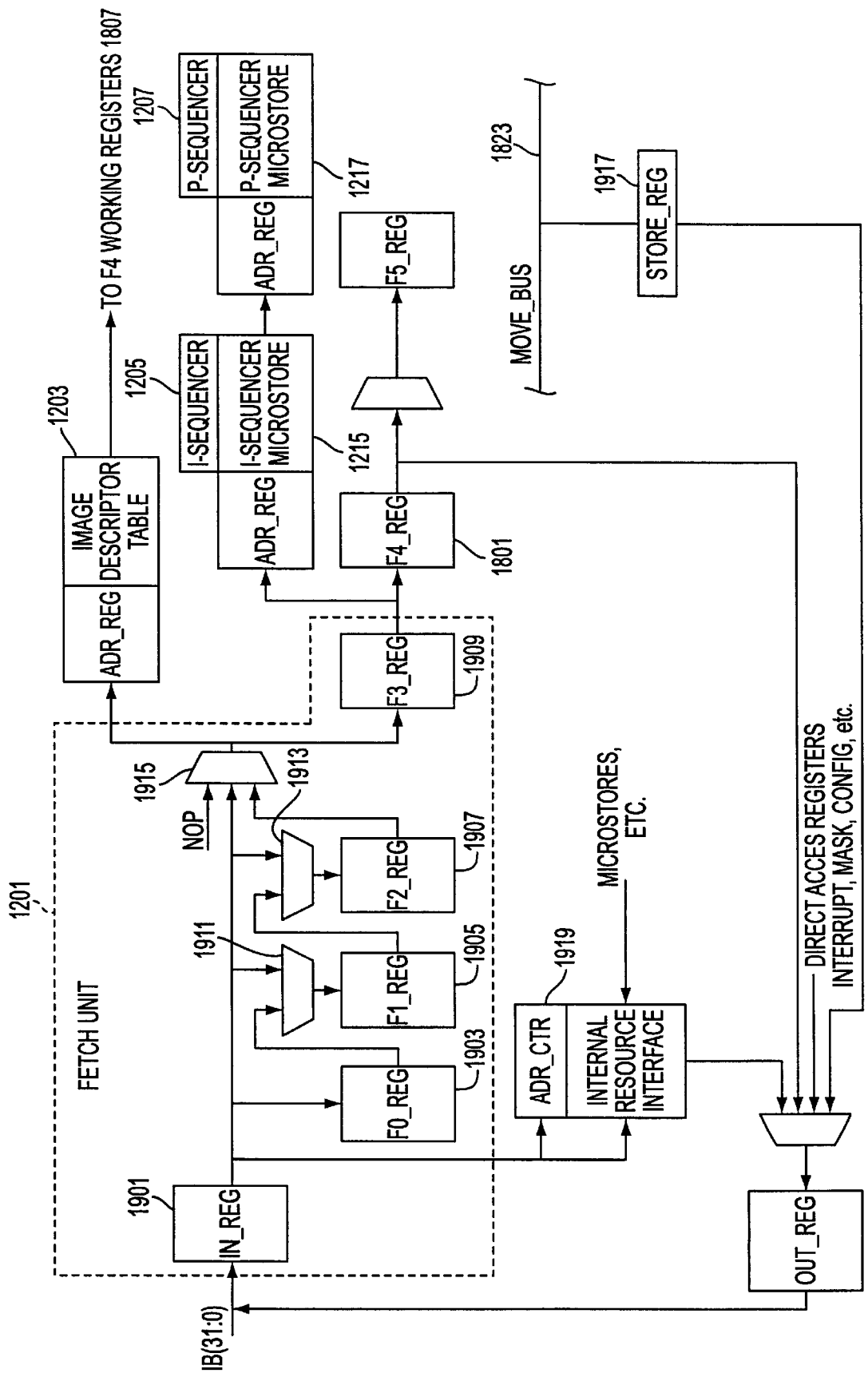
FIG. 20 is a more-detailed block diagram of the fetch unit and some of the resources with which it interacts, in accordance with one aspect of the invention.

As can be seen from FIG. 13, the fetch unit 1201 is the hardware interface between the received control signals and the instruction sequencer 1205. It manages the IACK-BSY signal and handles the instruction hand-off to the instruction sequencer 1205. FIG. 20 is a more-detailed block diagram of the fetch unit 1201 and some of the resources with which it interacts. (Some of these components are shown in FIGS. 13, 19A, 19B and 19C as well.) It can be seen, from FIG. 19A, that instructions are received into the MCC IC 101 from an Instruction Bus (Ibus) 1807, and supplied to a fetch unit 1201. In the exemplary embodiment, the fetch unit 1201 (shown in more detail in FIG. 20) comprises an input register (In_Reg) 1901, and four more registers designated F0_Reg 1903, F1_Reg 1905, F2_Reg 1907 and F3_Reg 1909. These registers, along with several multiplexors 1911, 1913, 1915, are arranged so that the received instructions 1501 and/or 1601 may be first loaded into the In_Reg 1901 and then caused to pass through any number from none to all of the registers F0_Reg 1903, F1_Reg 1905 and F2_Reg before being clocked into the register F3_Reg 1907. The output of the F3_Reg 1907 is supplied as an output of the fetch unit 1201. This arrangement makes it possible to stage a variable number of instructions that have been received but which cannot be immediately executed.

In addition to going to the F3_Reg 1909, the output from the multiplexor 1915 is supplied to address ports of the Image Descriptor Table 1203, so that the Src1, Src2 and Dest fields 1507, 1509, 1511 (or, depending on the opcode, the Dest field 1605) may be used to initiate reads of the respective source and destination image descriptors 1301.

Instructions begin execution in a stage designated F4. In support of this stage, the controller 105 includes an F4_Reg 1801 and a set of F4 working registers 1809. As shown in FIG. 19A, the F4 working registers 1809 comprise a set of four registers, each capable of storing an image descriptor 1301. Each of the four F4 working registers 1809 is dedicated to storing a respective one of the Src1, Src2, Dest and Temp image descriptors 1301 for the instruction that is about to be executed.

Operation of the Image Descriptor Table 1203 is preferably synchronous, so that when an instruction is ready to be executed, the image descriptors 1301 supplied at the output of the Image Descriptor Table 1203 are clocked into the F4 working registers 1809 at the same time that the F4_Reg 1801 clocks its input from the output of the F3_reg 1909. These operations are further synchronized with the clocking of the opcode field 1503 into an address register of the I-Sequencer memory 1215. This address points the instruction sequencer to the first instruction that it must execute for the operation designated by the opcode field 1503. For each opcode field 1503, the I-Sequencer 1205 has a corresponding routine, stored in the I-Sequencer memory 1215, that is executed in order to carry out the desired functions of the operation designated by the opcode field 1503. In turn, the I-Sequencer 1205 provides start addresses to an address register of the P-Sequencer memory 1217. The P-Sequencer memory 1217 contains one or more PE commands (in the form of CWs 1001) that are to be applied to the PE array 103 for each start address that is supplied by the I-Sequencer 1205. The job of the primitive sequencer 1207 is to indicate to the instruction sequencer 1205 that it has accepted a start address, and to then retrieve the one or more CWs 1001 from the P-Sequencer memory 1217 and supply these to the PE array 103. After the entire sequence of PE commands has been supplied to the PE array 103, the primitive sequencer 1207 accepts another start address from the instruction sequencer 1205 and begins the process again.

It was mentioned above that the F4 working registers 1203 receive their respective image descriptors 1301 from the Image Descriptor Table 1203. In some cases, however, a most-current image descriptor 1301 (in particular, an image descriptor 1301 specifying the destination of an operation) may not yet be stored in the Image Descriptor Table 1203 (e.g., it may not yet be allocated). To handle these situations, the opcode field 1503 stored in the F3_Reg 1909 is also decoded to provide F4_dest Working Register 1809 initialization for an allocation process. This is described in greater detail below.

It is possible for the execution of any given instruction to require a number of clock cycles within the instruction sequencer 1205. For this reason, it is necessary to provide a mechanism to queue up, or stage, instructions that have been received by the MCC IC 101. Stage registers F0_Reg 1903, F1_Reg 1905, and F2_Reg 1907 are used as instruction 'catchers', catching instructions written to the MCC IC 101 between the time that the F4 stage indicates that it will not accept the next instruction (due to multi-clock execution of an instruction) and the time that the IACK-BSY signal is forced to a value indicating "BUSY".

A typical scenario is for stage F4 to be busy executing a long instruction while a system controller attempts to stream a sequence of instructions into the MCC IC 101. In this case, the F3_Reg 1909 would hold the next instruction, and the registers F2_Reg 1907 through F0_Reg 1903 would catch the following instructions prior to IACK-BSY=busy being asserted. When stage F4 completes instruction execution and accepts the contents of the F3_Reg 1909, the F3_Reg 1909 will receive the output from the F2_Reg 1907, the F2_Reg 1907 will receive the contents of the F1_Reg 1905, and the F1_Reg 1905 will receive the contents of the F0_Reg 1903. The signal IACK-BSY=acknowledge will then be asserted in time to enable the MCC IC 101 to continue execution with no lost execution clocks (i.e., NOP instructions are not "bubbled" into the instruction stream).

In addition to being the starting stage for the execution of instructions directed at the PE array 103, the contents of the F4_Reg 1801 also serve as the basis for load, move and store instruction execution and image allocation and deallocation operations. These instructions are executed in parallel with the instruction sequencer 1205 (i.e., operation of the instruction sequencer 1205 is suspended during execution of the load, move and store instructions—see Table 56 for more information). As required, the load, move, store, allocation and deallocation instructions will hold the F4_Reg 1801 (i.e., keep it from accepting a new instruction) until their execution is complete. The instruction sequencer 1205 will provide NOP Instructions to the primitive sequencer 1207 during these processes.

5.1.2 Floating Point Registers

As mentioned earlier, the exemplary MCC IC 101 supports IEEE-compliant floating point operations. In one aspect of the invention, improved performance is achieve by internally utilizing a new format for representing floating point numbers that nonetheless preserves all information required by the IEEE Std. 754-1985.

The technique includes using a 36-bit data representation that is essentially a superset of the 32-bit IEEE representation. The extra bits in the representation allow certain conditions, such as overflow and zero-ness, to be detected or asserted quickly by a bit-serial processor. Other conditions, such as denormnalization are subsumed into normal processing through the extension of the exponent range. Improvements in processing speed range from marginal to 100%, depending on the operation.

The IEEE floating point standard is predicated upon the assumption of bit parallel computation and the need to represent as much information as possible in the 32 bits (single precision). This leads to the encoding of information (such as the zero-ness of a number) which may be extracted only be examining multiple bits, requiring multiple clocks of execution for a bit serial processor. The standard also specifies special treatment for "denormalized" numbers, that is, operands which fall outside the range of the 8-bit exponent, but which are still close enough to convey incomplete information on the operand value. This special treatment becomes part of the instruction stream in a SIMD processor.

It is expected that a control processor (i.e., a processor that supplies instructions and data to the MCC IC 101, and which receives results from the MCC IC 101) might use the more conventional IEEE floating point format. To accommodate these differences, floating point registers 1835 are provided that translate between the IEEE format (used by components external to the MCC IC 101) and the MCC IC 101 internal format. For information about how to access the floating point registers 1835, refer to the Internal Resource map presented below in Table 55. The following is a description of the algorithm which is used by the exemplary hardware to convert between the two formats.

The techniques described in the following sections allow the detection and assertion of certain conditions, such as zero-ness and overflow, without the need for time consuming multi-bit operations. The IEEE standard requires operands to be handled in a number of different ways depending on the condition (zero-ness, and the like) of the operand, for each operation. This handling, along with the handling of denormalized numbers, amounts to a significant fraction of the processing required in the absence of the 36-bit representation (roughly half in the case of fmult).

5.1.2.1 IEEE Single Precision Floating Point Representation

Under the conventional approach, a 32-bit single precision floating point number is composed of three fields: fraction (f), exponent (e) and sign (s). Assuming bit 0 is the least significant bit, the fraction, exponent and sign fields are composed of bits 0 through 22, bits 23 through 30, and bit-31, respectively. The value, v, of a floating point number is then calculated from its fields using the following formula (where NaN indicates the condition "not a number" and INF indicates "infinity"):

$$v = \begin{cases} \text{NaN} & e = 255, f \neq 0; \\ (-1)^s \text{INF} & e = 255, f = 0; \\ (-1)^s 2^{(e-127)} (1.f) & 0 < e < 255; \\ (-1)^s 2^{-126} (0.f) & e = 0, f \neq 0 \\ (-1)^s 0 & e = 0, f = 0. \end{cases}$$

The floating point numbers having an exponent equal to zero are called denormalized numbers. In accordance with one aspect of the invention, denormalized numbers are converted to normalized numbers for internal use within the MCC IC 101, so no special handling of them is necessary.

5.1.2.2 MCC IC 101 Floating Point Representation

The single precision floating point representation utilized within the exemplary MCC IC 101 differs from the IEEE standard 754-1985 format in that it comprises 36 bits divided into five fields. The first new field of type, "mccic_t, encodes the special cases of NaN, Inf, and Zero into bits 34 and 35 (where "NaN" means "Not a Number", and "Inf" means "Infinity"). An overflow/underflow field, designated "mccic_o/u", is provided in bit 33, while the sign field, designated "mccic_s", is located in bit 32. A 9-bit exponent field, located in bits 23 through 31 and designated "mccic_e", allows for non-zero values between $2^{-150}$ and $2^{127}$, inclusive, and thus eliminates the need to use denormalized numbers to represent the set of numbers defined by the IEEE Std 754-1985 floating point representation. Finally, the fraction field, designated "mccic_f" remains in bits 0 through 22, with an implied most significant bit of 1.

The new value, w, of a floating point number is now calculated from its fields using the following formula $$w = \begin{cases} \text{NaN} & t = 3; \\ (-1)^{\text{mccic\_s}} \text{INF} & t = 2; \\ (-1)^{\text{mccic\_s}} 2^{(\text{mccic\_e}-150)} (1.\text{mccic\_f}) & t = 1, 0 <= e <= 277; \\ (-1)^{\text{mccic\_s}} 0 & t = 0. \end{cases}$$

The encoding of bits 35–33 is summarized in the following table:

TABLE 49

| Special Case | 35 | 34 | 33 |
|---|---|---|---|
| zero | 0 | 0 | 0 |
| zero due to underflow | 0 | 0 | 1 |
| non-zero finite | 0 | 1 | 0 |
| non-zero finite | 0 | 1 | 1 |
| infinite | 1 | 0 | 0 |
| infinite due to overflow | 1 | 0 | 1 |
| NaN (input) | 1 | 1 | 0 |
| NaN (signaling) | 1 | 1 | 1 |

5.1.2.3 EEE to MCC IC Single Precision Floating Point Conversion

The IEEE to MCC ICC floating point conversion routine expands an IEEE-format floating point number into the five fields of the MCC IC-format number, as set forth above. The floating point conversion registers 1835 are for scalar values only, and conversion is triggered by a move to or from these registers (see Table 55). Images are converted by means of opcode 0x57 (contents of the mod field select to/from conversion). First, the MCC IC-format fraction field is calculated in a way that transforms all denormalized numbers into normalized numbers. This transformation is performed by first finding the bit location of the fraction's most significant one, and then shifting the fraction so that this MSB fraction bit falls into the implied MSB bit 23. For example, given the following denormalized number:

Bit position:

IEEE mantissa = 0.000 0101 0000 1111 0000 1111
(=0.f)
     22          0 one would generate:

Bit position:

MCC IC mantissa = 1.010 0001 1110 0001 1110 0000
(=1.f')
     22          0

Next, the MCC IC-format exponent is calculated. If the IEEE exponent is non-zero, a bias of 23 is added to the IEEE exponent to form the MCC IC-format exponent. For denormalized IEEE values, the MCC IC-format exponent equals the difference of 24 and the amount of shift necessary to move the most significant one of the IEEE fraction into the implied MSB bit position 23.

The third step of the IEEE-to-MCC IC floating point conversion technique is to move the IEEE sign bit into the MCC IC-format sign bit position, and to calculate the overflow/underflow bit. Initially, the overflow/underflow bit will be zero, unless the input value is a signaling NaN (0x7fffffff), in which case the overflow/underflow bit will be initialized to one.

The final step of this conversion process determines the MCC IC-format type field (i.e., bits 35–34). As is evident from Table 49, type bit 35 will be set if and only if the IEEE exponent is 255. Type bit 34 will be set if and only if the IEEE fraction is non-zero, or the IEEE exponent is in the range of 1 to 254 inclusive.

5.2 Direct Mode Access

The Control Interface Direct Mode of access, activated by the DSTRB signal, provides immediate (non-instruction-pipe) access to the resources of the MCC IC 101. These include microstore memories (i.e., I-Sequencer microstore 1215 and P-Sequencer microstore 1217), interrupt control registers (i.e., interrupt status and interrupt mask registers 1813, 1815), and other housekeeping and execution monitoring resources. Direct Mode Access read and write operations require no acknowledge handshake and use the entire thity-two bit IDAT field for data transfer. For read operations in the exemplary embodiment, data is returned upon the IDAT lines a fixed delay of four clocks following the assertion of DSTRB-=active and IRD-WR=read (see the control interface timing illustrated in FIG. 3). Read access in Direct Mode may be piped, where one read is performed per clock. Likewise, writes may also be performed every clock cycle. However, a write operation should not be performed following a read until the wait for data has completed. A three-bit address, IADR, is used to select which Direct Mode Access resource is to be accessed. In the exemplary embodiment, these resources are mapped as shown in Table 50.

TABLE 50

| IADR | Access | Description |
|------|--------|-------------|
| 000 | r/w | Interrupt Status Register (write = clear) |
| 001 | r/w | Interrupt Status Register (write = set) |
| 010 | r/w | Interrupt Mask Register (write = clear) |
| 011 | r/w | Interrupt Mask Register (write = set) |
| 100 | r/w | Fetch Pipe (read) Reset (write) |
| 101 | r/w | Configuration Register |
| 110 | r/w | Address Register/Counter |
| 111 | r/w | Data Access |

A write to the Interrupt Status Register (ISR) 1813 or to the Interrupt Mask Register (IMR) 1815 causes the bits indicated by 1's in the write data to be set or cleared, depending on the address selected, as shown in Table 50. A read of those addresses reads the selected register. A read from the fetch pipe advances (unloads) the fetch pipe from the F0_Reg 1903 to the F4_Reg 1801, where F4 is the instruction sequencer execution stage. Because reading from the fetch pipe causes NOPs to be "bubbled" in as instructions are advanced through the fetch pipe, this operation effectively unloads the fetch pipe. Reading from the Fetch Pipe enables the MCC to recover from a fatal trap condition. Five consecutive reads provides all fetch data and replaces the Fetch Pipe with NOP instructions.

The Configuration Register 1817 specifies operational modes for the MCC IC 101, such as memory protection and clock enable.

The Address Register/Counter 1919 provides the addressing for other Direct Mode Access resources accessed within the MCC IC 101. In the exemplary embodiment, the Address Register/Counter will auto-increment for each access to the Data Access address.

5.2.1 Interrupt Status and Mask Registers 1813, 1815

The Interrupt Status Register (ISR) 1813 monitors and records the occurrence of events within the MCC IC 101.Any event which is monitored by the ISR 1813 may be enabled to contribute to the MCC interrupt signal (INT) by setting the corresponding bit in the Interrupt Mask Register (IMR) 1815. The events which are represented in the ISR 1813 are shown in Table 51.

TABLE 51

| Bit | Int/Trap | Event |
|-----|----------|-------|
| 00 | Int | Single Clock Event |
| 01 | Int | ISTRB- Read Time-out |
| 02 | Trap | Parity Error Trap |
| 03 | Int | I-seq Sync Error |
| 04 | Int | IO Sync Error |
| 05 | Trap | Allocation Trap |
| 06 | Int | Allocation Error |
| 07 | Int | Deallocation Error |
| 08 | Int | PE Bitpool Almost Empty |
| 09 | Int | PE Nybblepool Almost Empty |
| 10 | Int | PG Bitpool Almost Empty |
| 11 | Int | PG Nybblepool Almost Empty |
| 12 | Int | PE Bitpool Access Error |
| 13 | Int | PE Nybblepool Access Error |
| 14 | Int | PG Bitpool Access Error |
| 15 | Int | PG Nybblepool Access Error |
| 16 | Int | Over Error |
| 17 | Int | Pseq Event |
| 18 | Int | IO Seq In Done |
| 19 | Int | IO Seq Out Done |

TABLE 51-continued

| Bit | Int/Trap | Event |
|---|---|---|
| 20–29 | | Spare |
| 30 | Int | Reset Occurred |
| 31 | Int | Reset from RST occurred |

The above-listed fields of the ISR 1813 will now be explained in greater detail.

Bit (0) corresponds to a Single Clock Event (i.e., an interrupt that is triggered by execution of one clock cycle). This bit in the ISR 1813 indicates that an enabled single clock event occurred. This event may be useful for single clocking capability. Clearing this interrupt event when the Configuration Register Clock Enable=inactive will cause a single clock to be enabled.

Bit (1) corresponds to ISTRB-Read Time-out. If the MCC IC 101 fails to acknowledge (with IACK-BSY= acknowledge) during a RD operation within 64K clocks, then an acknowledge is forced and the event recorded. Returned data for this condition is not defined in the exemplary embodiment.

Bit (2) corresponds to a Parity Error Trap. This is an Instruction Mode write parity error. If enabled via the IMR 1815, a parity error will cause a trap condition, freezing the Fetch Pipe and halting execution.

Bit (3) corresponds to an I-seq Sync Error. This indicates that an "accept" issued in connection with the instruction sequencer 1205 does not coincide with that associated with all MCC ICs 101 in an array.

Bit (4) corresponds to the IO Sync Error. This indicates that adjacent MCC ICs 101 attempted to drive connecting I/O pins at the same time. In the exemplary embodiment, this condition is checked for the east/west and north/south interface signals.

Bit (5) corresponds to the Allocation Trap. This occurs when the MCC IC 101 attempts to exceed its PE memory resources during an image allocation. This trap condition freezes the Fetch Pipe and halts execution.

Bit (6) corresponds to an Allocation Error. This occurs when one of three error conditions is detected: an already allocated image descriptor 1301 has been allocated again (reported but allowed), an allocation of image descriptors 0 (scalar 0), 1 (scalar 1), or 2 (tmp) was attempted (disallowed), or a deallocation of image descriptors 0, 1, or 2 was attempted (disallowed).

Bit (7) corresponds to a Deallocation Error. This occurs upon detection of a deallocation of an image descriptor 1301 that was not allocated, unpopulated, or a scalar. The image descriptor 1301 will be updated, but no image addresses are returned to bit or nybble pools.

Bits (8–11) correspond to various "Pools Almost Empty" events. This type of event means that a pool read with the pool level less than or equal to the initialized almost empty threshold was detected.

Bits (12–15) correspond to various "Pool Access Errors". This type of event occurs when it is detected that an attempt was made to read an empty pool or to write a full pool. Normal operation should never see either event; initialization and test could create these errors.

Bit (16) corresponds to an Over Error. When sampled via MCC IC instruction control, the array OVER signal was active, indicating occurrence of an overflow.

Bit (17) corresponds to a P-seq Event. This is an event created via a PE array instruction (i.e., CW 1001). It is generated in the primitive sequencer 1207.

Bit (18) corresponds to an "IO Seq In Done" event. This event occurs when it is detected that the IO sequencer's 607 input busy signal has transitioned from "busy" to "not busy".

Bit (19) corresponds to an "IO Seq Out Done" event. This event occurs when it is detected that the IO sequencer's 607 output busy signal has transitioned from "busy" to "not busy".

Bit (30) corresponds to a Reset. This indicates that a reset occurred, either from the RST input pin or via a Direct Access Mode Reset register.

Bit (31) corresponds to a Hard Reset event. This indicates that the RST input pin initiated a reset.

A system implementation should provide means for determining the source of an interrupt. For example, if there are sixteen MCC IC 101 devices in an array, there will be sixteen Int signals, one from each device. The system should combine these individual Int signals to supply a single interrupt to the control processor, but should also supply a 16-bit mask which indicates which of the sixteen MCC ICs 101 raised the interrupt. The control processor will then handle the interrupt by selecting (via IOE-) the MCC IC 101 that is signaling, reading the ISR 1813 of the selected MCC IC 101, responding to the event, and clearing the interrupt by writing to the ISR 1813. It is therefore desirable for the system to have an ability to selectively assert IOE- for any one of the MC ICs 101.

Where the interrupt is a trap, the handling will also include reading (and clearing) the Fetch Pipe. After the event has been handled, the fetch pipe is restored prior to a return from the interrupt handler so that processing may continue uncorrupted.

5.2.2 Fetch Pipe/Reset

The Fetch Pipe provides a means to recover from a fatal (trap) error such as running out of PE-accessible memory (i.e., the PE RAM 601 or the Page RAM 603) or detecting an instruction parity error. A sequence of five reads from the Fetch Pipe will effectively empty the Fetch Pipe and replace the pipe instructions with NOP instructions. Once the trap condition has been removed, the recovered pipe instructions may be re-issued. A write to the Fetch Pipe/Reset address (i.e., IADR=0x4—see Table 50) (with IDAT(0)=1 will cause a software initiated reset of the MCC IC 101.

5.2.3 Configuration Register

The Configuration Register 1817 configures the operation of the MCC IC 101. In the exemplary embodiment, the register is initialized to zero upon reset. The format of the register is shown in Table 52.

TABLE 52

| Name | Bits | Function |
|---|---|---|
| CLK_ENABLE | 0 | Clock Enable |
| MEM_UNPROT | 1 | Memory Unprotect |
| ODD_EVEN | 2 | Parity Select Odd = 1 Even = 0 |
| TIMEOUT_TST | 3 | Time-out Counter Test Mode |
| IDT_BNK_SEL | 5:4 | Selects IDT Bank for Test Access |
| PROFILE_TST | 6 | Profile Counter Test Mode |

Clock Enable

The execution control pipe from the instruction sequencer 1205 to the output of the Overlay logic 1209 is enabled with a Step_Enable signal (see below for more information about this aspect of the invention). Setting Clock:Enable will force Step_Enable to a value of 'true'. A typical startup sequence would be to reset the MCC IC 101, initialize microstores (e.g., I-Sequencer microstore 1215 and P-Sequencer microstore 1217), tables (e.g., IDT 1203), and pool memory 1213, and then set Clock Enable.

Memory Unprotect
  Resources within the MCC IC 101 that could cause incorrect operation if inadvertently accessed during normal operation are protected from access when Memory Unprotect is inactive. See the "ID/P" column in Table 55 (where "P" means protected).

Parity Odd/Even Select
  Selects the parity mode of Instruction Mode write parity check logic. In the exemplary embodiment, a '1' selects Odd, and a '0' Selects Even.

Time Out Counter Test Mode
  Places the ISTRB-read time-out counter into a test mode for test purposes only. From least significant to most significant, each nybble of the counter counts up until it reaches 0xf (the "terminal count"), at which point counting is discontinued and the terminal count value is, instead, maintained.

IDT Bank Select
  In an exemplary embodiment, the IDT 1203 is constructed as three mirrored dual-port memories. (That is, three dual-port memories are arranged so that they all maintain the same memory contents.) For test access via Direct Mode Access, these bits select which bank is selected for memory tests.

Profile Counter Test Mode
  Profile Counter testing (all three counters) is performed in an operation like that described above with respect to "Time Out Counter Test Mode" (all three counters). See Table 55 and the Section entitled "Profile Logic" for more information about the profile counters.

5.2.4 Address Register/Counter and Data Access

The Address Register/Counter (ARC) 1919 provides the address for Direct Mode Access operations. The 14-bit register provides internal addressing for the MCC IC 101 and it auto-increments after every Data Access read or write cycle. A complete map of the Direct Mode Access internal resources is presented below in Table 55.

5.3 Dependency Enforcement

In most cases, contentions which may arise as a result of concurrence of operations are resolved in the controller 105. There are three cases in which contentions must be resolved:

1. Internal contentions, of which the programmer would not normally be aware. For example, in the dispatch of an instruction from the fetch logic to the instruction sequencer 1205, the possibility exists for a newly generated image descriptor 1301 to be required by the next instruction (e.g., a "read" instruction that immediately follows the instruction that generates the image descriptor 1301 needed by the read instruction). Should this happen, the first instruction's write-back to the IDT 1203 occurs as normal, but the subsequent read of the IDT 1203 (normally instigated by the following "read" instruction) is "short circuited" by using the value from the F4 working register 1809 instead of the value read from the IDT 1203 (which would have been the old value rather than the newly updated value which is being written). This is represented in FIG. 19A by the path from the F4 Dest working register 1809 back to the multiplexor 1819. This value is routed internally in the multiplexor 1819 to one of the other output ports of the multiplexor 1819 for use during execution of the next instruction.

2. During a STR and RD pair, the amount of time required for the valid data to appear in the Store Reg 1917 is not deterministic in the exemplary embodiment. The RD must therefore hold off the bus operation (using IACK-BSY) as long as necessary in order to output the correct Store_Reg 1917 data. Internally, the Valid bit is set upon completion of the STR by the instruction sequencer 1205 and cleared upon RD.

3. During an operation of the I/O Sequencer 607, read or write access may be required for an image that is currently being input or output. In the case of an input, neither read nor write access may be permitted. For an output, read access only is allowed.

In other words, the image which is currently being output may also be an "in" parameter to an MCC IC instruction. These dependencies are enforced by a scoreboard which is updated during I/O launch in the instruction sequencer 1205, and at completion by the I/O-Sequencer 607. The makeup of the scoreboard is shown in Table 53:

TABLE 53

| Number of Bits | Description |
| --- | --- |
| 1 | I/O process (0 = in, 1 = out) |
| 1 | Status (0 = complete, 1 = active) |
| 7 | Image ID |

Fetch logic uses state information in the scoreboard to determine whether the next instruction must be held (based on the rules given in paragraph 3 above).

5.4 Synization

In general, the execution of instructions by an array of MCC ICs 101 will occur in complete synchronization. In other words, all MCC ICs 101 will have the same values in their IDTs 1203 and will be executing—to the clock—all instructions in perfect synchronization with each other. There are two events where synchronization is checked and for which an interrupt is raised if a loss of sync is detected. The first type is I/O sync, which is the synchronization of bitplane shift operations, and which is signaled by the IO Sync interrupt/status bit. The second type is I-seq sync, which is the synchronization of instruction accepts by the instruction sequencer 1205 and is signaled by the Iseq_Sync interrupt/status bit.

5.5 Single Stepping

To support a hardware debug and trace environment, the exemplary MCC IC 101 supports a single-stepping capability implemented through the ISR 1813. The clock enable for the Primitive Sequencer 1207 and I/O Sequencer 607 and Overlay Logic 1209 is controlled by a Step_Enable signal.

When the Clock Enable bit of the Configuration Register 1817 is active, the Step_Enable signal is active. This would be normal operation. When the Clock Enable bit is inactive, the Step_Enable signal may be enabled one clock at a time through the ISR 1813. A clear operation directed to bit 0 of the ISR 1813 will create a one clock duration of Step_Enable. Thus, single step operation may be attained through repeated clear accesses of the ISR 1813. While single stepping, the program counter address used by the Instruction Sequencer 1205, the state of the Primitive Sequencer 1207, the output of the Overlay logic 1209, and other control pipe parameters will be readable via Direct Mode Access.

5.6 Register and Memory Maps

In the exemplary embodiment, the resources of the MCC IC 101 are accessed as specified in the Internal Resource Map shown in Table 55 below. The address space above 0x80 comprises the various memory elements within the MCC IC 101 and is accessible only in Direct Mode. The address space below 0x80 comprises various registers and a mailbox memory 1821, and is accessible either in Direct Mode or in Instruction Mode as specified in the table. Many of these resources are accessible in only one mode or the other, although some are accessible in both access modes.

The Reg_.Map registers 2003 (addresses less than 0x80) occupy one of four banks of address space which is accessible in Instruction Mode. Because operands in the exemplary embodiment are limited to seven bits in the Instruction Word, it is necessary to restrict the address space to the range 0–127. It is also desirable to have access to the IDT 1203 in Instruction Mode, so the address spaces of the IDT 1203 and Reg_Map registers 2003 are arranged into four banks as shown in Table 54. As described earlier, read, write and move access are provided in Instruction Mode for movement of data within the register space, and the Mod field 1505 is used to specify the bank of the operand. Therefore, movement to, from and between any Reg_Map register resource or IDT word and any other Reg_Map register resource or IDT word is supported in Instruction Mode.

TABLE 54

| Bank | Description |
| --- | --- |
| 0 | Reg_Map registers |
| 1 | IDT Bitplane map low (31:0) |
| 2 | IDT Bitplane map high (63:32) |
| 3 | IDT Attributes (78:64) |

Table 55 summarizes the internal resources that are available through the instruction interface. Note that, in general, access to internal registers is through Instruction Mode Access, and access to memories is through Direct Mode Access. In the table the "I" column indicates Instruction Mode Access and the "D" indicates Direct Mode Access.

In the exemplary embodiment, for register/memory accesses which do not use the entire bus width, the unused bits are padded as 0's. Some of the registers which are on the "Move Bus" 1823 are 36-bits wide. The 36-bit width supports extended image size parameters and should only be used to move data to and from like 36-bit registers. When any of the 36-bit wide GLOR_Data register 1825, Quad-Glor registers 1843 and floating point conversion registers 1835 are loaded via Instruction Mode Access, the upper four bits are generated by sign-extension of bit 31 (MSB of a 32-bit load). When these registers are read via store instructions, only the least significant 32-bits are accessible. If the data in any of the 36-bit wide registers is an MCC IC-format floating point operand (36-bits), then the value can be read by moving it to the floating point conversion registers 1835 and it will be converted to an IEEE 32-bit format for reading.

Note that the address provided by an Instruction Bus operand (SRC1 or DEST) is seven bits spanning a range of 128 addresses which may be mapped to resources as shown in Table 55. In Table 55, the "I" column represents the possible access capabilities while in Instruction Mode access; the "D" column represents the possible access capabilities while in Direct Access mode; the "ID/P" column contains information indicating those instances in which a resource responds only when the MCC IC 101 is "selected" (ID/P=I, and further explained below in Table 55), and those resources whose accesses depend on the current protection mode as specified in Table 52 (ID/P=P). MOD bits 3 and 2 are associated with SRC1, and MOD bits 1 and 0 are associated with DEST. Each of these two-bit fields is defined as shown in Table 54.

TABLE 55

| ADDRESS | I | D | ID/P | Bits | DESCRIPTION |
| --- | --- | --- | --- | --- | --- |
| 0x0000 | rw | r | | 15:0 | Preload NS Skew |
| 0x0001 | rw | r | | 15:0 | Preload EW Skew |
| 0x0002 | rw | r | | 15:0 | IO Ram Base Address |
| 0x0003 | rw | r | | 15:0 | Preload |
| 0x0004 | r | | | 31:0 | Chip ID |

The chip select register 1849 is designed to allow a LDH opcode to select one or more MCC ICs 101. A chip (i.e., MCC IC 101) is selected when it is both row- and column-selected. The chip is row-selected if a '1' occurring in any of the row-select bits of the chip ID reg 1833 is in the same bit position as a '1' occurring in any of the row-select bits of the value in the chip select register 1849. Similarly, the chip is column-selected if a '1' occurring in any of the column-select bits of the chip ID reg 1833 is in the same bit position as a '1' occurring in any of the column-select bits of the value in the chip select register 1849.
In the exemplary embodiment, the row- and column- selecting bit positions are: Row_Select = {31:24, 15:8,}; and Col_Select = {23:16, 7:0} By convention, the MSB is chip 0 and the LSB is chip 15, supporting up to 16 × 16 MCC IC chips.
For example, a value of 0x80800000 will be the identification value for Chip 0,0. And 0x00000101 will be the identification for Chip 15,15.

| ADDRESS | I | D | ID/P | Bits | DESCRIPTION |
| --- | --- | --- | --- | --- | --- |
| 0x0005 | rw | | | 31:0 | Chip Select |
| 0x0006 | rw | | | 35:0 | Float IEEE to MCC IC-format Write a 32-bit IEEE format operand, read a 36-bit MCC IC-floating point operand. |
| 0x0007 | rw | | | 35:0 | Float MCC IC- to IEEE-format Write a 36-bit MCC IC-format operand, read a 32-bit IEEE-format operand. |
| 0x0008 | rw | r | I | 31:0 | x pattern register 1827. MSB is western-most PE position. |
| 0x0009 | rw | r | I | 31:0 | y pattern register 1829. MSB is northern-most PE position. |
| GLOR Select & Delay | | | | | |

LO:
2:0 EXT_DLY -External Delay for Glor_in
HI:
16 INT_EXT -1 = Will Sample internal chip glor
0 = Will Sample external chip glor
17 G_EXTEND -Sign Extend Glor Reg Samples
18 Q_EXTEND -Sign Extend Quad Glor Reg Samples
20:19 GSTAT_SEL -Source Select for GSTAT output
(0 = GLOR 1 = OVER 2 = INT 3 = TRUE)

| ADDRESS | I | D | ID/P | Bits | DESCRIPTION |
| --- | --- | --- | --- | --- | --- |
| 0x000a | rw | r | I | 31:0 | glor sel and delay |
| 0x000b | rw | r | I | 35:0 | chip glor_data reg |
| 0x000c | rw | r | I | 35:0 | NW glor reg |
| 0x000d | rw | r | I | 35:0 | NE glor reg |
| 0x000e | rw | r | I | 35:0 | SW glor reg |
| 0x000f | rw | r | I | 35:0 | SE glor reg |
| Profile Counters & Masks | | | | | |

Profile counter 0 counts clocks.
Profile counter 1,2 count based on enabled events specified by mask 1,2.

| ADDRESS | I | D | ID/P | Bits | DESCRIPTION |
| --- | --- | --- | --- | --- | --- |
| 0x0010 | | r | | 19:0 | Glor_Regs ms 4-bits of 0xb-0xf |
| 0x0011 | rc | r | | 31:0 | profile counter 0 (rc means there is read access and a write performs a clear) |
| 0x0012 | rc | r | | 31:0 | profile counter 1 (rc means there is read access and a write performs a clear) |
| 0x0013 | rc | r | | 31:0 | profile counter 2 (rc means there is read access and a write performs a clear) |
| 0x0014 | w | rw | | 15:0 | profile mask 1 |
| 0x0015 | w | rw | | 15:0 | profile mask 2 |
| 0x0016 | rw | | | | float MCC 1C-to IEEE most sig. 4 bits 3:0 (test only) |
| 0x0017–0x001f | | | | | <Reserved> |
| 0x0018 | | r | | | Overlay PE Command Word |
| 0x0019 | | r | | | Overlay Memory Control |
| 0x001a | | r | | | Overlay Miscellaneous Word |
| 0x001b | | r | | | Overlay Skew Counters |

TABLE 55-continued

| ADDRESS | I | D | ID/P | Bits | DESCRIPTION |
|---|---|---|---|---|---|
| 0x001c | | | r | | P-Sequencer State |
| 0x001d | | | r | | I-Sequencer State |

*For FIFO reset and init low level control, a "1" written to bit 0 resets the FIFO. A "1" written to bit 1 copies current level to lowest level reached register. The reset may only be performed through the direct access bus.

PE Bit Pool

| ADDRESS | I | D | ID/P | Bits | DESCRIPTION |
|---|---|---|---|---|---|
| 0x0020 | w* | w | | 1:0 | Reset, init low level |
| 0x0021 | r | r | | 31:0 | Level |
| | | | | | 22:16 lowest level |
| | | | | | 6:0 current level |
| 0x0022 | | r | | 31:0 | Pointers |
| | | | | | 31 full flag 30 empty flag |
| | | | | | 13:8 wr pointer 5:0 rd pointer |
| 0x0023 | | rw | | 6:0 | Almost empty offset (reset to 0x0a) |

PE Nybble Pool

| ADDRESS | I | D | ID/P | Bits | DESCRIPTION |
|---|---|---|---|---|---|
| 0x0024 | w* | w | | 1:0 | Reset, init low level |
| 0x0025 | r | r | | 31:0 | Level |
| | | | | | 22:16 lowest level |
| | | | | | 6:00 current level |
| 0x0026 | | r | | 31:0 | Pointers |
| | | | | | 31 full flag 30 empty flag |
| | | | | | 13:8 wr pointer 5:0 rd pointer |
| 0x0027 | | rw | | 6:0 | Almost empty offset (reset to 0x0a) |

Page Bit Pool

| ADDRESS | I | D | ID/P | Bits | DESCRIPTION |
|---|---|---|---|---|---|
| 0x0028 | w* | w | | 1:0 | Reset, init low level |
| 0x0029 | r | r | | 31:0 | Level |
| | | | | | 23:16 lowest level |
| | | | | | 7:00 current level |
| 0x002a | | r | | 31:0 | Pointers |
| | | | | | 31 full flag 30 empty flag |
| | | | | | 14:8 wr pointer 6:0 rd pointer |
| 0x002b | | rw | | 7:0 | Almost empty offset (reset to 0x0a) |

Page Nybble Pool

| ADDRESS | I | D | ID/P | Bits | DESCRIPTION |
|---|---|---|---|---|---|
| 0x002c | w* | w | | 1:0 | Reset, init low level |
| 0x002d | r | r | | 31:0 | Level |
| | | | | | 24:16 lowest level |
| | | | | | 08:00 current level |
| 0x002e | | r | | 31:0 | Pointers |
| | | | | | 31 full flag, 30 empty flag |
| | | | | | 15:8 wr pointer 7:0 rd pointer |
| 0x002f | | rw | | 8:0 | Almost empty offset (reset to 0x0a) |
| 0x0030–0x003f | | | | | <Reserved> |

MailBox

| ADDRESS | I | D | ID/P | Bits | DESCRIPTION |
|---|---|---|---|---|---|
| 0x0040–0x007f | rw | | | 31:0 | Mail Box Memory 1821 (The Mail box is also accessible via the Memory Interface 1831) |
| 0x0080–0x00ff | | | | | Spare |

IDT

Note: Instruction (Move Bus) access to the IDT 1203 utilizes the MOD bits

| ADDRESS | I | D | ID/P | Bits | DESCRIPTION |
|---|---|---|---|---|---|
| 0x0200–0x027f | | | rw P | 31:0 | IDT [31:0] |
| 0x0280–0x02ff | | | rw P | 31:0 | IDT [63:32] |
| 0x0300–0x037f | | | rw P | 15:0 | IDT [79:64] |

Pool Memories (FIFO Mode)

For the following accesses the pool memories 1213 are accessed as FIFOs. Access to any address within the memory's specified range will produce the same result.

| ADDRESS | I | D | ID/P | Bits | DESCRIPTION |
|---|---|---|---|---|---|
| 0x0400–0x043f | | | rw P | 7:0 | PE Bit Pool FIFO |
| 0x0500– | | | rw P | 15:8 | PE Nyb Pool FIFO |
| 0x053f | | | | | |
| 0x0600–0x067f | | | rw P | 23:16 | Page Bit Pool FIFO |
| 0x0700–0x07ff | | | rw P | 31:24 | Page Nyb Pool FIFO |

Pool Memories (Test Mode)

Memories having a depth less than 256 are mirrored to fill the address space. For example, if depth = 64, then addresses 0, 64, 128 and 192 are all treated as the same address.
For access 0x800–0x8ff these are addressable memories (i.e., directly addressable, not FIFOs):
31:24 Page Nybble Pool Memory
23:16 Page Bit Pool Memory
15:08 PE Nybble Pool Memory
07:00 PE Bit Pool Memory

| ADDRESS | I | D | ID/P | Bits | DESCRIPTION |
|---|---|---|---|---|---|
| 0x0800–0x08ff | | | rw P | 31:0 | Pool Memories (Test Only) |

Microcode Memories

| ADDRESS | I | D | ID/P | Bits | DESCRIPTION |
|---|---|---|---|---|---|
| 0x1000–0x11ff | | | rw P | 31:0 | PSEQ [31:0] |
| 0x1200–0x13ff | | | rw P | 7:0 | PSEQ [39:32] |
| 0x2000–0x27ff | | | rw P | 31:0 | ISEQ [31:0] |
| 0x2800–0x2fff | | | rw P | 31:0 | ISEQ [63:32] |
| 0x3000–0x37ff | | | rw P | 15:0 | ISEQ [79:64] |

5.6.1 Resource Selection via Chip ID Register 1833

Information about resource selection via the Chip ID Register 1833 may be found in Table 55.

5.6.2 FIFO Pool Memories

As shown in the Resource Map (Table 55), in Test Mode the Pool Memories 1213 are accessed in parallel, creating what appears to be a 32-bit memory. When accessed in this manner, any pool memory 1213 which is not 256 locations deep will be mirrored in this address range.

When accessed in the normal address range (in FIFO mode—accessing one pool memory at a time) the pool memory 1213 is managed as a FIFO. A write to the pool pushes the write data into the FIFO and a read pops pool data. Access to the current read and write pointers, and empty and full flags is read-only through the "Pointers" register.

A write of a full pool memory 1213 is disallowed and the write pointer will not increment. A read of an empty pool memory 1213 (level=0) is disallowed and the read pointer will not increment. Both cases will cause an error condition and will be reported through the ISR register 1813.

5.6.2.1 Initialization of FIFO Pool Memory 1213

Prior to functional operation of the MCC IC 101, each pool memory 1213 should be loaded with appropriate bit and nybble address values. In addition, the "almost empty offset" value should be set (if a value other than the default "reset" value is desired) and the pool reset register for each pool memory 1213 should be written with a 0x2 (i.e., set bit number 1) to copy the current level to the lowest level (this will allow the lowest level history value to be initialized with the number of items loaded during the initial pool load). A value of 0x1 (i.e., set bit number 0) written to the pool reset register will reset the read and write pointers—effectively resetting the FIFO. Note that, in the exemplary embodiment, the pool reset may ONLY be done through the Direct Mode Access path.

5.6.2.2 FIFO Pool Memory Level Status

The "level" register for each pool memory provides the current status of the FIFO Pool and contains two values: (1) current level, and (2) lowest level. The current level indicates the number of items within the pool memory 1213. This level is used by the Allocation/Deallocation logic 1211 to determine if an adequate number of items are available for image allocation. The lowest level is a history of the lowest pool level since that last pool lowest level initialization (by writing to the pool reset register).

The Allocation address pool threshold values ("almost empty offsets") are used to compute the almost empty signals which are read via status and interrupt registers. One of the four almost empty interrupt signals will become active due to a read of a pool with a level less than or equal to the "almost empty offset".

5.6.2.3 FIFO Pool Memory Reset

Resetting the MCC IC 101 initializes the almost empty threshold values to 0x0A. This results in the almost empty signals becoming active when the pool is less than or equal to 9 (note that a read when a pool has 10 items in it—0x0a— will only have 9 immediately after the read). The signal will become inactive when the pool is greater than or equal to 10 (0x0A). A chip reset or a pool reset forces the almost empty signal active as well.

Upon either a pool reset or a chip level reset the read and write pointers are set to zero, the lowest and current levels in the Level Register are set to zero, the empty flag is set to a 1 and the fill flag is set to a 0.

6. Image Descriptor Table (IDT) 1203

The Image Descriptor Table (IDT) 1203 provides the register set for the image descriptors 1301 that are the operands referenced in the MCC IC input instruction 1501. Referring now to FIG. 21, the IDT 1203 provides a bank of 128 registers, each 80 bits wide, with 1 read/write port and 3 read ports. The read/write port supports access to the IDT by three entities which all share access to this port via a multiplexor/demultiplexor 2001. These entities are the Allocation/Deallocation logic 1211, the Reg_Map logic 2003, and the Direct Access logic 2005. The Reg_Map 2003 provides a means for accessing the IDT 1203 from the Instruction Bus 1807 in Instruction Mode. As an alternative, the Direct Access logic 2005 provides a means for accessing the IDT 1203 from the Instruction Bus 1807 in a Direct Access mode. Mode selection (i.e., Instruction Mode versus Direct Access Mode) is controlled by the DSTRB- and ISTRB-interface signals to the MCC IC 101. The three read ports provide simultaneous access of the SRC1, SRC2, and DEST image descriptor operands that are loaded into the F4 working registers 1809 and operated on by the instruction sequencer 1205. In the exemplary embodiment, the IDT 1203 is made from a synchronous dual-port 128×16 RAM cell configuration. Both the read/write port and the 3 read ports are synchronous to a common clock.

Each of the three read ports of the IDT 1203 has a corresponding 7-bit address port (not shown) that is used to independently address one of the 128 registers. Note that registers 0 and 1 are hard-coded to always provide a scalar 0 and scalar 1 respectively. Register 2 is also hard-coded to reference the "Tmp" image (See Table 33).

On the read/write port side of the IDT 1203, the Allocation/Deallocation logic 1211 directly writes 80-bit image descriptors 1301 into the IDT 1203 when memory Alloc/Dealloc instructions are received from the host processor of the MCC IC 101.

6.1 Loading a Scalar Image Descriptor

The LDMVSTR (Load/Move/Store) module (part of the Reg_Map resources 2003 shown in FIG. 21) contains logic to compute the size of a scalar written into the IDT 1203 using LDL/LDH instructions. A LDL to the Nybble map portion of the Descriptor for NybI and NybO will write sign-extended data to bits 35:0 of the IDT entry and set the attribute field to indicate "signed", and "scalar", and set the size field to the correct size as indicated by the data. The logic is similar to a priority encoder and searches from most-significant bit (msb) to least-significant bit (1sb) for a bit change to indicate where the most significant bit of the data is. For example, a pattern of 0xffff or 0x0000, which has no adjacent bits that are opposite, will have a size of "1" (the only bit being the sign bit). A pattern of 0xfffe or 0x0001 will have a size of "2" (a sign bit and one data bit), and so on. A LDH to the Nybble map portion of the Descriptor for Nyb3 and Nyb2 will recompute the size (with a minimum size of 0x11) and write the new size, reload the upper portion (35:16) with sign-extended data, and reload the attributes with 'signed" and "scalar". If a 36-bit scalar is desired, a LDL to Nyb5 and Nyb4 (only least significant 4-bits are meaningful), the size field in the IDT 1203 will be zeroed and the attributes written with "signed", "scalar", and "extend".

Note that any load to the lower 36-bits of an IDT entry will generate attributes for a scalar. Only a direct load to the attributes portion of the IDT allows the entry to be modified to anything other than a scalar.

6.2 Unpopulated Image as a Source Operand

In the exemplary embodiment, when an unpopulated image is used as a source operand, it is to be treated as a global zero value. This is accomplished by passing a size attribute of 0 for that image during the read from the IDT 1203 into an F4 working register 1809.

7. Instruction Sequencer (ISEO)

The instruction sequencer 1205 is the central point of control for the MCC IC 101. Operations and operands are supplied to the instruction sequencer 1205 by the fetch unit 1201 and the IDT 1203 and the corresponding tasks are dispatched to the appropriate logic units for execution. Because all operations (which are dispatched via Instruction Mode Access) are handled by the instruction sequencer 1205, the instruction sequencer 1205 enforces dependencies which arise from the concurrent execution of tasks. The instruction sequencer 1205 dispatches tasks to the Allocation/Deallocation logic 1211, the MOV logic (one of the resources of the Reg_map 2003, shown in FIG. 21), and to itself for sequencing array operations.

The instruction sequencer 1205 sequences through instructions stored in the I-Seq Memory 1215. The instruction sequencer 1205 works in conjunction with the F4 working registers 1809, which handle image descriptor operands during an operation. The instruction sequencer 1205 includes Tmp Image control logic and P-seq instruction word generation logic. Three of the four F4 working registers 1809 hold normal 80-bit image descriptors which are loaded during instruction accept, with the three operands (src1, src2, dest) being specified by the instruction word loaded in the F3_reg 1909. The Temp portion of the F4 working registers 1809 is used to maintain a temporary operand, Tmp Image, which may be used during operations for which intermediate storage is required. The Tmp Image attributes may be varied under microcode control as required by the operation. The PSEQ instruction word 2200, which is generated by the instruction sequencer 1205 and supplied to the primitive sequencer 1207, consists of three operand specifications and several control fields which determine the operation to be performed by the primitive sequencer 1207. These functions are controlled by an instruction sequencer instruction word (see Table 57) which is read from the I-seq memory 1215 during execution of the operation. A microsequencer provides execution control for sequencing operations.

7.1 Instruction Dispatch

7.1.1 Load/Move/Store Dispatch

The Load/Move/Store (LDMVSTR) Logic (see Reg_Map 2003 in FIG. 21) manages and executes the LDL, LDH, MOV, and STR instructions. These instructions are executed from the F4_reg 1801. Note that the F4_reg 1801 is also the dispatch source for Allocation/Deallocation instructions as well as primitive instructions. Execution from the F4_reg 1801 ensures LDMVSTR instruction execution within the flow of primitive instructions, thus eliminating most array parameter synchronization requirements. Access of the GLOR_Data register 1825 is one area where care should be taken to ensure coordination between LDMVSTR access and array processor execution.

LDMVSTR instructions allow parameters or operands to be moved between internal resources of the MCC IC 101. These resources are accessible via the Move Bus 1823, and are memory mapped as described in Table 55. The Move Bus 1823 supports a 36-bit data transfer. An operand from a 32-bit source will be sign extended when being written to a 36-bit destination. Depending upon the instruction and the source and destination addresses, the LDMVSTR Logic in the exemplary embodiment requires from 1 to 5 clock cycles to execute, as listed in Table 56. For execution times greater than 1, the LDMVSTR Logic issues a hold condition to the instruction sequencer 1205, holding pipe execution until the Load/Move/Store instruction completes execution. In general, register access requires 1 clock, and memory access requires 2 clocks.

TABLE 56

| Instr | Source | Dest | Clocks | Notes |
|---|---|---|---|---|
| LDL/LDH | F4 | Register | 1 | 1,2 |
| LDL/LDH | F4 | MailBox | 2 | |
| LDL/LDH | F4 | IDT | 3 | 3,4 |
| MOV | Register | Register | 2 | 1,2 |
| MOV | Register | MailBox | 3 | |
| MOV | Register | IDT | 4 | 3,5 |
| MOV | MailBox | Register | 3 | 1,2 |
| MOV | MailBox | MailBox | 4 | |
| MOV | MailBox | IDT | 5 | 3 |
| MOV | IDT | Register | 3 | 1,2 |
| MOV | IDT | MailBox | 4 | |
| MOV | IDT | IDT | 5 | 3 |
| STR | Register | Store_Reg | 2 | |
| STR | MailBox | Store_Reg | 3 | |
| STR | IDT | Store_Reg | 3 | |

Notes
1) The IEEE-to-MCC IC format floating point format conversion register 1835 is an exception. It requires 2 clocks to compute its results. The LDMVSTR Logic should add 1 clock to its execution time for this destination.
2) The Preload Register 1837 may be used by the Allocation/Deallocation logic 1211 at the time when the Allocation/Deallocation logic 1211 receives an MCC instruction from the F3_reg 1909. This may occur when the Preload Register 1837 is the source of image size attributes. If the instruction immediately following a load to the Preload Register 1837 is an Allocation instruction, the LDMVSTR Logic will insert an additional execution clock to ensure a valid Preload value at the time that this value is accessed by the Allocation/Deallocation logic 1211.
3) When the IDT 1203 is a destination, an extra clock is inserted to allow a valid read of the IDT 1203 from the F3 stage of the fetch pipeline. Since the IDT 1203 has already performed its read during the first clock cycle of LDMVSTR execution, the LDMVSTR issues a "read again" signal to the IDT 1203 in the event that the destination location in the IDT 1203 will be used by the next array instruction.

TABLE 56-continued

| Instr | Source | Dest | Clocks | Notes |
|---|---|---|---|---|

4) A LDL or LDH operation directed at the IDT 1203 should sign extend the IDT destination to a full 36-bits (LDL-35:16, LDH-35:32) and the attribute field should be initialized to 0x0B (extend, scalar, signed).
5) A MOV from the IEEE-to-MCC IC float format conversion register 1835 to the IDT 1203 should also set the IDT attribute field to 0x0B (extend, scalar, signed).

7.1.2 Array Operation Dispatch

An MCC operation (e.g., of the type shown in FIG. 16) is dispatched when the instruction sequencer 1205 performs a "Jump to Vector". The 'vector' is the address which results from multiplying by 4 the value contained within the opcode field of the F3_reg 1909. The operation set spans up to 128 Opcodes, thereby covering the first 512 addresses of the I-seq Memory 1215 as a dispatch area. This leaves the upper 1.5 k of I-seq Memory 1215 free for coding longer operations. The spacing of operations by 4 allows room for an initial instruction followed by an instruction with a conditional branch. Because a 'fall through' instruction (i.e., an instruction that is executed if a branch condition fails) is needed, this scenario requires a minimum of three instructions. Because left-shifting the opcode value will only result in a value that is a power of two, four-instruction dispatch blocks are the minimum size in the exemplary embodiment.

Many operations require a single primitive only and might therefore be wasting three unused instructions. Should alternative embodiments cause the instruction set to grow beyond the 1.5 k working area, it is possible to reclaim these wasted instructions for in-line code segments of other operations. This task can be simplified by using a good assembler that manages the allocation of microcode memory to operations.

7.2 F4 Working Registers 1809

As explained earlier, the F4 working registers 1809 comprise three general purpose 80-bit working registers and one 16-bit temporary image working register. During instruction dispatch, the general purpose F4 working registers load image descriptors from the IDT 1203 based upon the operand (Image ID) fields contained in the F3_reg 1909. The general purpose registers of the F4 working registers 1809 are identified as Src1, Src2 and Dest, corresponding to the instruction operands. The loading of the F4 working registers 1809 is an automatic function of the fetch and dispatch processes. The general purpose working registers cannot be updated as a result of execution of an operation. The working register data supplies operand information to the primitive sequencer 1207 during dispatch of primitives, and can also be used to control sequencing.

The Temp working register maintains descriptor attributes for the 'Tmp Image'. The Tmp Image is a dual image which occupies the first 36 bits of both PE and Page RAM 601, 603. In the exemplary embodiment, the space for holding the Tmp Image may neither be allocated nor deallocated; it is always fully allocated by default. The assignment of nybbles to the Tmp Image is hardwired, which means that the Bit Map portion of the Tmp working register is not required. Whenever Tmp is selected as an operand, the 72-bit plane map is supplied by the operand select logic 1839 (i.e. nybbles 0, 1, 2, 3, 4, 5, 6, 7, 8).

The Tmp attributes, including the Size, may be varied under microcode control to provide a temporary or 'working' image which meets the requirements of a particular operation. Unlike normal image descriptors, the Tmp image may supply 9 nybble addresses as well as a Size attribute. This makes it possible to specify sizes in the range 33–35, something normal images cannot do. Since the allocation of Tmp bits in both memories is permanent, the programmer may vary the size and storage of Tmp at will and use the portion of Tmp that is needed for a given situation.

The Tmp image is used for temporary storage of operand data in chip operations. This provides several benefits. The first is that temporary storage is required in order to provide some of the complex operations (such as multiply and floating point operations) as self-contained MCC IC 101 operations. These complex operations require at least one, and in some cases two intermediate operands in addition to the one output and two input operands specified by the MCC instruction. The use of the Tmp image is also provided to the assembly level programmer (i.e., the programmer whose instructions are supplied to the MCC IC 101), affording him or her an operand that is free in terms of storage (since the Tmp image is always allocated) and low overhead in terms of management. It should be reiterated that Tmp is really two images: one in PE RAM 601 and one in Page RAM 603. The current storage attribute of the Tmp descriptor determines which of these two addressable storage resources is accessed at a given time.

A second benefit of the Tmp image is its use in optimizing the sequencing of complex operations with respect to operand storage. Because of the segmented array memory, the storage of operands relative to each other impacts the efficiency of an operation. For example, where both source operands and the destination operand are all stored in the (1-port) Page RAM 603, a simple primitive will require three clocks per bit operation. This is because three memory accesses are required for each bit operation, and the single port memory can accommodate only one access per clock. Where all three operands are in the (2-port) PE RAM 601, two clocks per bit are still required. An optimal arrangement is for one operand to be assigned to the Page RAM 603, and for the other two operands to be assigned to the PE RAM 601.

Because of this relationship between operand storage and performance, it is anticipated that an important part of optimization by the programmer will be the arrangement of operands in memory to combine optimally during execution. This can be a significant task that should be eased in any way possible. One way in which this is mitigated is through the control of Tmp image storage for complex operations such as multiply and floating point add. In the exemplary embodiment, the low level code for these operations has been written such that the Tmp storage is managed to provide optimal performance regardless of the storage relationships for the supplied operands. This moves the optimization task to the lowest possible level, encapsulating it in the Operation Set definition of the MCC IC 101, and freeing the programmer from this task at least for the complex operations.

Another benefit of the Tmp image is in allowing the low level programmer to generate conflict-free code. There is a subtle difference between this requirement and the desire to provide code that is optimal with respect to execution. There are some instructions (notably the loading of the XF, YF, C or D registers 821, 823, 815, 819 from memory) which require that the interval between separate instructions be maintained. Should the overlay logic encounter any conditions which generate a conflict (such as non-optimal storage relationships), extra cycles may be injected to handle the conflict, thereby changing the interval between some instruction pairs. It is the responsibility of the low level programmer to ensure that the code is conflict-free whenever such features are exploited. One of the best ways to ensure conflict-free code is through the use of Tmp where the programmer has control of storage.

7.3 Sequence Control

Figure 22A:
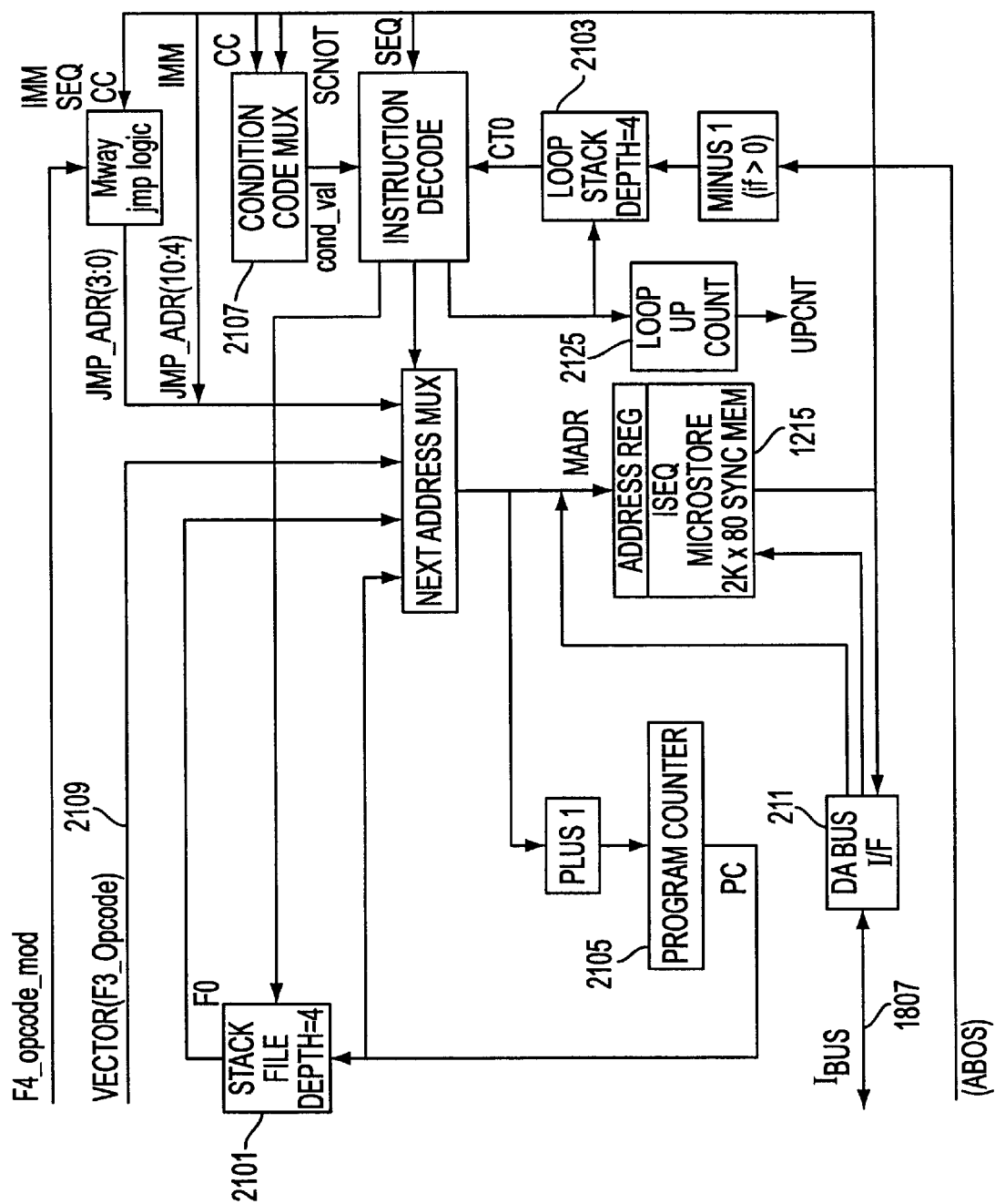
FIGS. 22A and 22B together form a block diagram showing the instruction sequencer and the I-seq Memory in greater detail.
Figure 22B:
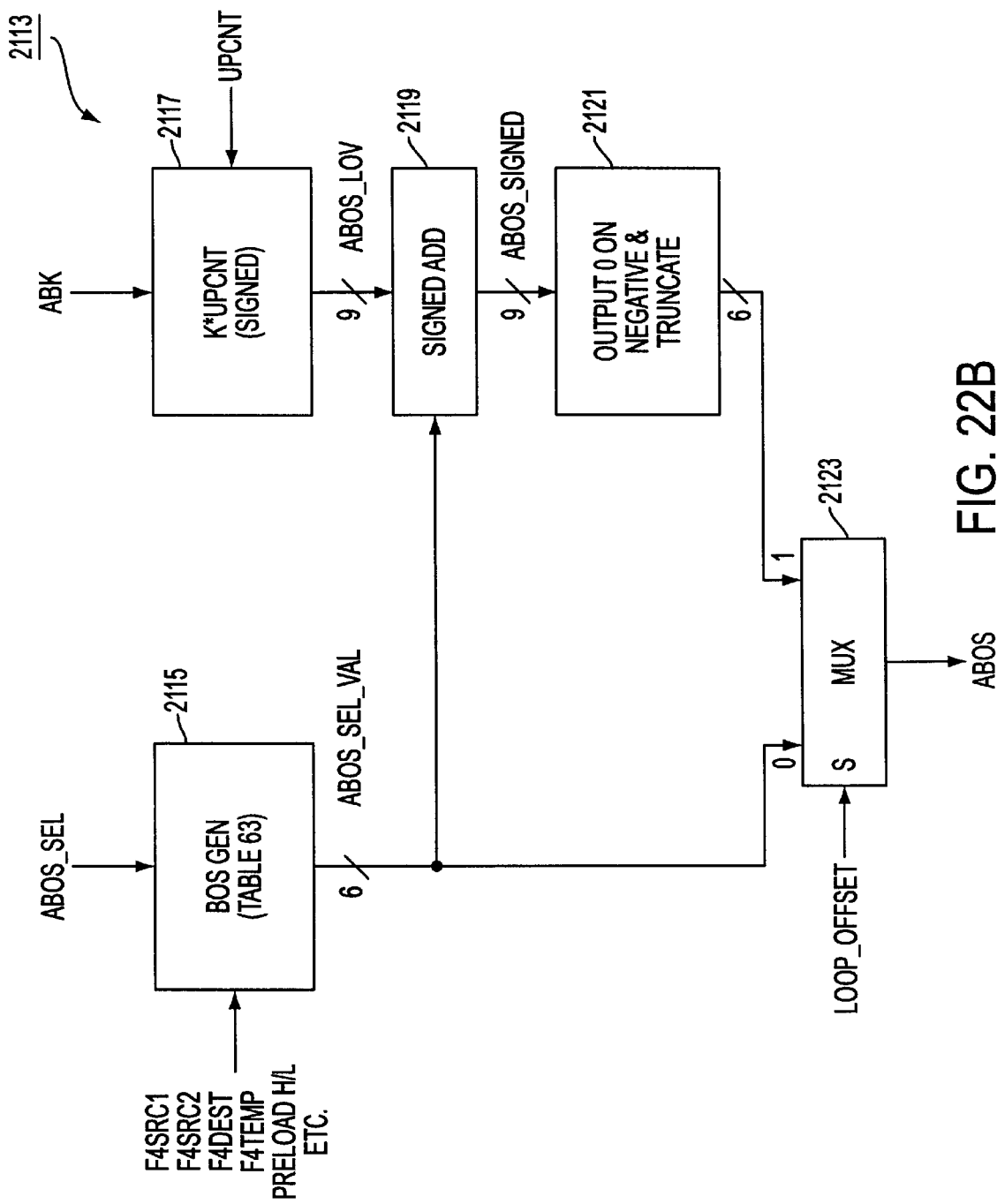

FIGS. 22A and 22B together form a block diagram showing the instruction sequencer 1205 and the I-seq Memory 1215 in greater detail. Referring first to FIG. 22A, in the exemplary embodiment, the I-seq Memory 1215 is 2K×80-bits. Primary components of the instruction sequencer 1205 include the Stack File 2101 and Loop Stack 2103 that each have a depth of 4, the Program Counter (PC) 2105, and the Condition Code Multiplexor (Mux) 2107 which decodes one of sixteen selected conditions.

The I-seq Memory 1215 stores 80-bit wide microinstructions, the format of which is set forth in Table 57.

TABLE 57

| I-SEQ Memory Bit | Field Identifier | No. of Bits | Description |
| --- | --- | --- | --- |
| 2:0 | SEQ | 3 | SEQ Instruction |
| 3 | SEQ_COND_NOT | 1 | SEQ Condition Not Control |
| 7:4 | COND_CODE | 4 | SEQ Condition Code |
| 19:8 | IMM | 12 | SEQ Immediate data |
| 12:8 | PICK1 | 5 | PICK1 encoded data |
| 10:8 | LBK | 3 | Left BOS K value |
| 13:11 | RBK | 3 | Right BOS K value |
| 16:14 | ABK | 3 | Answer BOS K value |
| 19:17 | AEK | 3 | Answer End K value |
| 20 | ALT_SEL | 1 | PSEQ Alternate Select |
| 29:21 | PSEQ_JMPIN | 9 | PSEQ Instruction Jump In Address |
| 30 | SKIN | 1 | Skew Inhibit control |
| 33:31 | LIMG_SEL | 3 | F5 Left Image Descriptor select |
| 39:34 | LBOS_SEL | 6 | Left BOS select |
| 42:40 | RIMG_SEL_ | 3 | F5 Right Image Descriptor select |
| 48:43 | RBOS_SEL_ | 6 | Right BOS select |
| 51:49 | AIMG_SEL | 3 | F5 Answer Image Descriptor select |
| 57:52 | ABOS_SEL | 6 | Answer BOS select |
| 63:58 | AEND | 6 | Answer End BOS select |
| 64 | ADIR | 1 | BOS Count Direction control |
| 68:65 | SIGIN | 4 | PSEQ SIGIN control |
| 71:69 | SIGOUT | 3 | PSEQ SIGOUT control |
| 72 | SIGSIGN | 1 | PSEQ SIGSIGN control |
| 76:73 | TMP_ID_CMD | 4 | F4 TMP Image Descriptor control |
| 79:77 | TMP_STG_CMD | 3 | F4 TMP Image Descriptor Storage control |

Bits 2 through 0 of each microinstruction are a SEQ field that designates one of eight possible sequencer instructions. The sequencer instruction set for the instruction sequencer 1205 is defined in Table 58.

TABLE 58

| SEQ Code | ISEQ Instruction | Description |
| --- | --- | --- |
| 000 | CJV | Conditional Jump to Vector-RESET Stack File and Counters if cond_val = TRUE |
| 001 | CJP | Conditional Jump to Immediate (IMM) field |
| 010 | CJS | Conditional Jump Subroutine to IMM field-Push PC |
| 011 | CRT | Conditional Return-Pop PC |
| 100 | MJP | M-Way Jump for i = 0 to 3; jmp_adr(i) = [mod(i) & cc(i)] | imm(i); |
| 101 | MJS | M-Way Jump Subroutine-Push PC for i = 0 to 3; jmp_adr(i) = [mod(i) & cc(i)] | imm(i); |
| 110 | LDP | Load Counter Push-Push PC on Stack File and push ABOS to Loop Counter Stack |
| 111 | DJF | Decrement and Jump to File if Ct0 = 1 (i.e., it is TRUE that Loop Counter equals zero), else Pop PC and Counters |

All instructions, other than M-way, are performed conditionally. Where the selected condition is false, the next address is the already-incremented PC value, that is, the current address+1. Bits 7 through 4 of each microinstruction are a COND_CODE field that designates one of sixteen possible sequencer condition codes. The Condition Code Mux selections for the instruction sequencer 1205 are defined in Table 59.

TABLE 59

| CC Code | Description (cond_val =) Note: if SCNOT = 1 then cond_val (output of Condition Code Mux 2107) is inverted |
|---|---|
| 0000 | ALWAYS = 1 |
| 0001 | SRC1 image descriptor Storage attribute |
| 0010 | SRC2 image descriptor Storage attribute |
| 0011 | DEST image descriptor Storage attribute |
| 0100 | GLOR = 1 |
| 0101 | SRC1 image descriptor Signed attribute |
| 0110 | SRC2 image descriptor Signed attribute |
| 0111 | DEST image descriptor Signed attribute |
| 1000 | ~size2[0] (i.e. true is size2 is even) |
| 1001 | GLOR_SAMPLE_PENDING = 1 |
| 1010 | (Src2'id = Dest'id) | | (Src2'stg = 0) |
| 1011 | Dest'mask = 1 |
| 1100 | min(size1,sizeD) < = 3 |
| 1101 | Abos = 0 |
| 1110† | NEVER (cond_val = 0): Loop Offset selection control |
| 1111† | NEVER (cond_val = 0): Pick1 selection control |

†The Code for these entries will ALWAYS be FALSE and are not affected by SCNOT.

The condition codes (shown in Table 1615) include Always (always TRUE), Never (always FALSE) and some codes (Loop Offset and Pickl Discrete) which evaluate as Never and perform other functions. Except where indicated, a condition code negation control, SCNOT, causes the inverse of the selected condition to be used.

The instruction sequencer 1205 supports basic subroutining and looping with a maximum nested depth of four. Nesting is provided by a Stack File 2101 and a Loop Stack 2103, both of depth four. Since both looping and subroutining use the Stack File 2101, a combined nesting of four, in any combination, is supported for these functions. During a push of either the Stack File 2101 or the-Loop Stack 2103, each register reads from the register above it on the stack while the top register receives the 'push' data. The previous contents of the bottom register are lost. During a pop of either stack, each register reads from the register below it on the stack while the bottom register loads 0. In addition to the Loop Stack 2103, a zero-based 6-bit counter, Up Loop Counter 2125 (which generates a signal called "Upcnt"), is provided to generate bit offset (BOS) values. The Up Loop Counter 2125 responds to the same controls as the loop counter (which is the top of the Loop Stack 2103). When the loop counter loads, Upcnt clears; and when the loop counter decrements, Upcnt increments. When the Loop Stack 2103 is popped, Upcnt is unaffected.

As explained earlier, the instruction sequencer 1205 begins execution of an operation based on the F3_reg 1907. The opcode stored in the F3_reg 1907 is supplied to the instruction sequencer 1205 as a Vector address 2109 and it begins execution with the Conditional Jump to Vector (CJV) instruction. The opcode in the F3_reg 1907 is a 7-bit value and is effectively offset (i.e., left-shifted) by 2-bits by being supplied as the Vector 2109 to bits [8:2] of the full 11-bit I-Seq Memory address. As a consequence of this offsetting, the 128 possible MCC IC instruction opcodes are mapped to the first 512 locations of the I-Seq Memory 1215. Note that both the Stack File 2101 and the Loop Stack 2103 are completely cleared on a CJV instruction and condition= True, that is, at the entry point of the opcode instruction.

The CJP instruction causes a conditional branch to the address supplied by the Imm field (bits 19:8) of the I-seq micro-instruction (see Table 57). The jump to subroutine (CJS) instruction is similar to CJP except that the value of the program counter 2105 is pushed to the Stack File 2101 in order to provide a return address for the subroutine. When a return (CRT) instruction is executed, the next address is read from the top of the Stack File 2101 and the Stack File 2101 is popped.

The multi-way branch (MJP) and multi-way jump to subroutine (MJS) instructions cause an unconditional branch (or jump subroutine) to the computed next address. The method for computing the next address is to begin with the 12-bit value contained within the Imm field of the micro-instruction, and then to logically-OR the four lower bits with the 4-bit value produced by AND-ing the Mod field 1505 value supplied by the F4_Reg 1801 with the CC bits (i.e., the cond-code bits (7:4) supplied by the I-sequencer memory 1215). With this method the programmer can specify a 2-way, 4-way, 8-way or 16-way branch. The CC field acts as a mask which determines the axes along which branching may occur. For example, where CC=1000 (binary), the branch is a two-way branch between Imm (Mod=0xxx) and Imm+8 (Mod=1xxx). (This assumes Imm(3)=0, the only sensible way to do this.) This is a two-way branch between addresses that are eight memory locations apart. Where CC=1001, the branch is a four-way branch between Imm, Imm+1, Imm+8, and Imm+9. Since the CC value is coded into the operation, and the Mod is a value supplied via the Ibus at run-time, it may be seen that the M-way branch does not alter execution based on operating conditions internal to the instruction sequencer 1205. Rather, it provides a means for expanding an opcode to perform multiple functions where the programmer uses the Mod field 1505 to select the desired function.

The LDP instruction initializes a loop sequence by pushing the contents of the PC 2105 onto the Stack File 2101 and pushing a loop count onto the Loop Stack 2103. The loop count is derived from the A-Bit Offset (ABOS) value that is computed for the PSEQ instruction word 2200 (i.e, the opcode and operand descriptors that are supplied as an input to the primitive sequencer 1207). The value ABOS−1 (i.e., ABOS minus 1) is loaded to the current loop counter to provide loop counts that range from ABOS−1 to 0, thereby providing ABOS iterations in all. (In the exemplary embodiment, an ABOS=0 results in 1 iteration as does ABOS=1.) When the DJF instruction is encountered, the current loop counter is tested and a branch to the address supplied by top of the stack file 2101 is taken if the count is not equal to zero. If the count is zero, the Stack File 2101 and Loop Stack 2103 are both popped, and execution falls through to the next address.

When the Condition Code field (CC) of the instruction sequencer microinstruction is either 14 or 15, a "continue" occurs regardless of the sequencer instruction (other than M-way). That is, execution falls through to the next address, and the selected function is performed. Where Loop Offset (CC=14) is selected in the CC field, the Upcnt register and Imm fields are combined with the individual BOS selects to provide BOS values for the primitive sequencer 1207. This is described more fully below. Where Pick1 Discrete is selected (CC=15), the five least significant bits of the Imm field provide the Pick1 signal that is passed to the primitive sequencer 1207.

In the exemplary embodiment, test and initialization of the ISEQ Memory 1215 is accomplished over the Direct Access (DA) port 2111 which provides 32-bit access of the ISEQ Memory 1215 via address mapping of bits [31:0], [63:32], and [79:64]. Access of bits [79:64] is accomplished with the low 16 bits [15:0] of the IBus 1807. Access of the ISEQ Memory 1215 by the IBus 1807 should occur only in an off-line condition, that is, when Step_Enable=False. The address map definition of the ISEQ Memory 1215 may be found in Table 55.

7.4 Tmp Image Control

The Tmp image descriptor may be varied under microcode control to provide the appropriate attributes for a particular operation. There are two I-seq Microinstruction fields that provide this control: the Tmp Image Descriptor control field (bits 76:73 of the ISEQ Memory word shown in Table 57) and the Tmp Image Descriptor Storage Control field (bits 79:77 of the ISEQ Memory word shown in Table 57). The set of Tmp Descriptor Commands (i.e., valid encodings of the Tmp Image Descriptor control field) are defined in Table 60. The set of Tmp Storage Commands (i.e., valid encodings of the Tmp Image Descriptor Storage Control field) are defined in Table 61.

TABLE 60

| Code | Tmp'Size | Tmp'Signed |
| --- | --- | --- |
| 0 | tmp_size | tmp_signed |
| 1 | tmp_size | !tmp_signed |
| 2 | tmp_size | 0 |
| 3 | tmp_size | 1 |
| 4 | tmp_size + 1 | tmp_signed |
| 5 | tmp_size − 1 | tmp_signed |
| 6 | tmp_size | src1_signed \| src2_signed |
| 7 | max(src1_size, src2_size) | src1_signed \| src2_signed |
| 8 | 1 | 0 |
| 9 | 32 | 1 |
| 10 | 36 | 1 |
| 11 | src1_size | src1_signed |
| 12 | src2_size | src2_signed |
| 13 | dest_size | dest_signed |
| 14 | src1_size + 1 | src1_signed |
| 15 | src1_size − 1 | src1_signed |

TABLE 61

| Code | Function |
| --- | --- |
| 0 | Nop |
| 1 | Tmp'Stg = S1not |
| 2 | Tmp'Stg = S2not |
| 3 | Tmp'Stg = Tnot |
| 4 | Tmp'Stg = Src1Src2 |
| 5 | Tmp'Stg = Dest |
| 6 | Tmp'Stg = PE RAM |
| 7 | Tmp'Stg = Page RAM |

The Tmp Descriptor Command provides control of the Tmp Size and Signed attributes, while the Tmp Storage Command provides control of the Tmp Storage attribute. All other attributes are hardwired and not within the control of the programmer.

The Tmp'Size and Signed attributes may be set directly (e.g., size=1, size=36) or indirectly in relation to an operand descriptor or the Tmp descriptor itself. It would be possible, for example, for the programmer to begin an operation by setting Tmp'Size to the Src1'Size, after which the size is counted down on each iteration of a loop by setting Size to Tmp'Size-1.

Since the programmer often finds it useful to employ that one of the PE RAM 601 or Page RAM 603 that is not the one specified for an operand or combination of operands (henceforth referred to as memory that is "opposite" in storage to such operand or operands), the Tmp Storage Control offers a number of ways to do this. Tmp storage may be set to the opposite of Src1 or Src2 storage (S1not, S2not) or opposite to its current value (Tnot). Tmp storage may be set to explicit values (PE RAM 601 or Page RAM 603) as well. Finally, a very natural way to determine storage is to use PE RAM 601 for Tmp storage unless both input operands utilize storage within the PE RAM 601, in which case PAGE RAM 603 is used (indicated by "Src1Src2" in Table 61). Because Tmp storage may be varied on each primitive of an operation, a great deal of flexibility is afforded the programmer for steering temporary data. It is even feasible to keep two separate temporary images, one in PE RAM 601 and the other in Page RAM 603, all using the same Tmp image descriptor.

7.5 P-seq Command Generation

The primary task of the instruction sequencer 1205 is to dispatch PSEQ instruction words 2200 to the primitive sequencer 1207. In order to begin execution of a primitive, three operands and a primitive sequencer (P-seq) execution address are required. The execution address (Pseq_Jmpin) specifies a single instruction, stored in the P-Sequencer memory 1217, that is to be executed zero or more times. (Executing an instruction zero times could be the result of run-time conditions.) The instruction is executed once for each bit in the range of bits specified for the destination image. The sequence of bit operations corresponding to a single dispatch from the instruction sequencer 1205 is known as a 'primitive'.

The three operands used by primitives are called "Left", "Right" and "Answer", and the allocated storage locations for these operands are defined by corresponding image descriptors 1301 stored in the F5 working registers 1811. These correspond roughly to 'Src1', Src2' and 'Dest' as defined for the Ibus 1807 and F4 working registers 1809. It is, however, possible to specify any of a number of operands (located in the F4 working registers 1809) (see Table 1918) to be passed as an input (i.e., Left or Right) P-seq operand. The possible I-seq operands that may be passed as Left or Right P-seq operands are defined in Table 62A. The corresponding codes for specifing these operands would be applied to the LIMG_SEL and RIMG_SEL fields in the I-seq microinstruction (see Table 57).

TABLE 62A

| Code | Image Selected |
| --- | --- |
| 0 | Zero Image |
| 1 | Src1 |
| 2 | Src2 |
| 3 | Dest |
| 4 | Tmp |
| 5 | Tnot |
| 6 | PeTmp |
| 7 | PgTmp |

Since the allocated storage for an input operand is presumed to be for read access only, any of these I-seq operands may be chosen as needed. A similar selection of operands is available for the Answer P-seq operand, as shown by the codes which may be applied to the AIMG_Sel field given in Table 62B. However, because the Answer operand is presumed to be a write (output) operand, only Dest or one of the Tmp selections allow the result of the operation to be written to memory. Source operands (Src1, Src2) may not be written. This is the programming model enforced with respect to Tbus operands.

TABLE 62B

| Code | Image Selected |
|---|---|
| 0 | Write access inhibited |
| 1 | Write access inhibited |
| 2 | Write access inhibited |
| 3 | Dest |
| 4 | Tmp |
| 5 | Tnot |
| 6 | PeTmp |
| 7 | PgTmp |

The various Tmp image codes allow some flexibility with respect to specifying the Tmp image to use. The Tmp image opposite that specified by the Tmp storage attribute may be selected (Tnot) or an explicit Tmp storage may be selected regardless of the Tmp storage value (PeTmp, PgTmp).

In addition to the image selection, each P-seq operand must have a starting bit offset (BOS) specified. In the case of the Answer operand, both starting and ending bits are specified. The range of BOS values specified for the Answer operand determines the span of the primitive for all operands. For example, if a primitive is dispatched where the Answer bit range is 4 . . . 7, the right start bit is 0 and the left start bit is 2, the primitive will execute a first bit operation on Answer(4), Right(0) and Left(2); a second bit operation on Answer(5), Right(1) and Left(3); and so on up to Answer(7), Right(3) and Left(5). With the exception of Signal Passing (see below), all bit operations within the primitive have identical commands, differing only in the PE memory addresses, which increment from bit operation to bit operation.

There are four bit offset fields which respectively correspond to the Left start bit (Lbos), Right start bit (Rbos), Answer start bit (Abos) and Answer end bit (Aend). The commands are identical in operation, each generating a 6-bit number indicating the desired bit offset.

The direction of bit sequencing is determined with the Answer Direction control. In the exemplary embodiment, setting Adir=0 instructs bit sequencing to proceed in the upward direction. Where sequencing in the down direction is desired, Adir=1 is specified and Abos=start_bos and Aend=end_bos are specified. Since the count direction is down, the Abos will generally be greater than Aend. However, if the count direction conflicts with the order of Abos and Aend, no iterations are executed.

Some additional controls, discussed in more detail below, include Skew Inhibit (Skin), Pickl Discrete, AltSel, and the SignSig. The Signal Passing controls (SigIn, SigOut) are passed to the P-seq as is (see section below entitled "Signal Passing" for more information).

7.5.1 Operand Select

A primitive may be thought of as a subroutine to the operation being performed in the instruction sequencer 1205. (This is not to be confused with subroutines that are actually performed within the instruction sequencer 1205.) Each primitive that is dispatched is passed two input operands (Left and Right) and an output operand (Answer). The operands that the instruction sequencer 1205 may pass include any of the F4 working registers 1809 (Src1, Src2, Dest, Tmp) or the Zero image (see Table 33). Permissible sources for the input operands are defined in Table 62A. Permissible sources for the output operand are defined in Table 62B. If the codes 0, 1 or 2 from Table 62B is selected as the Answer operand, the primitive will execute normally, but no write to PE-accessible memory will take place. The effect of the operation will be to generate appropriate flags, but have no other effect.

The Tmp image may be specified several ways, including Tmp, Tnot (Tmp that has storage opposite the Tmp'Storage attribute), PeTmp (i.e., the Tmp location in the PE RAM 601), and PgTmp (i.e., the Tmp location in the Page RAM 603). With this flexibility it is possible to read one Tmp (e.g., the Tmp location in PE RAM 601) and write the other (e.g., the Tmp location in Page RAM 603) in a single primitive.

7.5.2 Bit Offset Select

The instruction sequencer 1205 supplies four bit offset (BOS) values to the primitive sequencer 1207: the Left start bit (Lbos), Right start bit (Rbos), Answer start bit (Abos) and Answer end bit (Aend). These values are generated in response to four I-seq bit offset select commands: Lbos_sel, Rbos_sel, Abos_sel and Aend_sel.

Each of the four BOS select fields utilizes the same encoding scheme for designating a Bit Offset amount. The Bit Offset encoding scheme used in the exemplary embodiment is shown in Table 63.

TABLE 63

| Code | BOS Select |
|---|---|
| 0 . . . 35 | bit 0 . . . bit 35 |
| 36 | msb1 |
| 37 | msb2 |
| 38 | msbD |
| 39 | msbT |
| 40 | PreL |
| 41 | PreH |
| 42 | PreL + 1 |
| 43 | PreH + 1 |
| 44 | max(msb1 − PreL,0) |
| 45 | max(size1 − PreL,0) |
| 46 | min(PreH − PreL, msbD) |
| 47 | min(PreH − PreL, msbD) + 1 |
| 48 | max(size1,size2) + (sign1 ^ sign2) |
| 49 | max(msb1,msb2) + (sign1 ^ sign2) |
| 50 | min(PreH, msbD) |
| 51 | max(PreL − 1, 0) |
| 52 | <<unused>> |
| 53 | [(min(size1,sizeD) + 2)/3] − 2 (integer divide) |
| 54 | max(0, size2 − 4) |
| 55 | max(0, size2 − 3) |
| 56 | max(0, size2 − 2) |
| 57 | max(0, size2 − 5) |
| 58 | size2 |
| 59 | sizeD |
| 60 | size1 |
| 61 | max(0,sizeD − 2) |
| 62 | (msb2)/2 |
| 63 | <<unused>> |

Note: msbX is defined as follows: msbX = max(sizeX − 1, 0)
This formula is used for msb1, msb2, msbD & msbT The first table entry, codes 0 through 35, specifies how bit offsets of any number from 0 through 35 would be encoded, (i.e., the bit offset is equal to the code given). The remaining codes, 36 through 62 compute bit offsets based on formulas as shown in the table. For example, code 36, which specifies msb1, provides a bit offset equal to Src1'size-1. This formula is the same regardless of which operand the bit offset is generated for. So if Rbos_sel=36, then Rbos will be Src1'size-1, even if Src1 is not selected as the Right operand.

Some bit offsets employ the Preload register 1837. Where the Preload Low (PreL) is specified, the six least significant bits (5:0) of the Preload register 1837 are used. Where Preload High (PreH) is specified, the next six bits (11:6) are used.

An additional step in bit offset generation is performed when CC=14 and a non-M-way sequencer command is specified. This condition code generates a Never condition and provides the 12 bit Imm field value for use in loop offset control of the BOS calculation. When loop offset is specified, it is used in the calculation of all four BOS values.

In another aspect of the invention, which will be described with reference to FIG. 22B, loop offset control logic 2113 generates a BOS value by taking the BOS value generated through the normal BOS select logic 2115, and applying this to a first input of an adder 2119. An offset value is applied to a second input of the adder 2119. The offset is supplied by offset generation logic 2117 that multiplies a "k" value (see Table 2120) by the current Upcnt value supplied at the output of an up loop counter 2125 (see FIG. 22A). In the exemplary embodiment, "k" values are encoded into ISEQ microinstructions as defined in Table 64.

TABLE 64

| Code | K Value |
| --- | --- |
| 0 | 0 |
| 1 | 1 |
| 2 | 2 |
| 3 | 3 |
| 4 | 0 |
| 5 | −3 |
| 6 | −2 |
| 7 | −1 |

Each 'k' value is supplied by a three bit segment of the 12 bit Imm field (LBK, RBK, ABK, AEK as shown in Table 57). For example, an RBK of 6 (k=−2), Upcnt register of 5 and Rbos_sel of 20 would yield an Rbos of (−2)*5+20=10. If the LBK value were 0 in this example, the Lbos value would be unaffected by the loop offset logic.

In the exemplary embodiment, the output from the adder 2119 is a 9-bit signed value. This value is applied to logic 2121 that adjusts the value to zero if it was negative, and truncates the value to 6 bits. This value is applied to an input of a multiplexor 2123 so that it may be selected whenever loop offset is activated.

The use of loop offset control provides a means for embedding primitives in loops in a way that allows the bit offset on each iteration to be computed from the current loop count. The use of 'k' values supports operations such as fast multiply where each iteration of the loop operates upon multiple bits. The loop offset mechanism may even be employed as a parameter passing mechanism for I-seq subroutines, allowing common code to operate upon different bit offsets depending on the value of the loop count.

7.5.3 Sig Sign

The SigSign control provides a means for generating a Sig (see section below entitled "Signal Passing") that represents the sign bit of a computation result. Where the Answer operand is a signed image, the sign bit is usually generated on the final bit operation of the primitive, and is therefore equal to the final stored bit plane. The programmer can readily pass this bitplane value as the SigOut of a primitive. However, if the Answer is an unsigned image, the faial bit operation is simply generating the result MSB, not the sign bit. In this case, it is necessary to provide a zero plane as the SigOut. The SigSign operates by changing the value of the SigOut field (in the I-seq microinstruction—see Table 57) which is passed to P-seq to indicate Zero if the Answer image is unsigned. This allows the programmer to specify a SigOut as though the Answer is a signed image and get the correct sign Sig for all cases.

7.5.4 Pick1 Discrete

Pick1 Discretes are single event signals which may be specified by the I-seq Pick1 command. Pick1 commands are used to provide controls for functions such as GLOR extraction and I/O dispatch. The Pick1 command is specified under microcode control in the instruction sequencer 1205 and is propagated to the primitive sequencer 1207 and Overlay logic 1209. The point of sampling a particular discrete depends on the function to be performed. The Pick1 discretes are shown in Table 65.

The Pick1 command is a 5-bit value which may specify one of thirty-two functions to perform. The Pick1 command is invoked by selecting the CC=15 condition code and a non-M-way instruction during sequencing. The least significant five bits of Imm supply the Pick1 command value which is propagated to the primitive sequencer 1207.

In the exemplary embodiment, the 5-bit PICK1 field in the ISEQ microinstruction is encoded as defined in Table 65.

TABLE 65

| Discrete Operation | 5-bit Hex Code |
| --- | --- |
| NOP | 0x00 |
| OVER_SAMPLE_TEST | 0x01 |
| CGLOR_CLEAR | 0x02 |
| CGLOR_SAMPLE | 0x03 |
| CGLOR_OVERLAY_NS | 0x04 |
| CGLOR_OVERLAY_EW | 0x05 |
| CGLOR_SAMPLE_AND_OVERLAY_NS | 0x06 |
| CGLOR_SAMPLE_AND_OVERLAY_EW | 0x07 |
| PSEQ_EVENT | 0x08 |
| OVER_TEST | 0x09 |
| QGLOR_CLEAR | 0x0a |
| QGLOR_SAMPLE | 0x0b |
| QGLOR_OVERLAY_NS | 0x0c |
| QGLOR_OVERLAY_EW | 0x0d |
| QGLOR_SAMPLE_AND_OVERLAY_NS | 0x0e |
| QGLOR_SAMPLE_AND_OVERLAY_EW | 0x0f |
| XPAT_CLEAR | 0x10 |
| XPAT_LOAD_COL_GLOR | 0x11 |
| XPAT_SHIFT_RIGHT | 0x12 |
| XPAT_SHIFT_LEFT | 0x13 |
| YPAT_CLEAR | 0x14 |
| YPAT_LOAD_ROW_GLOR | 0x15 |
| YPAT_SHIFT_RIGHT | 0x16 |
| YPAT_SHIFT_LEFT | 0x17 |
| IO_MOVE_TO_PE | 0x18 |
| IO_MOVE_TO_IO | 0x19 |
| IO_HITPLANE | 0x1a |
| IO_HISTOGRAM | 0x1b |
| IO_PAGE_TO_PE | 0x1c |
| IO_PAGE_TO_IO | 0x1d |

7.5.5 Skew Inhibit (Skin)

The Skew Inhibit is a single bit command, specifiable in the ISEQ microinstruction, which alternatively allows (Skin=0) or inhibits (Skin=1) skewing during bit operations. Skewing in the Overlay Logic 1209 is controlled by the bits in the Mod field 1505 of the MCC IC input instruction 1501, which are passed along by the instruction sequencer 1205 and primitive sequencer 1207, following the operation all the way to the Overlay Logic 1209. The Overlay Logic 1209 has no means for determining when skewing is appropriate, so in the exemplary embodiment it would, in the absence of skew inhibit, skew operands any time the bits specified by the Mod field 1505 were non-zero. The Skin control inhibits skewing under microcode control by zeroing the Mod bits that are passed to the primitive sequencer 1207 when Skin is active.

8. Allocation/Deallocation Unit 1211

The Allocation/Deallocation Unit (Alloc) 1211 is the source of physical addresses for both the PE RAM 601 and the Page RAM 603. As images are allocated and deallocated via IBus Instructions, the Alloc 1211 will assign and deassign physical addresses to the image descriptors 1301 maintained in the IDT 1203. An image may be allocated to either the PE RAM 601 or to the Page RAM 603 and as a mask image or a non-mask image. In the case of mask images, a physical address designating a single bit plane is assigned to the image. Non-mask images will be assigned so-called "nybble addresses" that point to the start of a nybble plane. A nybble address represents four bit planes, and as such need not be capable of pointing to every single bit plane within either of the PE or Page RAMs 601, 603. A nybble address is derived from a physical addresses by eliminating the two least significant bits of the physical address. These two bits are implied by bit offsets, and are provided in the primitive sequencer 1207.

The Alloc 1211 manages four separate address pools: two nybble address pools and two bit address pools with the PE RAM 601 and Page RAM 603 assigned one bit pool and one nybble pool each. The four address pools are depicted collectively as the pool memory 1213. The PE RAM 601 and Page RAM 603 each have dedicated nybble and bit pools. These pools must be initialized prior to the execution of any Allocation Instructions. As images are allocated, the pools are read and addresses assigned to images. Likewise, as images are deallocated, addresses are returned to the pools. Updated image descriptors 1301 are written to the IDT 1203.

In the exemplary embodiment, the various pool memories are as defined in Table 66.

TABLE 66

| Name | Description | Size |
|---|---|---|
| pg_nyb | PG RAM nybble pool | 256 × 8 |
| pg_bit | PG RAM bit pool | 128 × 8 |
| pe_nyb | PE RAM nybble pool | 64 × 8 |
| pe_bit | PE RAM bit pool | 64 × 8 |

The pg_nyb pool may be initialized with up to 256 nybble addresses, enough to allocate the entire 1024 memory locations in the Page RAM 603. The pg_bit pool may be initialized with up to 128 bit addresses leaving 896 address locations corresponding to 224 nybble addresses for the pg nyb. If fewer than 128 memory addresses are allocated as single bit planes, then the nybble pool may need to handle more than 224 nybble planes. However, in the exemplary embodiment, the low 36 bits of each PE-accessible memory (i.e., PE RAM 601 and Page RAM 603) are typically set aside for Tmp (i.e., not put into either the nybble or bit pool), and would therefore reduce further the number of nybble addresses initialized in each of the nybble pools.

Further with respect to allocation of addresses to the pg_bit pool, the most significant two bits of the 10-bit address are implied to be 0 because only eight bits are available to form the address. (It will be recalled that a mask image uses only the 8-bit nybo field for specifying an address in an image descriptor.) Thus, the pg_bit pool should be initialized with addresses from the lowest 256 memory locations of the Page RAM 603.

The pe_nyb and pe_bit pools are similarly initialized with up to 64 nybble addresses and 64 bit addresses respectively. As explained earlier, the MCC IC 101 maintains two Tmp images hard-wire located to nybble addresses 0x0 through 0x8. In normal operation where the tmp images are utilized, the address pool initialization should not include these allocated temp addresses.

8.1 Interface between Alloc 1211 and Instruction Sequencer 1205

An allocation or deallocation operation begins when the instruction sequencer 1205 accepts an instruction, and the updated F4 contains an Alloc or Dealloc Opcode. The F4 opcode and the value of the f4_dest working register 1809 determine allocation/deallocation execution. There are two distinct operations associated with allocation: "allocation" of the image descriptor 1301 and "populating" the image descriptor 1301 with bit or nybble addresses. Each of these operations requires the Alloc 1211 to suspend operation of the instruction sequencer 1205 until the image descriptor 1301 in the IDT 1203 can be updated. In the case of mask allocation, the Alloc 1211 allocates an image descriptor 1301 and populates (assigns) the image descriptor 1301 with a RAM bit address. For a non-mask allocation, the Alloc 1211 only causes allocation of an image descriptor 1301 to take place. Population of the image descriptor 1301 is not performed until the image descriptor is actually used as a destination image. During a non-mask population process, the Alloc 1211 will suspend operation of the instruction sequencer 1205 until the IDT 1203 can be updated with a fully populated image descriptor 1301 (i.e., an image descriptor 1301 in which all of the nybble addresses have been assigned).

8.2 Interface between Alloc 1211 and IDT 1203

The Alloc 1211 is the primary means for updating image descriptors 1301 in the IDT 1203. Every time an instruction requires the image descriptor 1301 contained in the F4 Dest working register 1809 to be updated due to an Alloc, Dealloc, or Populate operation, the image descriptor 1301 in the IDT 1203 is also updated. An image descriptor 1301 in the IDT 1203 is updated with a single write from the Alloc 1211. When an allocation is performed utilizing information from the Src1 operand, the Fetch Unit 1201 uses descriptor information contained in the IDT 1203 to create the next contents for the F4 dest working register 1809.

8.3 Control Interface

The Control Interface (Instruction Bus 111 and additional miscellaneous control signals 113—see Table 1) is used to initialize the address pools and monitor their status. The PE and Page pool control interface resources are defined in Table 55. The pools are implemented as first-in-first-out (FIFO) memories which must be initialized by serially writing the bit and nybble addresses to the pools. In the exemplary embodiment, these pools also support a paralleled 32-bit access mode for testing purposes only.

The Alloc 1211 has several features to aid control interface control, monitoring, and configuration of the pools:

Writes to full FIFOs and reads from empty FIFOs are disallowed, and will cause an access error interrupt signal to the ISR 1813.

Current and lowest FIFO levels may be read at any time.

A programmable "almost empty offset" value may be initialized (via Direct Mode Access—see Table 55). A read from a FIFO having a level that is less than or equal to the almost empty offset value will cause an almost empty interrupt to the ISR 1813.

FIFO reset functions are supported.

8.4 Theory of Operation of Alloc 1211

The Alloc 1211 performs three basic operations: image allocation, image population, and image deallocation. In all cases, the Alloc 1211 performs a write-back to the IDT 1203. When a write-back to the IDT 1203 is required, the exemplary instruction sequencer 1205 requires a minimum of two clock cycles for the Instruction execution. This allows time for the IDT 1203 to be updated for subsequent uses of the written image descriptor 1301. If the next ISEQ instruction requires the same Image, the write-back data from the F4

Dest working register 1809 is used instead of the (now old) data contained in IDT 1203. For a mask image, both allocation and population occur at the time that the Alloc opcode is specified. For a non-mask image, only the allocation occurs with the Alloc opcode. The population of the non-mask image is delayed until the image is used as a destination operand.

8.4.1 Image Allocation

Image allocation involves the creation of an image descriptor. Depending on which allocation opcode is used, an image may alternatively be allocated to the PE RAM 601 or to the Page RAM 603. Allocation begins at the F3 stage of the fetch pipe. The Alloc Opcode is decoded and an image descriptor for the F4 Dest working register 1809 is generated in accordance with specifications indicated by the Alloc instruction opcode in combination with the bits in the Mod field 1505. Upon the next accept by the instruction sequencer 1205, the F4_reg 1801 and the F4 working registers 1809 are updated. If an allocation of an already allocated image descriptor 1301 is attempted, the allocation is allowed, but an interrupt is generated to the ISR 1813. An attempt to allocate the image descriptors 1301 stored at any of the locations 0x0, 0x1, or 0x2 in the IDT 1211 will be disallowed and will also generate an interrupt.

For a mask image allocation, a PE bit pool or Page bit pool memory address is overlaid upon the image descriptor 1301 stored in the F4 Dest working register 1809, and is also written to the appropriate location in the IDT 1203. For a non-mask image allocation, memory addresses are not assigned. Instead, a non-populated image descriptor is written to the IDT 1203. For non-mask images, population will occur later when the image descriptor is used for a destination operand.

8.4.2 Image Population

As stated above, a mask image is allocated during the execution of the Alloc Opcode. The Alloc 1211 populates non-mask images by monitoring the Unpopulated attribute of the image descriptor 1301 stored in the F4 Dest working register 1809. If the Unpopulated bit is active, the Alloc 1211 suspends operation of the instruction sequencer 1205 until the image descriptor 1301 has been assigned its required nybble addresses. Once populated, the F4 Dest working register 1809 is updated, the IDT 1203 is written, and the instruction sequencer 1205 is permitted to resume its operation.

Before an image is populated, the Alloc 1211 examines the levels of the image address pools in order to verify the existence of sufficient resources to populate the image descriptor 1301. If the resources are available, the populate process proceeds. If there are insufficient resources to populate the image descriptor 1301, the Alloc 1211 performs further resource checks. For example, Allocation and Deallocation are concurrent processes, so it is possible for an Allocation to "get ahead" of previously launched Deallocation processes. Accordingly, the Alloc 1211 will determine whether the required resources are scheduled to become available, and if so, it will wait for them. For a PE RAM population, if neither the PE pools nor a deallocation process is active, then the Alloc 1211 will attempt to reassign the allocation to Page RAM and update the descriptor accordingly. (In the exemplary embodiment, the reverse is not true; that is, if a Page RAM allocation can't proceed, then there is no attempt to populate the PE RAM 601 instead.)

If all populate options can not accommodate a requested image populate, the Alloc 1211 will issue an allocation trap interrupt and freeze the fetch pipe. For this situation, the pipe should be flushed via the fetch pipe read operation, discussed above in the section entitled Direct Mode Access. Once the fetch pipe has been flushed, pipe execution may be restarted by clearing the allocation trap interrupt in the ISR 1813.

8.4.3 Image Deallocation

The deallocation process is independent of the allocation process within the Alloc 1211. The function of the deallocation process is to return bit and nybble addresses to their respective pools 1213 and to update the deallocated image descriptor 1301 within the IDT 1203. When a Dealloc Opcode is decoded in the F4_reg 1801, the Dest image descriptor is updated by setting "allocated=false" and then written to the IDT 1203. The image descriptor 1301 is also written to position 0 of a deallocation queue within the Alloc 1211. The deallocation queue is two deep (0 and 1), and bit and nybble addresses are returned to their pools from queue position 1. Thus, at any time, the deallocation queue in the Alloc 1211 may contain at most two image descriptors 1301. If both queue positions contain active image descriptors 1301 to be deallocated, then the Alloc 1211 suspends the operation of the instruction sequencer 1205 until a queue position becomes free.

RAM addresses are serially returned to the pool memory 1213 (one per clock) from least significant nybble to the most significant nybble. Mask images only require one clock. A deallocate error interrupt will be generated if an attempt is made to deallocate an image descriptor 1301 that has not been allocated, if the image descriptor 1301 is not populated, or if it is a scalar—no addresses will be returned to the pools for an error condition.

9. Primitive Sequencer (PSEQ) 1207

Referring now to FIG. 23, the primitive sequencer 1207 receives a PSEQ instruction word 2200 from the instruction sequencer 1205. The format of the PSEQ instruction word 2200 is defined in Table 67.

TABLE 67

| Field | Description |
| --- | --- |
| mc_adr 2201 | PSEQ Memory Address |
| A_d_u 2203 | Answer Bit sequencing: (0 = increment, 1 = decrement) |
| A_end 2205 | Answer Ending Bit |
| A_bos 2207 | Answer Bit OffSet |
| R_bos 2209 | Right Bit OffSet |
| R_skew 2211 | skew selection for EW (Right image) from F4_reg Mod field |
| L_bos 2213 | Left Bit OffSet |
| L_skew 2215 | skew selection for NS (Left image) from F4_reg Mod field |
| sig_in 2217 | Signal Passing Input Specification |
| sig_out 2219 | Signal Passing Output Specification |
| discrete 2221 | Discrete command field (see section describing Pick1 discrete) |
| alt_sel 2223 | Selection control for PE Command Word bits that have alternate values. See sections entitled "PSEQ Microcode Memory Bit Assigments" and "PE Command Word Encoding" for more information. |

The PSEQ instruction word 2200 includes an mc_adr field 2201 that contains the address of a PSEQ microcode word, stored in the PSEQ memory 1217. The PSEQ microcode word contains information for generating a PE command word 1001. This PSEQ microcode word is selectively modified to accomplish signal passing before being passed to the Overlay logic. (See section entitled "Signal Passing" for more information.) The PSEQ microcode word that is fetched from the PSEQ memory 1217 will be executed one time for each bit of the destination image range [A_bos . .

. A_end] if the commanded direction (as designated by an A_d_u field 1203) decreases the difference between the value of the A_bos field 2207 and the value of the A_end field 2205. The A_bos field 2207 (Answer Bit Offset) will be loaded into a counter and incremented or decremented in the commanded direction with the resulting PE command word 1001 being passed to the Overlay logic 1209 once for each bit. If the commanded direction is opposite to the order of the A_bos and A_end fields 2207, 2205 (Answer Ending Bit) (i.e., if the commanded direction increases the difference between the A_bos and the A_end fields 2207, 2205) then only one output instruction will be executed. The primitive sequencer 1207 will always execute whatever instruction is clocked into its instruction register (when the primitive sequencer 1207 is able to accept it). If the instruction sequencer 1205 runs out of instructions (i.e., if the instruction sequencer 1205 finishes an operation and has no more pending in the F3_reg 1909), it will send a predefined "IDLE" instruction to the primitive sequencer 1207 along with NULL image descriptors (e.g., image descriptors consisting of all zeros), and a SigOut which matches that of the last non-idle instruction sent to the primitive sequencer 1207. In the exemplary embodiment, the PSEQ memory 1217 location for the IDLE primitive has a PSEQ microcode word with all fields zeroed (NOPs).

9.1 Instruction flow

In response to the primitive sequencer 1207 accepting a PSEQ instruction word 2200 from the instruction sequencer 1205, the A_bos field 2207 is loaded into a counter (A_bos-counter), and the accept line to the instruction sequencer 1205 is negated until the A_bos-counter is equal to the contents of the A_end field 2205 (if the commanded direction is opposite to the direction of A_end). In the event that the commanded bit-sequencing direction is opposite to that which would be required to sequence towards A_end, the next PSEQ instruction word 2200 will be accepted, with the result being that the current PSEQ instruction 2200 will be executed for only one bit-offset. In the exemplary embodiment, the primitive sequencer 1207 contains no microcode sequencing capability and the only sequencing is the bit-offset sequencing (i.e., the same PSEQ instruction 2200 is executed repeatedly while the bit-offset values increment or decrement).

9.2 Interface Definition

Signals defined for the interfaces to the primitive sequencer 1207 according to the exemplary embodiment are shown in Table 68.

TABLE 68

| I/O | size | Name | Description |
|---|---|---|---|
| I | 1 | pclk | processor clock |
| I | 1 | reset | a synchronous reset signal |
| I | 1 | step_enable | a clock enable signal for single-stepping |
| I | 80 | iseq_L_id | Left Image Descriptor |
|   | 80 | iseq_R_id | Right Image Descriptor |
|   | 80 | iseq_A_id | Answer Image Descriptor |
| I | 51 | iseq_pseq_instruction | I-Seq's instruction to the P-Seq (ref. FIG. 23) |
| I | 16 | iseq_ns_skew_preload | preloaded skew count (−32768 .. +32767) |
|   | 16 | iseq_ew_skew_preload | |
| I | 1 | ovl_pseq_accept | signals that the overlay logic is accepting the instruction from the P-Seq |
| O | 1 | pseq_iseq_accept | signals that P-seq is accepting the input instruction from the I-seq |
| O | 36 | pseq_pe_cw | PE command word to the overlay |
| O | 5 | pseq_discrete_command | (ref. Table 65 for assignments) |
| O | 1 | pseq_profile_1 | P-Seq profile control |
| O | 1 | pseq_profile_2 | P-Seq profile control |
| O | 10 | pseq_L_address | Left Image address |
|   | 1 | pseq_L_page_pe | Left Image source (1 = Page RAM, 0 = PE RAM) |
|   | 1 | pseq_L_scalar | Left Image is a scalar |
|   | 1 | pseq_L_scalar_value | Left Image scalar value for this bit of the image |
| O | 10 | pseq_R_address | Right Image address |
|   | 1 | pseq_R_page_pe | Right Image source (1 = Page RAM, 0 = PE RAM) |
|   | 1 | pseq_R_scalar | Right Image is a scalar |
|   | 1 | pseq_R_scalar_value | Right Image scalar value for this bit of the image |
| O | 10 | pseq_A_address | Answer Image address |
|   | 1 | pseq_A_page_pe | Answer Image destination (1 = Page RAM, 0 = PE RAM) |
|   | 1 | pseq_A_scalar | Answer Image is a scalar (will block writes to ram) |
| O | 2 | pseq_ew_skew | contains skew selection from Mod bits (−1,0,+1,preload) |
|   | 2 | pseq_ns_skew | |
| O | 16 | pseq_ns_skew_preload | A registered copy of I-Sequencer preload register, sampled only when the P-Sequencer accepts an instruction. |
|   | 16 | pseq_ew_skew_preload | |
| O | 1 | pseq_io_start | start strobe for I/O Sequencer |
| O | 3 | pseq_io_operation | I/O Operation Type (Move to/from IORAM, Hitplane, Histogram, Page to/from IORAM) |
| O | 11 | pseq_ioram_base_adr | base address for accesses to I/O RAM |
| O | 80 | pseq_io_id | Image Descriptor for I/O operation |

9.3 PSEO Microcode Memory Bit Assignments

In the exemplary embodiment, the PSEQ microcode word, stored in the PSEQ memory 1217, is 40-bits wide, and has bit assignments as shown in Table 69A.

TABLE 69A

| 39:34 | 33:0 |
|---|---|
| Alternate Command | Encoded PSEQ Command Word |

A decoding process takes place in the Primitive Sequencer 1207 that converts the encoded PE command word into a PSEQ Command Word format, as shown in Table 69B.

TABLE 69B

| 37:36 | 35 | 34:0 |
|---|---|---|
| Profile(1:0) | Inhibit Wr/Rd Conflict | PE Cmd Wd |

The PE Command Word is conditionally replaced by a NOP (i.e., all bits made zero) if the direction of requested bit sequencing (indicated by the A_d_u field 2203) would move away from the ending bit (indicated by the A_end field 2205). The PE Command Word (34:0) is passed to the Overlay logic 1209 after modification for signal passing. The contents of the Inhibit Wr/Rd Conflict field (bit 35) is passed directly to the Overlay logic 1209. The two Profile bits are passed to the profile logic for programmable profiling of PSEQ microcode events.

In the exemplary embodiment, the total number of control signals derived from the PE microcode word is 38 and the depth of the P-Sequencer microstore 1217 is 512. Each Primitive Store word may be invoked by zero or more (i.e., any number of) PSEQ instructions 2200 (shown as iseq_pseq_instruction in Table 68). That is, these instructions are reusable. Collectively, the Primitive Store is intended to represent a set of primitive commands that are sufficient for the MCC IC 101 instruction set. In some embodiments, however, the set of commands required is greater than 512. Consequently, in another aspect of the invention, more instructions are provided from the same set of instructions by exploiting redundancy in the set. For example, consider the following two commands:

1) ns:=0 ew:=bram c:=plus wram:=plus
2) ns:=1 ew:=bram c:=plus wram:=plus

These commands are identical to one another except for the LSB of the ns command field. If an alternate ns_cmd(0) were encoded in the same microcode word, both commands can be encoded in one instruction, with an external control (alt_sel) being used to determine whether the default or alternate ns_cmd(0) is to be used in a particular case. This approach is implemented in two parts:

The first part of the solution is to increase the number of alternate bits available by encoding portions of the primitive command (cm, profile) and freeing those bits for use as alternate command bits. In the exemplary embodiment, this gives six bits to use. The encoding is used in the following way: Where mode_cmd ≠3, the CM and Profile commands are decoded as '0'. Where mode_cmd=3, the CM and Profile commands are derived from other command bits as shown in Table 71, and those command bits are, in turn, decoded as zero. (As a result, some command combinations are not possible.)

Next, the optimum set of command bits to serve as alternates is determined. This set is shown in Table 72. When the Alt_Sel field 2223 from the PSEQ instruction 2200 is zero, the P-seq command word 2301 (33:0) is used as-is. When Alt_Sel=1, the six alternate command bits are substituted for the corresponding PSEQ command word bits.

To summarize, in this alternative embodiment, some command set redundancy and spare microstore width have been traded for an effective increase in depth (of an estimated 120–140).

9.4 PE Command Word Generation

In the exemplary embodiment, the generated command for the Overlay logic 1209 includes the following items, defined in Table 70:

TABLE 70

| Field | Description |
|---|---|
| PE command word | read from PSEQ memory 1217, missing field (CM and Profile commands) decoded (and modified for signal passing) |
| Inhibit Wr/Rd Conflict | read from PSEQ memory 1217, this allows the microcoder to selectively inhibit resolution of a Write followed by a Read (of the same location) conflict |
| Left Image address | generated from image descriptor and bit offset as described below |
| Right Image address | generated from image descriptor and bit offset as described below |
| Answer Image address | generated from image descriptor and bit offset as described below |
| Left Skew Mod | copied from primitive sequencer instruction (L_skew) |
| Left Skew Preload | registered copy of instruction sequencer Preload register |
| Right Skew Mod | copied from primitive sequencer instruction (R_skew) |
| Right Skew Preload | registered copy of instruction sequencer Preload register |
| Discrete Command Word | copy of discrete field 2221 from PSEQ instruction 2200 |

9.4.1 PE Command Word Encoding

In order to reduce the required depth of PSEQ memory 1217, the PE Command word is encoded. The CM_SEL field of the PE Cmd Wd and the profile bits (sent to the profiling logic) are encoded. In addition, six of the lower 30 bits of the PE Cmd Wd stored in P-seq microstore have an alternate value stored in the "Alternate Cmd Bits" field (bits 39:34).

The CM-SEL and profile bits are decoded by using the reserved bit combination of the MODE_CMD field (mode 3) and 4 other bits as shown in Table 71. For any location in the PSEQ memory 1217 that has a MODE_CMD field of 3 (reserved), the MODE-CMD field and each of the four bits used in the decode of CM_SEL and profile bits will have their corresponding positions in the overlay PE Cmd Wd replaced with a zero.

TABLE 71

| u-store Mode_CMD | Overlay PE CW Bits (Decoded) | Overlay PE CW Bits (Masked) |
|---|---|---|
| 3 | CM_CMD(0) = u-store NS_SEL(3) | NS_SEL(3) = 0, MODE_CMD = 0 |
| 3 | CM_CMD(1) = u-store EW_SEL(3) | EW_SEL(3) = 0, MODE_CMD = 0 |
| 3 | Profile(0) = u-store Z_SEL(2) | Z_SEL(2) = 0, MODE_CMD = 0 |

TABLE 71-continued

| u-store Mode_ CMD | Overlay PE CW Bits (Decoded) | Overlay PE CW Bits (Masked) |
|---|---|---|
| 3 | Profile(1) = u-store ROLL_CMD | ROLL_CMD = 0, MODE_CMD = 0 |
| Not Equal 3 | All decoded bits = 0 | All passed from u-store |

Six of the lower 30 bits of the PE Command Word field stored in the PSEQ memory 1217 have alternate values which can be selected via the "alt_sel" field 2223 of the PSEQ instruction word 2200 as shown in the Table 72. When the "alt_sel" bit is active (i.e., equal to "1"), the PE Command Word bits passed to the overlay will be supplied from the "Alternate" field rather than the normal locations.

TABLE 72

| Overlay PE CW Bit | Alt_Sel = 0 | Alt_Sel = 1 |
|---|---|---|
| NS_SEL(0) | u-store: NS_SEL(0) | u-store: ALT_CW_BITS(0) |
| EW_SEL(0) | u-store: EW_SEL(0) | u-store: ALT_CW_BITS(1) |
| AL_SEL(0) | u-store: AL_SEL(0) | u-store: ALT_CW_BITS(2) |
| RAM_SEL(0) | u-store: RAM_SEL(0) | u-store: ALT_CW_BITS(3) |
| RAM_SEL(1) | u-store: RAM_SEL(1) | u-store: ALT_CW_BITS(4) |
| OP_CMD | u-store: OP_CMD | u-store: ALT_CW_BITS(5) |

9.5 Image Address Generation

The Left, Right & Answer image addresses (for non-scalar images) are generated from the appropriate image descriptor 1301 and bit offset as follows:

address=(nyb ×4)+(bos mod(4))

where:
- bos=the "Bit OffSet" for the requested bit; and
- nyb=id[((bos/4)+7):(bos/4)]; (This is the nybble address for the requested bit.)

For input images that have the "scalar" bit set in the image descriptor 1301, the address sent to the Overlay logic 1209 will be zeroed along with the page e bit, and the scalar_value bit will be set by selecting the appropriate bit (indicated by the bit-offset) of the scalar value which is contained in the image descriptor 1301.

9.5.1 Bit Offset Resolution

For bit offset values that extend beyond the image size, the address of the sign bit will be supplied for a signed image, and a scalar value of zero will be supplied for an unsigned image.

For scalar image descriptors 1301, the bit offset field is used to select from bits 31 . . . 0 of the scalar (or from bits 35 . . . 0 if the "extend" bit is set), and the selected bit is passed to the Overlay logic 1209 as "scalar value". For a bit offset. beyond the range of the scalar (e.g. >31 for extend=0 and >35 for extend=1), the most significant bit is passed for a signed scalar, and a zero is supplied for an unsigned scalar.

This approach to the resolution of bit offsets allows the low level programmer to assume a model where the specification of bit offsets is arbitrary with respect to image size. In other words, the programmer can pretend that an image operand is any size within the range of the bit offset codes. The physical storage of the image may require anywhere from 0 to 36 bits, but any bit offset value specified will be resolved to provide a correct value even if it is beyond the range of image storage. This is accomplished through the sign extension method described above, whereby a bit offset which is greater than the most significant (actual) bit of an image provides the most significant bit for a signed image and a zero-valued bit plane for an unsigned image. These data values are the same as the bit plane data values which would be supplied if the image actually did occupy sufficient storage space to accommodate the bit offset.

9.6 Signal Passing

As will be described in greater detail below, the architecture of an exemplary PE 701 is a pipelined one having three stages ("PE data pipe"). A conceptual contradiction in the assignment of registers to a particular stage of the PE data pipe arises from the fact that sometimes a register (such as the C register 815) functions as a computation destination (e.g., c=cy1), which is a third stage role, and sometimes as a source (e.g., c=0 at the onset of an ADD), which is a second stage role. This contradiction causes problems in the generation of primitives because it is often necessary to initialize a register prior to execution of some operation (c=0) while propagating a result to that register (c=cy1) during every clock of that primitive. To accommodate this it would be necessary to execute an additional initialization clock prior to the 'body' of the primitive.

A related problem arises when one primitive generates a mask value that is to be used by the next primitive. For example, if a compare primitive (which has a final result supplied at the PLUS output of the ALU 801) is generating a mask plane to be used immediately by a fork primitive, the coupling between the two primitives cannot be made seamless (i.e. without wasted clocks) without writing the two primitives to specifically mate with each other. In this example, the mask data must be coupled from PLUS on the final clock of the first primitive, to the C and D registers 815, 819 during the initialization clock (see paragraph above) of the second primitive. Fortunately these are the same clock, and the coupling is made by executing C=PLUS and D=CMUX on the final clock of the first primitive.

In accordance with one aspect of the invention, a technique called "signal passing" is utilized to accommodate the two situations described above. Signal passing means simply propagating a single bitplane value from one primitive to the next. The signal, or "Sig" is not a physical storage location, but a coupling process. In the example above, the Sig was coupled from one primitive to the next by storing PLUS to the C and D registers 815, 819. The PLUS signal was the output Sig (SigOut) of the first primitive and the C and D registers 815, 819 provided the Sig input (SigIn) of the second primitive. The coupling occurred because the first primitive had a SigOut attribute (i.e., the Sig_Out field 2219 of the PSEQ instruction word 2200) of PLUS and the second primitive had a SigIn attribute (i.e., the Sig_In field 2217 of the PSEQ instruction word 2200) of (C=Sig, D=CMUX). If the first primitive SigOut had been CY1 and the second primitive SigIn had been Z=Sig, the generated instruction would have been Z=CY1.

The signal passing instruction for a given pair of primitives is always generated/executed on the last instruction of the first primitive (the 'signal passing instruction"). The Sig commands preempt the commands of the signal passing instruction wherever non-NOP commands are specified for SigIn. In'the example above, the C command is preempted by C=PLUS and the D command is preempted by D=CMUX. However, no other commands are preempted, since no other command fields were specified in the SigIn. In the second example, only the Z command is preempted.

The preemption of commands is perfectly safe because, by convention, the only means for coupling operations is through the values (images) stored to memory, and through the Sig. Where a command is preempted, the bitplane value which is lost could not be used anyway, since it is not going to memory or Sig.

For cases in the SigOut table where there is no signal (identified by <none>), the signal passing specified by SigIn (if any) will be ignored (i.e. microcode value specified will be allowed to pass unmodified). For example, for the case where a primitive with SigOut of "None" is followed by a primitive with "C=Sig, Z=Sig", the microcode C_SEL field and Z_SEL field values will be passed unmodified on the last clock of the first primitive. Also, where a SigIn of "none" is selected, no preemption occurs. However, for cases where the SigIn is specified as an initialization (e.g. C=0, Z=0, etc), the preemption will still occur regardless of the SigOut value for the previous primitive.

The SigIn commands of the exemplary embodiment are defined in Table 73.

TABLE 73

| Code | Function |
|---|---|
| 0 | C=Sig |
| 1 | C=Sig, D=CMUX |
| 2 | C=Sig, XF=CMUX |
| 3 | C=Sig, YF=CMUX |
| 4 | Z=Sig |
| 5 | C=Sig, Z=Sig |
| 6 | none |
| 7 | C=Sig, Z=Sig, D=CMUX |
| 8 | C=0, Z=0 |
| 9 | C=0, Z=1 |
| 10 | C=0, YF=CMUX |
| 11 | C=0, Z=1, D=CMUX |
| 12 | C=1, Z=0, YF=CMUX |
| 13 | C=1, Z=1 |
| 14 | C=1, D=CMUX |
| 15 | C=1, Z=0 |

The SigOut commands of the exemplary embodiment are defined in Table 74.

TABLE 74

| Code | SigOut | C_Cmd | Z_Cmd |
|---|---|---|---|
| 0 | Plus | 3 | 3 |
| 1 | Z | 5 | 0 |
| 2 | Cy1 | 2 | 2 |
| 3 | Plus | 3 | 3 |
| 4 | <none> | — | — |
| 5 | <none> | — | — |
| 6 | 0 | 6 | 6 |
| 7 | 1 | 7 | 7 |

10. Overlay Unit

The Overlay logic 1209 receives instructions from the primitive sequencer 1207. In the exemplary embodiment, the received instructions are in "PE Command Word" format, which is substantially the same format that it will output to the PE array 103, along with associated control signals supplied by the primitive sequencer 1207. The PE Command Word that is supplied to the Overlay logic 1209 is modified as necessary to account for pipeline delays and conflict resolutions, the addition of RAM addressing and control, and the insertion of CM_sel commands supplied by the I/O Sequencer 607. This is accomplished by overlaying certain Command Word fields with appropriate values before supplying the PE command word 1001 to the PE array 103.

These aspects of the invention will now be described with reference to FIGS. 24A, 24B and 24C, which together form a block diagram of the Overlay logic 1209.

10.1 Pipeline Delay Corrections

In the exemplary embodiment, each PE 701 in the PE array 103 has a pipelined architecture having three stages that permits data to flow first to the NS and/or EW registers 807, 809; next to the AL and/or BL registers 811, 183; and finally through the ALU 801 to any of a number of other registers and/or through the WRAM mux 807. Thus, each PE command word 1001 includes information for directing the simultaneous operation of each of these three PE execution stages. Because each stage is concerned with the processing of a different operand, creating a program of PE command words 1001 can be a difficult task.

In one aspect of the invention, this problem is addressed by elements in the Overlay logic 1209 that permit the programmer of the primitive sequencer 1207 to write programs utilizing a command word format that represents an operation with fields for data manipulation of the NS and EW registers 807, 809; the AL and BL registers 811, 813; the Carry and PLUS outputs of the ALU 801; and the WRAM mux 807 as though each of these operations were applied to the same bitplane operand. The Overlay logic 1209 includes means for extracting these fields from the received P-seq command word, and inserting them into respective fields of a sequence of PE command words 1001 that are supplied as an output of the Overlay logic 1209. In this way, sequences of PE command words 1001 are generated from the received P-seq instruction words.

Figure 24A:
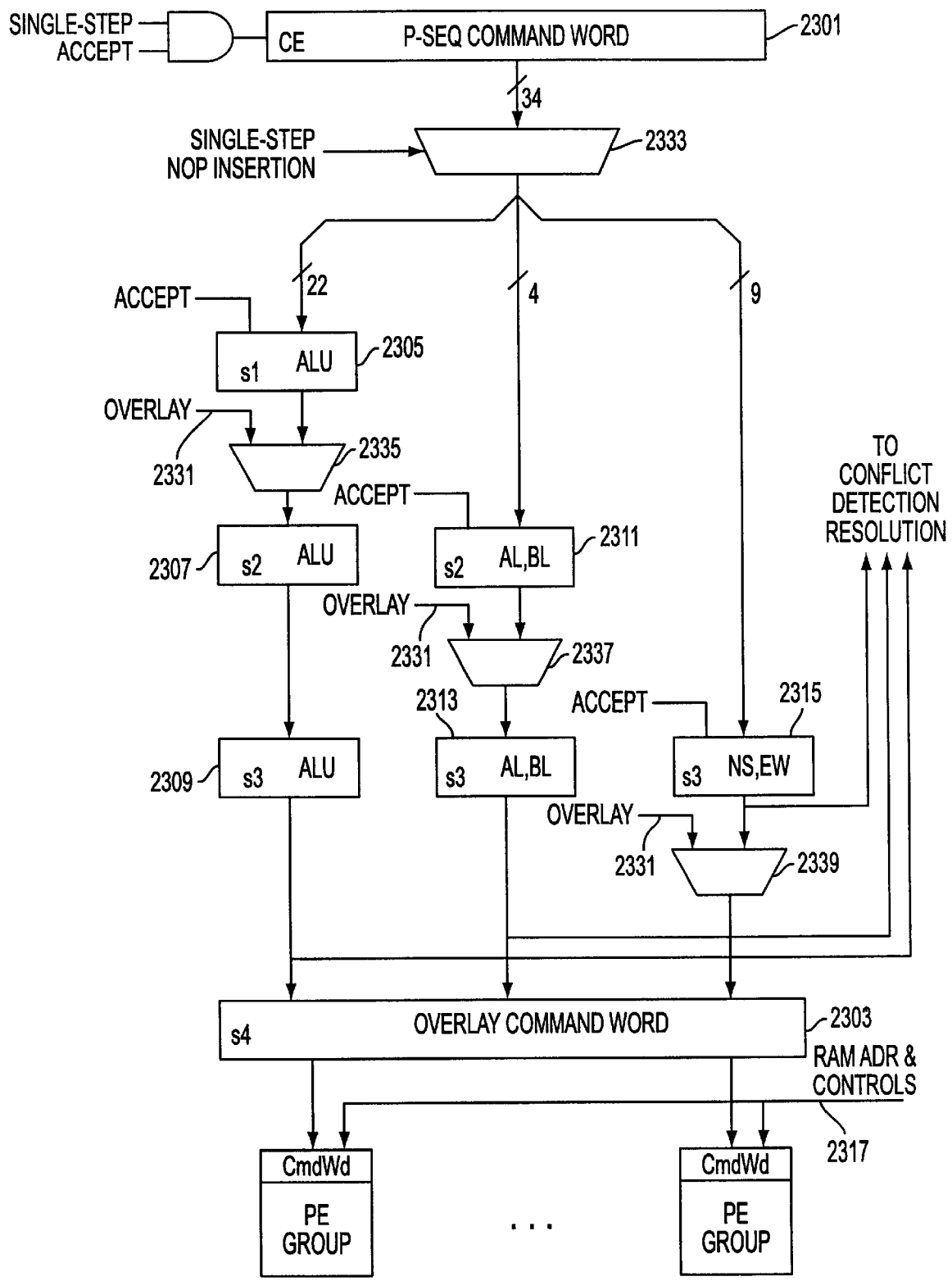
FIGS. 24A, 24B and 24C, together form a block diagram of the Overlay logic in accordance with one aspect of the invention.
Figure 24B:
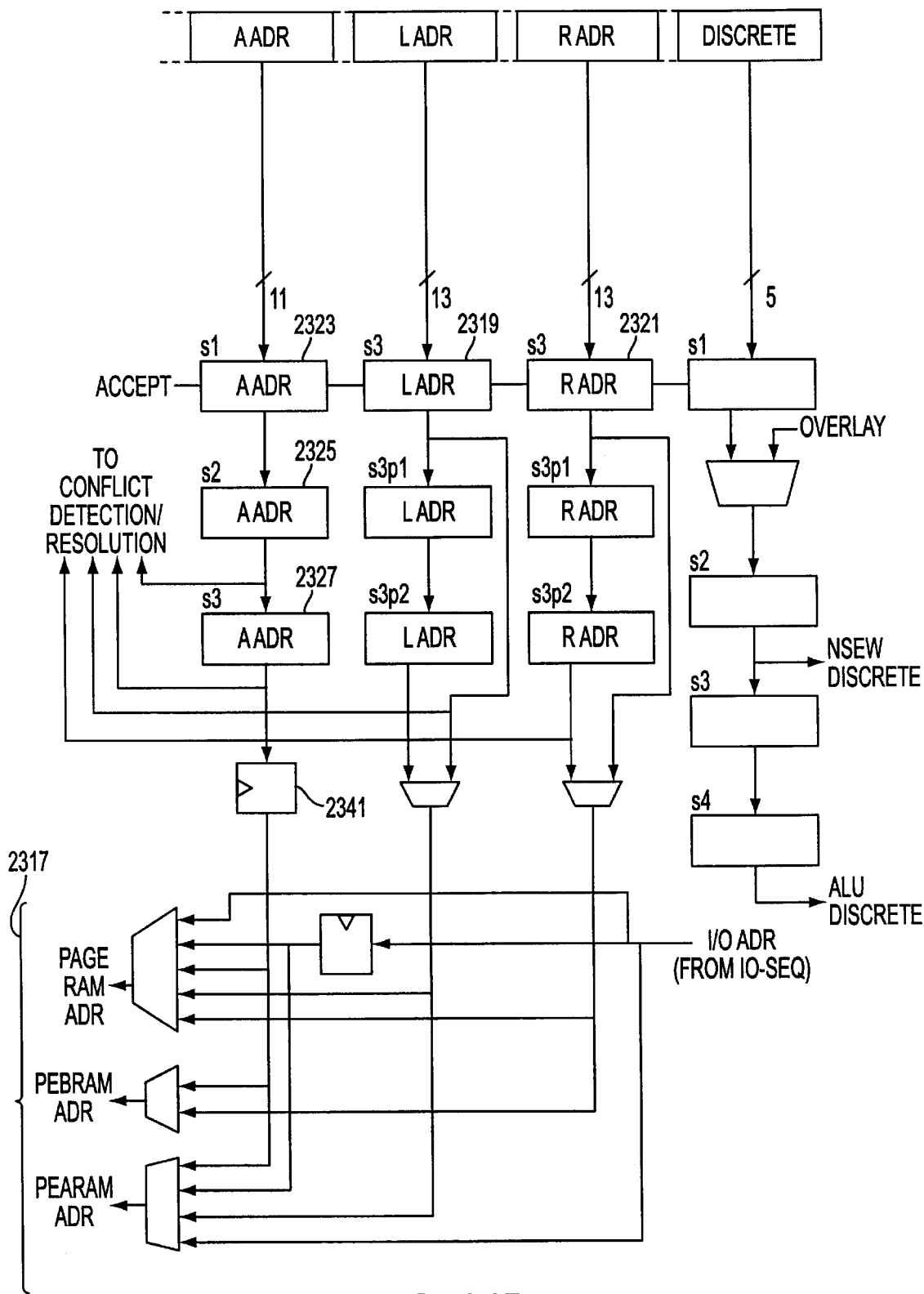
Figure 24C:
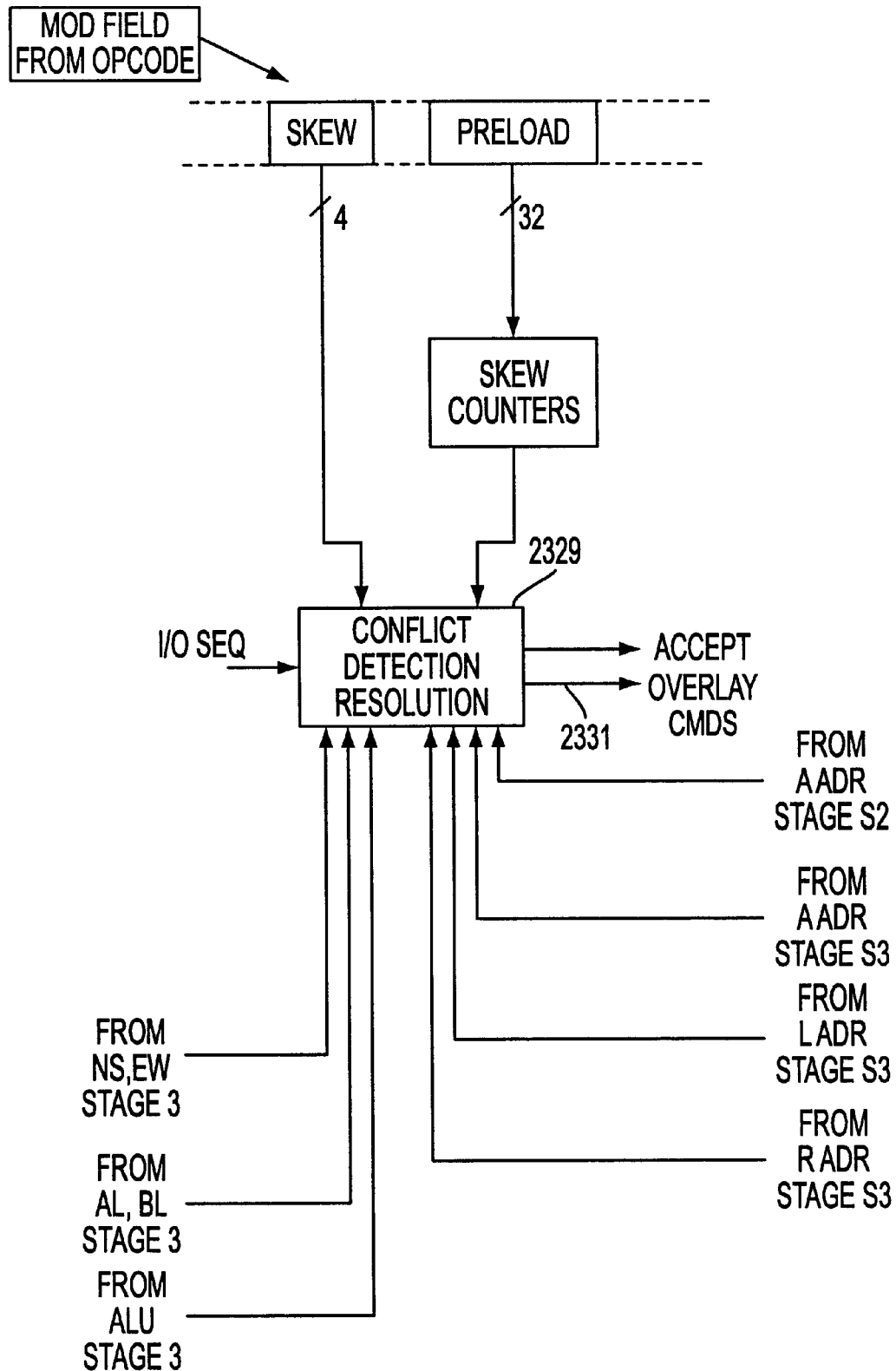

An exemplary embodiment of this aspect of the Overlay logic 1209 is depicted in FIG. 24A. A P-seq command word register 2301 receives the P-seq command word from the primitive sequencer 1207. The output signals from the P-seq command word register 2301 are selectively routed to a respective one of three instruction pipelines within the Overlay logic 1209. A first one of the instruction pipelines has three stages (respectively designated s1, s2 and s3) so that the instruction fields supplied at the input of the pipeline will be delayed by three clock cycles before being supplied to an overlay command word register 2303. Because the "ALU"—related commands need to be executed last in the PE fetch pipeline, the fields for controlling ALU-related resources are supplied to an ALU s1 register 2305 of this first instruction pipeline. These control fields will therefore be routed, over the course of three successive clocks, through the ALU s1 register 2305, an ALU s2 register 2307 and an ALU s3 register 2309.

AL- and BL-related control fields from the P-Seq command word register 2301 control a second stage of the PE fetch pipeline, so these commands need be delayed by only two clock cycles before being supplied as a portion of the PE command word 1001. Accordingly, the second instruction pipeline has only two stages: an AL,BL s2 register 2311 whose output feeds an input of an AL,BL s3 register 2313. The AL- and BL-related control fields supplied at the input of the AL,BL s2 register 2311 will therefore be routed, over the course of two successive clocks, through the AL,BL s2 register 2311 and the AL,BL s3 register 2313.

The NS- and EW-related control fields from the P-seq command word register 2301 control a first stage of the PE fetch pipeline, so these commands need be delayed by only one clock cycle before being supplied as a portion of the PE command word 1001. Accordingly, the third instruction pipeline has only one stage: an NS,EW s3 register 2315. The NS- and EW-related control fields supplied at the input of the NS,EW s3 register 2315 will therefore be routed, over the course of one clock, to the output of the NS,EW s3 register 2315.

Outputs from the ALU s3 register 2309, the AL,BL s3 register 2313 and the NS,EW s3 register 2315 are combined (i.e., concatenated) in the overlay command word register 2303. The output of the overlay command word register 2303 is supplied, along with RAM address and control signals, to form the PE command word 1001 that will be supplied to the PE array 103.

This function of the Overlay logic 1209 is further illustrated in Table 75, which shows an exemplary P-seq command word (received from the primitive sequencer 1207), and the resultant three PE command words 1001 that are generated at the output of the Overlay logic 1209. It will be observed that a single P-seq command word cannot completely specify any one PE command word 1001. Those fields that are not specified are supplied by earlier- and later-received P-seq command words.

TABLE 75

| Inst from Primitive Sequencer | NS < = ARAM EW < = BRAM | AL < = NS BL < = EW | WRAM < = AL + BL C < = Cyl |
|---|---|---|---|
| Clk Cycle | | At output of Overlay | |
| 1 | NS < = ARAM EW < = BRAM | | |
| 2 | | AL < = NS BL < = EW | |
| 3 | | | WRAM < = AL + BL C < = Cyl. |

The PE Command Word 1001 is broken up by pipeline delay correction as defined in FIG. 25. The designation of "stage 1", "stage 2" and "stage 3" in FIG. 25 indicates the stage in the respective overlay instruction pipeline to which that field is first supplied, so that a field designated "Stage 1" must pass through all three stages, whereas a field designated "Stage 3" need only pass through one stage.

In another aspect of the invention, the PE- and Page RAMs 601, 603 within each PE 701 are synchronous memories that require application of the address one clock cycle before the desired data is available at the output of the memory. To accommodate this requirement, the overlay command word register 2303 acts as a fourth stage ("s4") that further delays the PE command word fields. The RAM address and control signals 2317, by not having to be routed through this delay stage, can accordingly be applied in advance of even the Stage 3 command fields. Referring to FIG. 24B, it can be seen that the RAM addresses for source operands ("Left Address" ("L Adr") and "Right Address" ("R Adr")) are received by the Overlay logic 1209 and supplied to respective L Adr s3 and R Adr s3 registers 2319, 2321. The outputs of these registers are supplied directly to form the RAM address and control signals 2317 without having to pass through any other clockable registers so that they will be supplied one clock cycle ahead of when the command for the memory write operation is issued. The RAM addresses for destination operands ("Answer Address" ("A Adr")) pass through a four stage pipeline comprising an A Adr s1 register 2323, an A Adr s2 register 2325, an A Adr s3 register 2327 and an additional delay register 2341 so they are synchronized with the PE command word at stage 4 of the overlay logic 1209.

10.2 Memory Conflicts 10.2.1 Memory Write followed by Read of same address

In accordance with another aspect of the invention, the pipeline execution is modified in order to account for a primitive command word that reads the same memory location as that which was specified as a destination by the previous instruction. From the following example, it can be seen that unmodified pipeline execution could lead to an erroneous answer. This modification is made by conflict resolution components within the Overlay logic 1209. Referring to FIG. 24C, the heart of this aspect of the invention is the conflict detection/resolution logic 2329. Conflict resolution is not always desired, however. In some microcode sequences, the programmer may take into account the pipeline delays and may deliberately code this sequence out of a desire to read the old value prior to the write operation. For this case, in accordance with another aspect of the invention, the microcoder of the primitive sequencer 1207 is provided with the ability to selectively disable this conflict resolution. The inhibit is passed to the Overlay logic 1209 by the signal "pseq_inhibit wr_rd conflict".

Table 76 illustrates three partial PE command words 1001 that might be received by the Overlay logic 1209 from the primitive sequencer 1267.

TABLE 76

| Inst from Primitive sequencer | NS < = ARAM(0) EW < = BRAM(1) | AL < = NS BL < = EW | WRAM(2) < = AL + BL C < = Cyl |
|---|---|---|---|
| Inst from Primitive sequencer | NS < = ARAM(2) EW < = BRAM(3) | AL < = NS BL < = EW | WRAM(4) < = AL + BL C < = Cyl |
| Inst from Primitive sequencer | NS < = ARAM(5) EW < = BRAM(4) | AL < = NS BL < = EW | WRAM(6) < = AL + BL C < = Cyl |

In this exemplary sequence, several conflict situations are illustrated. For example, the first and second instructions call for a write operation to location "2" to be performed immediately prior to a read from location "2". Similarly, the second and third instructions call for a write operation to location "4" to be performed immediately prior to a read from location "4". Table 77 illustrates the resultant operations if no conflict resolution were to be performed. Note that, in the fourth column labeled "Memory Access", the memory "read" operations occur one cycle in advance of the instruction that intends to utilize the data from the output of the memory.

TABLE 77

| Clk Cycle | At output of Overlay logic 1209 | | Memory Access |
|---|---|---|---|
| 0 | | | ARAM(0) -read BRAM(1) -read |
| 1 | NS < = ARAM(0) EW < = BRAM(1) | | ADDR(2) read. prior to write. - > ARAM(2) -read BRAM(3) -read |
| 2 | NS < = ARAM(2) EW < = BRAM(3) | AL < = NS BL < = EW | |
| 3 | | AL < = NS BL < = EW | WRAM(2) < = AL + BL C < = Cyl | WRAM(2) -wrt |
| 4 | | | WRAM(4) < = AL + BL C < = Cyl | |

Looking at the right column, it can be seen that, as a result of the staged execution of the various operations, the write to location "2" actually occurs in clock cycle 3, which is after the read to that same location (clock 1). This is the reverse of the way these operations were coded, however, meaning that the read operation is retrieving "stale" data.

Table 78 illustrates the resultant operations when conflict resolution is performed by the Overlay logic 1209.

TABLE 78

| Clk Cycle | Conflict Resolution | | | Memory Access |
|---|---|---|---|---|
| 0 | | | | ARAM(0)-read BRAM(1)-read |
| 1 | NS <= ARAM(0) EW <= BRAM(1) | | | |
| 2 | NOP | AL <= NS BL <= EW | | BRAM(3)-read |
| 3 | NS. <= RMUX EW <= BRAM(3) | NOP | WRAM(2) <= AL + BL C <= Cyl | WRAM(2) -wrt |
| 4 | NOP BL <= EW | AL <= NS | NOP | BRAM(5)-read |
| 5 | NS <= BRAM(5) EW <= RMUX | NOP | WRAM(4) <= AL + BL C <= Cyl | WRAM(4)-wrt |
| 6 | | AL <= NS BL <= EW | NOP | |
| 7 | | | WRAM(6) <= AL + BL C <= Cyl | WRAM(6)-wrt |

It can be seen that by adding the NOP instructions at appropriate stages in the Overlay logic 1209, no RAM location is read until the previously designated write operation to that RAM location has been performed. These "NOP" instructions are generated as "overlay commands 2331" by the conflict detection/resolution logic 2329, and may be substituted for other control fields by means of respective multiplexors 2333, 2335, 2337 ans 2339.

In accordance with yet another aspect of the invention, in this exemplary embodiment these delayed RAM reads are eliminated entirely by grabbing the data from the output of the WRAM mux 807 at the same time that this data is being written into the PE- or Page RAM. 601, 603. For example, at clock cycle 3, the instruction "NS<=RMUX" moves the data from the WRAM mux 807 at the same time that this data is being written into location "2" of the PE-accessible RAM. Without this feature, it would have been necessary to add an additional clock cycle delay so that "NS<=ARAM(2)" could have been issued in the next cycle. A similar situation can be seen with respect to the read to location "4", which has been made unnecessary by the issuance of "EW<=RMUX" at the same time that "WRAM(4)<=AL+BL" is performed.

10.2.2 Pipeline Memory Usage Conflict Resolution 10.2.2.1 ALU Field Memory Read Conflicts There are four instructions in the ALU-related fields of the PE command word 1001 that can access either the PE RAM 601 or the Page RAM 603. They are:

C:=ARAM

D:=ARAM (via D OP)

YF:=ARAM

XF:=BRAM

There is no conflict resolution for these instructions in the exemplary embodiment. Consequently, the microprogrammer of the primitive sequencer 1207 must ensure conflict-free microcode in order to use these instructions. These instructions will be decoded by the Overlay logic 1209 in order to drive the memory controls with addressing information coming from the addressing information supplied in the Left (for ARAM) and Right (for BRAM) address fields for the instruction which enters the Overlay logic 1209 two clocks later. Since this effectively "couples" two P-Seq instructions which are two clocks apart, it is critical that there be no conflicts in the instructions. The effect of conflicts would be that the Overlay logic 1209 could insert extra instructions (by splitting a P-seq instruction into more than one instruction issued to the PE array 103) into the pipeline in order to resolve conflicts which could destroy this "coupling" of an instruction with a later supplied address leading to a PE or Page RAM read with an incorrect address.

10.3 PE RAM Conflicts

In the exemplary embodiment, the PE RAM 601 is a two-port synchronous RAM with each port being capable of a read or write operation on every clock. The only exception to this is a requirement, in the exemplary embodiment, that a read is never allowed from the same address that is being written from the other port. The conflict detection/resolution logic 2329 in the Overlay logic 1209 is designed to prevent this situation by looking for a PE RAM read of the same address being written, and delaying the generation of the read instruction by one clock if this sequence is scheduled to occur by the primitive sequencer 1207.

With a two-port RAM, it is not possible to execute a command word that attempts to perform two reads and a write to PE RAM 601 on the same clock cycle. This conflict can occur in three ways:

1) A command word has a write operation to PE-RAM 601 followed by a command word that reads from ARAM(PE-RAM) & BRAM(PE-RAM) in the ALU field (all three of these operations would ordinarily be scheduled on the same clock since a read operation must occur on the clock cycle previous to the command word).

2) A command word writes to a PE-RAM address followed by a command word with a read from a single PE-RAM port in the ALU field, and that followed two clocks later by a command in which the NS/EW field attempts to read from the other PE-RAM port (these three RAM operations would—without any conflict resolution—be attempted on the same clock cycle).

3) A command word write followed three clocks later by a command word which has a NSIEW field which attempts to read both ARAM(PE-RAM) and BRAM (PE-RAM).

Cases 1 & 2 are not resolved by the Overlay logic 1209. Consequently, in the exemplary embodiment, all ALU-field RAM read operations must be coded to be conflict-free by the microprogrammer of the primitive sequencer 1207.

The conflict detection/resolution logic 2329 does resolve case #3 by inserting a NOP cycle into the command word stream to eliminate the conflict.

10.4 Page RAM Conflicts

Conflicts can arise with multiple operands when both the Left and Right Image descriptors point to images in Page RAM 603 because the Page RAM 603 is a single-ported memory. An example of a sequence that causes such a conflict is shown in Table 79. The resolution of the exemplary conflict is shown in Table 80.

TABLE 79

| Inst from Primitive sequencer | NS <= ARAM(PG) EW <= BRAM(PG) | AL <= NS BL <= EW | WRAM(2) <= AL + BL C <= Cyl |
|---|---|---|---|

TABLE 80

| Clk Cycle | At output of Overlay logic 1209 | | |
|---|---|---|---|
| 1 | NS < = ARAM(PG) | | |
|   | EW < = EW (NOP) | | |
| 2 | NS < = NS (NOP) | AL < = AL (NOP) | |
|   | EW < = BRAM (PG) | BL < = BL (NOP) | |
| 3 |   | AL < = NS | WRAM < = NOP |
|   |   | BL < = EW | C < = C (NOP) |
| 4 |   |   | WRAM < = AL + BL |
|   |   |   | C < = Cyl |

10.4.1 Write followed by a Read Conflict

Figure 26:
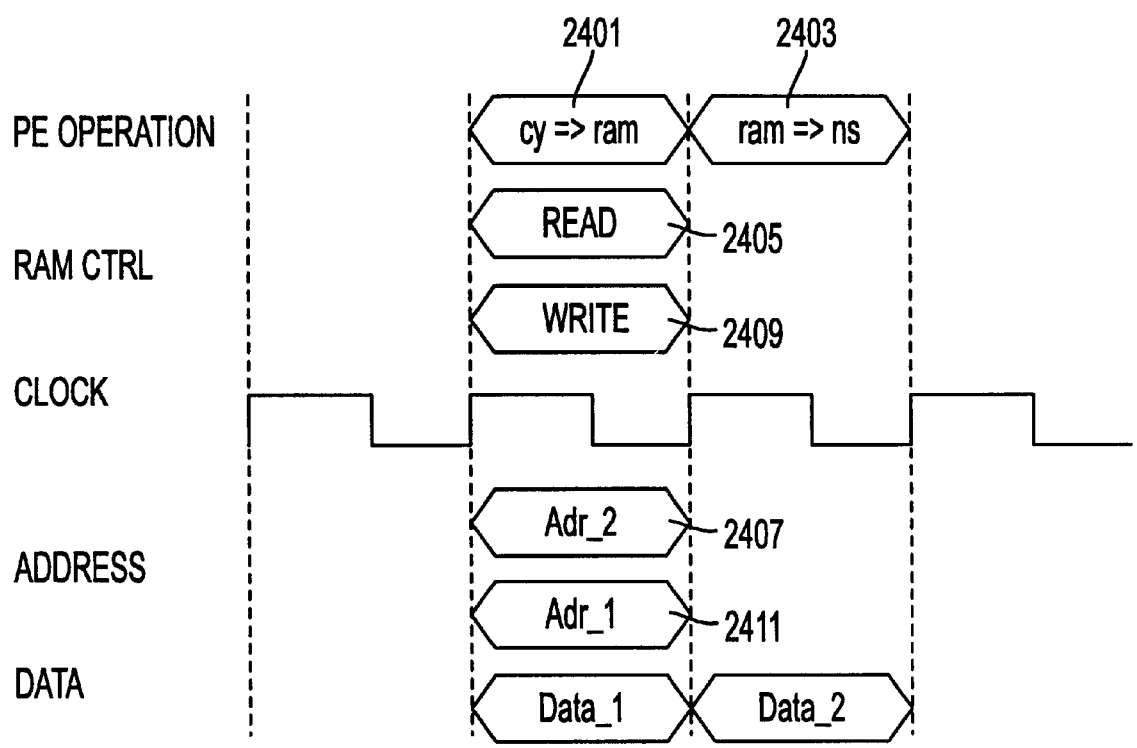
FIG. 26 is a timing diagram illustrating a memory conflict situation.

Due to the usage of a synchronous one-port memory for the Page RAM 603 on the chip, a potential conflict occurs when the instruction pipeline wants to execute a memory write followed by a memory read on the next clock cycle. Since the data is delayed by one clock for a read operation, the Overlay logic 1209 compensates by making the address available one clock earlier than when the read is to occur. (There is no similar compensation called for on write operations.) This creates a conflict for the situation in which a first PE command word 1001, designating a write operation, is followed in the next clock by a second PE command word 1001 that designates a read operation. This situation is illustrated in FIG. 26. A first PE operation 2401 specifies a write of the carry bit to a location in Page RAM 603. This is followed, in the next clock, by a PE operation 2403 that specifies that the NS register 807 is to receive the contents of a location from the Page RAM 603. In order to perform the memory read operation called for in the second PE operation 2503, the RAM control signals must designate a "Read" 2405 and the address for the read (Adr_2 2407) during the same clock cycle that it must also issue the "Write" 2409 control signal along with the address for the write operation (Adr_1 2411).

An example of such a conflict sequence is also depicted in Table 81, which shows three instructions that could be issued from the primitive sequencer 1207. For each of the instructions, the variously specified operations are shown in a column that corresponds to a stage in the fetch pipe in which that operation is to be performed.

TABLE 81

| Inst from Primitive sequencer | NS < = ARAM EW < = BRAM | AL < = NS BL < = EW | WRAM(PG) < = AL + BL C < = Cyl |
|---|---|---|---|
| Inst from Primitive sequencer | NS < = ARAM EW < = BRAM | AL < = NS BL < = EW | WRAM < = AL + BL C < = Cyl |
| Inst from Primitive sequencer | NS < = ARAM(PG) EW < = BRAM(PG) | AL < = NS BL < = EW | WRAM < = AL + BL C < = Cyl |

The resultant operations specified at the output of the Overlay logic 1209 are shown in Table 82.

TABLE 82

| Clk Cycle | At output of Overlay (Without Conflict Resolution) | | | Memory Access |
|---|---|---|---|---|
| 1 | NS < = ARAM EW < = BRAM | | | |
| 2 | NS < = ARAM EW < = BRAM | AL < = NS BL < = EW | | PG Rd |
| 3 con- flict | NS < = ARAM(PG) EW < = NOP | AL < = NS BL < = EW | WRAM(PG) < = AL + BL C < = Cyl | PG Wrt PG Rd |
| 4 | NS < = NOP EW < = BRAM(PG) | AL < = NS BL < = EW | EW | |

Note that the conflict occurs on clock cycle 3 because the Page RAM 603 is a synchronous memory and the read operation must actually occur one clock prior to the "EW<= BRAM" so that the data will be available during the "EW<= BRAM" command cycle. When this situation occurs, the conflict detection/resolution logic 2329 compensates by holding the pipeline at the NS/EW field stage until it can access the memory. This is illustrated in Table 83.

TABLE 83

| Clk Cycle | Resolution Sequence: At output of Overlay logic 1209 | | | Memory Access |
|---|---|---|---|---|
| 1 | NS <= ARAM EW <= BRAM | | | |
| 2 | NS <= ARAM EW <= BRAM | AL <= NS BL <= EW | | PG Read |
| 3 | NS <= ARAM(PG) EW <= NOP | AL <= NS BL <= EW | WRAM(PG) <= AL + BL C <= Cyl | PG Write |
| 4 | NS <= NOP EW <= NOP | NOP | WRAM <= AL + BL C <= Cyl | PG Read |
| 5 | NS <= NOP EW <= BRAM(PG) | NOP | NOP | |
| 6 |   | AL <= NS BL <= EW | NOP | |
| 7 |   |   | WRAM <= AL + BL C <= Cyl | |

10.5 RAM Selection

RAM Selection is determined by the storage bit in the Image Descriptor 1301 that indicates whether the image is stored in PE RAM 601 (storage=0) or Page RAM 603 (storage=1).

10.5.1 Scalar Insertion into RAM access fields

For some fields in the PE Command Word 1001 that can read from the ARAM Mux 803 or BRAM Mux 805 (such as ALU fields YF, XF, D), if the Image Descriptor 1301 specifies that a scalar value is to be provided rather than a value out of one of the RAMs, the Overlay logic 1209 commands the scalar to be inserted via the ARAM and BRAM multiplexors 803, 805 multiplexors in the PE Group Logic, which is described in detail below. The Overlay logic 1209 provides two bits per RAM field (i.e., two for the ARAM multiplexor 803 and two for the BRAM multiplexor 805) for control of scalar insertion. In each case, one of the two bits is used to indicate that the access is to retrieve a scalar bit and the other of the two bits is used to contain the value of the scalar bit.

The scalar insertion is preemptive such that all registers loading from the same port (e.g. NS:=ARAM, and YF:=ARAM) will receive the same value.

Scalar insertion is accomplished for the NS, EW and C conmnand fields through direct manipulation of the command to select one of the scalar load command options (e.g., NS:=0, C:=1, etc.).

10.6 Image Skew Resolution

In another aspect of the invention, the Overlay logic 1209 resolves the skew associated with the left and right operands and utilizes two 2-bit fields (from the primitive Sequencer 1207) to specify skew as shown above in Table 37. The convention for values for the preload skew registers 1851 in the exemplary embodiment is that the 16-bit signed value represents the present position of a source image relative to the destination cell, with positive values indicating North and East directions. Thus a North/South Preload value of "+1" indicates that the source data for each PE 701 is located in the North neighboring PE 701, and a "−1" Preload value indicates that the source data for each PE 701 is located in the South neighboring PE 701. In order to execute the desired operation, the Overlay logic 1209 generates PE commands to fetch the image from the designated neighbor. Thus for a Preload of "+1", the Overlay logic 1209 has to shift the image to the south by one position in order to line the image up for the operation.

When the Preload skew registers 1851 are used to specify skew, the Overlay logic 1209 may, for example, utilize a 16-bit signed count to generate the correct number of clocks to skew the operand. When this occurs, the separate stages of the pipeline should be stalled until the operand is properly "aligned" via skew operations, and the next P-Seq Command Word must be held until the Overlay logic 1209 can accept it. To illustrate this, Table 84 shows the fetch pipeline for a primitive sequencer instruction that calls for one operand to have a skew of 2. Table 85 shows the resultant operations generated at the output of the Overlay logic 1209 for this exemplary instruction.

TABLE 85

| Clk Cycle | At output of Overlay | | |
|---|---|---|---|
| 1 | NS <= ARAM | | |
|   | EW <= BRAM | | |
| 2 | NS <= NS | AL <= NS | |
|   | EW <= EI | BL <= BL | |
| 3 |  | AL <= AL (NOP) | WRAM <= NOP |
|   |  | BL <= EI | C <= Cy1 |
| 4 |  |  | WRAM <= AL + BL |
|   |  |  | C <= Cy1 |

10.7 NSEW Interconnect Conflict

There are three types of conflicts that can arise with regard to NSEW interconnect:

1) a change in shift direction commnanded in consecutive instructions;
2) a change in shift direction within a primitive (between NS/EW and AL/BL); and
3) two instruction fields requesting different data to be driven on the NSEW interconnect.

These are addressed in the following paragraphs.

10.7.1 NSEW Shift Direction change (Bus Contention)

If an instruction requests a shift direction that is the opposite of the shift direction specified on the previous clock, the Overlay logic 1209 inserts a NOP cycle to eliminate bus contention. The term "Bus contention" refers to the situation in which two tri-state devices are connected and one tunns on its drivers faster than the other chip turns off its drivers. When this condition occurs, there is a high-current path from the I/O driver power supply to the I/O driver power return. The pad cycle eliminates the Bus contention by ensuring that there will be enough time for the V/O driver to completely turn off before the other driver turns on.

10.7.2 NSEW Shift Direction Change within a Primitive

In the exemplary embodiment, the Overlay logic 1209 does not attempt to resolve the conflict resulting from the situation in which a primitive has a shift direction in the NS or EW field with an implicit shift in the opposite direction for the AL or BL field. However, the NSEW interconnect drivers will be disabled (to prevent bus contention) during one of the commanded shifts.

10.7.3 NSEW Data Source Conflict

A conflict occurs when two instruction fields request that different data be driven onto the NSEW interconnect. As an example, a potential conflict can occur on clock cycle #3 for the Image Skew example presented above in Tables 84 and 85. If the next P-Seq Command word has an "EW<=WI" instruction, it will conflict with the implicit command ("BL<=El") enabling the East-West interconnect on the west edge of the chip to be driven with the value contained in the EW register 809. To resolve this conflict, in accordance with another aspect of the invention, two NOPs are inserted into the pipeline (one for the I/O direction conflict and one to allow for a pad clock cycle where the interconnect is not driven to elimate driver contention).

TABLE 84

| Inst from primitive sequencer | NS <= ARAM<br>EW <= BRAM (Skew = 2) | AL <= NS<br>BL <= EW | WRAM <= AL + BL<br>C <= Cy1 |
|---|---|---|---|

10.8 I/O Sequencer Cycle Stealing

When the I/O-Sequencer 607 requests a RAM operation, the pipelines of the Overlay logic 1209 are inactivated and the RAM controls inserted in the quadrant control buffers (described below) as requested by the I/O-sequencer 607. This is referred to as I/O Sequencer cycle stealing. During an I/O cycle stealing operation, the "accept" signal to the primitive sequencer 1207 is negated and all of the control path are stalled for one clock cycle.

10.9 Distribution of PE Controls

10.9.1 MCC Organization and Layout

A critical aspect of the design of the MCC IC 101 is the organization of the chip into functional blocks and the layout of those blocks on the die. It is generally desirable to keep signal routing to a minimum so that the least die space and power is "wasted" on signal runs. Other factors, such as critical path signals, chip boundary signals, and placement of memories also come into play.

In the exemplary embodiment, the MCC IC 101 is organized so that the PE array 103 is divided into four quadrants, with each quadrant being situated in a corner of the device. The quadrants are spaced so that there is room for logic along the horizontal and vertical axes of the chip. The horizontal axis is used for the I/O RAM memories 107, and the vertical axis is used for the fetch unit 1201 and sequencing logic (e.g., instruction sequencer 1205 and primitive sequencer 1207).

Figure 42A:
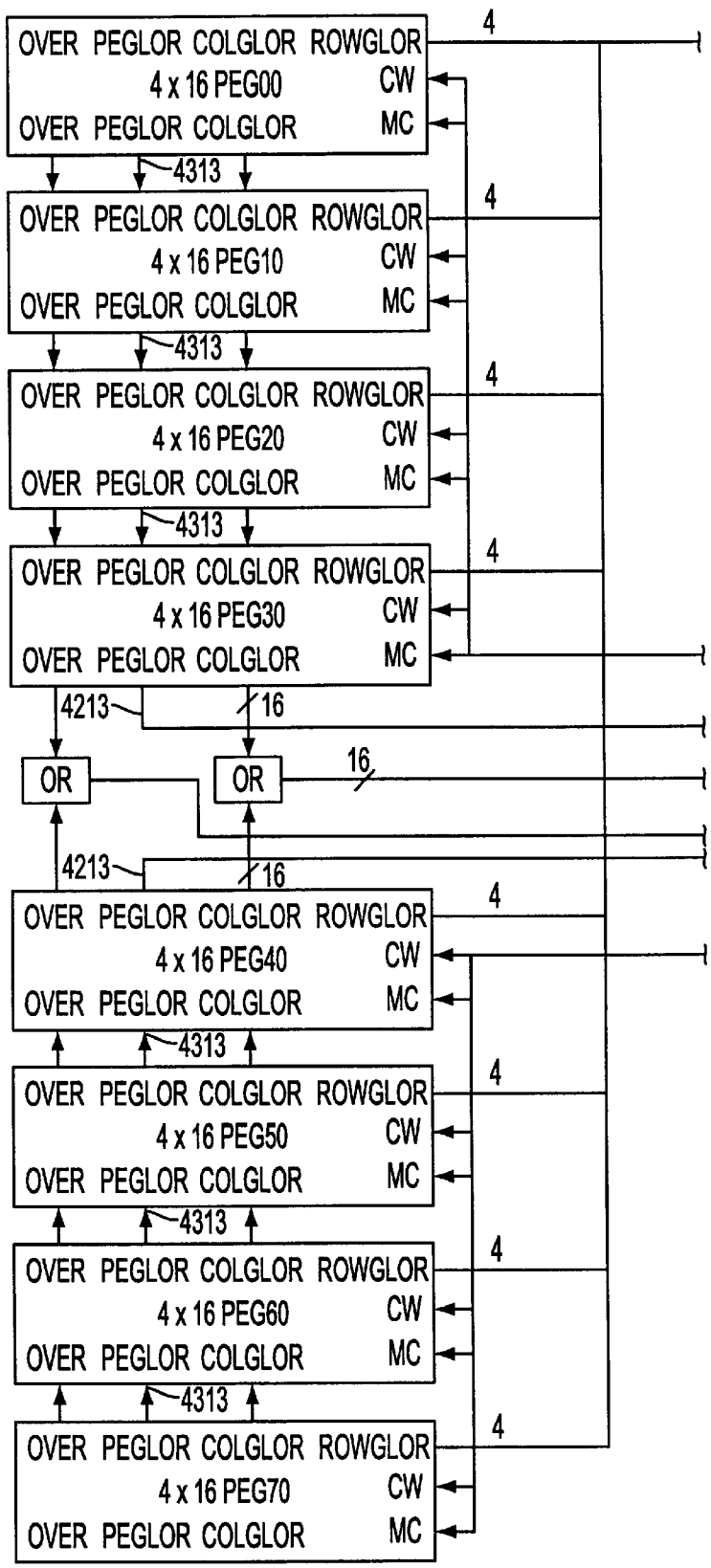
FIGS. 42A, 42B and 42C together illustrate the distribution of PE controls to array quadrants.
Figure 42B:
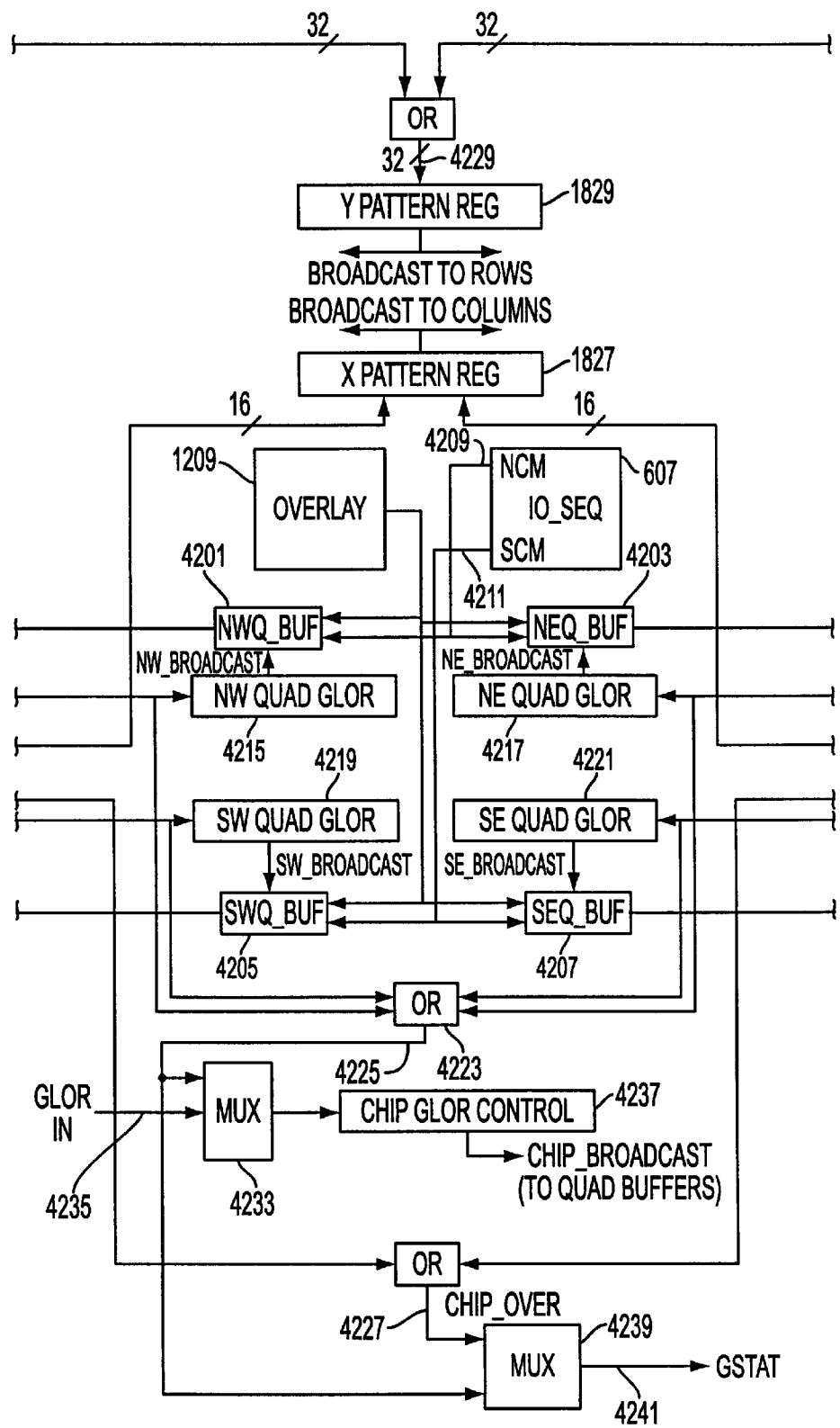
Figure 42C:
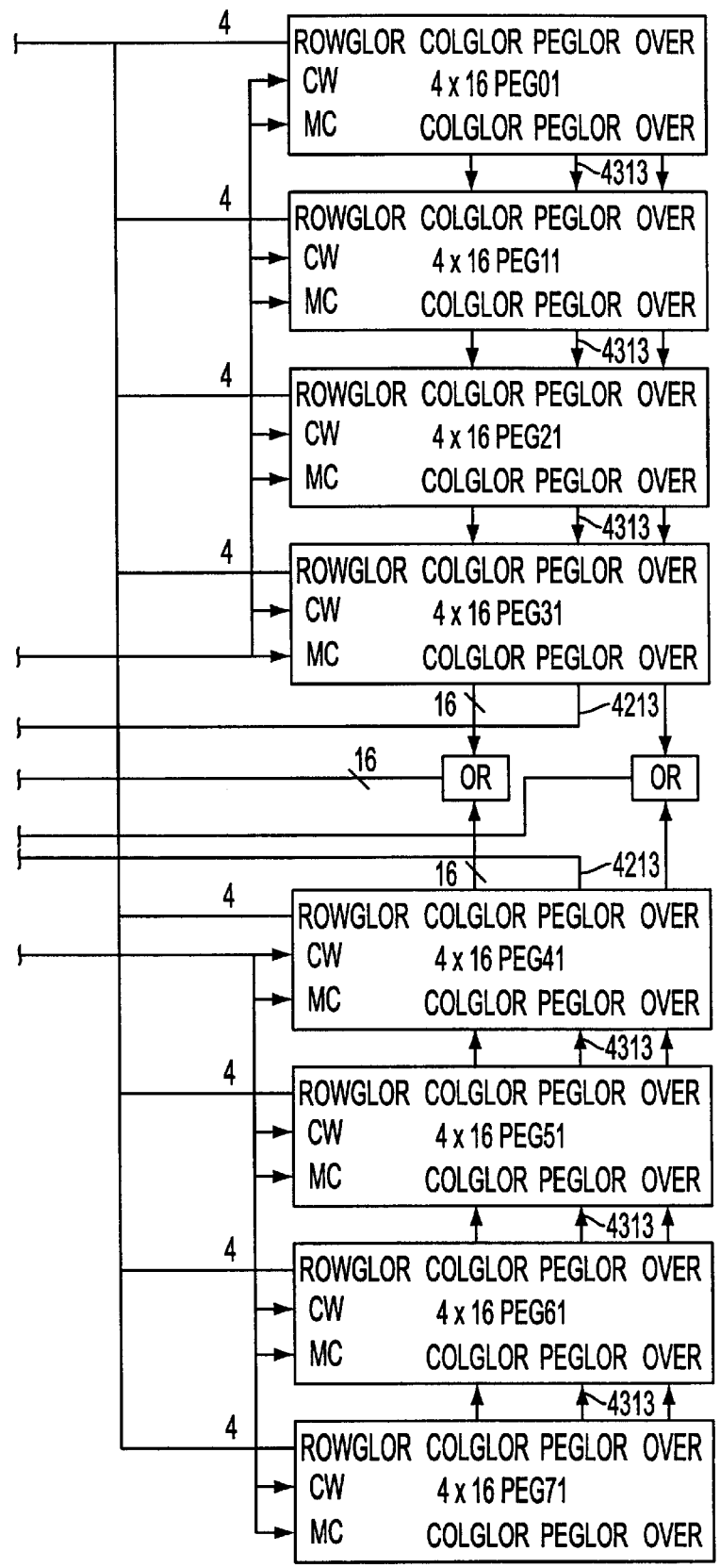
Figure 43A:
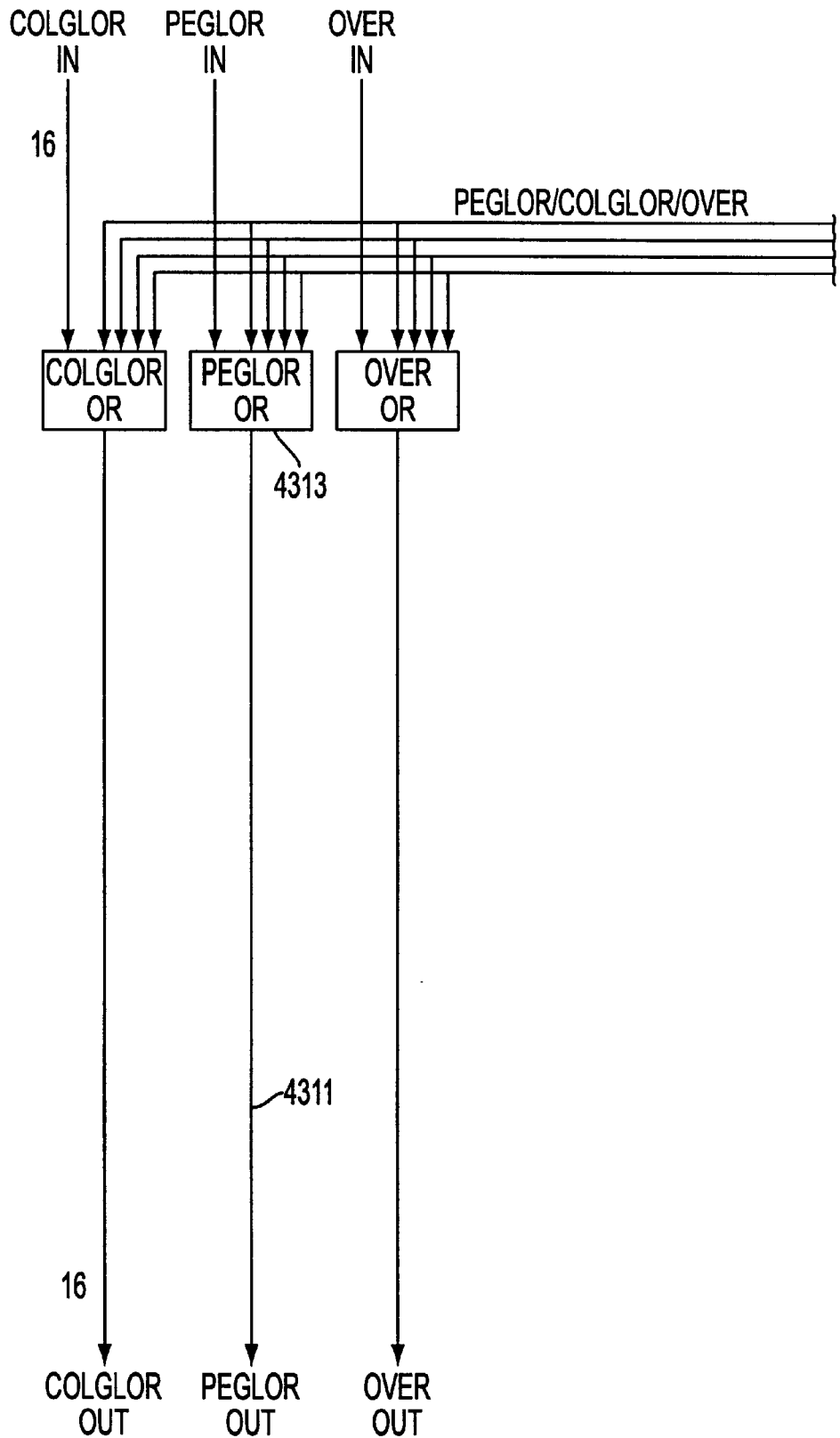
FIGS. 43A, 43B and 43C together illustrate the functional elements of a 4 16 PE Group.
Figure 43B:
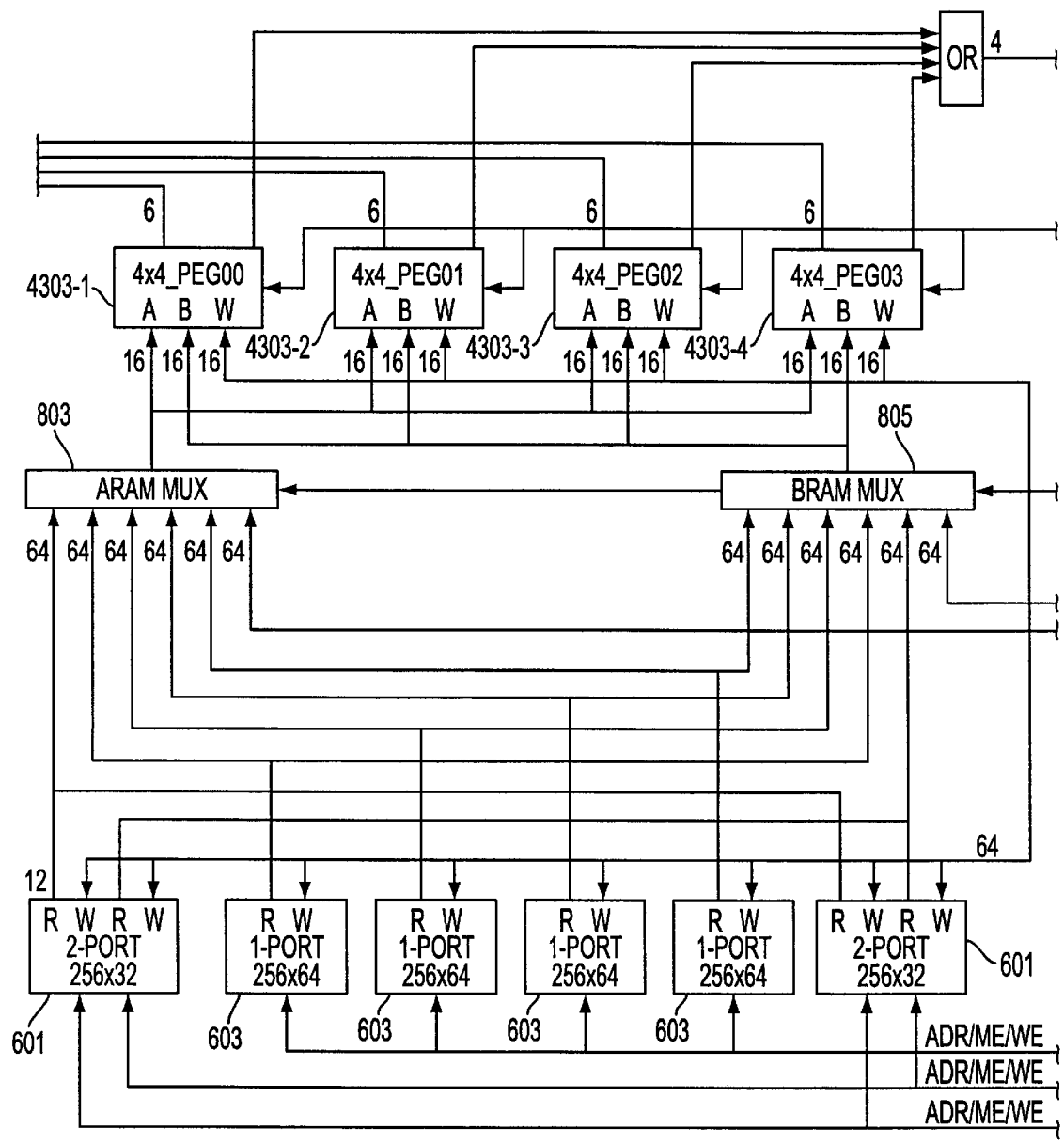
Figure 43C:
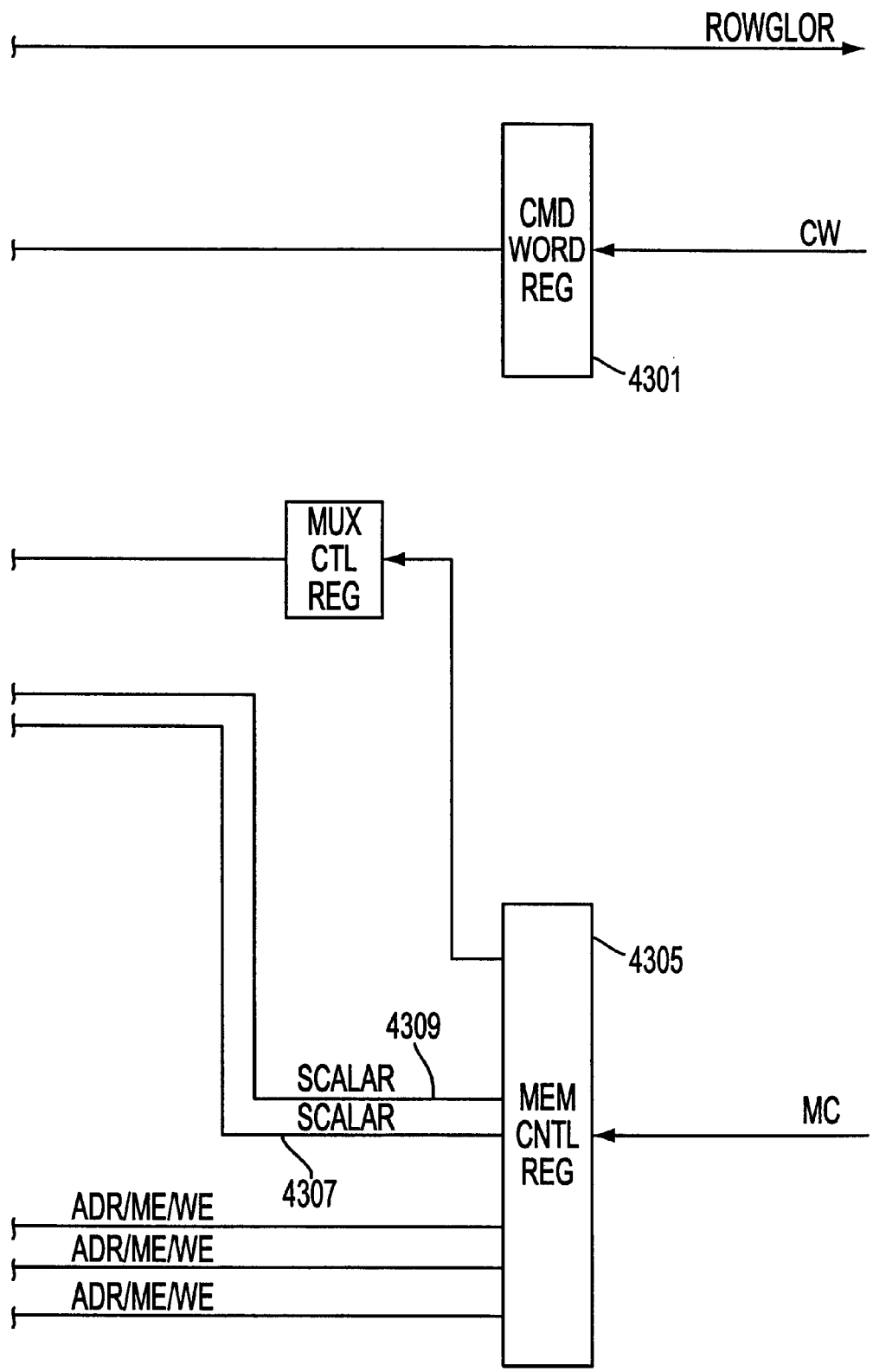

FIGS. 42A, 42B and 42C together illustrate the distribution of PE controls, and resembles the physical layout just described. The quadrants are subdivided into 4×16 PE Groups (PEGs). Each 4×16 PEG is further subdivided into 4×4 PE groups as shown in FIGS. 43A, 43B and 43C. (In this document, the acronym "PEG" refers exclusively to a 4×16 PE Group.)

The distribution scheme discussed here includes several aspects, such as PE command distribution, PE memory controls, I/O sequencer controls, and global signal values and controls.

10.9.2 PE Command Distribution

Referring now to FIGS. 42A, 42B and 42C, the PE command generated by the overlay logic 1209 is distributed to four quadrant control buffers: NWQBUF 4201, NEQ_BUF 4203, SWQ_BUF 4205 and SEQ_BUF 4207. Each of the quadrant control buffers (quad buffers) in turn propagates the PE command word 1001 to a respective quadrant of the chip where it is distributed to the CW inputs of each PEG. As shown in FIGS. 43A, 43B and 43C, the PE command word 1001 is supplied to a command word register 4301 in each PEG, and then distributed to the 4×4 PE groups 4303-1 . . . 4303-4, each of which internally supplies the PE command word 1001 to each of its PEs 701.

10.9.3 PE Memor=Controls and Scalar Injection

The PE memory controls generated by the overlay logic 1209 are distributed to the four quadrant buffers (NWQ_BUF 4201, NEQ_BUF 4203, SWQ_BUF 4205 and SEQ_BUF 4207), which provide them to the memory control (MC) inputs of each PEG, as shown in FIGS. 42A, 42B and 42C. The memory controls are supplied to a memory control register 4305 within each PEG. The output of the memory control register 4303 supplies the memory controls for the 1-port memories that constitute the Page RAM 603, the 2-port memories that constitute the PE RAM 601, and the ARAM and BRAM multiplexors 803, 805.

The ARAM PE signal, generated by the ARAM multiplexor 803, may supply data from one port of the PE RAM 601 (shown as two blocks in FIG. 43B), from the Page RAM 603 (shown as four blocks in FIG. 43B), or from a scalar signal 4307. Similarly, the BRAM PE signal, generated by the BRAM multiplexor 805, may supply data from the other port of the PE RAM 601, from the Page RAM 603, or from a scalar signal 4309. The memory address (ADR), memory enable (ME) and write enable (WE) signals together with the Scalar and multiplexor control signals provide the control for generating the PE ARAM and BRAM input signals.

10.9.4 I/O Sequencer Controls

The CM controls for image input and output are supplied by the I/O Sequencer 607. The signals are supplied to the quadrant buffers, with north halfplane signals 4209 going to the NWQ_BUF and NEQ_BUF buffers 4201, 4203, and the south halfplane signals 4211 going to the SWQ_BUF and SEQ_BUF buffers 4205, 4207. This allows individual control of each halfplane for shifting bitplane data as described in the following section entitled "Input Output Sequencer (IOSEQ)." The I/O sequencer 607 has priority over other operations. Therefore, execution is frozen during insertion of I/O sequencer CM_Sel and WRAM Sel commands by the I/O sequencer 607.

10.9.5 Global Signals

Generation of the chip GLOR value begins by combining the PEGLOR outputs of all PEs 701 within a 4×4 PE group to create a single, registered 4×4 PEGLOR output for the group. The PEGLOR outputs from each of the 4×4 PE groups is supplied to a respective input of a PEGLOR OR gate 4313. A remaining input of the PEGLOR OR gate 4313 receives a PEG GLOR output signal from a preceding PEG in the quadrant. The output of the PEGLOR OR gate 4313 is a PEG GLOR output signal for this PEG. By combining the PEG GLOR output signals 4313 within a quadrant as shown, a Quad GLOR signal 4213 for that quadrant is generated. The Quad GLOR signals 4213 are each supplied to a respective one of the Quad GLOR control blocks (NW Quad GLOR control block 4215, NE Quad GLOR control block 4217, SW Quad GLOR control block 4219, and SE Quad GLOR control block 4221). The Quad GLOR signals 4213 are also supplied to respective inputs of a 4-input OR gate 4223, which generates a chip GLOR signal 4225. The chip GLOR signal 4225 is supplied to one input of a multiplexor 4233, the other input of which receives the GLOR_IN signal 4235. The output of the multiplexor 4233 supplies a signal to Chip GLOR control logic 4237, which includes the GLOR_Data Register 1825.

The chip OVER signal 4227 is generated in a similar manner, except that it is registered twice instead of once. Also, because there is no Quad OVER signal, the 16 PEG OVER signals are combined directly to provide the chip OVER signal 4227. The chip OVER signal 4227 is supplied to one input of a multiplexor 4239. Another input of the multiplexor 4239 receives the chip GLOR signal 4225. This arrangement allows either of the chip OVER and chip GLOR signals 4227, 4225 to be supplied as the GSTAT signal 4241.

Quad GLOR data is broadcast to the array by providing the Quad GLOR values (output by the Quad GLOR control blocks, i.e., NW Quad GLOR control block 4215, NE Quad GLOR control block 4217, SW Quad GLOR control block 4219, and SE Quad GLOR control block 4221) to respective ones of the quad buffers (NWQ_BUF 4201, NEQ_BUF 4203, SWQ_BUF 4205 and SEQ_BUF 4207), along with the controls for Quad GLOR broadcast. The GLOR broadcast data is supplied to the PEGs as Scalar data with the appropriate memory controls for propagating scalar data.

Chip GLOR values are broadcast in a similar manner, except that the same data is supplied to all four quad buffers.

RowGLOR and ColGLOR values are extracted from each PEG as multi-bit data as shown in FIGS. 43A, 43B and 43C.

A 4×16 PEG will have four bits of RowGLOR data and sixteen bits of ColGLOR data (reflecting the PEG dimensions). The RowGLOR signals from each PEG are combined with those of other PEGs to produce the multi-bit Chip RowGLOR signal 4229 reflecting the row OR values. The Chip RowGLOR signal 4229 is supplied to the Y-pattern register 1829. Similarly, the ColGLOR signals from each PEG are combined with those of other PEGs to produce, in the X-pattern register 1827, the multi-bit Chip RowGLOR signal 4231 reflecting the column OR values.

The broadcast of Row and Col pattern values (respective outputs of X-pattern and Y-pattern registers 1827, 1829) is accomplished by distributing the pattern data to the PEs 701 in a similar manner to that of the RowGLOR and ColGLOR distribution.

11. Input Output Sequencer (IOSEQ)

In the exemplary embodiment, the I/O-Sequencer 607 can perform any one of three operations:

1) an image move (from I/O RAM 107 to the PE array 103 via the CM plane 605, or from the PE array 103 to the I/O RAM 107 via the CM plane 605);

2) generating a list of "hits" from a single bitplane ("hitplane") (i.e., identifying which PEs 701 in the PE array 103 have data satisfying a particular criterion);

3) generating a histogram of image data that exists in the I/O RAM 107. (The generated histogram comprises a number of "bin counts", each of which is a value representing the frequency of occurrence of a corresponding data value.)

These operations are now described in greater detail.

11.1 Image Move Operation

An Image Move operation moves an image between a host processor's memory and the MCC IC 101. In order to facilitate use of the MCC IC 101, data is received from an external source and stored into the I/O RAM 107 in pixel format. In one aspect of the invention, the data is then moved to the PE array 103 in such a way as to simplify the re-ordering of data from one PE 701 to the next so that each PE 701 holds (e.g., in its PE RAM 601) all of the bits associated with one pixel. (This type of re-ordering is referred to as "pixel corner-turning"). In the exemplary embodiment, the movement of data from the I/O RAM 107 to the PE array 103 facilitates corner-turning only for images comprising 1-, 8-, 16- or 32-bit pixels.

Assume that the image data is stored in an externally-located general-purpose micro-processor (uP) memory in raster-scanned pixel order with each image line starting on a 64-bit boundary. The transfer of image data from uP memory to an array of MCC ICs 101 may proceed as a simple memory-move starting from the base address of the image using a linear address sequence. It is a function of board-level logic to sequence the chip select lines for the individual MCC ICs 101 during the image transfer. Table 86 shows a typical memory image for an 8-bit image with the pixel nomenclature shown as row, column coordinates for a 2×2 array of MCC ICs 101.

TABLE 86

| | The Image in uP Memory (64-bits wide) | | | | | | | |
|---|---|---|---|---|---|---|---|---|
| Address (Hex) | Byte 0 | Byte 1 | Byte 2 | Byte 3 | Byte 4 | Byte 5 | Byte 6 | Byte 7 |
| 0 | 0,00 | 0,01 | 0,02 | 0,03 | 0,04 | 0,05 | 0,06 | 0,07 |
| 1 | 0,08 | 0,09 | 0,0A | 0,0B | 0,0C | 0,0D | 0,0E | 0,0F |
| 2 | 0,10 | 0,11 | 0,12 | 0,13 | 0,14 | 0,15 | 0,16 | 0,17 |
| 3 | 0,18 | 0,19 | 0,1A | 0,1B | 0,1C | 0,1D | 0,1E | 0,1F |
| ... | | | | | | | | |
| 8 | 1,00 | 1,01 | 1,02 | 1,03 | 1,04 | 1,05 | 1,06 | 1,07 |
| ... | | | | | | | | |

After being written to an MCC IC 101 in an array of MCC ICs 101, the data will be in one of two banks of memory (determined by mode and address written to) that, together, make up the I/O RAM 107. Each bank is organized as 1K×64. (This may be implemented, for example, as eight separate memories with each being 1K×8.) The data will be in the same organization as uP memory with the exception that the pixels will be in 32×32 tiles. A sample 8-bit image with pixel addresses relative to the MCC IC 101 in the array is shown in Table 87. Note that an MCC IC's pixel-row will take up four addresses in the I/O RAM 107:

TABLE 87

| | The image in I/O Memory (64-bits wide) | | | | | | | |
|---|---|---|---|---|---|---|---|---|
| Address (Hex) | Byte 0 | Byte 1 | Byte 2 | Byte 3 | Byte 4 | Byte 5 | Byte 6 | Byte 7 |
| 0 | 0,00 | 0,01 | 0,02 | 0,03 | 0,04 | 0,05 | 0,06 | 0,07 |
| 1 | 0,08 | 0,09 | 0,0A | 0,0B | 0,0C | 0,0D | 0,0E | 0,0F |
| 2 | 0,10 | 0,11 | 0,12 | 0,13 | 0,14 | 0,15 | 0,16 | 0,17 |
| 3 | 0,18 | 0,19 | 0,1A | 0,1B | 0,1C | 0,1D | 0,1E | 0,1F |
| 4 | 1,00 | 1,01 | 1,02 | 1,03 | 1,04 | 1,05 | 1,06 | 1,07 |
| 5 | 1,08 | 1,09 | 1,0A | 1,0B | 1,0C | 1,0D | 1,0E | 1,0F |
| ... | | | | | | | | |
| 0C | 03,00 | 03,01 | 03,02 | 03,03 | 03,04 | 03,05 | 03,06 | 03,07 |
| 0D | 03,08 | 03,09 | 03,0A | 03,0B | 03,0C | 03,0D | 03,0E | 03,0F |
| 0E | 03,10 | 03,11 | 03,12 | 03,13 | 03,14 | 03,15 | 03,16 | 03,17 |
| 0F | 03,18 | 03,19 | 03,1A | 03,1B | 03,1C | 03,1D | 03,1E | 03,1F |
| ... | | | | | | | | |
| 7E | 1F,10 | 1F,11 | 1F,12 | 1F,13 | 1F,14 | 1F,15 | 1F,16 | 1F,17 |
| 7F | 1F,18 | 1F,19 | 1F,1A | 1F,1B | 1F,1C | 1F,1D | 1F,1E | 1F,1F |

Figure 27:
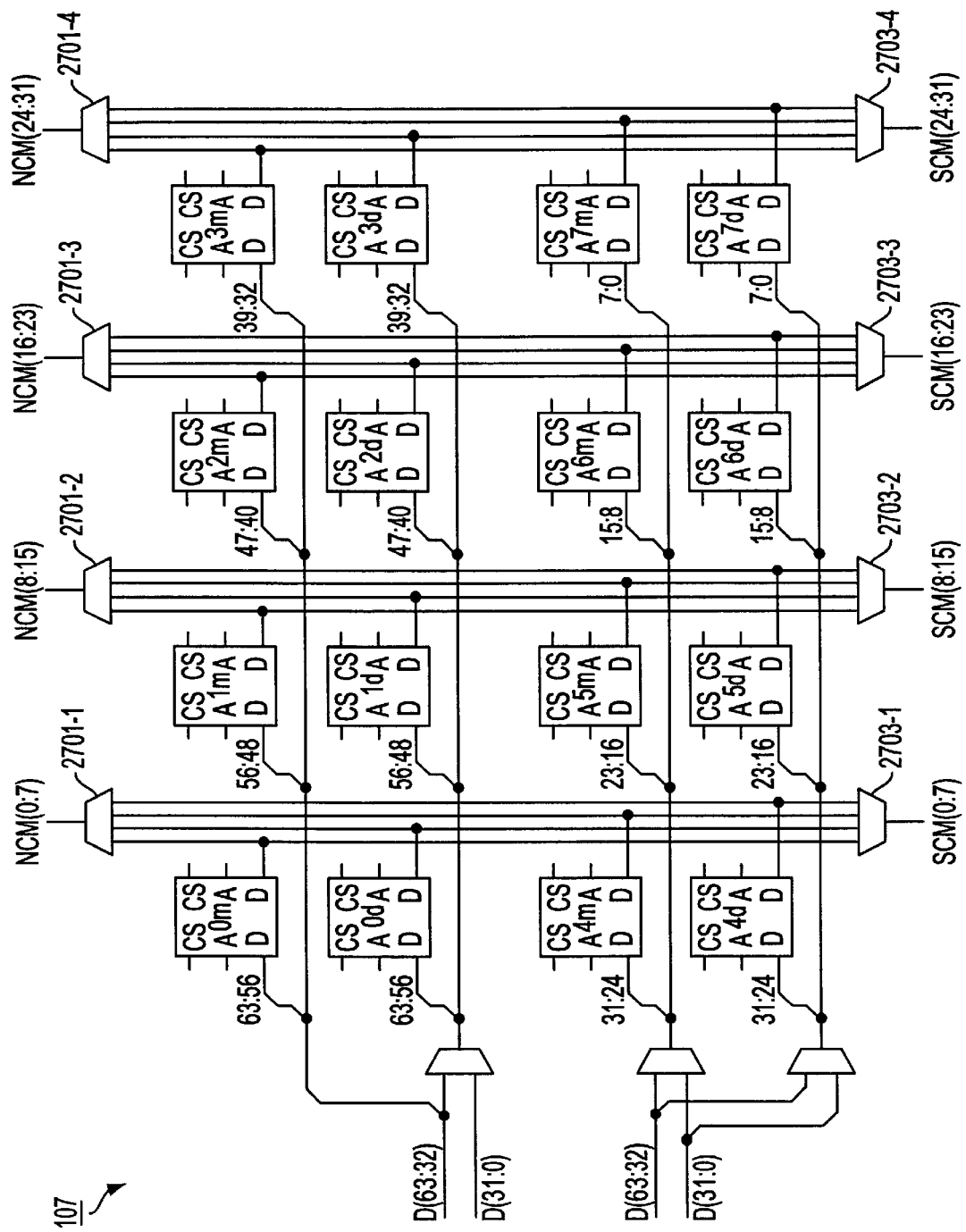
FIG. 27 is a block diagram of an exemplary embodiment of the I/O RAM in accordance with one aspect of the invention.

An exemplary embodiment of the I/0 RAM 107 is depicted in FIG. 27. The I/O-RAM 107 is organized into two banks, with each bank divided into two blocks, designated "upper" and "lower", where "upper" and "lower" refer to the relative bit positions of parts of the 64-bit data word supplied to or read from the memories by a source that is external to the MCC IC 101. In the exemplary embodiment, memories 0–3 are upper and 4–7 are lower.

In accordance with one aspect of the invention, the various banks may be accessed in a number of ways, as will be described in greater detail below. In two of the access modes, the two banks will be accessible in contiguous memory space. For another access mode, the I/O RAM 107 will be split into the two banks with externally generated addressed memory access only to the blocks suffixed with an 'm' and DMA accesses directed to the blocks suffixed with a 'd'.

FIG. 28A depicts how a sample image made up of 8-bit pixels will be stored in the I/O RAM 107, and in particular, shows how the pixels are distributed between the upper and lower blocks of the I/O RAM 107. This information corresponds to the information presented above in Table 87.

When the image data is read from the I/O-RAM 107 and shifted into the CM register plane of the PE array 103, the North half of the PE array 103 shifts in a northern direction, and the South half of the PE array 103 shifts in a southern direction. The North and South groups of CM registers 829 each read out of opposite blocks of I/O-RAM 107. The addresses generated for the upper (0–3) and lower (4–7) blocks of memory for an image move are shown in Table 88.

TABLE 88

| Image Size | Upper Block Address | | Lower Block Address | |
|---|---|---|---|---|
| | S % 2 = 0 | S % 2 = 1 | S % 2 = 0 | S % 2 = 1 |
| 1 | Base + INT(S/2) | Base + 15-INT(S/2) | Base + 15-INT(S/2) | Base + INT(S/2) |
| 8 | Base + S * 4 + I | | Base + (15-S)*4 + I | |
| 16 | Base + S * 8 + I | | Base + (15-S)*8 + I | |
| 32 | Base + S * 16 + I | | Base + (15-S)*16 + I | |

Where:
I = (0..(ImageSize/2) − 1) is the number of the bitplane that is being shifted into the CM registers 829, and
S = (0..15) is the current CM shift count for inputting the current bitplane
INT = Integer conversion using truncation.
The symbol "%" denotes the function "modulo".

In Table 88, the terms involving the number "15" (e.g., "15-INT(S/2)", and "Base+(1−S)*4+I") are presented for the exemplary embodiment, in which the PE array 103 is split into northern and southern halves, each having sixteen rows. For the more general case of an N×M array, the number "15" would be replaced by "(N/2)−1" (where N is assumed to be an even integer). It will also be recognized that the formulas for determining the upper and lower block addresses are a function of the Image Size, so that for an Image Size given by the variable ImageSize, the Upper Block Address is given by "Base+S*(*nageSize/2)+I", and the Lower Block Address is given by "Base+(((N/2)−1)−S) *(ImageSize/2)+I".

Address sequences for 1-bit images are shown in Table 89 (where "UB" designates "Upper Block" and "LB" designates "Lower Block".

TABLE 89

| Upper CM register group | | Lower CM register group | |
|---|---|---|---|
| Address | Mux Select | Address | Mux Select |
| 0 | UB | 0F | LB |
| 0 | LB | 0F | UB |
| ... | | ... | |
| 07 | UB | 08 | LB |
| 07 | LB | 08 | UB |

Address sequences for images made up of 8-bit pixels (for bitplane I in 0 . . . 7) are shown in Table 90.

TABLE 90

| Upper CM register group | | | Lower CM register group | | |
|---|---|---|---|---|---|
| Address | Mux Select | | Address | Mux Select | |
| (Hex) | I%2 = 0 | I%2 = 1 | (Hex) | I%2 = 0 | I%2 = 1 |
| 0 + I/2 | UB | LB | 7C + I/2 | LB | UB |
| 4 + I/2 | UB | LB | 78 + I/2 | LB | UB |
| ... | | | ... | | |
| 38 + I/2 | UB | LB | 44 + I/2 | LB | UB |
| 3C + I/2 | UB | LB | 40 + I/2 | LB | UB |

Address sequences for 16-bit images (for bitplane I in 0 . . . 0FH) are shown in Table 91.

TABLE 91

| Upper CM register group | | | Lower CM register group | | |
|---|---|---|---|---|---|
| Address | Mux Select | | Address | Mux Select | |
| (Hex) | I%2 = 0 | I%2 = 1 | (Hex) | I%2 = 0 | I%2 = 1 |
| 0 + I/2 | UB | LB | F8 + I/2 | LB | UB |
| 8 + I/2 | UB | LB | F0 + I/2 | LB | UB |
| ... | | | ... | | |
| 70 + I/2 | UB | LB | 88 + I/2 | LB | UB |
| 78 + I/2 | UB | LB | 80 + I/2 | LB | UB |

Address sequences for 32-bit images (for bitplane I in 0 . . . 1FH) are shown in Table 92.

TABLE 92

| Upper CM register group | | | Lower CM register group | | |
|---|---|---|---|---|---|
| Address | Mux Select | | Address | Mux Select | |
| (Hex) | I%2 = 0 | I%2 = 1 | (Hex) | I%2 = 0 | I%2 = 1 |
| 00 + I/2 | UB | LB | 1F0 + I/2 | LB | UB |
| 10 + I/2 | UB | LB | 1E0 + I/2 | LB | UB |
| ... | | | ... | | |
| E0 + I/2 | UB | LB | 110 + I/2 | LB | UB |
| F0 + I/2 | UB | LB | 100 + I/2 | LB | UB |

A typical read sequence is shown in Tables 93 and 94 for an 8-bit image showing the address that each half of the bank of CM registers 829 is reading from and which block is selected for that bank of CM registers 829. (The first bitplane is shown; subsequent bitplanes will be similar with Mux Selects toggling on bitplane boundaries and lower address bits incrementing on bitplane boundaries.)

TABLE 93

North CM

| Addr. | Mux Select | Byte 0 | Byte 1 | Byte 2 | Byte 3 |
|---|---|---|---|---|---|
| 00 | UB | 0,00 | 0,01 | 0,02 | 0,03 |
| 04 | UB | 1,00 | 1,01 | 1,02 | 1,03 |
| 08 | UB | 2,00 | 2,01 | 2,02 | 2,03 |
| 0C | UB | 3,00 | 3,01 | 3,02 | 3,03 |
| 10 | UB | 4,00 | 4,01 | 4,02 | 4,03 |
| 14 | UB | 5,00 | 5,01 | 5,02 | 5,03 |
| 18 | UB | 6,00 | 6,01 | 6,02 | 6,03 |
| 1C | UB | 7,00 | 7,01 | 7,02 | 7,03 |
| ... | | | | | |
| 38 | UB | E,00 | E,01 | E,02 | E,03 |
| 3C | UB | F,00 | F,01 | F,02 | F,03 |

TABLE 94

South CM

| Addr. | Mux Select | Byte 4 | Byte 5 | Byte 6 | Byte 7 |
|---|---|---|---|---|---|
| 7C | LB | 1F,04 | 1F,05 | 1F,06 | 1F,07 |
| 78 | LB | 1E,04 | 1E,05 | 1E,06 | 1E,07 |
| 74 | LB | 1D,04 | 1D,05 | 1D,06 | 1D,07 |
| 70 | LB | 1C,04 | 1C,05 | 1C,06 | 1C,07 |
| 6C | LB | 1B,04 | 1B,05 | 1B,06 | 1B,07 |
| 68 | LB | 1A,04 | 1A,05 | 1A,06 | 1A,07 |
| 64 | LB | 19,04 | 19,05 | 19,06 | 19,07 |
| 60 | LB | 18,04 | 18,05 | 18,06 | 18,07 |
| ... | | | | | |
| 44 | LB | 11,04 | 11,05 | 11,06 | 11,07 |
| 40 | LB | 10,04 | 10,05 | 10,06 | 10,07 |

Figure 28B:
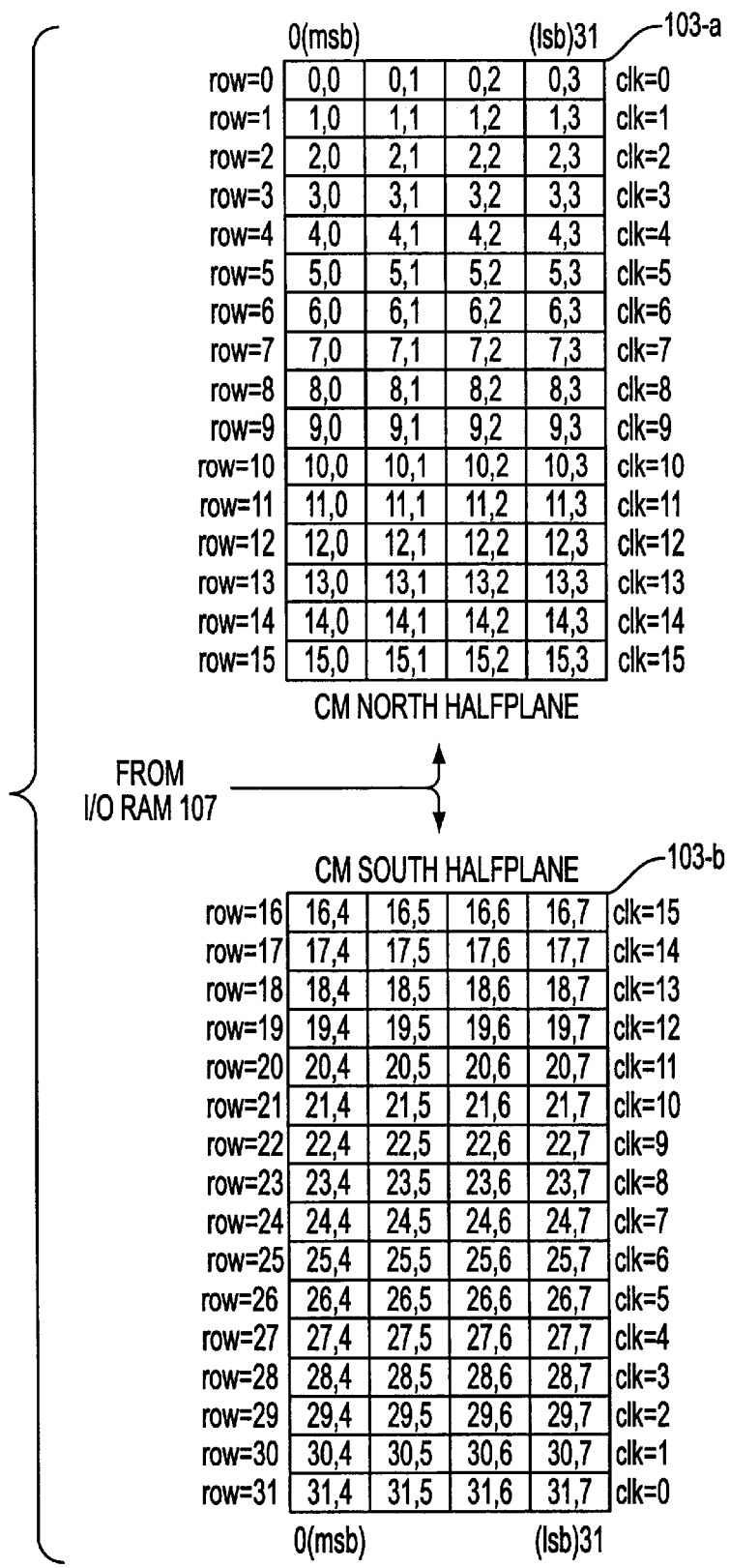

The resultant distribution of pixels in the north and south PE arrays 103-*a*, 103-*b* is shown in FIG. 28B.

After the first group of sixteen CM shifts into the PE array 103, the 8-bit pixels will be distributed as shown in Table 95 ("Bitplane #0"), and the next group of sixteen CM shifts produces the pattern shown in Table 96 ("Bitplane #1"). The data in each Table entry identifies a pixel by its row and column number in the original image. It will be observed that in this aspect of the invention, a bitplane has been provided to thirty-two rows of the PE array 103 in only sixteen shift operations.

TABLE 95

| | Bitplane #0 | | | |
|---|---|---|---|---|
| Rows | Col 0–7 | Col 8–15 | Col 16–23 | Col 24–31 |
| Row 0 | 00,00 | 00,01 | 00,02 | 00,03 |
| Row 1 | 01,00 | 01,01 | 01,02 | 01,03 |
| Row 2 | 02,00 | 02,01 | 02,02 | 02,03 |
| Row 3 | 03,00 | 03,01 | 03,02 | 03,03 |
| ... | | | | |
| Row 0F | 0F,00 | 0F,01 | 0F,02 | 0F,03 |
| Row 10 | 10,04 | 10,05 | 10,06 | 10,07 |
| ... | | | | |
| Row 1C | 1C,04 | 1C,05 | 1C,06 | 1C,07 |
| Row 1D | 1D,04 | 1D,05 | 1D,06 | 1D,07 |
| Row 1E | 1E,04 | 1E,05 | 1E,06 | 1E,07 |
| Row 1F | 1F,04 | 1F,05 | 1F,06 | 1F,07 |

TABLE 96

| | Bitplane #1 | | | |
|---|---|---|---|---|
| Rows | Col 0–7 | Col 8–15 | Col 16–23 | Col 24–31 |
| Row 0 | 00,04 | 00,05 | 00,06 | 00,07 |
| Row 1 | 01,04 | 01,05 | 01,06 | 01,07 |
| Row 2 | 02,04 | 02,05 | 02,06 | 02,07 |
| Row 3 | 03,04 | 03,05 | 03,06 | 03,07 |
| ... | | | | |
| Row 0F | 0F,04 | 0F,05 | 0F,06 | 0F,07 |
| Row 10 | 10,00 | 10,01 | 10,02 | 10,03 |
| ... | | | | |
| Row 1C | 1C,00 | 1C,01 | 1C,02 | 1C,03 |
| Row 1D | 1D,00 | 1D,01 | 1D,02 | 1D,03 |
| Row 1E | 1E,00 | 1E,01 | 1E,02 | 1E,03 |
| Row 1F | 1F,00 | 1F,01 | 1F,02 | 1F,03 |

Figure 28C:
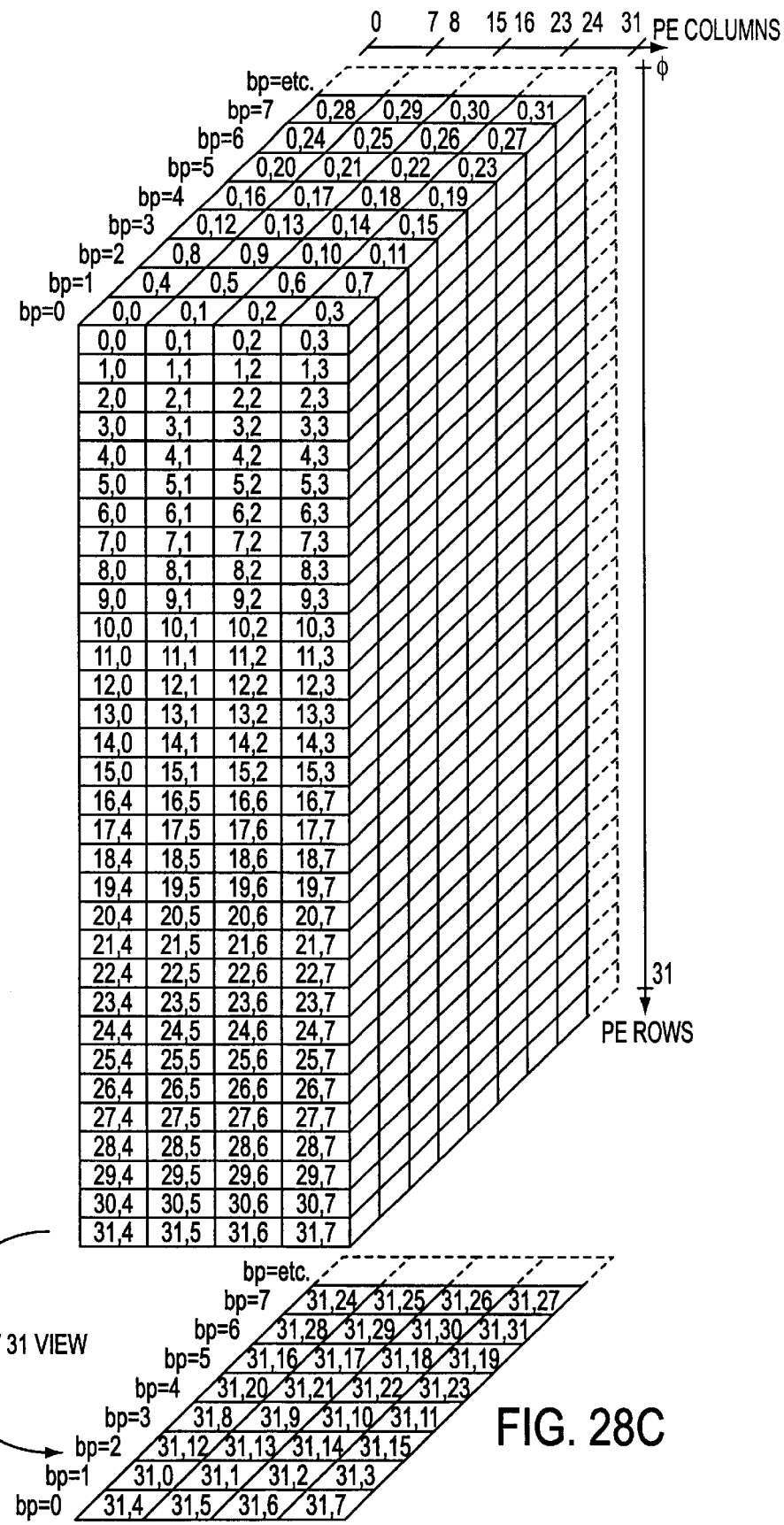

After the entire image has been shifted into the PE array 103, 8-bit pixels will be distributed as shown in FIG. 28C. For images made up of single-bit pixels, the distribution is exactly what is desired for processing (i.e., one pixel per PE 701). Tables 97 through 100 show a single-bit image sequence. Starting with Table 97, it shows a bit-plane image as written into I/O RAM 107. In the table, the notation 0,00 denotes a byte containing bits 0,0 through 0,7 of the bit plane; byte 0,01 denotes a byte containing bits 0,8 through 0,f; and so on.

TABLE 97

| | Memory (64-bits wide) | | | | | | | |
|---|---|---|---|---|---|---|---|---|
| Address (Hex) | Byte 0 | Byte 1 | Byte 2 | Byte 3 | Byte 4 | Byte 5 | Byte 6 | Byte 7 |
| 0 | 0,00 | 0,01 | 0,02 | 0,03 | 1,00 | 1,01 | 1,02 | 1,03 |
| 1 | 2,00 | 2,01 | 2,02 | 2,03 | 3,00 | 3,01 | 3,02 | 3,03 |
| 2 | 4,00 | 4,01 | 4,02 | 4,03 | 5,00 | 5,01 | 5,02 | 5,03 |
| ... | | | | | | | | |
| 0F | 1E,00 | 1E,01 | 1E,02 | 1E,03 | 1F,00 | 1F,01 | 1F,02 | 1F,03 |

Tables 98 and 99 show the read sequence for shifting a 1-bit image into the North bank of CM registers 829 and the South bank of CM registers 829, respectively.

TABLE 98

North CM

| Address | Mux Select | Byte 0 | Byte 1 | Byte 2 | Byte 3 |
|---|---|---|---|---|---|
| 0 | UB | 00,00 | 00,01 | 00,02 | 00,03 |
| 0 | LB | 01,00 | 01,01 | 01,02 | 01,03 |
| 1 | UB | 02,00 | 02,01 | 02,02 | 02,03 |
| 1 | LB | 03,00 | 03,01 | 03,02 | 03,03 |
| 2 | UB | 04,00 | 04,01 | 04,02 | 04,03 |
| 2 | LB | 05,00 | 05,01 | 05,02 | 05,03 |
| 3 | UB | 06,00 | 06,01 | 06,02 | 06,03 |
| 3 | LB | 07,00 | 07,01 | 07,02 | 07,03 |
| ... | | | | | |
| 7 | UB | 0E,00 | 0E,01 | 0E,02 | 0E,03 |
| 7 | LB | 0F,00 | 0F,01 | 0F,02 | 0F,03 |

TABLE 99

South CM

| Address | Mux Select | Byte 4 | Byte 5 | Byte 6 | Byte 7 |
|---|---|---|---|---|---|
| 0F | LB | 1F,00 | 1F,01 | 1F,02 | 1F,03 |
| 0F | UB | 1E,00 | 1E,01 | 1E,02 | 1E,03 |
| 0E | LB | 1D,00 | 1D,01 | 1D,02 | 1D,03 |
| 0E | UB | 1C,00 | 1C,01 | 1C,02 | 1C,03 |
| 0D | LB | 1B,00 | 1B,01 | 1B,02 | 1B,03 |
| 0D | UB | 1A,00 | 1A,01 | 1A,02 | 1A,03 |
| 0C | LB | 19,00 | 19,01 | 19,02 | 19,03 |
| 0C | UB | 18,00 | 18,01 | 18,02 | 18,03 |
| ... | | | | | |
| 08 | LB | 11,00 | 11,01 | 11,02 | 11,03 |
| 08 | UB | 10,00 | 10,01 | 10,02 | 10,03 |

Table 100 shows the bit-plane image as it appears in the CM plane within the PE array 103.

TABLE 100

CM Bitplane

| Rows | Col 0–7 | Col 8–15 | Col 16–23 | Col 24–31 |
|---|---|---|---|---|
| Row 0 | 00,00 | 00,01 | 00,02 | 00,03 |
| Row 1 | 01,00 | 01,01 | 01,02 | 01,03 |
| Row 2 | 02,00 | 02,01 | 02,02 | 02,03 |
| Row 3 | 03,00 | 03,01 | 03,02 | 03,03 |
| ... | | | | |
| Row 0F | 0F,00 | 0F,01 | 0F,02 | 0F,03 |
| Row 10 | 10,00 | 10,01 | 10,02 | 10,03 |
| ... | | | | |
| Row 1C | 1C,00 | 1C,01 | 1C,02 | 1C,03 |
| Row 1D | 1D,00 | 1D,01 | 1D,02 | 1D,03 |
| Row 1E | 1E,00 | 1E,01 | 1E,02 | 1E,03 |
| Row 1F | 1F,00 | 1F,01 | 1F,02 | 1F,03 |

Referring back now to FIG. 28C, for pixel sizes greater than 1, the bits that make up any one pixel are, up to this point, distributed among a number of PEs 701. For example, looking at FIG. 28C, it can be seen that the 8-bit pixel (0,0) has each of its eight bits allocated to a different one of eight PEs 701 that make up row 0, columns 0 . . . 7 of the PE array 103. In particular, these bits are each stored at a location within either the PE- or Page RAM 601, 603 that has been allocated to bit plane (bp) 0. It will also be seen that each of these same PEs 701 (i.e., the ones that make up row 0, columns 0 . . . 7 of the PE array 103) also stores, at other memory locations, a bit from other pixels as well, such as the pixel (0,4). Consequently, it can be seen that the pixels must be further repositioned within the PE array 103 in order to arrive at the situation in which each PE 701 has stored therein all of the bits associated with a particular pixel.

Although the pixel distribution illustrated in FIG. 28C is not conducive to efficient use of the SIMD architecture for image processing, in accordance with one aspect of the invention this distribution facilitates the further redistribution of the pixels because the pixel data that is ultimately destined for a given row of PEs 701 is already completely located somewhere in that row. This reduces the amount of shifting between PEs 701 that will be required to perform the redistribution. Although the pixel distribution pattern is different between the North sixteen rows and the South sixteen rows of the PE array 103 for any pixel size other than one, it remains true that the pixel data that is ultimately destined for a given row of PEs 701 is already completely located somewhere in that row.

Figures 29A, 29B, 29C, 29D:
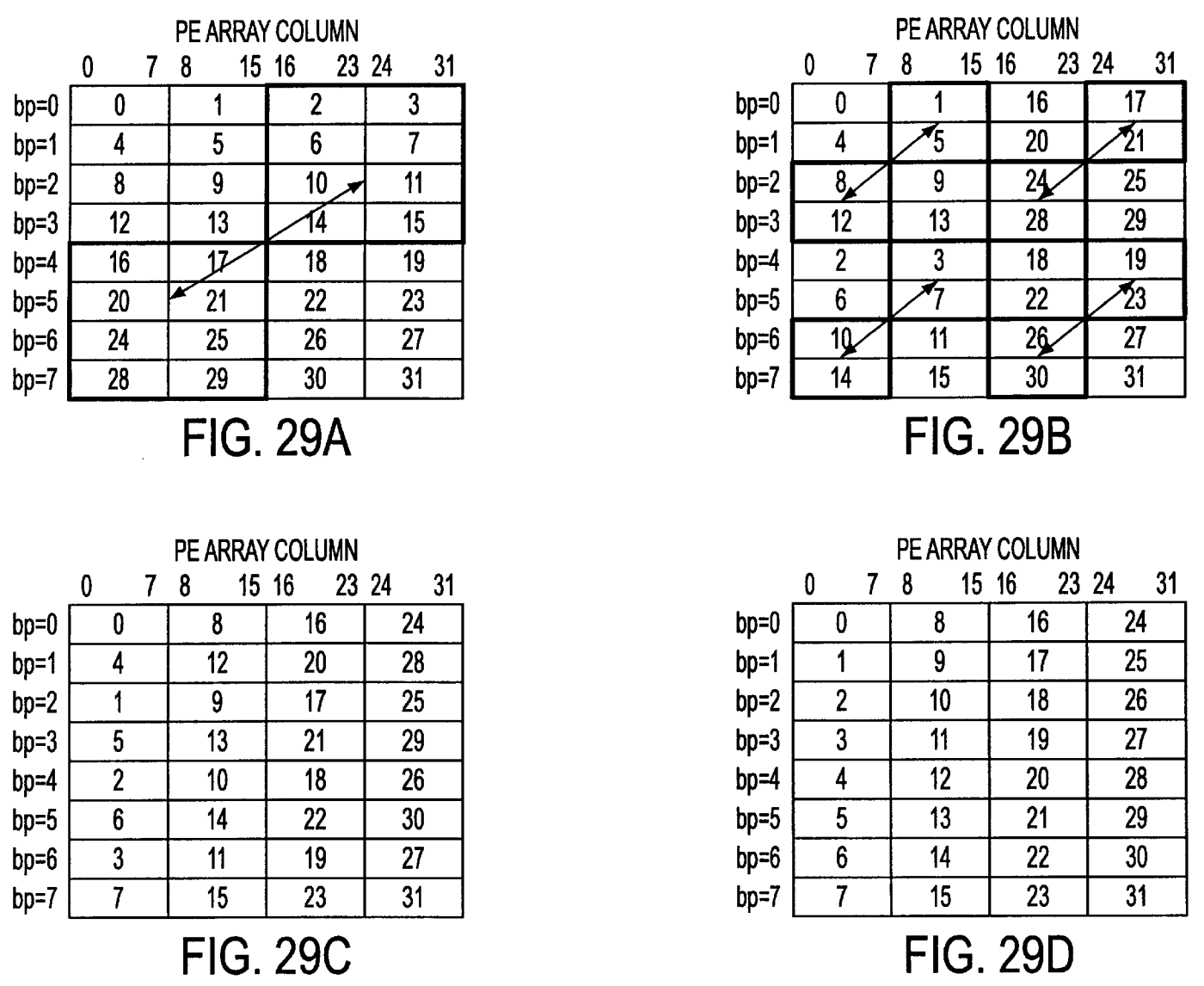

In one embodiment, an array algorithm is used to reposition the data so that each PE 701 has stored therein all of the bits that make up an individual pixel. One such algorithm for 8-bit pixel data will now be described with reference to FIGS. 29A–29I. FIG. 29A depicts the locations of pixels in one row of the PE array 103 just after they have been moved from the I/O RAM 107 to the PE array 103. Because the algorithm does not involve other PE rows, and because the algorithm is equally applied to all rows in the PE array 103, it is only necessary to show one row for the purpose of illustration. In this example, PE row 0 is depicted, with 8-bit pixels being distributed in two dimensions: across the PE row (i.e., from PE column 0 through PE column 31) and across bitplanes 0 through 7 (i.e., at eight different addressable storage locations within each of the PEs 701 in the row).

The first step in the repositioning algorithm is to swap the locations of pixels 2, 3, 6, 7, 10, 11, 14 and 15 with the corresponding locations of pixels 16, 17, 20, 21, 24, 25, 28 and 29. The resultant pixel distribution is depicted in FIG. 29B. Note that for each pixel, a swap requires moving one bit of information from a first addressable storage location (bitplane location) in each of eight PEs 701 to a second addressable storage location in each of eight other PEs 701.

The next step, which is depicted in FIG. 29B, is to swap the locations of pixels 1 and 5 with the locations of 8 and 12; to swap the locations of pixels 17 and 21 with the locations of pixels 24 and 28; to swap the locations of pixels 3 and 7 with the locations of pixels 10 and 14; and to swap the locations of pixels 19 and 23 with the locations of pixels 26 and 30. The resultant pixel distribution is shown in FIG. 29C.

The next step is to change only the bitplane locations of the pixels so that pixels end up in ascending order within each 8-PE-wide column of pixels. In this operation, it is only necessary to move bits from one addressable storage location in a PE 701 to another addressable storage location within that same PE 701; it is unnecessary to move bits from one PE 701 to another. The resultant pixel distribution is depicted in FIG. 29D. It will be observed that the bits for each of pixels 0 through 7 are spread across the PEs located in columns 0 through 7; that the bits for each of pixels 8 through 15 are spread across the PEs located in columns 8 through 15; that the bits for each of pixels 16 through 23 are spread across the PEs located in columns 16 through 23; and that bits for each of pixels 24 through 31 are spread across the PEs located in columns 24 through 31. Thus, further processing requires application of the same shuffle pattern to each of the four groups of eight PEs 701.

FIG. 29E shows the pixel distribution in one of the four groups of eight PEs 701, namely, those pixels 0 through 7 located in the PE's of row 0, columns 0 through 7. In FIG. 29E, each pixel is identified by pixel number and bit number. The next step is to swap the locations of 4×4 blocks of pixel bits as shown in FIG. 29E. The resultant arrangement of pixel bits is depicted in FIG. 29F.

The next step is to swap 2×2 blocks of pixel bits with the locations of other 2×2 blocks of pixel bits, as shown in FIG. 29F. The resultant pixel bit distribution is depicted in FIG. 29G. Next, the location of individual pixels are swapped with those of other individual pixels, as shown in FIG. 29G. The resultant arrangement of pixel bits is shown in FIG. 29H. It can be seen that, at this point, all of the bits for pixel 0 are stored in addressable locations of the column 0 PE 701, that all of the bits for pixel 1 are stored in addressable locations of the column 1 PE 701, and so on. All that remains is to reorder the storage locations of the bits within each PE 701 so that the bits appear in ascending storage locations. The results of this final step are shown in FIG. 29I.

11.1.1 Address Generation for Image Move

Figure 30:
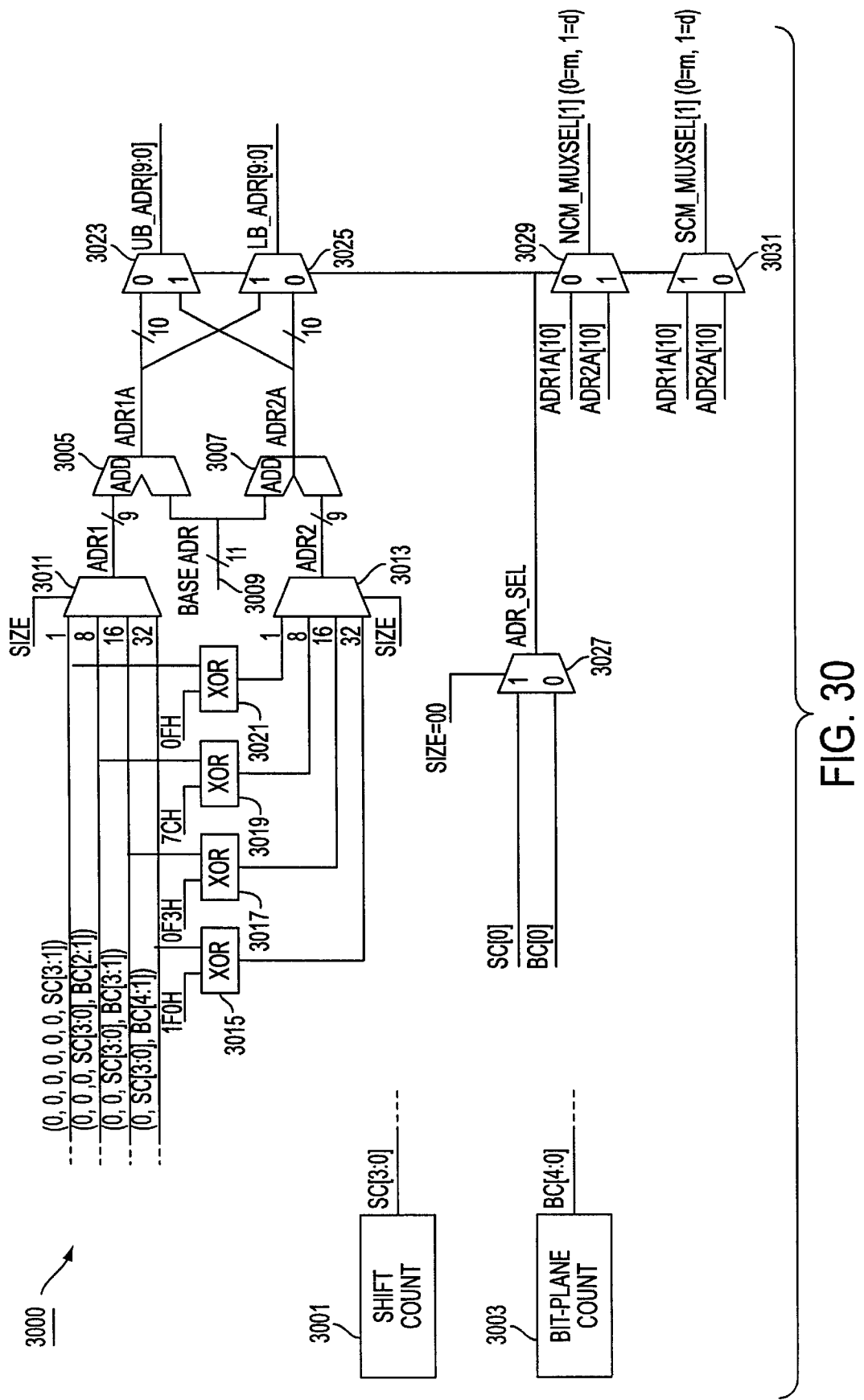
FIG. 30 is a block diagram of an exemplary embodiment of an Address Generator for an Image Move operation in accordance with one aspect of the invention.

An exemplary embodiment of an Address Generator 3000 for an Image Move operation is depicted in FIG. 30. The Address Generator 3000 includes first and second adders 3005, 3007, each of which receives a Base Address signal 3009 at one of its inputs. A second input of the first adder 3005 is supplied by a first multiplexor 3011. Similarly, a second input of the second adder 3007 is supplied by a second multiplexor 3013. Each of the first and second adders 3005, 3007 generates an address (adr1a, ad42a) of one of the memory blocks to be accessed. The generated address is derived from the current state of a shift counter 3001, a bitplane counter 3003 and a Size code. A Size code of 0 means the 1-bit pixels are to be moved; a Size code of 1 means that 8-bit pixels are to be moved; a Size code of 2 means that 16-bit pixels are to be moved; and a Size code of 3 means that 32-bit pixels are to be moved. The adr1 address is a "count up" value, while the adr2 address is a "count down" value. In this embodiment, counting down is accomplished by inverting the counter-based address inputs with XOR gates 3015, 3017, 3019, 3021.

The adr1a address is supplied to a "0" input of a third multiplexor 3023 and also to a "1" input of a fourth multiplexor 3025. The adr2a address is supplied to a "1" input of the third multiplexor 3023 and also to a "0" of the fourth multiplexor 3025. The third multiplexor 3023 supplies an address to an upper block of I/O RAM 107, while the fourth multiplexor 3025 supplies an address to a lower block of I/O RAM 107. This arrangement permits an Adr_Sel signal, supplied by an Adr_Sel multiplexor 3027, to determine whether, on a given clock, the adr1a value will be routed to the upper block or lower block of I/O RAM 107, and vice versa for the adr2a address. The input to a "0" input of the Adr_Sel multiplexor 3027 is the least significant bits of the output of the bitplane counter 3003, and the input to a "1" input of the Adr_Sel multiplexor 3027 is the least significant bit of the shift counter 3001.

Selection by Adr_Sel multiplexor 3027 is controlled by a signal that is asserted when the Size code equals zero. As a consequence, when multi-bit images are moved, the Adr_Sel signal causes the mapping of adr1a/adr2a to upper/lower block to alternate on bit-plane boundaries. When a 1-bit image is moved, Adr Sel alternates on bit-line boundaries.

The Adr_Sel signal also controls the NCM_MUXSEL/SCM_MUXSEL multiplexors 3029, 3031, and generates the appropriate output values (NCM_MUXSEL, SCM_MUXSEL) as shown in Tables 101 and 102.

The terminal count for the bitplane counter 3003 will be image size dependent. Because the number of rows in each of the North and South halves of the PE array 103 is constant (e.g., sixteen in the exemplary embodiment), the terminal count for the shift counter 3001 is also constant.

The memory blocks selected by the Data Multiplexors 2701-1 ... 2701-4 and 2703-1 ... 2703-4 (see FIG. 27) are shown in Tables 101 and 102.

TABLE 101

| ADR_SEL | NCM MUXSEL[1] | NCM Data |
|---|---|---|
| 0 | 0 | 0 m–3 m |
| 1 | 0 | 4 m–7 m |
| 0 | 1 | 0 d–3 d |
| 1 | 1 | 4 d–7 d |

TABLE 102

| ADR_SEL | SCM MUXSEL[1] | SCM Data |
|---|---|---|
| 0 | 0 | 4 m–7 m |
| 1 | 0 | 0 m–7 m |
| 0 | 1 | 4 d–7 d |
| 1 | 1 | 0d –7 d |

11.2 Image Page Operation

An image page operation is similar to an image move operation with the difference being that a page operation simply transfers the bitplanes as if they were individual bitplane images (i.e., no provision is made for adjusting the locations of data in order to simplify corner-turning). As a result, an image page operation can be any number of bitplanes within the limits of the Image Descriptor 1301. In the exemplary embodiment, however, an image move operation must be either a single bitplane, or an 8-bit, 16-bit, or 32-bit image.

11.3 Hitplane Operation

I/O-Ram address generation for a hitplane operation is different from that for the image move and page operations. For hitplane operation, the bank of CM registers 829 are each loaded with data indicating whether a hit occurred in a respective one of the PEs 701 (a "1" indicates a hit). At the completion of the hitplane operation, the I/O-RAM 107 will be loaded with the number of 'hits' in the bitplane followed by a list of the X-Y location of the "hits". The format of the data in the I/O-RAM 107 after this operation is complete is shown in Table 103.

TABLE 103

| Address (Hex) | Memory (64-bits wide) | | | | | | | |
|---|---|---|---|---|---|---|---|---|
| | Byte 0 | Byte 1 | Byte 2 | Byte 3 | Byte 4 | Byte 5 | Byte 6 | Byte 7 |
| Base + 0 | Hit Count | | $X_0$ | $Y_0$ | $X_1$ | $Y_1$ | $X_2$ | $Y_2$ |
| Base + 1 | $X_3$ | $Y_3$ | $X_4$ | $Y_4$ | $X_5$ | $Y_5$ | $X_6$ | $Y_6$ |
| ... | | | | | | | | |

Figure 31:
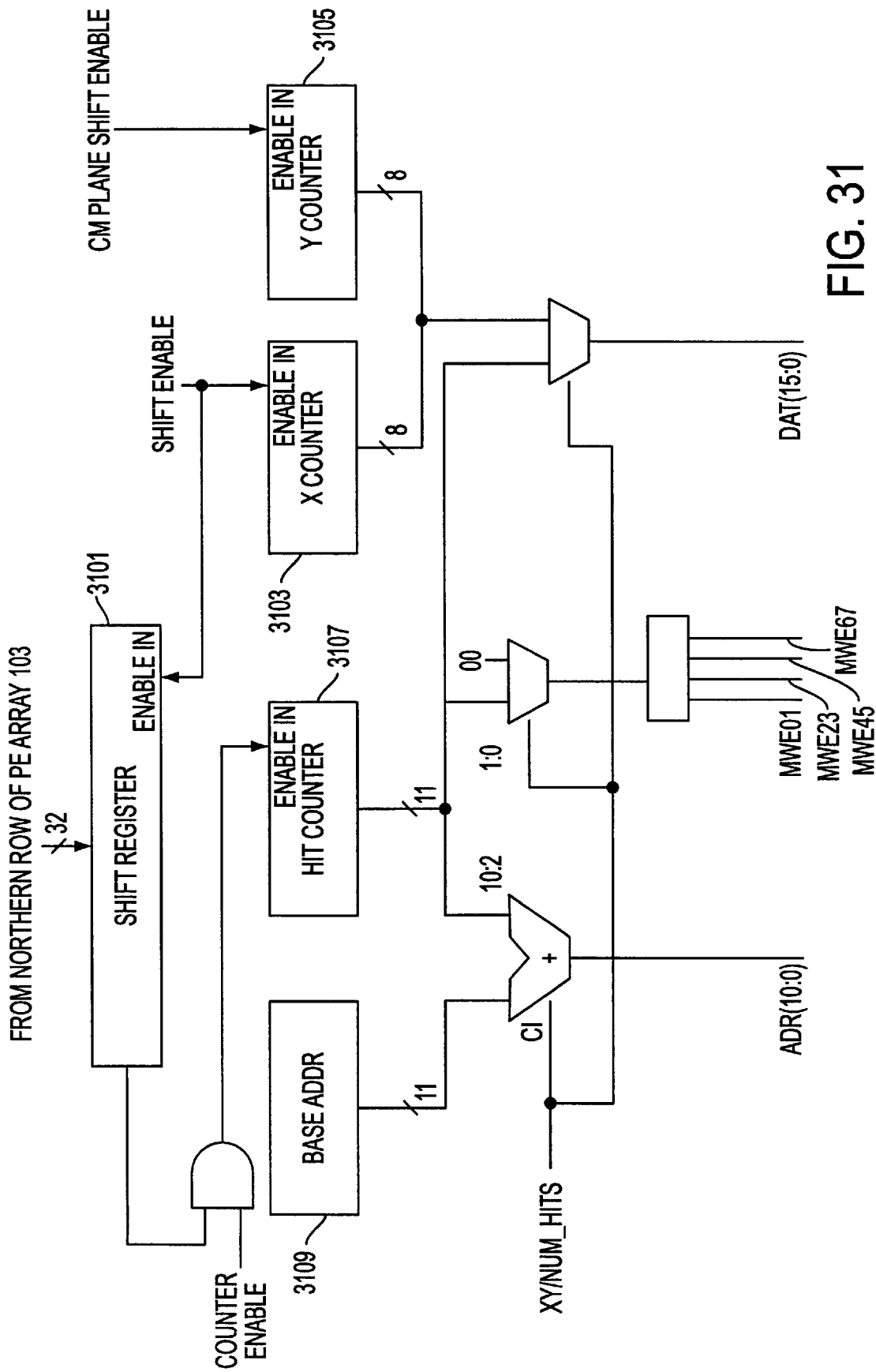
FIG. 31 is a block diagram of hitplane logic in accordance with one aspect of the invention.

In the exemplary embodiment, a 'brute force' method is utilized in which the upper and lower banks of CM registers 829 are linked and each shift of the CM register plane to the North takes the 32-bit data and loads it into a shift register 3101, as illustrated in FIG. 31. After this load, the shift register 3101 is shifted one bit at a time. Each shift of this register will either write a 'hit' into the I/O-RAM 107 or not, as a function of whether -a hit was detected (e.g., detecting that a "1" bit was shifted out of the shift register 3101). This method takes a deterministic time to complete and therefore minimiizes rendezvous complications for the MCC IC array controller (i.e., since this process always takes the same amount of time, a non-handshake (timed) rendezvous can be employed). A common address will be generated for each of the I/O RAM blocks, with information being written into groups of two memory blocks (i.e., pairs of byte-wide memories as shown in FIG. 27) using the individual memory enable signals. In the exemplary embodiment, the execution time for a hitplane operation is ((32×32)+5)=1029 PCLK cycles. An exemplary apparatus for generating the necessary control and address signals for this operation is shown in FIG. 31. An X-counter 3103 is incremented once for every shift of the shift register 3101. A Y-counter 3105 is incremented once for every shift of the CM plane in the PE array 103. A hit counter 3107 is incremented whenever a hit is shifted out of the shift register 3101. The contents of a base address register 3109 are combined with a present value of the hit counter 3107 to generate an I/O RAM address for storing the X and Y locations of a most recently detected hit.

11.4 Histogram Operation

In order to simplify the hardware in the exemplary embodiment, the histogramming of only 8 and 16-bit images is supported with a bin counter of 8-bits. A designated range of 8-bit memory locations in the I/O RAM 107 serves as the bins for storing count information for a corresponding value. It is possible for the data in the 8-bit bin counter to overflow because there are 1024 PEs 701 in the PE array 103. In the event of a bin overflow, the bin count should be stalled at the maximum count (e.g., 255). Where a uniform background exists in an image, the possibility of a predominant value overflowing one bin is fairly great. The possibility of overflowing two bins is substantially less because this implies a sufficiently even distribution between two values that jointly occupy half or more of the (chip) image. Therefore the occurrence of bin overflow is detected by the histogram logic and is supplied as an event signal to the profile logic.

The histogram image source is the I/O RAM 107, and in the case of a 16-bit image only the least significant 12-bits are used. (It is therefore advisable for programmers to make sure that images are processed into twelve-bit pixels or less before histogramming.) This approach will allow histogramming of image data which is being input to the chip for 8 and 16-bit images. For any other image size, the array must be used to remap the data into a maximum of 12-bits and output to the I/O RAM 107 as either an 8-bit or a 16-bit image (with the image data contained in the lower 12 bits).

Note that the entire I/O RAM 107 cannot be used as bin-counters because in one of the memory modes (mode 10, described in greater detail below), only one half of the I/O RAM 107 is accessible to the memory interface for processor access. If the image source is allowed to be the I/O RAM 107, then a 16-bit image will take up 256 locations, and 4K bin counters (12-bits used for the histogramming) will take up 512 locations, leaving 256 locations open in the memory space for that half of the I/O RAM 107. To simplify address parameter passing; the output of histogramming should always use the same output space in the IO/O RAM 107 (e.g., 0x200, which is the upper half of the lower bank of I/O RAM 107.)

Figure 32:
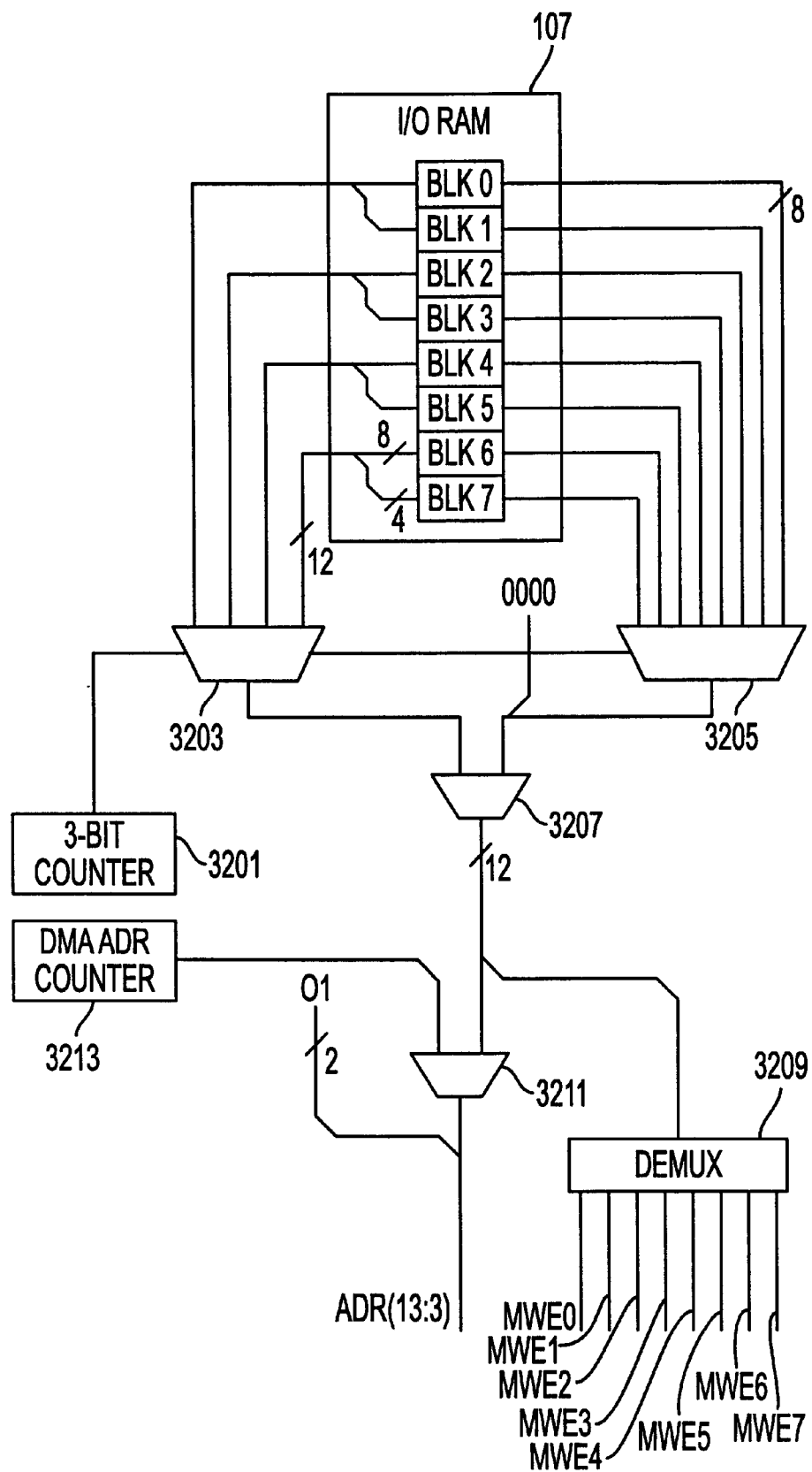
FIG. 32 is a block diagram of an exemplary address generator for supporting a histogram operation in accordance with one aspect of the invention.

In the exemplary embodiment, the histogram operation is supported by an address generator as shown in FIG. 32. The I/O RAM 107 is depicted. To the left of the I/O RAM 107 is a depiction of 12-bit data read operations, while to the right of the I/O RAM 107 is a depiction of 8-bit data reads.

The 12-bit data is derived from the twelve low-order bits of 16-bit data. The four 12-bit addresses are supplied to respective inputs of a first multiplexor 3203, while the eight 8-bit addresses are supplied to respective inputs of a second multiplexor 3205.

The output from a 3-bit counter 3201 is supplied to the control inputs of the first and second multiplexors 3203, 3205 in order to address consecutive blocks during 8-bit accesses, and to address consecutive block pairs during 12-bit accesses (ignoring the third bit as a multiplexor select).

The 12-bit data, supplied by the first multiplexor 3203, is supplied to a first input of a third multiplexor 3207. The 8-bit data is padded with four high-order 0's to create a uniform 12-bit binary number, and the padded data is supplied to a second input of the third multiplexor 3207.

The lower three bits from the output of the third multiplexor 3207 are supplied to a decoder 3209, which generates write enables to the eight blocks of the I/O RAM 107. The remaining (high-order) nine bits from the output of the third multiplexor 3207 are supplied to a first input of a fourth multiplexor 3211, the second input of which receives an address from a DMA address counter 3213. During histogram operation, the fourth multiplexor 3211 selects the output from the third multiplexor 3207.

The nine bits supplied by the fourth multiplexor are combined with two high-order bits that are hard wired to "10", thereby generating an eleven-bit address and enforcing a base address of 0x200 for the histogram.

The 8-bit wide contents of the location in the I/O RAM 107 designated by the generated address are read, incremented (if not equal to the maximum value), and then rewritten back to that same location. It is the responsibility of the MCC IC array controller to clear the contents of the I/O RAM 107 (by writing a zeroed image) prior to starting the histogram process so that all bin-counters start off at zero.

Execution time for the two histogram sizes are shown below in Table 104. They vary due to the different number of pixels contained in one I/O RAM location.

TABLE 104

| Histogram Image Size | PCLK Clocks | Formula |
| --- | --- | --- |
| 8 bits | 2306 | (((32 * 32)/8) * 18) + 2 |
| 16 bits | 2562 | (((32 * 32)/4) * 10) + 2 |

12. Memory Interface Unit

The Memory Interface (see Table 2 and associated text) allows access to the following:

the Mailbox Memory 1821;

a Chip ID Register 1833;

a DMA Base Register 1841; and one port of the I/O RAM 107.

12.1 Memory Interface Modes

The configuration and external access mode of the Memory Interface is determined by the mode select signals (MODE(1:0)—see Table 2). Valid modes are shown in Table 105.

TABLE 105

| Mode | Memory Acc | DMA Acc | Description |
|---|---|---|---|
| 00 | D(63:0) | D(63:0) | 64-bit access mode. Accesses may be memory or DMA. |
| 01 | D(63:32) | D(63:32) | 32-bit access mode. Accesses may be memory or DMA. |
| 10 | D(63:32) | D(31:0) | Split Mode. Memory access will be to one half of the memory address space and DMA accesses will be to the other half. |
| 11 | | | <Reserved: DO NOT USE> |

Figure 33A:
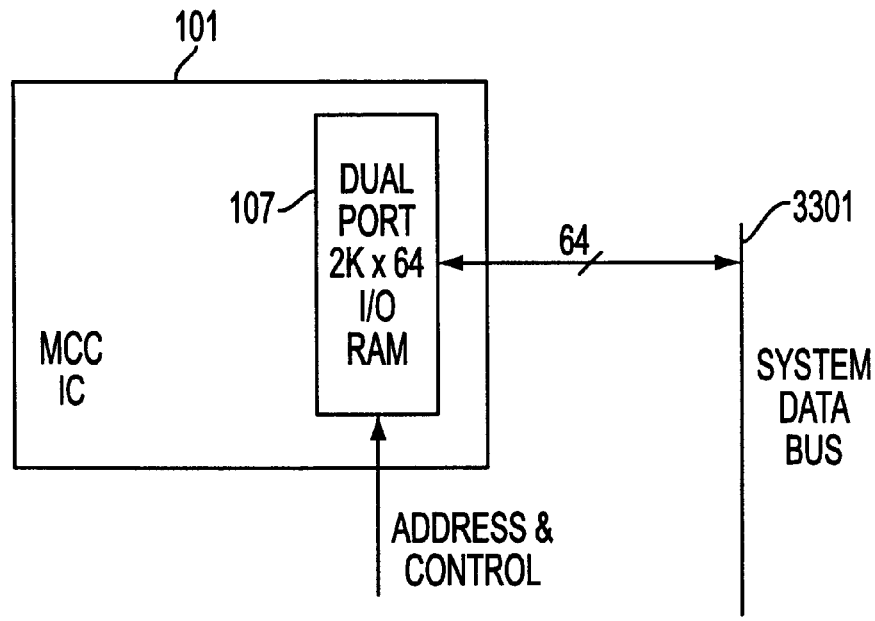
FIGS. 33A–33D illustrate different modes for externally accessing the I/O RAM in accordance with one aspect of the invention.
Figure 33B:
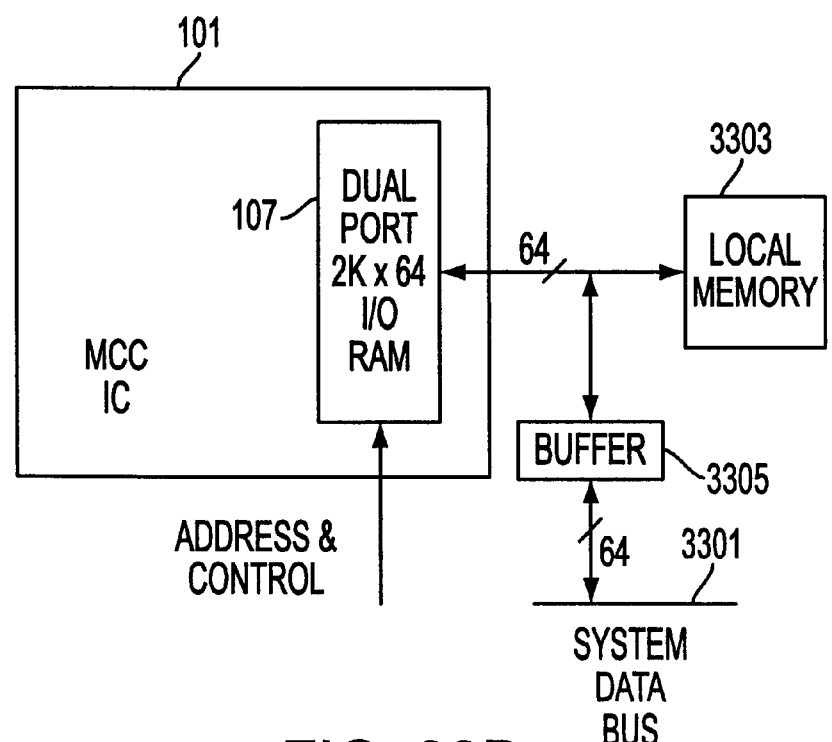

Mode 0 configures the bus width to 64-bits and allows for the fill address range of the I/O RAM 107 to be accessed for either memory accesses or DMA accesses. In this mode it is the responsibility of the board-level logic to arbitrate the usage of the bus between memory accesses and DMA. FIGS. 33A and 33B illustrate applications utilizing Mode 0. In FIG. 33A, a System Data Bus 3301 is directly connected to the I/O RAM 107 in a manner that permits the exchange of 64-bit wide data words. FIG. 33B shows a setup that allows access by both a System Data Bus 3301 and a Local Memory 3303. The component labeled "buffer 3305" does not function as a memory, but instead as a bus tri-stater. The Local Memory 3303 is for image paging (for fast up-close access).

Figure 33C:
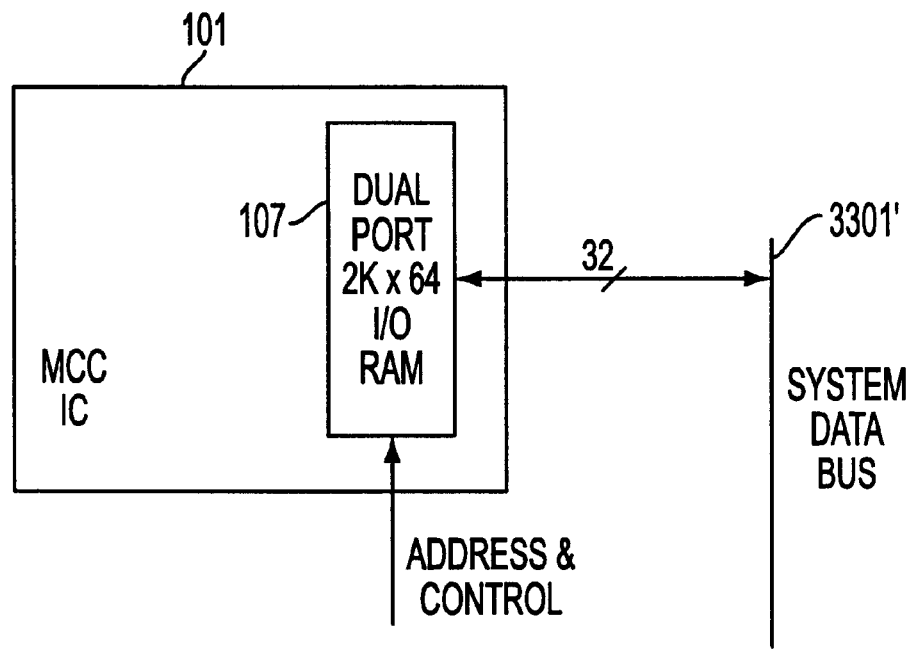

Mode 1 is identical to Mode 0 except that the bus width is reduced to 32-bits. FIG. 33C shows a System Data Bus 3301' directly coupled to the I/O RAM 107 for access in this fashion. The byte-select signals are used to steer the data. Byte select signals 0 to 3 allow the "high" 32-bits of an address location to be accessed and byte select signals 4–7 allow the "low" 32-bits of an address location to be accessed.

Figure 33D:
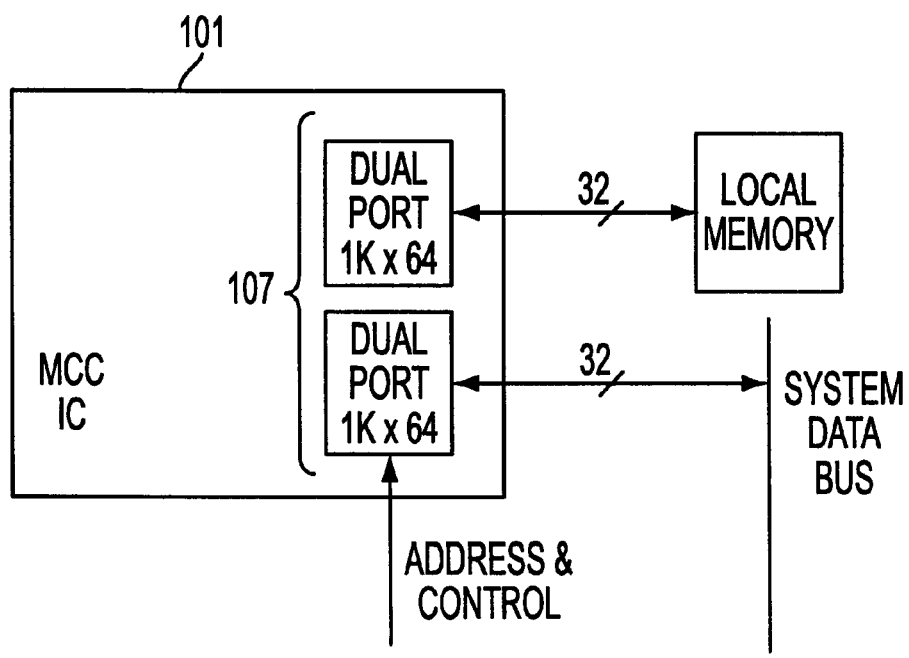

Mode 2 configures the 64-bit bus to be split into two separate 32-bit buses. A configuration utilizing this access mode is depicted in FIG. 33D. In this mode, the I/O RAM 107 appears to the user as two separate memories, with one responding only to memory accesses and the other responding to DMA accesses only. In this mode, memory accesses and DMA accesses may be concurrent. The "high" 32-bits (63:32) will allow access to the "low" half of the address range (0-0x3ff) as memory access space and the "low" 32-bits (31:0) will allow access to the "high" half of the address range (0x4000-x7ff) as DMA access space. Note that in this mode the DMA address counter value of 0 addresses location 0x400 in the I/O RAM 107.

12.2 DMA Operations

The exemplary MCC IC 101 does not require an external DMA controller. However, the following considerations are made for board designs that may include an external DMA controller.

12.2.1 DMA Input Images

For frame rate processing in which the image input time is expected to overlap with array processing, it is expected that an external DMA controller will write the image into the I/O RAM 107. After the initial image is input by the external DMA controller and moved into either the PE RAM 601 or the Page RAM 603 (collectively referred to herein as "PE-accessible RAM") using the I/O-Sequencer 607, the host processor can then begin each algorithm cycle with an instruction to move the input image to the PE-accessible RAM using the I/O sequencer 607 and then command the DMA controller to begin inputting the next image into I/O RAM 107. It is expected that the "DMA controller done" status (or interrupt) will inform the processor of the availability of the next input image in the I/O RAM 107. No handshaking signals are needed to or from the MCC IC 101 in this case because the host processor will be coordinating both the algorithm execution and the input DMA operations.

12.2.2 DMA Output Images

For frame rate processing in which the image output time is expected to overlap with array processing, it is expected that at the end of the algorithm execution cycle an external DMA controller will be programmed to move the output image from I/O RAM 107 to an external memory. The host processor can launch an instruction to the MCC IC 101 to move the image from PE-accessible RAM to the I/O RAM 107 using the I/O-Sequencer 607, and while the I/O-Sequencer 607 is moving the data the host processor can command the DMA controller to move the data from the I/O RAM 107 to the external memory. The DMA controller should not be allowed to proceed until the I/O-Sequencer operation is complete. For this purpose the I/O-Sequencer busy" status is brought out on an external pin (IOS_BUSY). The DMA controller can proceed in this case once the IOS BUSY signal goes inactive.

13. GLOR and Pattern Register Logic

Global I/O refers to the movement of data or information from or to an entire MCC IC 101 or an array of MCC ICs 101. The MCC IC 101 supports this capability through the generation of Global OR (GLOR) signals along with several internal GLOR registers. Each PE 701 may contribute to the generation of GLOR signals: PE Glor, Row Glor, Column Glor, and Over. Signals from individual PEs 701 are logically ORed together to produce a global signal.

Every PE clock cycle produces global signals which may optionally be sampled as specified by the PE command word 1001. Data sample commands are issued with the instruction creating the data to be sampled. The actual data will not be available for several clocks due to the pipeline nature of the PE 701, and the required pipeline delays to gather (OR) the results of the PE arrays 103. This is especially true when global data is gathered from an array of MCC ICs 101. The MCC IC 101 automatically self-times the data sample, eliminating the need for a user to know precise clock delays for instruction execution.

Once sampled, data may be moved within the MCC IC 101, read from the MCC IC 101, used for execution control (PEGLOR register), and/or broadcast back into the PE array 103.

Several GLOR signals and registers are supported. Chip GLOR 4225 is an OR of the PE GLOR signals from an entire PE array 103. The Chip GLOR signal 4225 may immediately (within the same chip producing it) be sampled into the GLOR_Data register 1825. Alternatively, it may be output via the MCC IC's output pin that conveys the GSTAT signal 4241, where it may be externally sampled and/or ORed with GSTAT signals 4241 from other MCC ICs 101 and fed back into all MCC ICs 101 to be sampled by a GLOR Data register 1825. The MCC IC 101 provides self-timing support for the external ORing as well as a GVLD signal to indicate valid GSTAT data. The Over signal from the PE array may also be processed in the same manner.

The GLOR and pattern register logic includes seven registers for the broadcast and sampling of array data and associated control logic. The seven registers include the X_Pattern register 1827, Y_Pattern register 1829, GLOR_Data register 1825, and four quadrant ("quad") GLOR registers 1843. The four quad GLOR registers 1843 are individually referred to herein as the NW_Quad register, the NE_Quad register, the SW_Quad register and the SE_Quad register. The GLOR_Data register 1825 and the X- and Y-Pattern registers 1827, 1829 each interact with the whole PE array 103, whereas each of the quad GLOR registers 1843 interacts with a particular quadrant of the PE array 103. In the exemplary embodiment, each of the quad GLOR registers 1843 interacts with a respective one of four 16×16 PE array quadrants. Additionally, the GLOR_Data register 1825 can sample off-chip data (presumably an array GLOR generated externally) supplied via the GLOR_In input port 1845.

For purposes of description it is useful to think of the four quadrant GLOR registers 1843 collectively, because they can only act collectively. That is, they all broadcast simultaneously and/or sample simultaneously, responding to a common set of control signals. Therefore, as shown in Table 106, there are four resources for which broadcasting and sampling are done: the GLOR-Data register 1825, the X_Pattern register 1827, the Y_Pattern register 1829, and the quadrant GLOR registers 1843. In the case of the row and column GLORs, the X_Pattern and Y_Pattern registers 1827, 1829, capture the data and directly feed their contents back into the PE array 103. The contents of the GLOR_Data register 1925 and quadrant GLOR registers 1843 may be serially overlayed upon PE command words 1001 to inject (broadcast) data back into the PE array 103. The quadrant GLOR registers 1843 allow each PE quadrant to receive a different scalar value. The GLOR_Data register 1825 and quadrant GLOR registers 1843 support simultaneous sampling and reading (instruction overlay) of GLOR data, enabling a short instruction loop for broadcasting information from the array or making decision tree branches.

The mechanism for broadcast in all cases is microcode control via PSEQ command. The X- and Y-Pattern registers 1827, 1829 broadcast in response to normal NS and EW commands, while the GLOR Data register 1825 and quad GLOR registers 1843 broadcast in response to Pick1 Discrete signals. Sampling is accomplished via a delay shift register in response to Pick1 Discrete signals in all cases (refer to Table 65, above).

TABLE 106

| Register(s) | Broadcast | Sample Internal | Sample External |
|---|---|---|---|
| X_Pattern | EW_Sel | Yes | No |
| Y_Pattern | NS_Sel | Yes | No |
| GLOR_Data | Discrete | Yes | Yes |
| Quadrant GLOR | Discrete | Yes | No |

Each of the four resources employs its own broadcast and sample control machine, which includes a 'sample_control' register. The GLOR_Data register 1825 and quadrant GLOR machines also employ Reg_Rd and Reg_Wr counters. The description of broadcast and sampling which follows is a general one which is applicable to each of the machines.

During broadcast and sampling, access to register data is controlled by two counters, Reg_Rd and Reg_Wr. The Reg_Rd counter provides the bit number from which broadcast data is taken while the Reg_Wr counter provides the bit number to which sampled data is written. The Reg_Rd counter increments each time a broadcast command is issued and the Reg_Wr counter increments each time a sampling control signal is received (from the Sample_Control register). Both counters are cleared when the Pick1 Sample_Clear signal is issued. For the GLOR_Data and quad GLOR registers 1825, 1843, control for broadcasting is provided by the Pick1 field of the PSEQ command. For the X- and Y-Pattern registers 1827, 1829, control for broadcasting is provided by the PSEQ command.

The sampling process is controlled by sampling delay registers (Sample_Delay_nt and Sample_Delay_Ext) and a Sample_Control register. (The appropriate delay register is selected by an internal/external select bit in glor_sel_and delay register (see Table 55), i.e., internal is selected for chip GLOR sampling, and external is selected for GLOR_in (array GLOR) sampling.) The sample delay registers are initialized with the appropriate delay values for a given system (e.g., internal=4, external>=6 depending on the delay external to the chip). The Sample_Control register is a shift register that shifts in a logical '1' when a sample instruction (Pick1) is issued and a logical '0' otherwise. The applicable sample delay register determines the bit offset to read in the Sample_Control register to enable sampling by the selected destination resource.

Sampling must have a deterministic delay from the output of the overlay logic 1209 to the GLOR-related registers. In the presence of possible conflicts or I/O cycle steals, this delay cannot be performed in software. Thus, the sequence of events for sampling is as follows:

1. A sampling discrete is issued and a P.E. command 1001 is issued for source data to be loaded (e.g., ld C-Reg).
2. A '1' is shifted into Sample_Control(0).
3. Several clocks pass, the '1' moves toward the read position (based upon selected delay).
4. The '1' is read enabling the global data to be sampled into selected destination register(s).

The PSEQ command word provides sampling and broadcast controls. The broadcast controls are performed by the overlay logic 1209 and coincide with the PE commands that use the broadcast data. Sampling controls coincide with the PE commands that generate the data to be sampled. The sampling process does not finish until the delay time has elapsed following the end of the primitive containing the sample controls. Safe operation is ensured by following the sample primitive with a delay primitive issued by the instruction sequencer 1205. Fast operation is afforded by omitting the delay. This allows the expert programmer (who knows how to avoid dependency conflicts) to provide a faster, though less robust, sampling operation.

Where simultaneous broadcasting (i.e., propagating a global value to the array by means of the overlay logic) and sampling are desired, the appropriate delay is -built into the microcode. For example, if the appropriate delay is four, a primitive is issued to broadcast the first four bits, followed by a primitive to broadcast the rest of the bits while sampling all bits. This is followed by a delay primitive (if "safe" operation is desired) or no primitive (if "fast" operation is desired).

During sampling, the current sample data bit is written to the Reg.Wr bit position. All bit positions above the Reg_Wr value are also written, based on the Answer operand's Signed attribute, effectively sign extending the sampled data to cover all 32 bits of the destination register. (This applies to the GLOR_Data and quad GLOR registers 1825, 1843 only.) Where the destination operand is unsigned (Signed= 0), a 0 is written to all bits above the Reg_Wr value. Where the destination operand is signed, the sample data value is written to the high bits.

The means for feedback of global values is similar for the array GLOR, chip GLOR and quadrant GLOR. In each case, multi-bit registers capture the global bit values as they are generated by the PEs 701 and the synchronization is enforced by control logic. The array GLOR and chip GLOR values are captured in the chip GLOR register while a set of four registers is employed to simultaneously capture all quadrant GLOR values.

The row and column global values are different in that they each represent multi-bit (e.g., 32-bit) values. The capture of one of these values therefore requires a single clock only and occupies the entire destination register. The relatively complex control logic is not really required for these, so in the exemplary embodiment, a simple microcode solution is employed instead. The RowGLOR signal is captured in the Y-Pattern register 1829, and the ColGLOR signal is captured in the X-Pattern register 1827. Once captured, these signals may be read by an external control processor or rebroadcast into the array as pattern values. The mapping of RowGLOR to the Y-Pattern register 1829, and the ColGLOR to the X-Pattern register 1827 provides a natural pairing of row pattern to row broadcast and column pattern to column broadcast.

13.1 Application of quad GLOR registers 1843 in the MAD-BC Algorithm

The Minimum Absolute Difference (MAD) algorithm provides a measure of the similarity (correlation) between a source pattern (image S) and a reference pattern (image R). The correlation is computed by effectively sliding the reference pattern over the source pattern and determining the relative measure of correlation at each position. For example, the following shows how a 3×3 reference pattern is applied to a 5×5 source image:

```
1)  R r r . .
    r r r . .
    r r r . .
    . . . . .
    . . . . .

2)  . R r r .
    . r r r .
    . r r r .
    . . . . .
    . . . . .

3)  . . R r r
    . . r r r
    . . r r r
    . . . . .
    . . . . .

⋮

9)  . . . . .
    . . . . .
    . . R r r
    . . r r r
    . . r r r result: c c c . .
        c c c . .
        c c c . .
        . . . . .
        . . . . .
```

The above shows the sequence of correlation operations as image R is applied to image S. The uppercase 'R' shows the location to which the correlation result is written in the result image C (correlation). The correlation at each position is computed by summing the absolute value of the differences between corresponding image values. In step 1, for example, the correlation value C00=|r00−s00|+|r01−s01|+ . . . +|r22−s22|. In step 2, C01=|r00−s01|+|r01−s02|+ . . . +|r22−s23|, and so on.

The method outlined above shows an iterative process whereby one value of C is computed for each iteration. Each iteration involves a single multiply (in the 2-D SIMD array) and a 3×3 box sum which is accomplished in four adds in the SIMD array. Where the size of the reference pattern is at least half the size of the source pattern (n each dimension), this approach is fairly optimal.

Where a relatively small reference pattern is employed, it may be seen that the above approach would require lengthy computation. For example, a 3×3 reference pattern in a 64×64 image would require (64−2)×(64−2)=3844 iterations. A better approach in this example is to apply the reference pattern values to the image globally, thereby iterating on the reference pattern size (3×3=9 in this case). Rather than moving the reference image, the source image is moved in this approach.

Consider the original example of the 5×5 source image and 3×3 reference image. The following steps would be performed:

1) Subtract image S from r00 (r00 is supplied globally) and take absolute value. At the end of this step, C00= S00−r00, C01=|S01−r00|, and so on.
2) Shift image S to the west so that S01 is located at 00, and so on. Now subtract r01 from this shifted S, take absolute value and add to the accumulating correlation image C. Now, C00=S00−r00+|S01−r01|, and so on.
3–9) Continue to shift S west and south in a raster fashion (similar to the shifting of R in the original example) until all 9 differences have been accumulated.

At the end of this process, the correlation image C has valid MAD values at each of 'c' positions as shown in the original example. Clearly, where a whole-image correlation is computed using a relatively small reference pattern, this method has significant merit.

Occasionally, it is desirable to perform correlations upon "blocks" of values within an image (i.e., image segments). The image blocks may or may not represent contiguous image segments and the reference patterns may differ from one block to the next. This Minimum Absolute Difference with Block Correlation (MAD-BC) approach is easily applied to an array where the blocks are the dimension of the MCC IC 101.A correlation algorithm such as the one described above may be implemented wherein each MCC IC 101 broadcasts a different reference value on a given iteration, drawing this value from a unique reference pattern assigned to that MCC IC 101. On each iteration, a reference value load to the Chip GLOR_Data register 1825 of each MCC IC 101 in the array is required. This is followed by the broadcast, subtract, absolute value and shift for one iteration of the correlation algorithm. In this manner, a separate reference pattern is applied to the source image segments which correspond to MCC IC boundaries within the array, providing a block correlation.

The granularity of the block correlation can be further extended by using the Quad GLOR capabilities of the MCC IC 101 to provide correlations on block sizes of 16×16. This is accomplished in a similar manner to the MAD-BC description above except that four loads, one to each of the Quad GLOR registers 1843, is required for each. MCC IC 101 in the array on each iteration. For some applications, the use of Quad GLOR to perform MAD-BC correlations provides a speed improvement of 8-to-1 or more.

13.2 Pattern Generation Logic

The X- and Y-Pattern registers 1827, 1829 can be used as source registers for PE instructions (such as NS:=YPAT, and EW:=XPAT) and can be used as destination registers for row and column GLOR data. They can also be loaded via the Move Bus 1823 by the instruction sequencer 1205 from the mailbox memory 1821 or written into the mailbox memory 1821. They also can be shifted under command of the primitive sequencer 1207 using the 'discrete command" field. Shift operations shift a logic "0" into the input side.

14. Profile Logic 1847

In the exemplary embodiment, the profile logic 1847 includes three counters and two profile mask registers (see Table 55). The first counter counts clock cycles while the other two counters count events as enabled by the profile mask registers. Each of the profile mask registers is 16-bits wide and is paired with a profile counter to determine which events will contribute to the count. Each bit of the profile mask register enables (1) or inhibits (0) the contribution of an event to the profile count. Possible events are defined in Table 107.

TABLE 107

| Code | Event |
|---|---|
| 0 | ld/mov/st hold |
| 1 | alloc hold |
| 2 | deall hold |
| 3 | i/o hold |
| 4 | pipe empty nop accept |
| 5 | pseq event (pick1) |
| 6 | pseq accept |
| 7 | iseq accept |
| 8 | normal skew hold |
| 9 | skew conflict hold |
| 10 | memory conflict hold |
| 11 | wr_rd_order conflict hold |
| 12 | pseq profile1 (pseq store bit 36) |
| 13 | pseq profile2 & pseq accept (pseq bit 37) |
| 14 | Counter0 Rollover |
| 15 | Counter1/2 Rollover |

A counter is incremented when at least one event for which that counter is enabled is encountered. The event codes are the same for both profile mask registers except for 15, which is the Count1/2 rollover. This code applied to the profile1 mask allows counter1 to sample the rollover (i.e., the occurrence of a count up from 0xffffffff to 0) of counter2. Similarly, this code applied to the profile2 mask allows counter2 to sample the rollover of counter1.

The profile counters may be read in Instruction Mode or Direct Mode. An Instruction Mode read causes the counter to be cleared.

Operation of the profile counters during single stepping is identical to normal execution except that the counters will count during enabled clocks only.

An explicit profile event (codes 12, 13) is defined that originates in the P-seq microcode. This allows the programmer to tag specific operations for profiling during execution of code. The event may be counted on every clock (code 12, P-seq store (36)) or only during P-seq accept (code 13, P-seq store(37)) to provide time-in-operation vs. number-of-operations.

15. Pixel corner-turning: Alternative Embodiment

In the exemplary embodiment described above, pixel corner-turning is accomplished by moving pixels into predetermined ones of the PE's 701, and then performing a pixel redistribution algorithm within the PE array 103 (See FIGS. 28A–28B and 29A–29I). In an alternative embodiment, pixel corner-turning is accomplished by means of special hardware components interposed between the I/O array 107 and the PE array 103. This alternative embodiment will now be described.

Figure 34A:
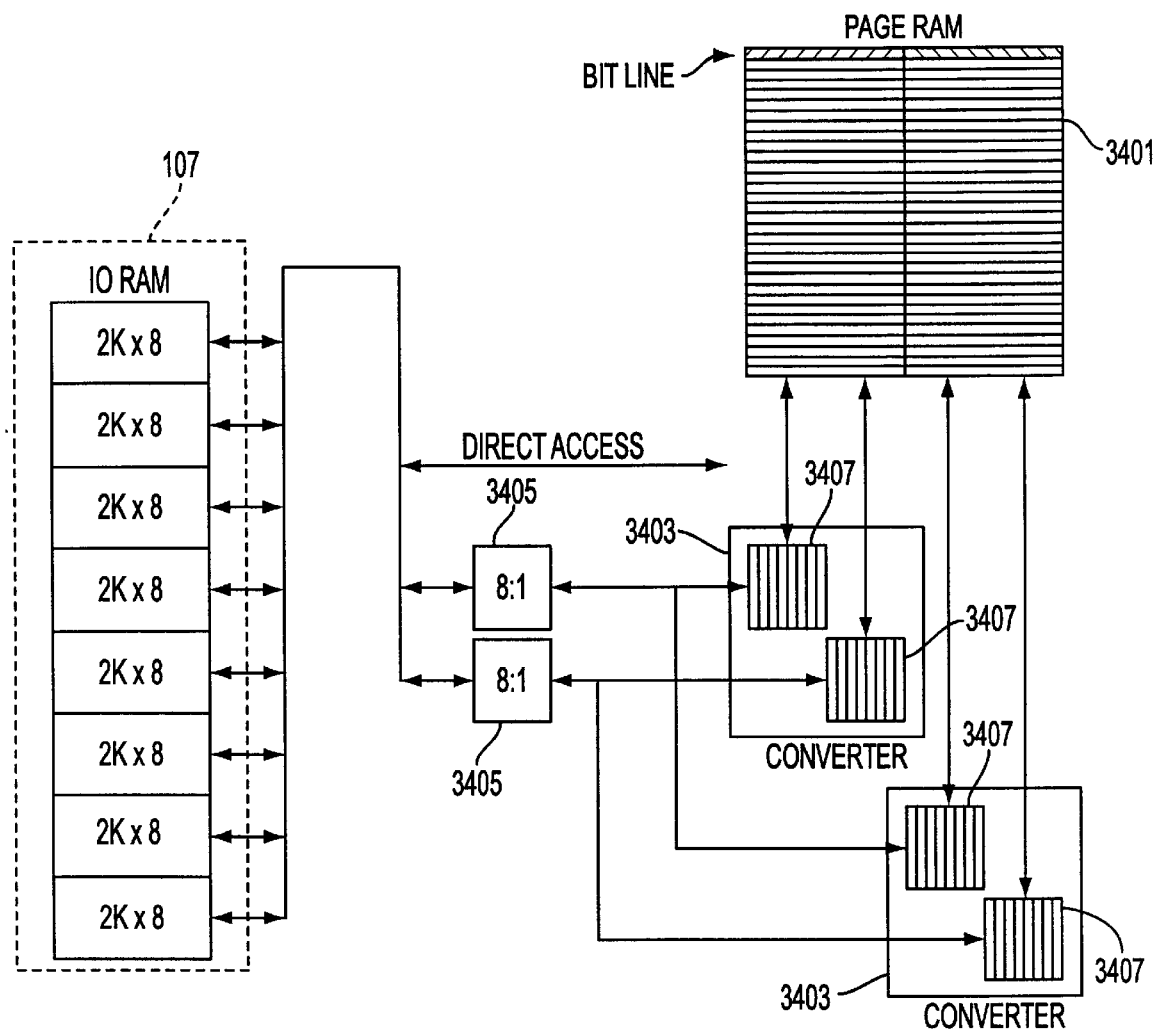
FIGS. 34A–34C illustrate pixel corner turning logic in accordance with one aspect of the invention.

Referring first to FIG. 34A, an arrangement is shown that includes an I/O RAM 107 that stores pixel data in raster-scanned pixel order as described above in Table 87. Also as described above, in the exemplary embodiment the I/O RAM 107 comprises eight addressable memory components, each being a 2 k×8 RAM. In this embodiment, each PE 701 includes a Page RAM 3401. The Page RAM 3401 of this embodiment differs from the Page RAM 603 described above in that the Page RAM 3401 of any particular row of PEs 701 in the PE array 103 may be accessed directly from outside the PE array 103. This means that one half row of data may be written into the Page RAM 3401 of a target row of the PE array 103 without disturbing the contents of any Page RAM 3401 located in any other row. Furthermore, this may be accomplished in a single access operation; there is no need to shift the data through the array to get it to, or to receive it from, the target row.

Interposed between the I/O RAM 107 and the Page RAM 3401 are first and second converters 3403 each coupled to first and second multiplexors 3405. The purpose of the first and second converters 3403 is to perform forward and reverse pixel corner-turning of 8-bit wide data. The purpose of the first and second multiplexors 3405 is to enable the corner-turning of data that is a multiple of 8-bit wide data (e.g., 16, 24, 32, . . . ), as will be explained in greater detail below.

Each of the first and second converters 3403 comprises two blocks of parallel-to-serial/serial-to-parallel (PS/SP) shift registers 3407. In the exemplary embodiment, each block of PS/SP shift registers 3407 comprises eight PS/SP shift registers. The parallel I/O ports of the individual PS/SP shift registers are coupled together so that, in one phase of operation, data that is stored in each PS/SP shift register may be clocked in parallel to a neighboring PS/SP shift register. In another phase of operation, each of the PS/SP shift registers serially shifts data bits into or out of itself.

The process of moving data from the I/O RAM 107 to the Page RAM 3401 (where it is necessary to convert the pixel order from raster-scan ordering to -bitplane ordering) will now be described. Each of the first and second converters 3403 is coupled to the I/O RAM 107 through the first and second multiplexors 3405 in such a way that the first converter 3407 accesses one half of the I/O RAM 107, and the second converter 3407 accesses the other half of the I/O RAM 107. These accesses do not occur at the same time, however. Instead, the first and second converters 3407 "ping pong" their I/O RAM access operations.

Figure 34B:
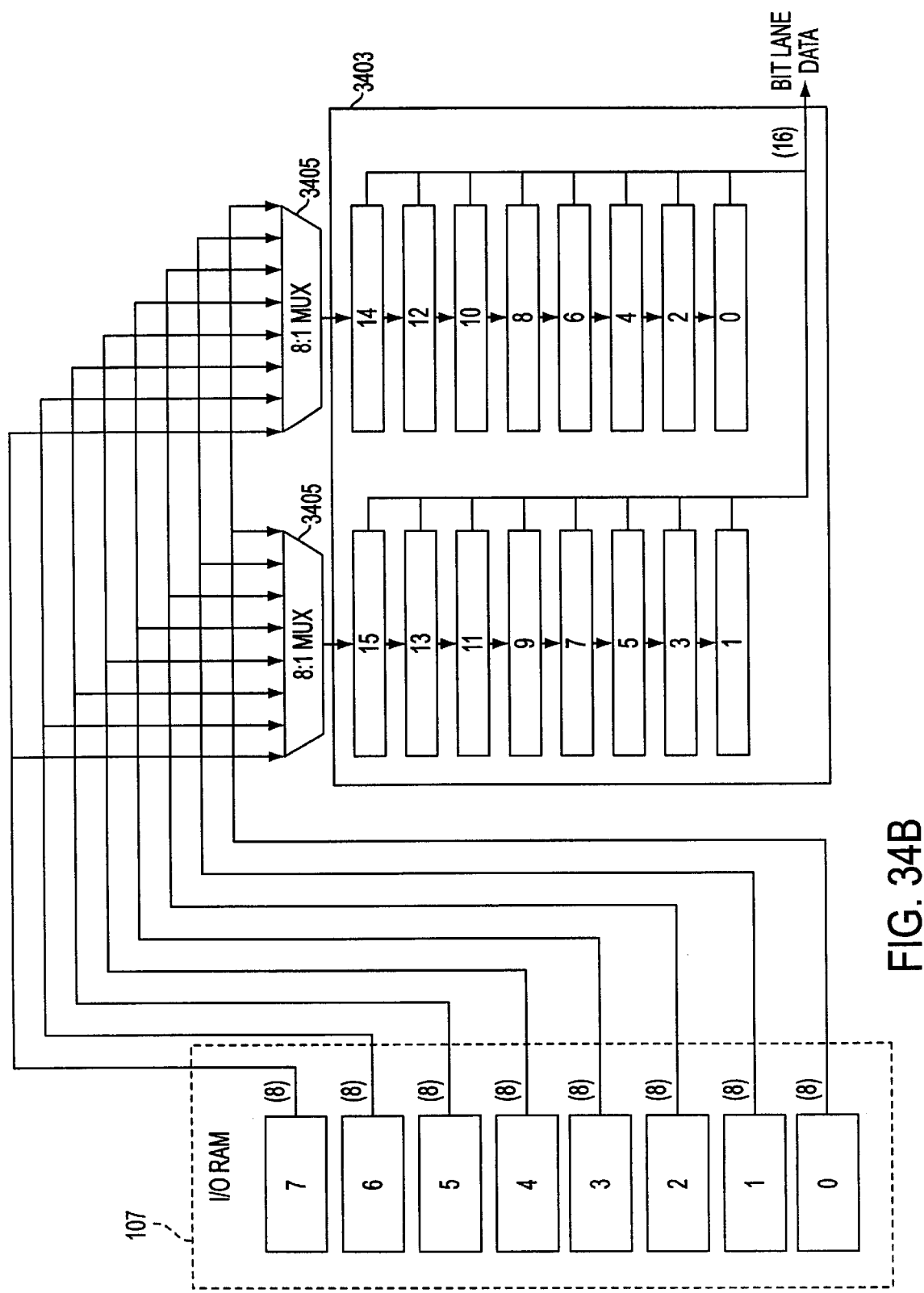

FIG. 34B depicts, in greater detail, the operation of one of the first and second converters 3403 during a transfer of data from the I/O RAM 107 to the Page RAM 3401. Assuming that an 8-bit pixel image is to be transferred, pixels are read from the I/O RAM 107 in a raster scan order, with the first 16 pixels being placed into the PS/SP shift registers in the order indicated in the figure. The two multiplexors 3401 permit 8-bit pixels to be accessed two at a time, so that it takes a total of eight clock cycles to fill the sixteen PS/SP shift register block 3407. Once loaded, the PS/SP shift registers are each controlled to shift data, one bit at a time, out of their respective serial ports. These single bits of data are combined (i.e., concatenated) to produce 16-bit wide bit-line data that is loaded into a respective left or right half of the Page RAM 3401 (i.e., in Page RAM 3401 located in either the left or right 16 PEs 701 in a row). (In the exemplary embodiment, the first converter 3403 is coupled to the left half of the Page RAM 3401, and the second converter 3403 is coupled to the right half of the Page RAM 3401.) The 8-bit pixels, shifted one bit at a time, therefore generate eight bit-lines of data that are stored into eight Page RAM locations in each of sixteen PEs 701.

As mentioned above, the first and second converters 3403 operate in "ping pong" fashion, so that while the first converter 3403 provides data to the left half of Page RAM 3401, the second converter 3403 receives the next sixteen 8-bit pixels from the I/O RAM. At the end of this operation, the two converters 3403 swap their function, so that the second converter 3403 provides data to the right half of Page RAM 3401 while the first converter 3403 receives the next sixteen 8-bit pixels from the I/O RAM. A single left-right ping pong operation writes 8-bit pixels to a full 32-PE row. This process is repeated for all thirty-two rows of PEs 701.

When images having pixels larger than eight bits are to be moved, the procedure is to first move eight bits of each pixel in accordance with the steps set forth above. Then, a next group of eight bits of each pixel is moved, and so on until all of the bits of each pixel have been moved. For example, when 16-bit pixels are to be moved, all of the most-significant eight bits of each pixel would first be moved from the I/O RAM 107 to the Page RAM 3401. Then, the least significant eight bits of each pixel would be moved. In order to accommodate the movement of pixels whose size is a varying multiple of eight bits, the exemplary embodiment provides first and second multiplexors 3405 that are each 8-to-1 multiplexors. This enables each converter to select corresponding 8-bit portions of consecutive pixels no matter how far apart those 8-bit portions are stored in the I/O RAM 107. For example, when 16-bit pixels are involved, the most significant bytes of consecutive pixels are stored into I/O RAM blocks 0, 2, 4 and 6, while the least significant bytes of these consecutive pixels are stored into I/O RAM blocks 1, 3, 5 and 7. By contrast, when 32-bit pixels are to be moved, the most significant bytes of consecutive pixels are stored into I/O RAM blocks 0 and 4, least significant bytes are stored into I/O RAM blocks 3 and 7, and the two middle bytes are stored into I/O RAM blocks 1 and 5; and 2 and 6, respectively. In this way, the first and second multiplexors function as means for coupling the converter 3403 to corresponding groups of bits (e.g., most significant bytes, least significant bytes, and the like) of consecutive pixels stored in the I/O RAM 107.

Figure 34C:
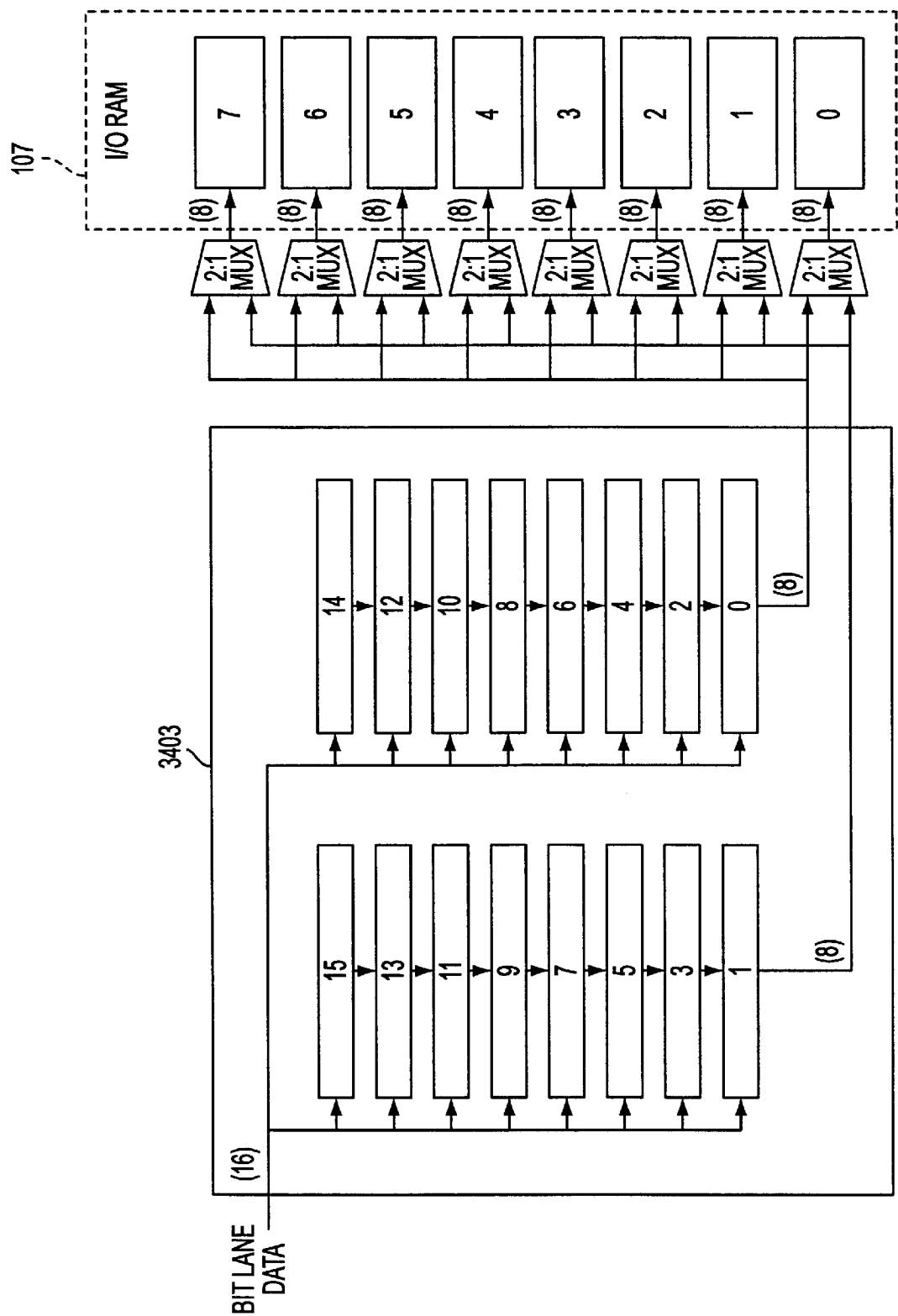

Referring now to FIG. 34C, a reverse procedure is employed to move and corner-turn data from the Page RAM 3401 to the I/O RAM 107. In FIG. 34C, only one of the first and second converters 3403 is shown. However, it will be recognized that two converters 3403 are employed in ping pong fashion in a similar way to that described above with respect to movement of data in the other direction. Each of the first and second converters 3403 functions the same way. Essentially, when dealing with 8-bit pixels, eight bit-lines of data are sequentially supplied to a converter 3403. A bit from each bit-line is supplied to a corresponding one of the PS/SP shift registers. After eight clock cycles, each of the PS/SP shift registers has eight bits of a pixel. The pixels are then written to appropriate banks of I/O RAM. When pixels greater than 8-bits are moved and converted, the process is performed once for each group of eight bits, as described above with respect to movement in the opposite direction.

In another aspect of the invention pertaining to this embodiment, bit plane data, or 1-bit images, may be transferred between the I/O RAM 107 and the Page RAM 3401 without passing through the first and second converters 3403.

16. Speed-enhanced Multiply and Divide Operations in the MCC IC 101

The bit-serial nature of the PE 701 makes the execution of multi-pass operations such as multiply and divide extremely time consuming. Where a conventional (i.e., multi-bit) processor may employ considerable logic enabling multi-bit computations to occur within a single (or very few) clock cycles, the bit-serial nature of the PE 701 does not lend itself to bit-parallel computations. Yet, the ability to quickly perform multiply and divide operations are key to the overall performance of signal processing architectures.

These problems are addressed in accordance with other aspects of the invention, which are described in the following sections. The techniques described below allow each pass of an operation (multiply or divide) to incorporate more steps, thereby reducing the number of cycles required to perform the operation. These techniques conform to the bit-serial nature of the PE 701, while providing a factor of two to three speedup in execution of these operations.

Each of the operations described below (i.e., the two multiply and one divide embodiments), is particularly well suited for application in the MCC IC 101. However, it will be recognized by those of ordinary skill in the art that they may be equally applied to any bit-serial processor environment, regardless of whether it is the MCC IC 101, a different SIMD architecture, or even an architecture having only a single bit-serial processor.

16.1 Fast Multiply

Figure 35:
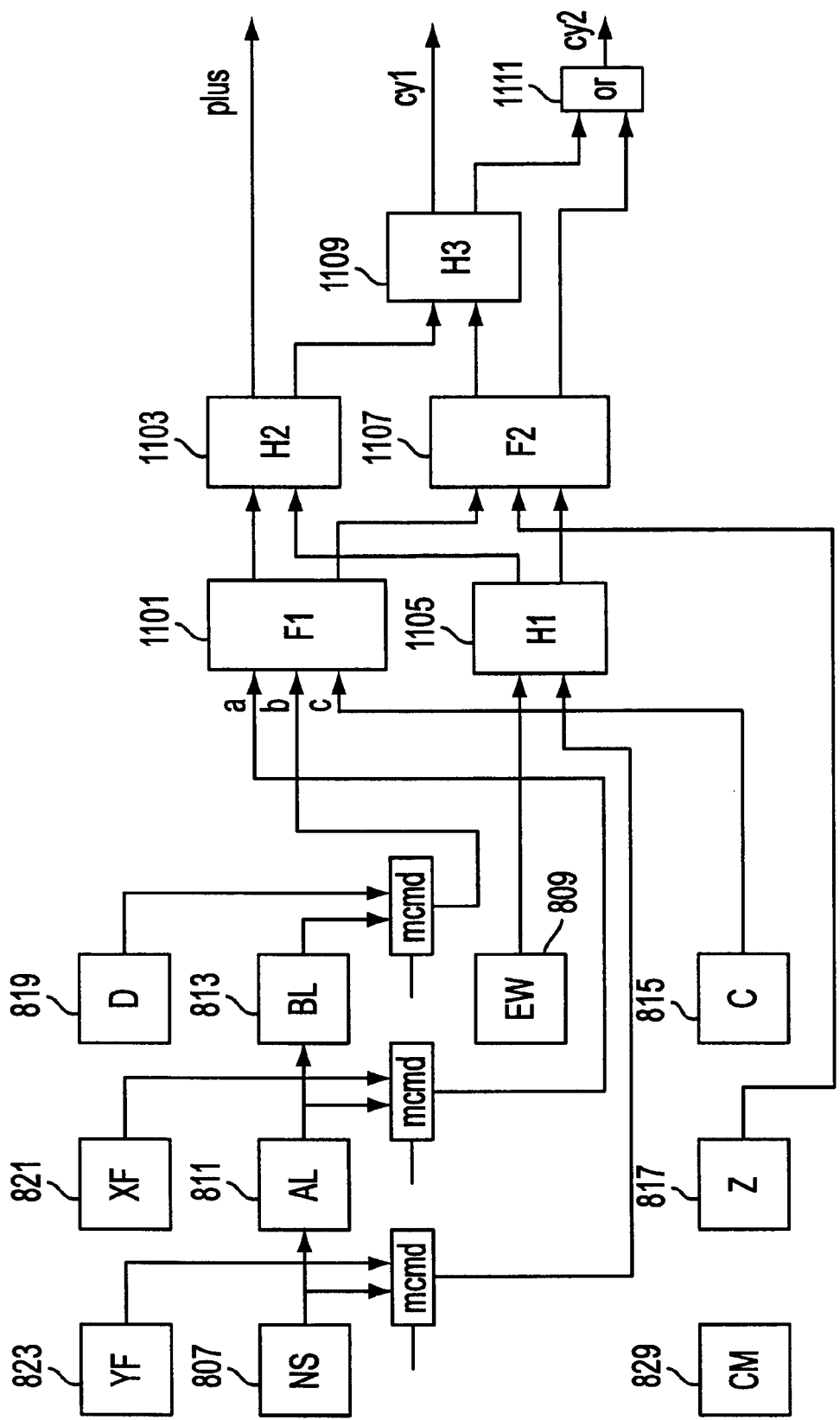
FIG. 35 illustrates the pertinent data paths within the PE. that are employed to effect an embodiment of a fast multiply operation in accordance with one aspect of the invention.

In accordance with one aspect of the invention, a fast multiply technique is utilized whereby at each step, a multiply between three multiplier bits and the multiplicand is performed, with the result being summed in a running accumulator. FIG. 35 illustrates the pertinent data paths within the PE 701 that are employed to effect this embodiment of the fast multiply operation. On a given clock, the three multiplier bits (i, i+1, i+2) mask three multiplicand bits a+2, j+1, j) respectively such that three multiplication bits of equal significance are generated as inputs to the ALU 801. The ALU 801, in turn, sums the three multiplication bits along with the accumulator bit, a least significant carry bit, and a most significant carry bit (which counts as 2).

At the beginning of a multiply step, the multiplier bits (i, i+1, i+2) are loaded to the YF, XF and D registers 823, 821, 819 respectively. The multiplicand bits are loaded to the NS register 807 one by one. As one bit is loaded to NS, the NS value is passed on to the AL register 811, and the AL value is passed on to the BL register 813. At any given time, the values in the NS, AL and BL registers 807, 811, 813 are multiplicand bits (j+2, j+1, j) respectively. As the NS register 807 loads bit 'j', the accumulator bit 'j' is loaded to the EW register 809. The new accumulator bit 'j' is stored from the PLUS output of the ALU 801 on the following clock.

During each clock, the carry lsb (CY1) is propagated to the C register 815, and the carry msb (CY2) is propagated to the Z register 817. These values are supplied to the ALU 801 for the next clock cycle.

Figure 36:
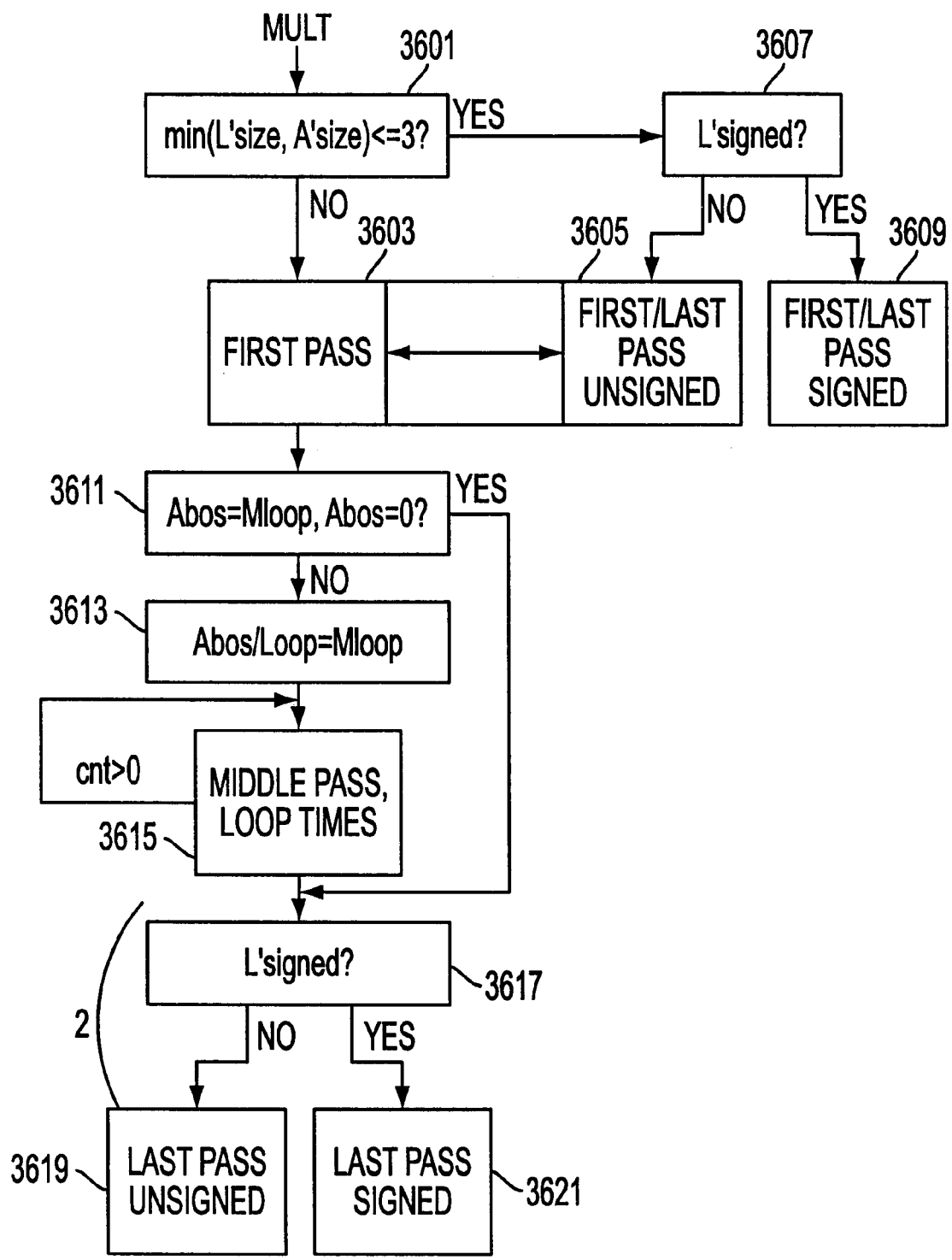
FIG. 36 is a flow chart depicting the flow of control for a first embodiment of a fast multiply operation in accordance with one aspect of the invention.

The control flow for the above-described multiply operation is further depicted in the flow chart of FIG. 36. The multiply operation is staged as a series of 3-bit multiply "passes". Each pass represents the multiply of the Right operand by 3 bits of the Left operand and the addition of the product to the accumulator image.

There are three kinds of passes: a First pass, one or more Middle passes, and a Last pass. The First pass is one in which a zero value is used as the accumulator input. The Middle passes use the accumulator as both the Right input and the Answer output. The Last pass performs a signed multiply if the Left image is signed. (The Last pass where Left is unsigned is no different from a Middle pass.) Where the Left or Answer image is size 3 or less, a combined First and Last pass is also required. There are two types of First/Last pass: one for Left'signed=0, and one for Left'signed 1. These passes, which are the points where image computation is performed, are shown in blocks 3603, 3605, 3609, 3615, 3619 and 3621.

Blocks 3601, 3607, 3611, 3613 and 3617 illustrate loop and branch points. At the beginning of the operation, a branch is taken if the Left or Answer image size is 3 or less. Where this condition holds, a single pass is all that is required. A second branch is taken at block 3607 depending on whether the Left operand is signed or not. The appropriate first/last pass (i.e., one of blocks 3605 and 3609) is executed and the operation is complete.

When both the Left and Answer operand sizes are greater than 3, a normal first pass is performed (block 3603). After this pass, the loop count is computed in Abos (Abos=Mloop, block 3611), and a branch around the loop is taken if this count is equal to zero. (The count will be equal to zero if only two passes are required, i.e., the Left or Answer size is six or less.) If the branch is not taken, a second computation is performed (Abos=Mloop, block 3613) and the loop is established. The middle passes are then executed Mloop times (block 3615).

At the exit of the loop, a branch is taken on Left'signed (Block 3617). Where the Left operand is signed, a signed last pass is performed (block 3621). At the end of the last pass, the multiply operation is complete.

The operation described above requires the presence of two condition codes and three bos codes in the Iseq functions, as shown in Table 108.

TABLE 108

| Command | Function |
|---|---|
| cc = 12 | Abos = 0 |
| cc = 13 | min(L'size, A'size) < = 3 |
| bos = 53 | [(min(L'size, A'size) + 2)/3] − 2† |
| bos = 54 | upcnt |
| bos = 55 | min(A'size − 1, upcnt + R'size + 3) |

Note:
†Brackets indicate integer value of divide

16.1.1 A Looping Enhancement

In accordance with another aspect of the invention, an examination of the multiply flow diagram shows that a benefit can be gained if the branch around the loop can be combined with the loop initialization instruction. Since a loop-zero-times is not provided any other way, this could be a significant benefit to the loop capability in general.

This capability would be provided by allowing a jump address to be specified in the Imm field during the LDP. (This is possible because the Imm field is not used by LDP in the exemplary embodiment.) Where the loop count to be loaded is zero, a branch would be taken instead of beginning execution of the loop. The loads and pushes would also be inhibited thereby effectively bypassing the loop altogether, that is, performing zero loop iterations.

16.2 Fast Multiply: Alternative Embodiment

In an alternative embodiment, a multiply by any n-bit number (where n is even) can be accomplished by n/2 adds and/or subtracts with 1 operation deferred. For example, suppose it is desired to multiply a value Z by binary 0100 1101 0011 1010. This may be accomplished 4 bits at a time as follows (where the symbol "<<" indicates a left shift):

1. A=0+(Z<<1)+(Z<<3);
2. A=A+(Z<<4)+(Z<<6);—since 0011=0100−0001
3. A=A+(Z<<8)−(Z<<10);—1101=00001−0100 w/carry out
4. A=A+(Z<<12)+(Z<<14);—carry in changes 0100 to 0101=0100+0001

A nybble multiplier is accomplished with:

a 5-input adder (A, Z1, Z2, C1, C2) (8 input, 3 cy out for byte mult);

2 reg bit carry out 2 input inverters 4 reg bit nybble value 4 reg bit shift reg 1 reg bit accumulator 1 reg bit RAM write (only if this is a critical path).

This is a total of 12 registers that would be required in each PE 701 (21 if a byte multiply is desired). The improvements to be gained are:

mult 8: 80 down to 35;

mult 16: 290 down to 100 mult 24: 625 down to 200 (130 for byte mult)

mult 32: 1090 down to 290.

Figure 37:
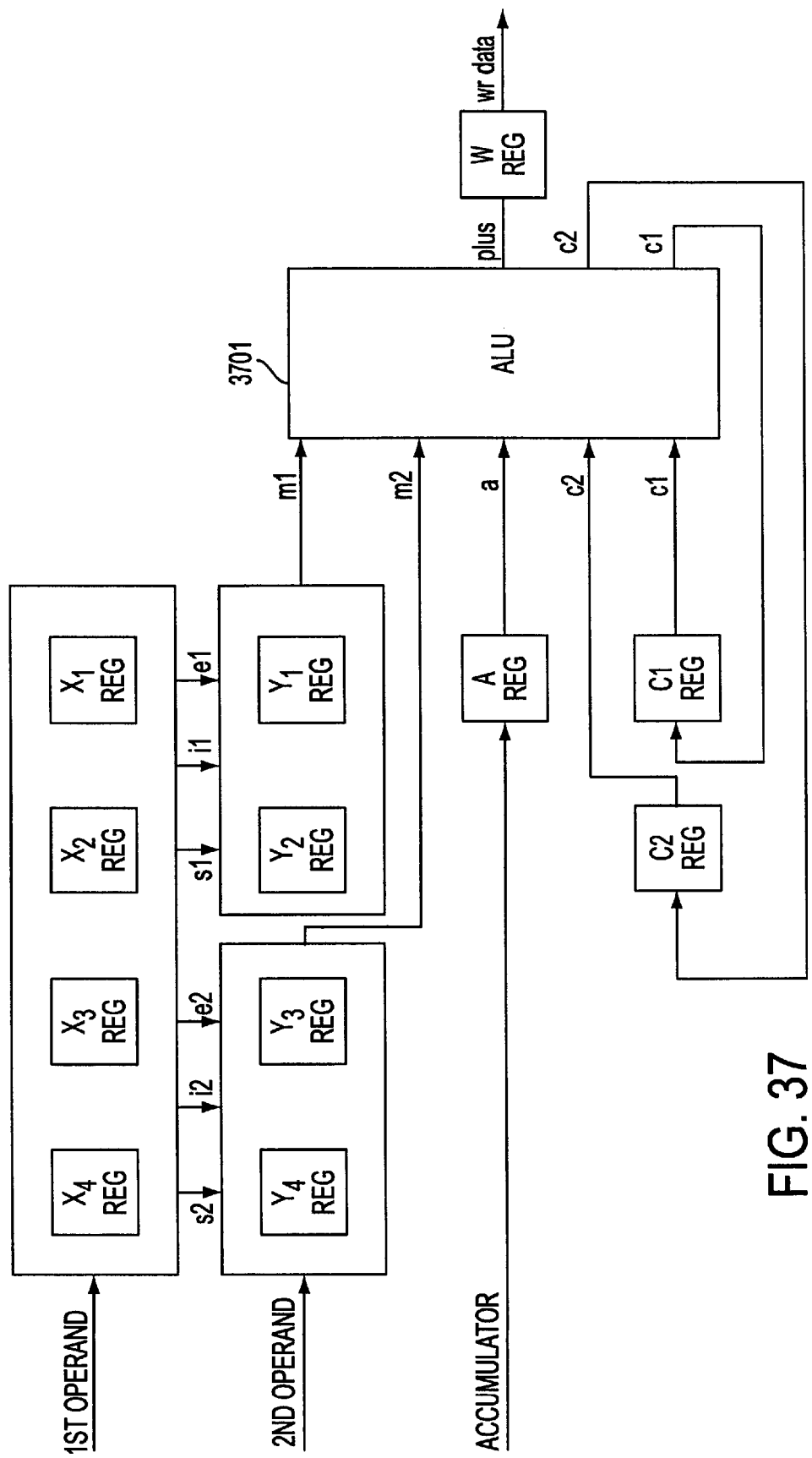
FIG. 37 is a block diagram of an alternative embodiment of a PE for supporting a second embodiment of a fast multiply operation in accordance with one aspect of the invention.

Referring now to FIG. 37, a modified (i.e., alternative embodiment) architecture for a PE 701 is depicted. The multiply function requires that the ALU 3701 function as a 5-input adder, where the inputs are:

a—accumulator bit;

m1—multiply data 1 (table below)

m2—multiply data 2 (table below)

c1—carry bit 1 c2—carry bit 2 (significance is 2)

Each of the inputs is of equal significance except for C2 which counts as 2 (i.e., C1 and C2 taken together form a 2-bit number).

This adder can, on a given bit operation, generate a sum that ranges from 0 to 6. There are therefore 3 outputs: PLUS, C1 and C2. The C1 and C2 bits are the carry out to the next bit operation and as such represent significance of 2 and 4 as outputs of the current operation, but are of significance 1 and 2 as inputs to the next operation. The outputs are:

P—plus/sum output

C1—carry bit 1

C2—carry bit 2

The ALU logic is represented by information contained in Table 109:

TABLE 109

| c2 | c1 | m2 | m1 | a | C2 | C1 | P |
|---|---|---|---|---|---|---|---|
| 0 | 0 | 0 | 0 | 0 | 0 | 0 | 0 |
| 0 | 0 | 0 | 0 | 1 | 0 | 0 | 1 |
| 0 | 0 | 0 | 1 | 0 | 0 | 0 | 1 |
| 0 | 0 | 0 | 1 | 1 | 0 | 1 | 0 |
| 0 | 0 | 1 | 0 | 0 | 0 | 0 | 1 |
| 0 | 0 | 1 | 0 | 1 | 0 | 1 | 0 |
| 0 | 0 | 1 | 1 | 0 | 0 | 1 | 0 |
| 0 | 0 | 1 | 1 | 1 | 0 | 1 | 1 |
| 0 | 1 | 0 | 0 | 0 | 0 | 0 | 1 |
| 0 | 1 | 0 | 0 | 1 | 0 | 1 | 0 |
| 0 | 1 | 0 | 1 | 0 | 0 | 1 | 0 |
| 0 | 1 | 0 | 1 | 1 | 0 | 1 | 1 |
| 0 | 1 | 1 | 0 | 0 | 0 | 1 | 0 |
| 0 | 1 | 1 | 0 | 1 | 0 | 1 | 1 |
| 0 | 1 | 1 | 1 | 0 | 0 | 1 | 1 |
| 0 | 1 | 1 | 1 | 1 | 1 | 0 | 0 |
| 1 | 0 | 0 | 0 | 0 | 0 | 1 | 0 |
| 1 | 0 | 0 | 0 | 1 | 0 | 1 | 1 |
| 1 | 0 | 0 | 1 | 0 | 0 | 1 | 1 |
| 1 | 0 | 0 | 1 | 1 | 1 | 0 | 0 |
| 1 | 0 | 1 | 0 | 0 | 0 | 1 | 1 |

TABLE 109-continued

| c2 | c1 | m2 | m1 | a | C2 | C1 | P |
|----|----|----|----|---|----|----|---|
| 1 | 0 | 1 | 0 | 1 | 1 | 0 | 0 |
| 1 | 0 | 1 | 1 | 0 | 1 | 0 | 0 |
| 1 | 0 | 1 | 1 | 1 | 1 | 0 | 1 |
| 1 | 1 | 0 | 0 | 0 | 0 | 1 | 1 |
| 1 | 1 | 0 | 0 | 1 | 1 | 0 | 0 |
| 1 | 1 | 0 | 1 | 0 | 1 | 0 | 0 |
| 1 | 1 | 0 | 1 | 1 | 1 | 0 | 1 |
| 1 | 1 | 1 | 0 | 0 | 1 | 0 | 0 |
| 1 | 1 | 1 | 0 | 1 | 1 | 0 | 1 |
| 1 | 1 | 1 | 1 | 0 | 1 | 0 | 1 |
| 1 | 1 | 1 | 1 | 1 | 1 | 1 | 0 |

Table 110 shows a mapping of multiplier 4-bit groups to add/subtract operations. For example, a pattern of 0001 maps to an add at S0, 0010 maps to an add at S1, 0011 maps to an add at S2 and subtract at S0 (effectively 3=4−1). Using add and subtract, the goal is to find a combination of operations for each input that is implemented with one or fewer operations per shift pair (S3:S2, S1:S0). Some combinations such as 1111 require that 1 be added to the next 4-bit group. In the case of 1111, the implementation is 16−1=15, requiring a carry out to the next 4-bit group (hence the 'C' column in table 110).

Table 111 shows that this mapping may be realized for each pair as enable (E), invert (I) and delay (D) signals. These signals are applied to multiplicand bit pairs as shown in FIG. 37 to produce the two ALU inputs m1, m2. Enable allows/inhibits the ALU input while the invert passes/inverts the input. The delay selects which of the two multiplicand bits to use as the input.

TABLE 110

| 3 | 2 | 1 | 0 | S3 | S2 | S1 | S0 | C |
|---|---|---|---|----|----|----|----|----|
| 0 | 0 | 0 | 0 | 0 | 0 | 0 | 0 | 0 |
| 0 | 0 | 0 | 1 | 0 | 0 | 0 | + | 0 |
| 0 | 0 | 1 | 0 | 0 | 0 | + | 0 | 0 |
| 0 | 0 | 1 | 1 | 0 | + | 0 | − | 0 |
| 0 | 1 | 0 | 0 | 0 | + | 0 | 0 | 0 |
| 0 | 1 | 0 | 1 | 0 | + | 0 | + | 0 |
| 0 | 1 | 1 | 0 | 0 | + | + | 0 | 0 |
| 0 | 1 | 1 | 1 | + | 0 | 0 | − | 0 |
| 1 | 0 | 0 | 0 | + | 0 | 0 | 0 | 0 |
| 1 | 0 | 0 | 1 | + | 0 | 0 | + | 0 |
| 1 | 0 | 1 | 0 | + | 0 | + | 0 | 0 |
| 1 | 0 | 1 | 1 | 0 | − | 0 | − | 1 |
| 1 | 1 | 0 | 0 | 0 | − | 0 | 0 | 1 |
| 1 | 1 | 0 | 1 | 0 | − | 0 | + | 1 |
| 1 | 1 | 1 | 0 | 0 | 0 | − | 0 | 1 |
| 1 | 1 | 1 | 1 | 0 | 0 | 0 | − | 1 |

There are multiple mappings that will accomplish the function. The mapping shown above is convenient in that it never requires more than one operation (add/sub) for each pair (S0/S1, S2/S3) of shift positions. Each pair can therefore provide a single input to the PE ALU 3701. Each of the two inputs can be described in terms of its delay and inversion. Specifically, where the operation is "sub", an inversion is applied, and where the operation occurs at the second shift position within the pair (S1 and S3), a delay is applied. We can express the S0 . . . S3 columns of Table 110 in terms of inversion (I), delay (D) and enable (E) for the two ALU adder inputs (1, 2) as shown in Table 111.

TABLE 111

| 3 | 2 | 1 | 0 | S3 | S2 | S1 | S0 | C | D2 | I2 | E2 | D1 | I1 | E1 |
|---|---|---|---|----|----|----|----|---|----|----|----|----|----|----|
| 0 | 0 | 0 | 0 | 0 | 0 | 0 | 0 | 0 | x | x | 0 | x | x | 0 |
| 0 | 0 | 0 | 1 | 0 | 0 | 0 | + | 0 | x | x | 0 | 0 | 0 | 1 |
| 0 | 0 | 1 | 0 | 0 | 0 | + | 0 | 0 | x | x | 0 | 1 | 0 | 1 |
| 0 | 0 | 1 | 1 | 0 | + | 0 | − | 0 | 0 | 0 | 1 | 0 | 1 | 1 |
| 0 | 1 | 0 | 0 | 0 | + | 0 | 0 | 0 | 0 | 0 | 1 | x | x | 0 |
| 0 | 1 | 0 | 1 | 0 | + | 0 | + | 0 | 0 | 0 | 1 | 0 | 0 | 1 |
| 0 | 1 | 1 | 0 | 0 | + | + | 0 | 0 | 0 | 0 | 1 | 1 | 0 | 1 |
| 0 | 1 | 1 | 1 | + | 0 | 0 | − | 0 | 1 | 0 | 1 | 0 | 1 | 1 |
| 1 | 0 | 0 | 0 | + | 0 | 0 | 0 | 0 | 1 | 0 | 1 | x | x | 0 |
| 1 | 0 | 0 | 1 | + | 0 | 0 | + | 0 | 1 | 0 | 1 | 0 | 0 | 1 |
| 1 | 0 | 1 | 0 | + | 0 | + | 0 | 0 | 1 | 0 | 1 | 1 | 0 | 1 |
| 1 | 0 | 1 | 1 | 0 | − | 0 | − | 1 | 0 | 1 | 1 | 0 | 1 | 1 |
| 1 | 1 | 0 | 0 | 0 | − | 0 | 0 | 1 | 0 | 1 | 1 | x | x | 0 |
| 1 | 1 | 0 | 1 | 0 | − | 0 | + | 1 | 0 | 1 | 1 | 0 | 0 | 1 |
| 1 | 1 | 1 | 0 | 0 | 0 | − | 0 | 1 | x | x | 0 | 1 | 1 | 1 |
| 1 | 1 | 1 | 1 | 0 | 0 | 0 | − | 1 | x | x | 0 | 0 | 1 | 1 |

Each ALU input is generated by using a delay (D) as a select between the two shift positions of the pair, XORing the selected data with the inversion (I), and ANDing the result with the enable (E).

16.3 Fast Divide

Figure 38:
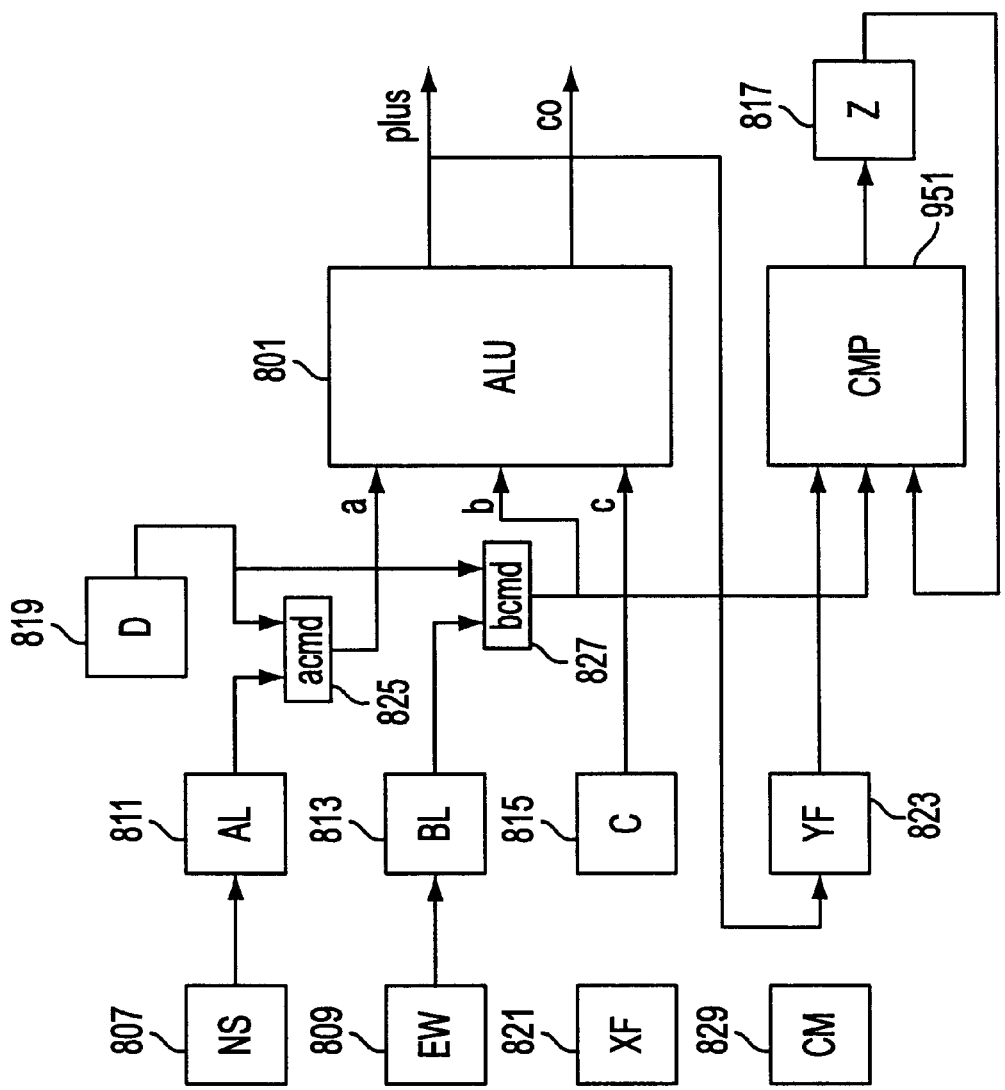
FIG. 38 is a block diagram of pertinent data paths through the PE for performing a fast divide operation in accordance with one aspect of the invention.

In accordance with another aspect of the invention, a quick divide technique is provided that includes two strategies that each individually improve performance over conventional methods. The pertinent data paths through the PE 701 that are called into play for the fast divide are depicted in the block diagram of FIG. 38. The first strategy is to combine the conditional subtract for one quotient bit (from a given iteration) with the compare for the next quotient bit (for the subsequent iteration). The second strategy is to provide a zero/non-zero mask for denominator bits beyond the current quotient most significant bit (msb), thereby removing the need to look at all denominator bits on every iteration. Each of these methods provides a theoretical speedup approaching 2 to 1 compared to conventional techniques and, in practice the methods combine to provide approximately 3-to-1 overall improvement. These strategies will now be described individually.

16.3.1 Normal Divide Algorithm

Figure 39A:
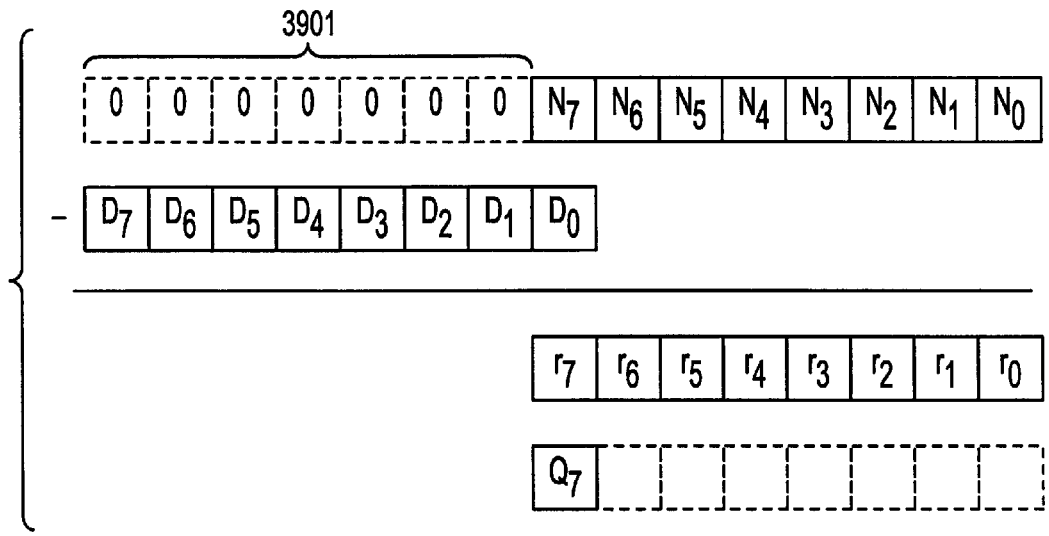
FIGS. 39A and 39B respectively depict first and second iterations of a conventional divide operation.
Figure 39B:
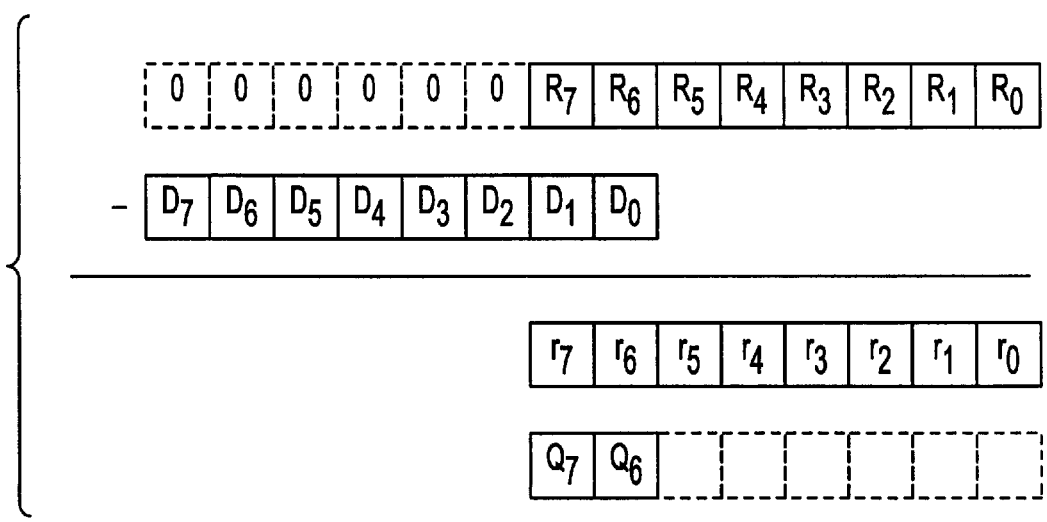

To better appreciate the various aspects of the improved divide techniques, a short discussion of conventional divide techniques will first be presented, with reference being made to FIGS. 39A and 39B, which respectively depict exemplary results from first and second divide iterations.

The bit-serial unsigned divide algorithm is a straightforward series of compare and conditional subtract operations. The first iteration of divide is accomplished by comparing the numerator to the denominator where the denominator is shifted with respect to the numerator so that the denominator least significant bit aligns with the numerator most significant bit. This is shown in FIG. 39A using 8-bit operands.

The numerator size is effectively extended by zero padding 3901 at the most significant end such that it covers the extent of the denominator bits. (This is a conceptual step—it does not involve any computation.) The shifted denominator is compared to the numerator and the result (1 if D<=N, else 0) is stored as the most significant quotient bit ($Q_7$). This result is then used as the condition mask for the subtract operation. In other words, the conditional subtract to produce the remainder (r)=N−D where $Q_7$ otherwise r=N.

The second iteration of the divide is similar to the first except that the numerator is replaced by the remainder from the previous iteration (R), the denominator is shifted by 6 instead of 7, and $Q_6$ is computed as shown in FIG. 39B. The remaining 6 iterations are similar to the second, where the denominator is shifted by 1 less each time, the next lower quotient bit is computed, and the conditional subtract produces the updated remainder.

16.3.2 "Compare Ahead" Strategy

Figure 40:
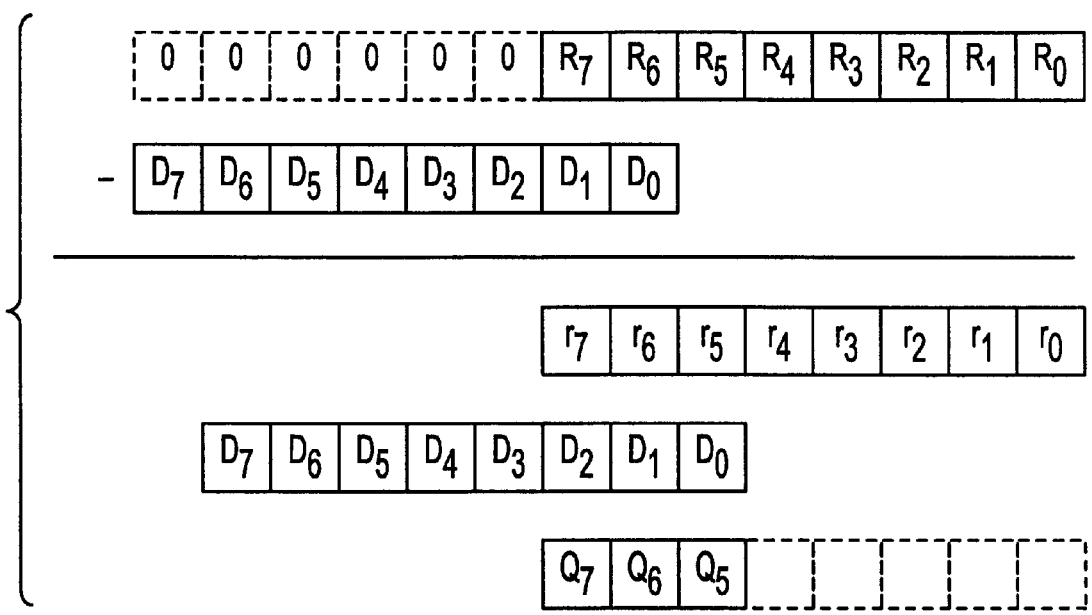
FIG. 40 depicts an exemplary iteration in accordance with a first improvement to performing a divide operation.

As mentioned earlier, a first aspect of the improved fast divide algorithm is to combine the conditional subtract from a given iteration with the compare for the subsequent iteration. This is possible because the conditional subtract portion of a divide step generates the remainder value for the next divide step. The combination of these steps is accomplished by diverting each remainder bit, as it is generated, into a comparison circuit. Referring now to FIG. 40, the subtract to generate the remainder (r) is the result of R–D conditioned on $Q_6$. At the same time, $Q_5$ is computed by comparing D to (r). D is effectively shifted by 1 less, representing the next iteration, while (r) is used as the remainder, representing the next iteration's R.

Referring back to FIG. 38, this aspect of the invention is supported in the exemplary embodiment of the MCC IC 101 by routing the PLUS output of the ALU 801 ($r_i$) to the YF register 823 on each clock cycle. The contents ($r_i$) of the YF register 823 are compared to the bit value contained in the D register 819 during the next clock while the ALU 801 is generating the next remainder ($r_{i+1}$). The D bit which is subtracted from ($R_{i+1}$) is therefore the same D bit that is compared to ($r_i$). In this manner each (r) bit for compare is matched to the next higher D bit than the corresponding R bit for conditional subtract. Therefore, the compare function is effectively performed for the subsequent iteration during the generation of the remainder in the current iteration.

More particularly, the current subtract of denominator bit 'j' (in the BL register 813) from remainder bit 'I' (in the AL register 811) produces the new remainder bit 'I' at the PLUS output of the ALU 801. The compare for the next iteration needs to be denominator bit 'j' with remainder bit 'i–1', the bit produced by the previous conditional subtract bit operation. These bits are brought together by delaying the remainder bit 1 clock via load to the YF register 823. The compare is therefore between the respective outputs of the BL register 813 and the YF register 823. On each clock, the Z register 817 records a '1' if YF>BL, '0' if YF<BL, and retains the previous value if YF=BL.

16.3.3 Remainder Zero/Non-Zero Mask

Figure 41:
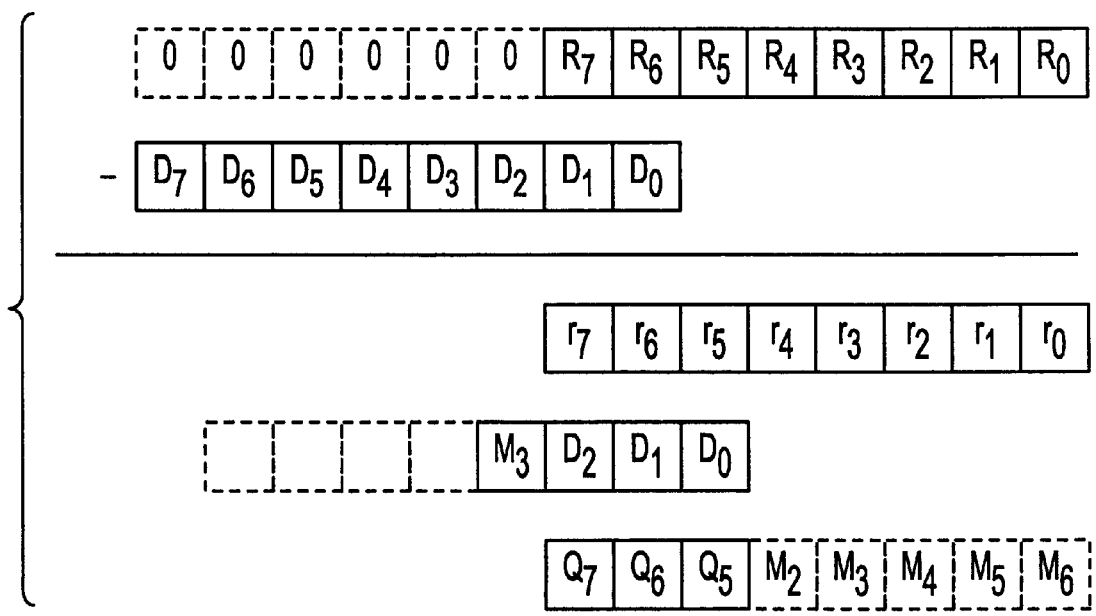
FIG. 41 depicts an exemplary iteration in accordance with a second improvement to performing a divide operation.

A second aspect of the fast divide technique arises from a recognition that on iteration (i), only the lowest (i) denominator bits will be used during the conditional subtract. Should the previous compare result be true (i.e., the prevailing remainder is greater than the shifted denominator), it is a given that all unread denominator bits (those aligned beyond the R msb) are 0. If any unread denominator bit were not 0, the previous compare would have failed because the effective denominator value must be greater than the remainder. In other words, one of the D bits which match up with a padded '0' is a 1 and the subtraction cannot take place. To determine that the compare will fail, it is only necessary to know whether any one of the D bits in the range 7:i (7:2 in the example depicted in FIG. 41) is non-zero. Rather than examine every D bit in the range 7:2, a mask bit (M) is consulted that is set to 1 if any $D_{7:2}$ is not 0. The generation of an image ($M_{7:0}$) where each bit $M_i$ represents the condition $D_{7:i}$ is not 0, is straightforward and requires only eight clocks. The quotient image (Q) may be used as temporary storage for the mask image (M) since each M bit may be discarded when used and replaced by the newly generated Q bit.

Looking at how this second divide improvement is applied in the exemplary PE 701, on a given divide step, the quotient bit 'i' is generated by comparing denominator bit 0 to remainder bit 'i', denominator '1' to remainder 'i+1', and so on. To provide a complete comparison, the whole denominator is compared to a sign extended remainder (assuming the offset carries the denominator past the remainder msb). Bit by bit comparison beyond the remainder msb is unnecessary since a '1' anywhere in this portion of the denominator means remainder(i)<denominator. Therefore, quotient(i)=0, and the condition for subtraction is 0. The condition of zero/non-zero for the denominator bit slice (i . . . msb) for all 'i' may be precalculated in a single pass and stored in the quotient image. Each bit operation will require the use of one of the zero/non-zero mask bits, and will replace it with the newly calculated quotient bit.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for processing data, comprising:
   at least one processing element for processing data in response to processing element command words, wherein each of said at least one processing element includes a random access memory (RAM) having a plurality of storage locations, and wherein each storage location is capable of storing an n-bit data unit, n being an integer greater than zero; and
   a controller for generating processing element command words that are supplied to the at least one processing element and which cause the at least one processing element to manipulate an M-bit operand, M being evenly divisible by n,
   wherein:
   the controller utilizes an image descriptor that represents the M-bit operand to generate addresses for accessing the M-bits of the operand stored in the RAM; and
   the image descriptor includes a map field comprising a plurality of address fields, each for addressing one of the storage locations in the RAM.

2. The apparatus of claim 1, wherein the controller uses each one of the address fields to generate addresses for accessing a number, q, of n-bit data units, where q is greater than one.

3. The apparatus of claim 2, wherein q equals four.

4. The apparatus of claim 2, wherein addresses stored in each one of the address fields are in the form of a RAM storage address divided by q.

5. The apparatus of claim 1, wherein:
   the controller uses each one of the address fields to alternatively generate addresses for accessing a number, q, of n-bit data units, where q is greater than one, or addresses for accessing a single n-bit data unit;
   addresses stored in each one of the address field may alternatively be in the form of a RAM storage address or a RAM storage address divided by q; and
   each image descriptor further includes a mask field for designating which form of address field is contained in the image descriptor.

6. The apparatus of claim 1, further comprising an addressable image descriptor table for storing a plurality of image descriptors.

7. The apparatus of claim 6, wherein the controller generates the processing element command words in response to a received instruction that includes an operand field that designates an address of one of the image descriptors stored in the addressable image descriptor table, wherein the addressed image descriptor represents the M-bit operand.

8. The apparatus of claim 1, wherein each image descriptor further includes a size field for specifying a size value from which the controller determines how many of the address fields are presently being used for specifying an operand.

9. The apparatus of claim 8, wherein each image descriptor further includes an extend field for indicating whether the operand is of a predetermined extended size not indicated by the size field.

10. The apparatus of claim 9, wherein when the extend field indicates that the operand is of the predetermined extended size, the size field is used to indicate an address of an n-bit data unit that forms a portion of the operand.

11. The apparatus of claim 10, wherein floating point operands in the apparatus are represented by data having the predetermined extended size.

12. The apparatus of claim 1, further comprising:
an allocation unit for allocating an image descriptor to a designated operand in response to a received allocation instruction; and
means for populating the map field of the allocated image descriptor with RAM addresses.

13. The apparatus of claim 12, wherein each image descriptor further includes a field that indicates whether the map field is populated.

14. The apparatus of claim 13, wherein the means for populating the map field operates in response to detecting that a received instruction specifies the designated operand as a destination operand, and further detecting that the map field of the allocated image descriptor has not yet been populated.

15. The apparatus of claim 12, wherein each image descriptor further includes a field that indicates whether the image descriptor is allocated.

16. The apparatus of claim 1, wherein:
the map field may alternatively comprise the plurality of address fields or a scalar operand; and
each image descriptor further includes a scalar field for indicating whether the map field comprises the plurality of address fields or the scalar operand.

17. The apparatus of claim 1, wherein:
each image descriptor further includes a signed attribute field for indicating whether the operand is a signed operand.

18. The apparatus of claim 17, wherein:
the controller responds to an indication that the operand is a signed operand by repeatedly generating a same RAM address of the operand sign bit for use over a sequence of processing element command words, thereby effectively extending the sign bit of the operand during processing that involves the operand.

19. An apparatus for processing data, comprising:
at least one processing element for processing data in response to processing element command words, wherein each of said at least one processing element includes a first random access memory (RAM) having a plurality of storage locations, and a second RAM having a plurality of storage locations, and wherein each storage location is capable of storing an n-bit data unit, n being an integer greater than zero; and
a controller for generating processing element command words that are supplied to the at least one processing element and which cause the at least one processing element to manipulate an operand stored in one of the first and second RAMs,
wherein:
the controller utilizes an image descriptor that represents the operand to generate memory controls and addresses for accessing the operand stored in said one of the first and second RAMs; and
the image descriptor includes a storage field for indicating in which of the first and second RAMs the operand is stored.

20. The apparatus of claim 19, further comprising an addressable image descriptor table for storing a plurality of image descriptors.

21. The apparatus of claim 20, wherein the controller generates the processing element command words in response to a received instruction that includes an operand field that designates an address of one of the image descriptors stored in the addressable image descriptor table, wherein the addressed image descriptor represents the operand.

22. The apparatus of claim 19, further comprising:
an allocation unit for allocating an image descriptor to a designated operand in response to a received allocation instruction; and
population means for populating a map field of the allocated image descriptor with addresses from one of the first or second RAMs, and for setting the storage field of the allocated image descriptor to indicate in which of the first and second RAMs the operand is stored.

23. The apparatus of claim 22, wherein the population means attempts to populate the map field of the allocated image descriptor with addresses from that one of the first or second RAMs that is specified in the allocation instruction.

24. The apparatus of claim 23, wherein whenever the population means cannot populate the map field of the allocated image descriptor with addresses from that one of the first or second RAMs that is specified in the allocation instruction, it will attempt to populate the map field of the allocated image descriptor with addresses from that one of the first or second RAMs that is not specified in the allocation instruction.

25. A method of operating a data processing apparatus comprising at least one processing element for processing data in response to processing element command words, wherein each of said at least one processing element includes a random access memory (RAM) having a plurality of storage locations, and wherein each storage location is capable of storing an n-bit data unit, n being an integer greater than zero; and a controller for generating processing element command words that are supplied to the at least one processing element and which cause the at least one processing element to manipulate an M-bit operand, M being evenly divisible by n, the method comprising the step of:
in the controller, utilizing an image descriptor that represents the M-bit operand to generate addresses for accessing the M-bits of the operand stored in the RAM,
wherein the image descriptor includes a map field comprising a plurality of address fields, each for addressing one of the storage locations in the RAM.

26. The method of claim 25, further comprising the step of, in the controller, using each one of the address fields to generate addresses for accessing a number, q, of n-bit data units, where q is greater than one.

27. The method of claim 26, wherein q equals four.

28. The method of claim 26, wherein addresses stored in each one of the address fields are in the form of a RAM storage address divided by q.

29. The method of claim 25, wherein:
the controller further performs the step of utilizing each one of the address fields to alternatively generate addresses for accessing a number, q, of n-bit data units, where q is greater than one, or addresses for accessing a single n-bit data unit,
wherein:
addresses stored in each one of the address field may alternatively be in the form of a RAM storage address or a RAM storage address divided by q; and
each image descriptor further includes a mask field for designating which form of address field is contained in the image descriptor.

30. The method of claim 25, further comprising the step of storing a plurality of image descriptors in an addressable image descriptor table.

31. The method of claim 30, wherein the controller further performs te step of generating the processing element command words in response to a received instruction that includes an operand field that designates an address of one of the image descriptors stored in the addressable image descriptor table, wherein the addressed image descriptor represents the M-bit operand.

32. The method of claim 25, wherein each image descriptor further includes a size field for specifying a size value from which the controller determines how many of the address fields are presently being used for specifying an operand.

33. The method of claim 32, wherein each image descriptor further includes an extend field for indicating whether the operand is of a predetermined extended size not indicated by the size field.

34. The method of claim 33, wherein when the extend field indicates that the operand is of the predetermined extended size, the controller uses the size field to indicate an address of an n-bit data unit that forms a portion of the operand.

35. The method of claim 34, further comprising the step of representing floating point operands in the apparatus by data having the predetermined extended size.

36. The method of claim 25, further comprising the steps of:
allocating an image descriptor to a designated operand in response to a received allocation instruction; and
populating the map field of the allocated image descriptor with RAM addresses.

37. The method of claim 36, wherein each image descriptor further includes a field that indicates whether the map field is populated.

38. The method of claim 37, wherein the step of populating the map field is performed in response to detecting that a received instruction specifies the designated operand as a destination operand, and further detecting that the map field of the allocated image descriptor has not yet been populated.

39. The method of claim 36, wherein each image descriptor further includes a field that indicates whether the image descriptor is allocated.

40. The method of claim 25, wherein:
the map field may alternatively comprise the plurality of address fields or a scalar operand; and
each image descriptor further includes a scalar field for indicating whether the map field comprises the plurality of address fields or the scalar operand.

41. The method of claim 25, wherein:
each image descriptor further includes a signed attribute field for indicating whether the operand is a signed operand.

42. The method of claim 41, wherein the controller further performs the step of:
responding to an indication that the operand is a signed operand by repeatedly generating a same RAM address of the operand sign bit for use over a sequence of processing element command words, thereby effectively extending the sign bit of the operand during processing that involves the operand.

43. A method of operating a data processing apparatus comprising at least one processing element for processing data in response to processing element command words, wherein each of said at least one processing element includes a first random access memory (RAM) having a plurality of storage locations, and a second RAM having a plurality of storage locations, and wherein each storage location is capable of storing an n-bit data unit, n being an integer greater than zero; and a controller for generating processing element command words that are supplied to the at least one processing element and which cause the at least one processing element to manipulate an operand stored in one of the first and second RAMs, the method comprising the steps of:
in the controller:
utilizing an image descriptor that represents the operand to generate memory controls and addresses for accessing the operand stored in said one of the first and second RAM,
wherein the image descriptor includes a storage field for indicating in which of the first and second RAMs the operand is stored.

44. The method of claim 43, further comprising the step of storing a plurality of image descriptors in an addressable image descriptor table.

45. The method of claim 44, wherein the controller further performs the step of generating the processing element command words in response to a received instruction that includes an operand field that designates an address of one of the image descriptors stored in the addressable image descriptor table, wherein the addressed image descriptor represents the operand.

46. The method of claim 43, further comprising the steps of:
allocating an image descriptor to a designated operand in response to a received allocation instruction; and
populating a map field of the allocated image descriptor with addresses from one of the first or second RAMs, and setting the storage field of the allocated image descriptor to indicate in which of the first and second RAMs the operand is stored.

47. The method of claim 46, wherein the step of populating comprises attempting to populate the map field of the allocated image descriptor with addresses from that one of the first or second RAMs that is specified in the allocation instruction.

48. The method of claim 47, further comprising the step of attempting to populate the map field of the allocated image descriptor with addresses from that one of the first or second RAMs that is not specified in the allocation instruction whenever the map field of the allocated image descriptor cannot be populated with addresses from that one of the first or second RAMs that is specified in the allocation instruction.

* * * * *